(12) United States Patent
Rosen

(10) Patent No.: US 7,269,256 B2
(45) Date of Patent: Sep. 11, 2007

(54) ELECTRONIC-MONETARY SYSTEM

(75) Inventor: Sholom S. Rosen, New York, NY (US)

(73) Assignee: Citibank, N.A., New York, NY (US)

( * ) Notice: Subject to any disclaimer, the term of this patent is extended or adjusted under 35 U.S.C. 154(b) by 871 days.

(21) Appl. No.: 10/145,545

(22) Filed: May 13, 2002

(65) Prior Publication Data

US 2003/0070080 A1 Apr. 10, 2003

Related U.S. Application Data

(60) Continuation of application No. 09/138,459, filed on Aug. 21, 1998, now Pat. No. 7,028,187, which is a division of application No. 08/895,395, filed on Jul. 16, 1997, now Pat. No. 6,175,921, which is a division of application No. 08/730,158, filed on Oct. 23, 1996, now Pat. No. 5,703,949, which is a continuation of application No. 08/575,699, filed on Dec. 19, 1995, now abandoned, which is a division of application No. 08/234,461, filed on Apr. 28, 1994, now Pat. No. 5,557,518, and a continuation-in-part of application No. 09/039,933, filed on Mar. 16, 1998, now Pat. No. 6,047,887, which is a division of application No. 08/371,201, filed on Jan. 11, 1995, now Pat. No. 5,898,154, which is a division of application No. 07/794,112, filed on Nov. 15, 1991, now Pat. No. 5,453,601.

(51) Int. Cl.
*H04L 9/00* (2006.01)

(52) U.S. Cl. .................. 380/44; 713/168; 713/170; 713/175

(58) Field of Classification Search ................. 380/44, 380/46–47, 277, 282, 285; 713/168–170, 713/157, 175–176
See application file for complete search history.

(56) References Cited

U.S. PATENT DOCUMENTS 5,001,752 A * 3/1991 Fischer .................... 713/178
5,164,988 A * 11/1992 Matyas et al. ............. 713/156
5,406,628 A * 4/1995 Beller et al. ............... 380/30

* cited by examiner

*Primary Examiner*—Hosuk Song
(74) *Attorney, Agent, or Firm*—Morrison & Foerster LLP

(57) ABSTRACT

An improved monetary system using electronic media to exchange economic value securely and reliably is disclosed. The system provides a complete monetary system having electronic money that is interchangeable with conventional paper money. Also disclosed is a system for open electronic commerce having a customer trusted agent securely communicating with a first money module, and a merchant trusted agent securely communicating with a second money module. Both trusted agents are capable of establishing a first cryptographically secure session, and both money modules are capable of establishing a second cryptographically secure session. The merchant trusted agent transfers electronic merchandise to the customer trusted agent, and the first money module transfers electronic money to the second money module. The money modules inform their trusted agents of the successful completion of payment, and the customer may use the purchased electronic merchandise.

32 Claims, 160 Drawing Sheets

TRANSACTION MONEY MODULE

TELLER MONEY MODULE

MONEY GENERATOR MODULE

FIG. 8

| EXTERNAL INTERFACE | | | 56 |
|---|---|---|---|
| COMMUNICATION SESSION MANAGER | | | 57 |
| APPLICATION SERVICES | | | |
| 58 MANAGE NETWORK SIGN-ON | 59 SYNCHRONIZE TIME/ DATE | ROUTE 60 MESSAGE | DIRECT TO 61 BANK SERVICE |

| NETWORK SERVER |
|---|

SECURITY SERVER

FIG. 18

| TYPE OF TRANSACTION | STEP | CLEARING BANK | | ISSUING BANK | ACCOUNTING TRANSACTION |
|---|---|---|---|---|---|
| TRANSFER NOTES FROM CLEARING BANK TO ISSUING BANK | (1) | $100<br>$100 CR (ON ACCOUNT A) | →TRANSFER NOTES→ | $50 (DEPOSITED AT ISSUING BANK)<br>0 | D $100 A<br>D $150 MI<br>C $50 MD<br>C $200 DC |
| | | 0 | | $150<br>$100 CR | |

KEY: ( )- ALTERNATE VALUES AND STEPS

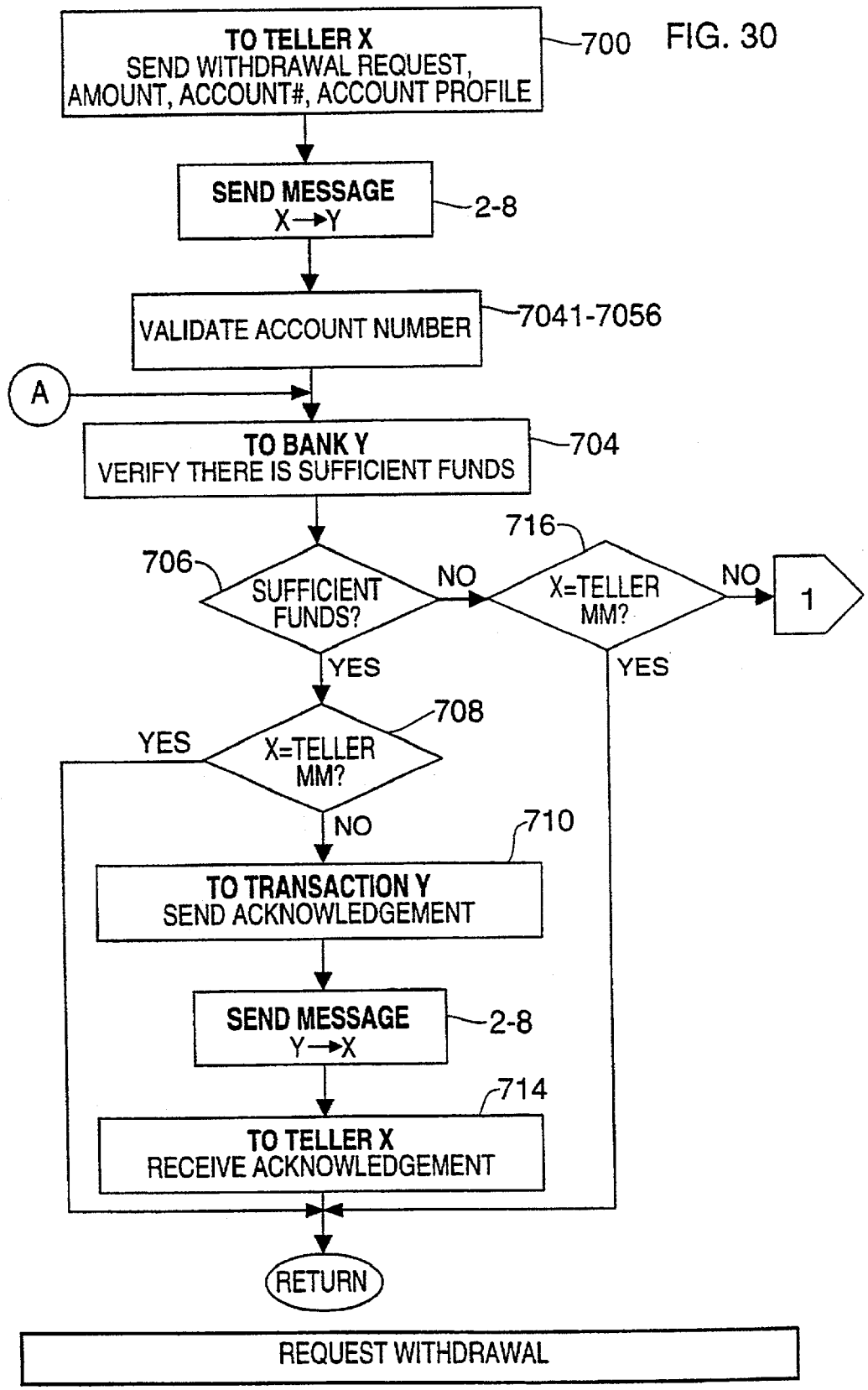

REQUEST WITHDRAWAL (CONTINUED)

SUBSCRIBER MONEY MODULE SIGN ON

SUBSCRIBER MONEY MODULE SIGN ON (CONTINUED)

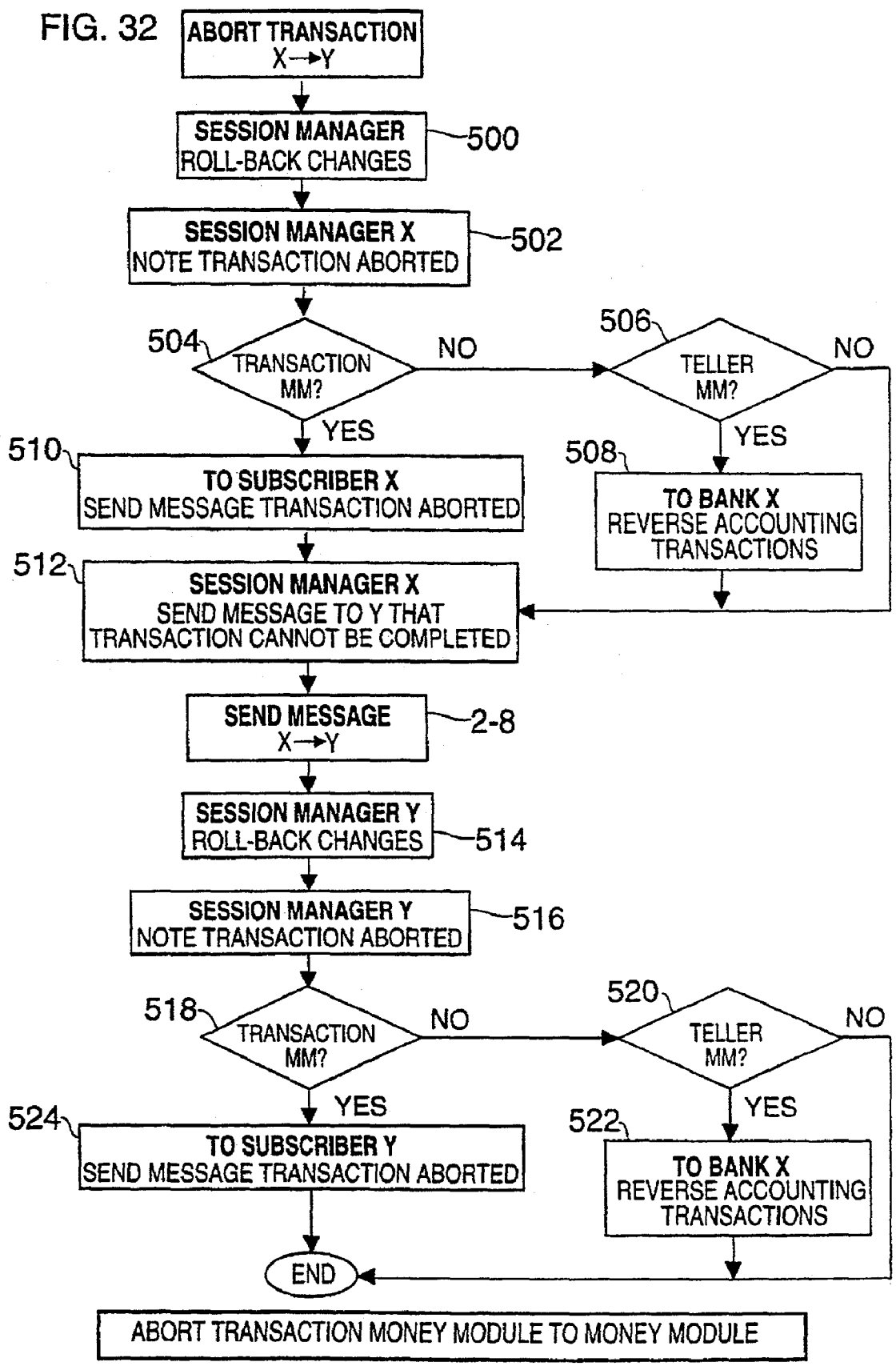

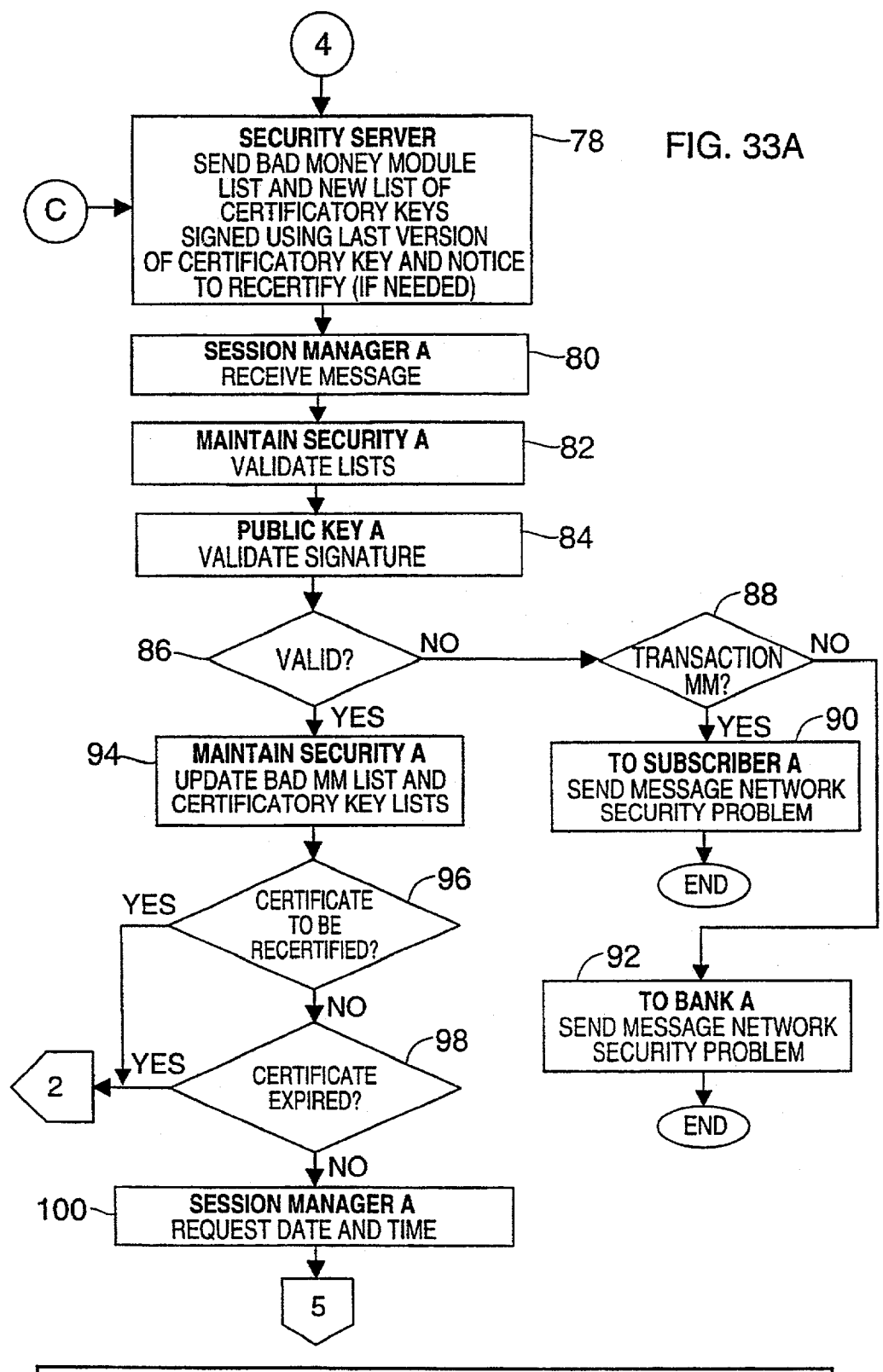

MONEY MODULE NETWORK SIGN ON (CONTINUED)

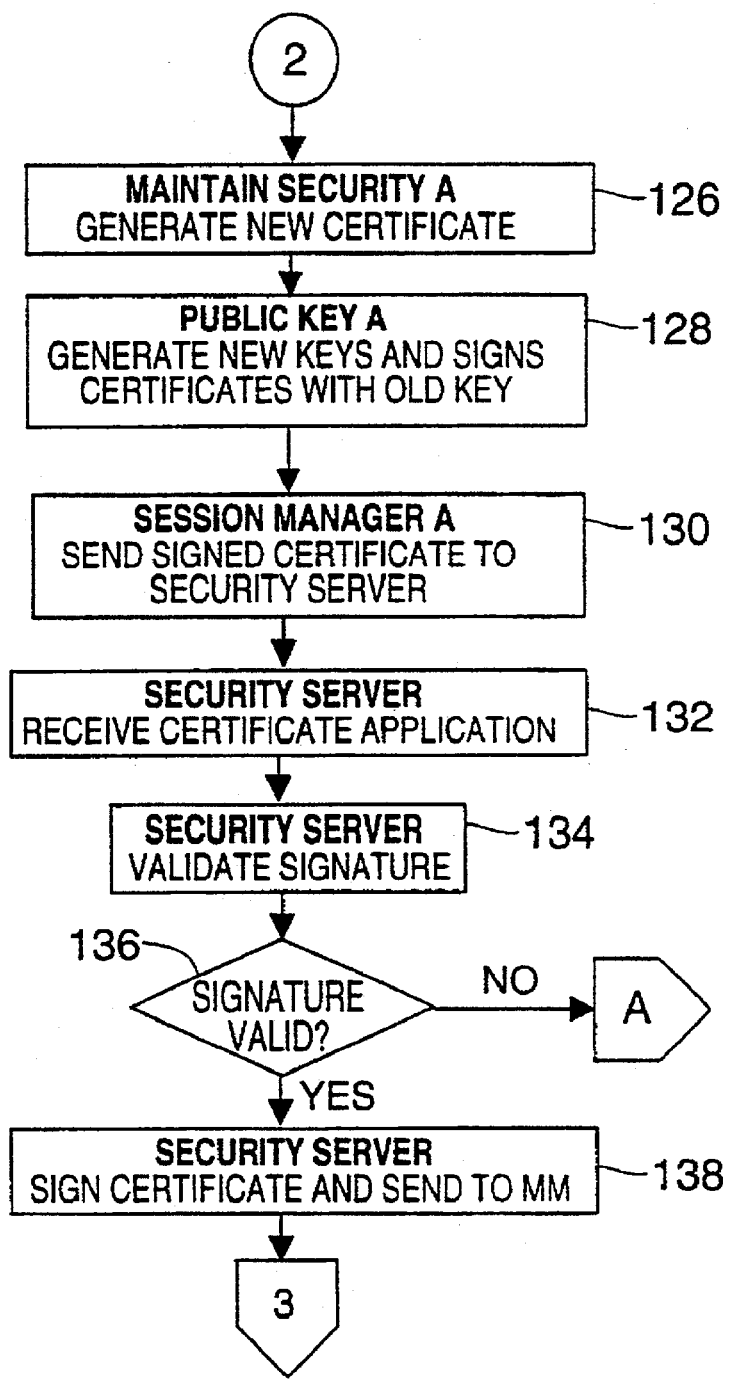

MONEY MODULE NETWORK SIGN ON (CONTINUED)

ESTABLISH SESSION-MONEY MODULE TO MONEY MODULE (CONTINUED)

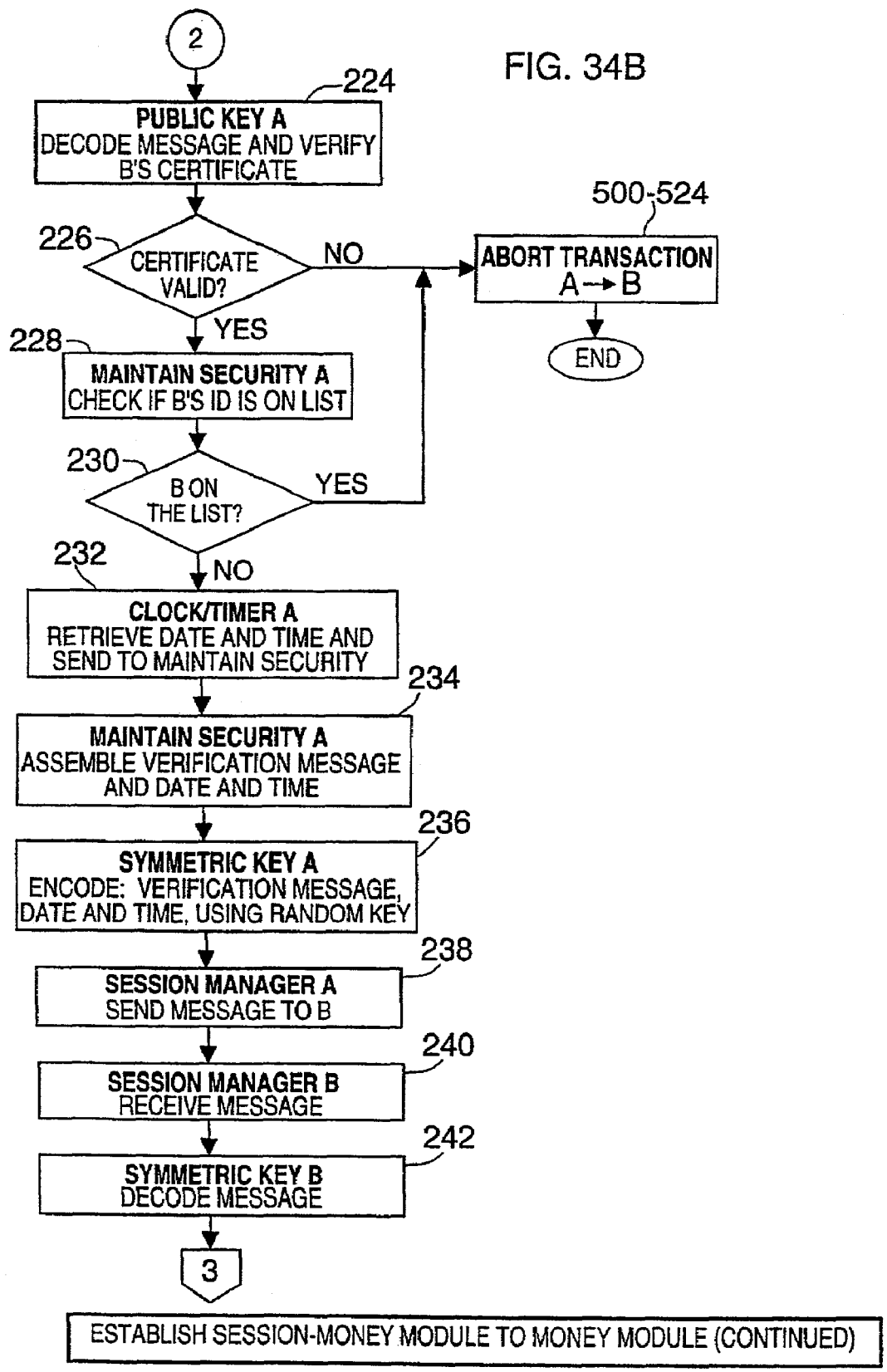

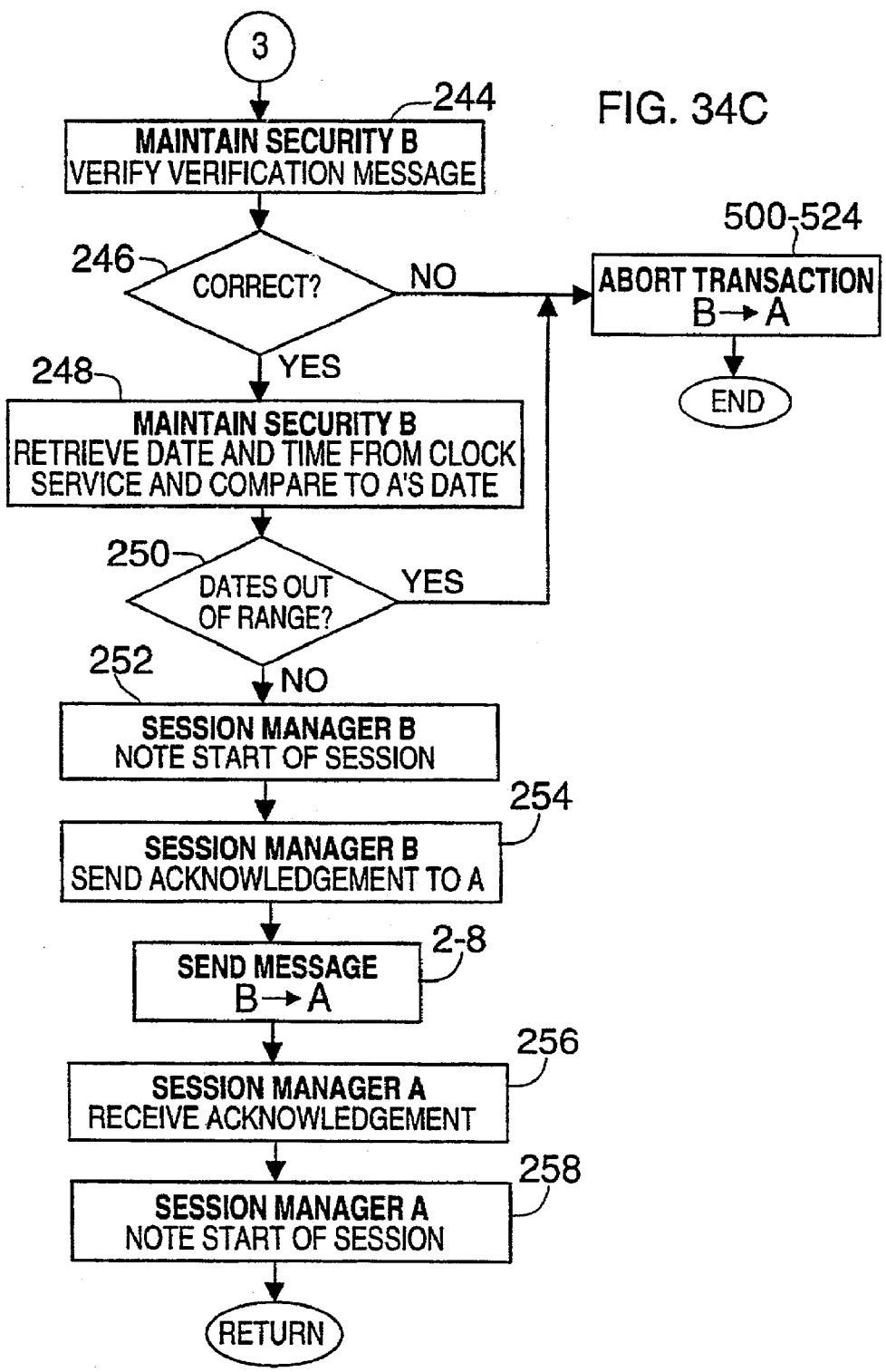

WITHDRAWAL FROM CORRESPONDENT BANK (CONTINUED)

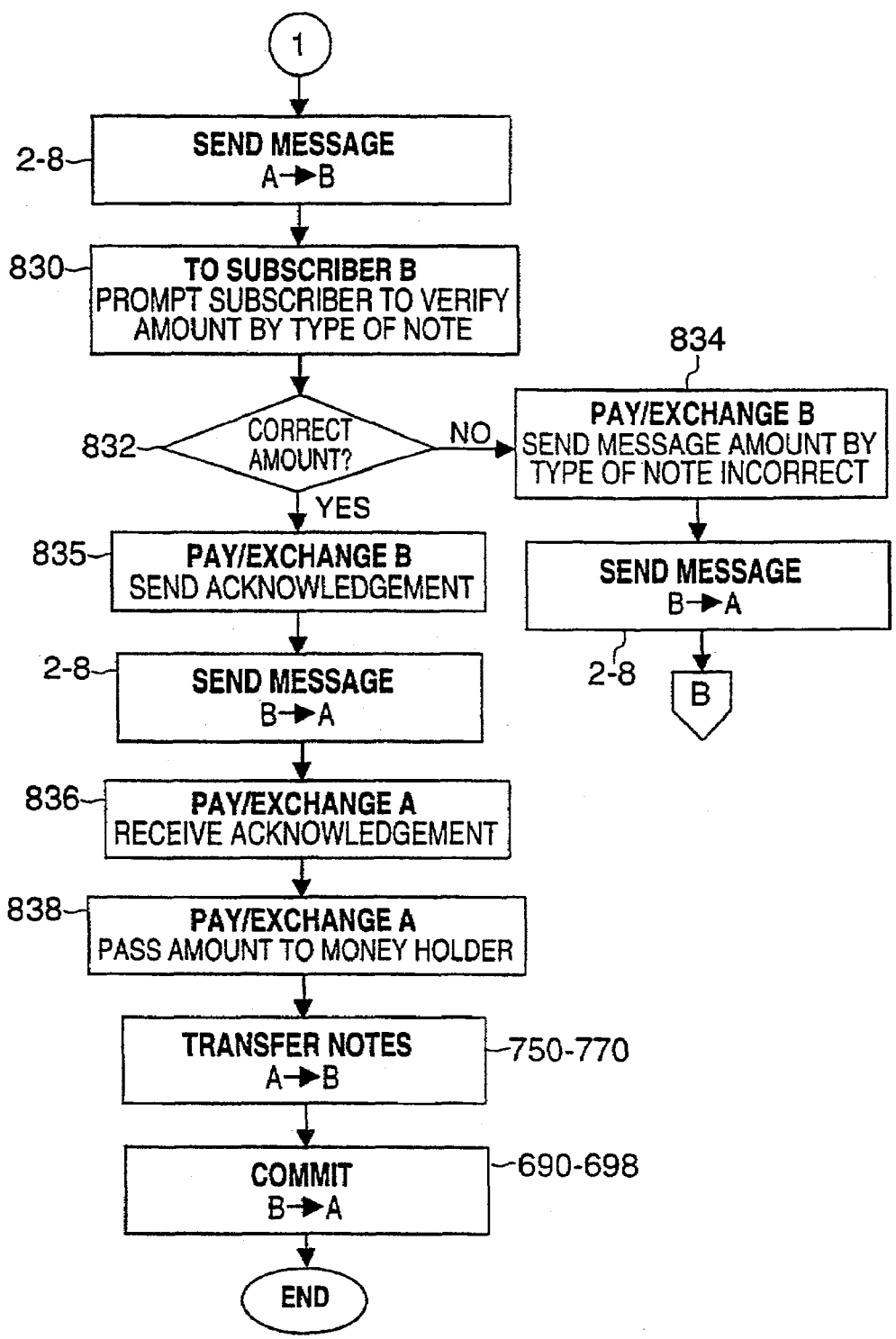

SEND ENCODED MESSAGE - MONEY MODULE TO MONEY MODULE

VALIDATE ACCOUNT NUMBER

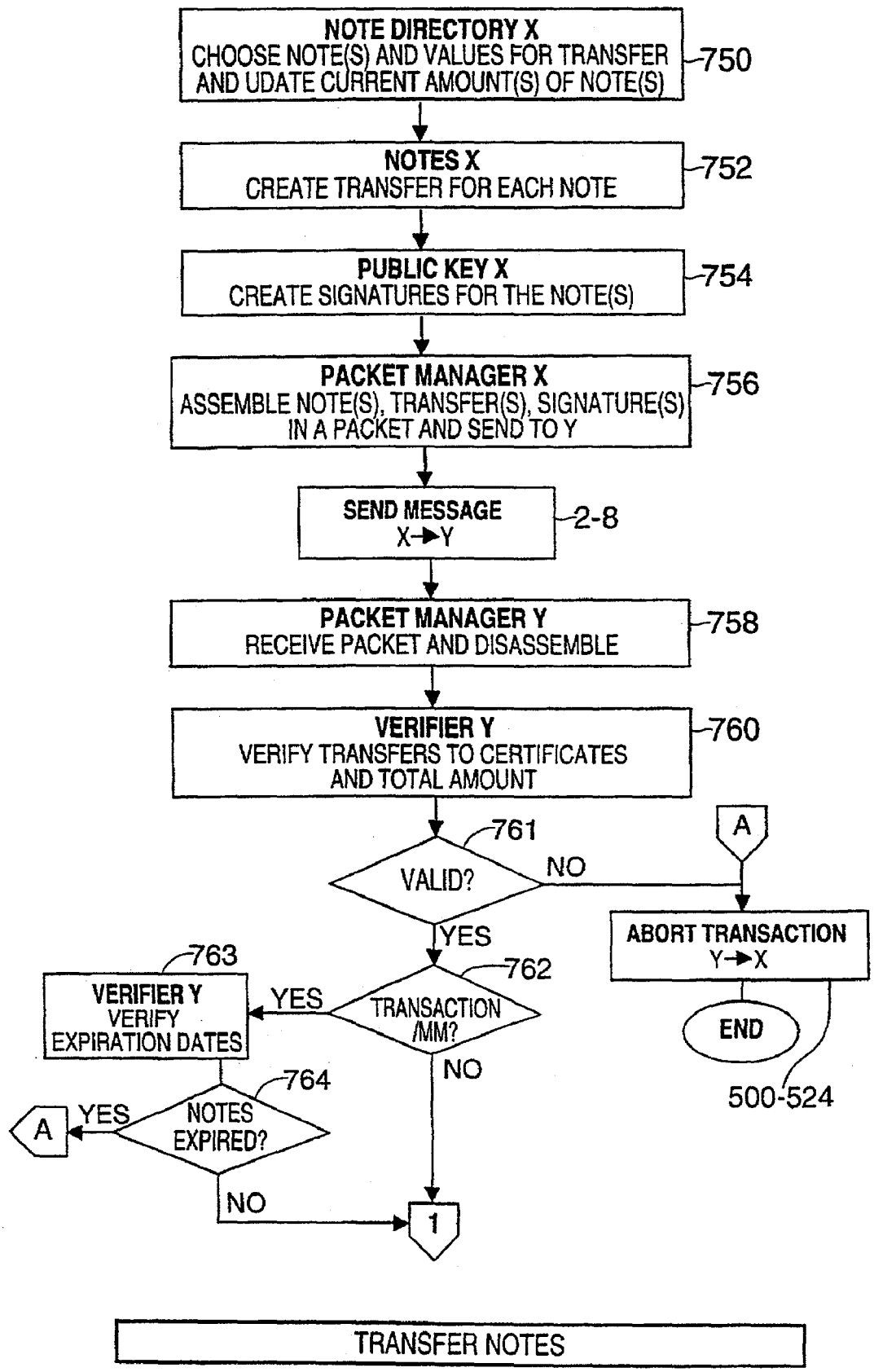

REQUEST DEPOSIT

DEPOSIT TO CORRESPONDENT BANK (CONTINUED)

SUBSCRIBER TO SUBSCRIBER FOREIGN EXCHANGE (CONTINUED)

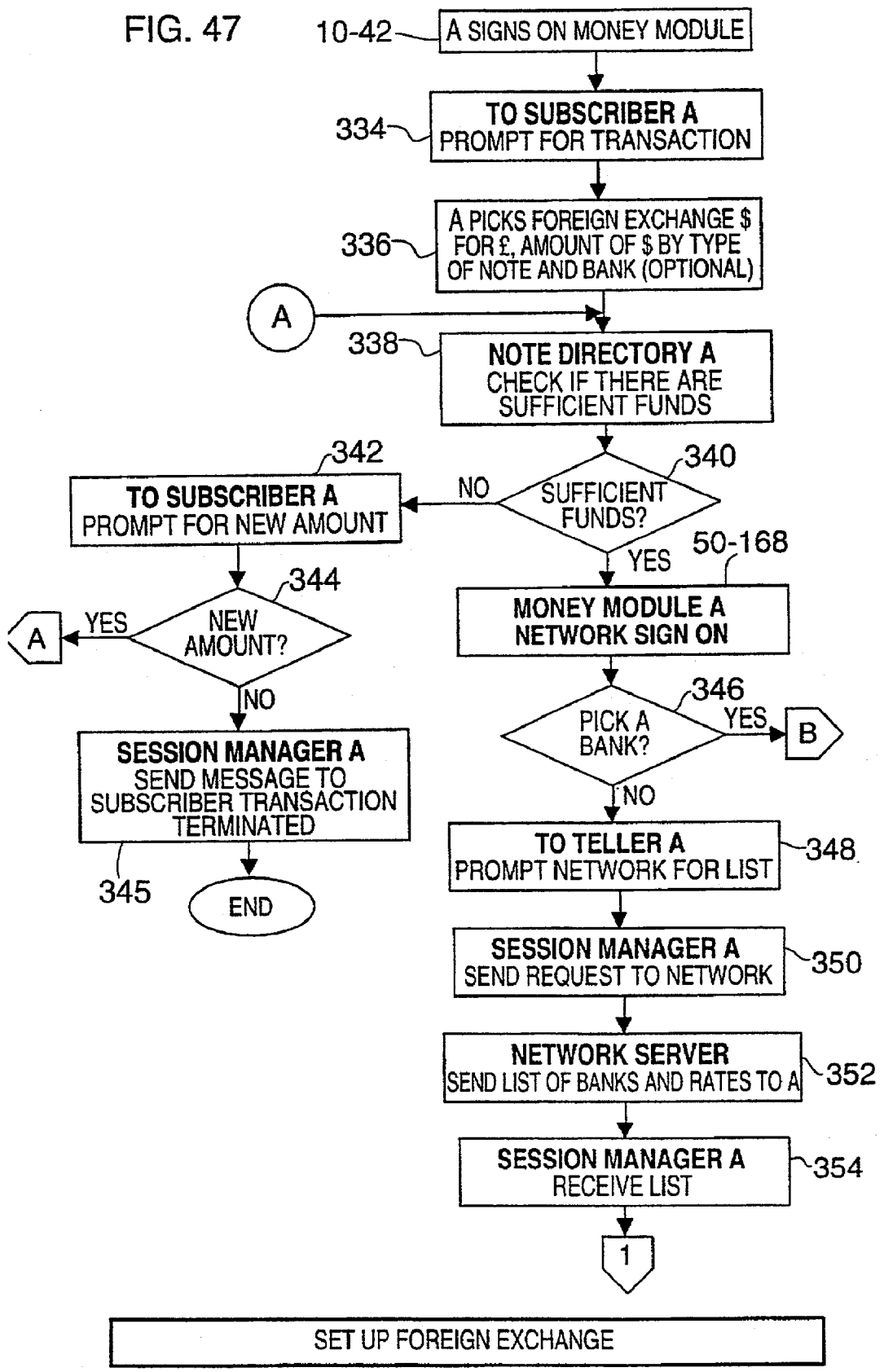

SET UP FOREIGN EXCHANGE (CONTINUED)

ELECTRONIC-MONETARY SYSTEM

This patent application is a continuation of U.S. application Ser. No. 09/138,459, filed Aug. 21, 1998 now U.S. Pat. No. 7,028,187, which is (1) a divisional of 08/895,395, filed Jul. 16, 1997, now U.S. Pat. No. 6,175,921, which is a divisional of application Ser. No. 08/730,158, filed Oct. 23, 1996, now U.S. Pat. No. 5,703,949, which is a file wrapper continuation of application Ser. No. 08/575,699, filed Dec. 19, 1995, now abandoned, which is a divisional of application Ser. No. 08/234,461, filed Apr. 28, 1994, now U.S. Pat. No. 5,557,518; and (2) a continuation-in-part of U.S. application Ser. No. 09/039,933, filed Mar. 16, 1998, now U.S. Pat. No. 6,047,887, which is a divisional of application Ser. No. 08/371,201, filed Jan. 11, 1995, now U.S. Pat. No. 5,898,154, which is a divisional of application Ser. No. 07/794,112, filed Nov. 15, 1991, now U.S. Pat. No. 5,453,601. Each of the above is hereby incorporated by reference in its entirety.

FIELD OF THE INVENTION

The present invention relates to an electronic monetary system for implementing electronic money payments as an alternative medium of economic exchange to cash, checks, credit and debit cards, and electronics funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

The present invention also relates to a system for facilitating open electronic commerce. In particular, the system utilizes tamper-proof electronic units, referred to as "trusted agents" in combination with money modules to create a secure transaction environment for both the buyer and seller of electronic merchandise and services.

BACKGROUND OF THE INVENTION

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need of having the correct amount or providing change therefor. Furthermore, the handling and managing of paper cash and coins is inconvenient, costly and time consuming for both individuals and financial institutions alike.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House (ACH) and point of sale (POS) systems are examples of electronic funds transfer (EFT) systems that have become used by retail and commercial organizations on a substantial basis in recent years. However, the payments made through these types of EFT systems are limited in that they cannot be performed without the banking system. Moreover, ACH transactions usually cannot be performed during off business hours.

Home Banking bill payment services are examples of an electronic funds transfer system used by individuals to make payments. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used with an on-line system to transfer money between accounts, such as between the account of a merchant and that of a customer, cannot satisfy the need for an automated transaction system that provides for the transfer of universally accepted economic value outside of the banking system.

To implement an automated, yet more convenient transaction system that does not require the banking system to intermediate the transfer, and that can dispense some form of economic value, there has been a trend towards off-line electronic funds transfer. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH, and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

However, these proposed systems suffer from a failure to recognize fully the significance of bank deposits as money, and their necessity to back any form of universally accepted monetary representations that may be issued. In the systems disclosed thus far, representations of economic value, whether electronic or paper, are issued without the backing of equal valued liabilities as the counterpart to their assets.

None of the paperless payment systems that have been proposed so far are comprehensive enough so as to implement a multipurpose electronic monetary system that includes not only the automated devices that allow subscribers to transfer electronic funds or money between them without any intermediating system, but that also encompasses and includes an entire banking system for generating the value represented by the electronic money and for clearing and settling the electronic money accounts of the banks and financial institutions involved to maintain a monetary balance within the system.

Thus, there is a need for a system that allows common payor to payee economic exchanges without the intermediation of the banking system, and that gives control of the payment process to the individual. Furthermore, a need exists for providing a system of economic exchange that can be used by large organizations for commercial payments of any size, that does not have the limitations of the current EFT systems.

Accordingly, it is an object of the present invention to provide a complete electronic monetary system which utilizes electronic money that is interchangeable with traditional cash and is universally accepted.

It is another object of the present invention to provide a method of securely transferring economic value including currency and credit among subscribers, among financial institutions, and between subscribers and financial institutions.

A further object of the present invention is to provide a multipurpose paperless payment system whereby transactions can be carried out in both an on-line and an off-line mode between subscribers.

It is yet another object of the present invention to provide a payment system that reduces the cost of central electronic funds transfer systems by off loading much of the payments to off-line devices.

It is still another object of the present invention to provide a system of inexpensive electronic transfers to reduce an institution's cost of managing paper cash, checks and coins.

It is still a further object of the present invention to provide a user friendly electronic payment system that may be used reliably and securely for real time transfers of money between members of the general public, between members of the general public and commercial organizations, and between commercial organizations.

It is still another object of the present invention to provide a system for depositing and withdrawing economic value which may be integrated with a wide variety of data processing and data communication systems including currently available home banking services.

It is still a further object of the present invention to provide an electronic monetary system which utilizes electronic money in the form of multiple currencies.

It is yet a further object of the present invention to provide a system for safely transferring economic value in transactions of virtually any size denomination.

It is yet another object of the present invention to provide a medium of economic exchange that is fungible, easily transferable, undeniably redeemable, and secure from reuse, duplication, and counterfeiting.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF THE EXEMPLARY EMBODIMENT

To achieve the foregoing, and other objects, the method and apparatus of the present invention employ a preferred embodiment in the form of an electronic-monetary system having (1) banks or financial institutions that are coupled to a money generator device for generating and issuing to subscribing customers electronic money including electronic currency backed by demand deposits and electronic credit authorizations; (2) correspondent banks that accept and distribute the electronic money; (3) a plurality of transaction devices that are used by subscribers for storing electronic money, for performing money transactions with the on-line systems of the participating banks or for exchanging electronic money with other like transaction devices in off-line transactions; (4) teller devices, associated with the issuing and correspondent banks, for process handling and interfacing the transaction devices to the issuing and correspondent banks, and for interfacing between the issuing and correspondent banks themselves; (5) a clearing bank for balancing the electronic money accounts of the different issuing banks; (6) a data communications network for providing communications services to all components of the system; and (7) a security arrangement for maintaining the integrity of the system, and for detecting counterfeiting and tampering within the system.

In the preferred embodiment, the functions of the money generating devices, the transaction devices, and the teller devices will be performed by a combination of tamper-proof computer hardware and application software modules that may be networked together. Information is transmitted in an encrypted form to provide security from unauthorized inspection. The electronic money is transmitted with digital signatures to provide authentication, and security from modification or counterfeiting.

The electronic money exchanged by these devices may be an electronic representation of currency or credit. An important aspect of the electronic currency is that it is the equivalent of bank notes and is interchangeable with conventional paper money through claims on deposits in an issuing bank, but can be withdrawn or deposited both at an issuing bank and at a correspondent bank. However, only the issuing banks can generate the electronic currency, and will be liable for its redemption.

The issuing banks later utilize inter-bank clearing and settling processes to maintain the monetary balance in the banking system, as is currently practiced by today's banking industry.

The electronic money representations are fungible, universally accepted, and undeniably redeemable from the issuing banks, i.e., they have the characteristics of money transactions. To preserve the integrity of the electronic monetary system, each exchange of electronic money includes, along with other information, data identifying the monetary unit of the credit or currency, (i.e., dollars, yen, etc.) the amount by unit of credit or currency, the bank issuing the electronic credit or currency, and several digital signatures.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an electronic monetary system provides for transactions utilizing electronic money including electronic currency backed by demand deposits in a bank in lieu of cash transactions, and electronic credit authorizations. The invention comprises a money module for generating the electronic money; a money module for issuing, distributing, and accepting the electronic money; and a money module for accepting, storing, and transferring the electronic money between other accepting money modules and between the accepting money module and the issuing money module.

According to a further aspect of the invention, an electronic monetary system is provided for implementing and maintaining electronic money which includes electronic currency that is interchangeable with conventional money through claims on deposits in a bank and electronic credit authorizations.

The system includes a plurality of issuing banks; a generator module for creating electronic money; teller modules coupled to the generator module, for performing teller transactions and for interfacing with other teller modules, such transactions including the accepting and the distributing of the electronic money; a security system for providing the overall integrity of the electronic monetary system; a clearing and settling process for balancing the electronic money accounts of the separate issuing banks and for clearing the electronic money issued by the issuing banks; and a plurality of transaction modules owned by authorized users, for transferring the electronic money between the transaction modules and between the transaction modules and the teller modules.

In accordance with another aspect of the invention, the functions of the generator modules, the transaction modules, and the teller modules will be performed by a combination of tamper-proof computer hardware and application software that may be networked together.

The electronic money exchanged by these modules, which may be an electronic representation of currency backed by demand deposit accounts at the issuing bank or credit authorizations, may be transmitted with digital signatures to provide security from unauthorized modification or counterfeiting. In a preferred embodiment, security from counterfeiting and tampering is also provided by requiring the modules and the individual units of electronic money to be renewed periodically. Offending modules or counterfeit electronic money can be removed from circulation as soon as they are discovered.

Briefly, a process in accordance with the invention comprises the steps of (1) providing a generating module to generate electronic representations of economic value backed by demand deposits or by a credit line;

(2) providing a teller module to accept the generated electronic representations of economic value and to issue the electronic representations of economic value;

(3) providing the authorized users with a transacting module for accepting, storing and transferring the electronic representations of economic value to other authorized users having the transacting module and to the teller processing module;

(4) accepting and transferring the electronic representations of economic value to other authorized users having a transacting module and to the teller module; and (5) providing a security system to allow the transfer of electronic representations of economic value in a secure manner between the generating module, the teller module and the transacting module.

It is a further object of the invention to provide a system which will allow customers to buy electronic merchandise or services on demand without enrolling in an electronic community.

It is another object of the present invention to enable remote delivery of electronic merchandise or services with real-time anonymous payment or real-time authorization-based payment where neither the customer nor the merchant can interfere with the payment and delivery process once they have agreed to the transaction.

It is another object of the present invention to use trusted agents and money modules to create a system for open electronic commerce where both customers and merchants can securely transact remotely over electronic networks without prior knowledge of each other.

It is another object of the present invention to provide a secure electronic real-time purchase transaction between buyer and seller without third-party intervention.

According to one further aspect of the invention, a customer trusted agent establishes a cryptographically secure session with a merchant trusted agent. The customer trusted agent securely communicates with a first money module, and the merchant trusted agent securely communicates with a second money module. The merchant trusted agent delivers electronic merchandise that is provisionally retained by the customer trusted agent. The trusted agents participate in a secure dialogue and mutually agree on the payment terms. The first money module transmits electronic money to the second money module. Upon successful completion of the money module payment, the first money module informs the customer trusted agent, and the second money module informs the merchant trusted agent. The merchant then logs the sale and the customer may use the purchased electronic merchandise.

According to a second further aspect of the invention, the customer may pay for the electronic merchandise by presenting a credential representing a credit or debit card.

According to a third further aspect of the invention, electronic tickets may be presented to other trusted agents in order to obtain services.

According to a fourth further aspect of the invention, the trusted agents may be used for performing a secure identity-based payment.

According to a fifth further aspect of the invention, the trusted agents may be used to resolve a dispute over purchased electronic merchandise.

BRIEF DESCRIPTION OF THE DRAWINGS

Other objects and advantages of the present invention will become more apparent by the following description with reference to accompanying drawings, in which:

FIG. 8 is a block diagram of a Network Server, according to the invention.

FIGS. 11-24 are flow diagrams of accounting examples, according to the invention.

FIGS. 28-50A are flow charts of transaction examples, according to the invention.

DISCLOSURE OF THE PREFERRED EMBODIMENTS OF THE INVENTION

The present invention contemplates an improved monetary system using electronic media to securely and reliably exchange economic value. The system can be implemented by integrating novel data processing systems with other procedures which can be implemented with the current worldwide banking systems.

Throughout this description, "electronic money" may also be referred to by the abbreviation "E-M." Additionally, the term "bank" is used hereinafter to indicate any banking, financial institution or the like which is a participant of the present invention.

Figure 1:
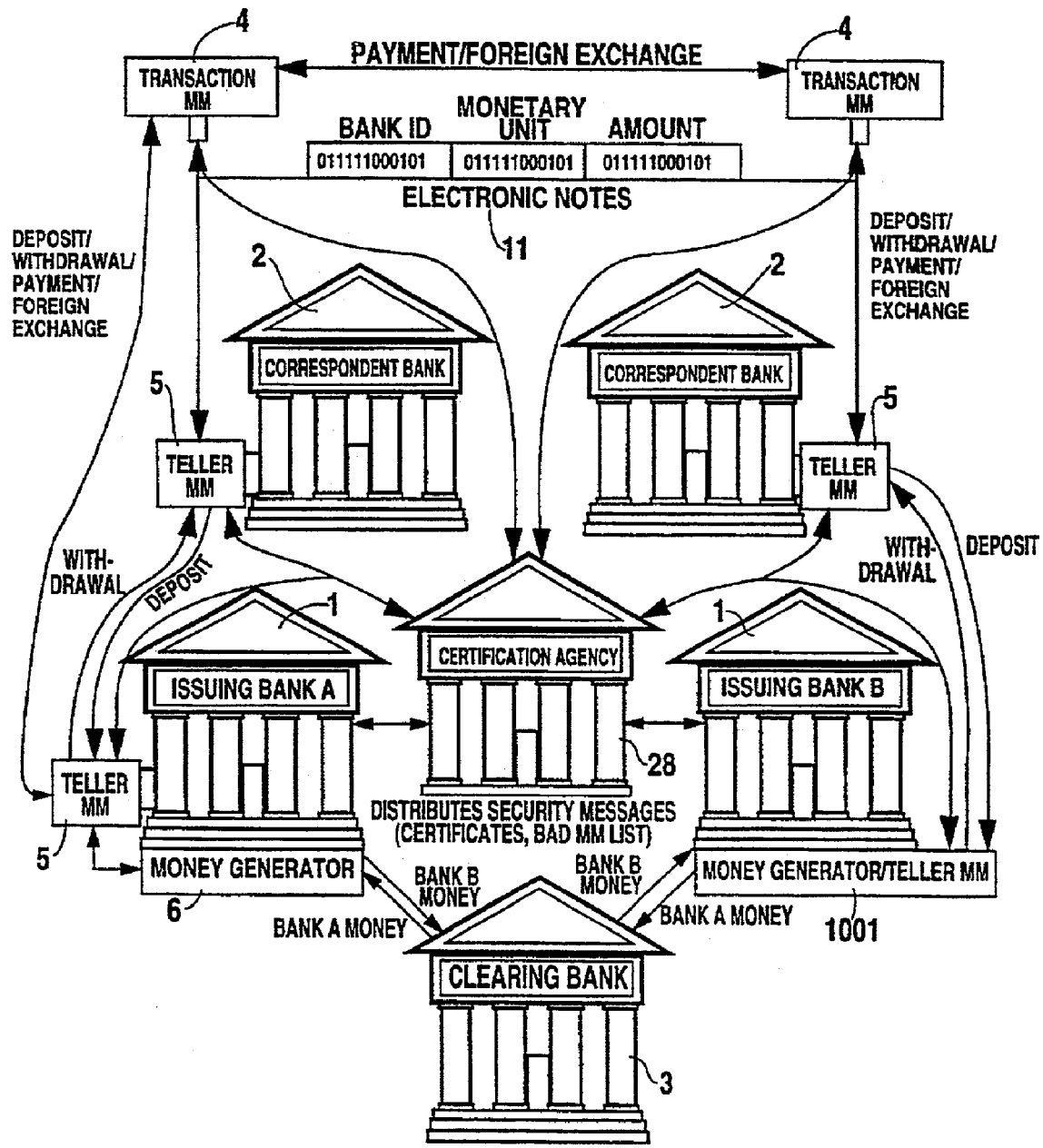
FIG. 1 is a diagram illustrating general aspects of the invention.

Referring now to the drawings, wherein like numerals refer to like components, there is disclosed in FIG. 1, in block form, broad aspects of the preferred embodiment. In FIG. 1, the general relationship among the features of the system is shown. The system includes Issuing Banks 1 each having a Teller money module 5 and a Money Generator module 6; Correspondent Banks 2 each having a Teller money module 5; an electronic money Clearing Bank 3; a Certification Agency 28 and a plurality of Transaction money modules 4 owned by subscribers of the system. Though money generator module 6 and teller module 5 are preferably embodied separately, the functions of these modules may be embodied in a unitary device under processor control.

Electronic notes 11, the media for transferring electronic money, are generated by the Money Generator module 6 for an Issuing Bank 1. These notes 11 are then transferred by a Teller money module 5 to a subscriber utilizing a Transaction money module 4. Electronic notes 11 may be representations of currency or credit authorizations. For security reasons, all electronic notes 11 will expire after a preset time period. Once expired, the notes 11 must be redeemed at a participating bank for updated ones before they can be transferred.

An Issuing Bank 1 generates and distributes the electronic notes 11, and is liable for their redemption. An Issuing Bank 1 performs deposits, withdrawals, payments to loans and inquiries for other money modules.

A Correspondent Bank 2 is a participating bank which distributes electronic money through accounts it maintains at Issuing Banks 1, but does not generate any electronic money, and is not liable for its redemption. Because it cannot generate any electronic money, the Correspondent Bank 2 in the preferred embodiment must make real-time requests of electronic money from an account it maintains at an Issuing Bank 1 whenever a subscriber wishes to withdraw electronic money at a Correspondent Bank 2.

Conversely, a Correspondent Bank 2 deposits all electronic money deposited by subscribers, to the accounts the Correspondent Bank 2 holds at Issuing Banks 1. These accounts will be described hereinafter. A Correspondent Bank 2, like an Issuing Bank 1, will perform deposits withdrawals, payments to loans and bank inquiries.

Notably, an Issuing Bank 1 may also be a Correspondent Bank 2 for the monetary units that it does not generate. For example, an Issuing Bank 1 for electronic dollar notes 11 may be a Correspondent Bank 2 for electronic notes 11 of yen, marks, etc., issued by other banks.

It is also important to note that the system of the invention can function without Correspondent Banks 2. For example, a subscriber can eliminate the use of a Correspondent Bank 2 by communicating directly with his/her Issuing Bank 1 when making a deposit, withdrawal, etc. Correspondent Banks 2 are included in the preferred embodiment for the practical purpose of expanding distribution of the system while reducing the risks that are inherent in any banking system, such as the risks caused by the collapse of a bank issuing money.

The Clearing Bank 3 is utilized when more than one bank is issuing electronic money. According to the invention, it is anticipated that more than one bank will be issuing electronic money. Thus, the Clearing Bank 3 is provided to clear the electronic money deposited and to balance accounts it maintains for the Issuing Banks 1. The Clearing Bank 3 maintains demand accounts for each Issuing Bank 1 in the system.

The Certification Agency 28, is the centerpiece of the system security. It provides a process that "certifies" the validity of a money module for a certain period of time by issuing a certificate to each money module. A money module must have a valid certificate in order to be able to transact with other money modules 4, 5, 6.

Before the certificate expires, it must be updated so that a subscriber can continue to use his/her transaction money module 4. This process makes users of the system establish periodic contact with the Certification Agency 28.

Periodic contact allows for faster response when tampering with the money modules of the system is detected. To this end, the Certification Agency 28 also provides a list of offending or compromised money modules to other money modules so that transactions with the bad units may be blocked.

Figure 2:
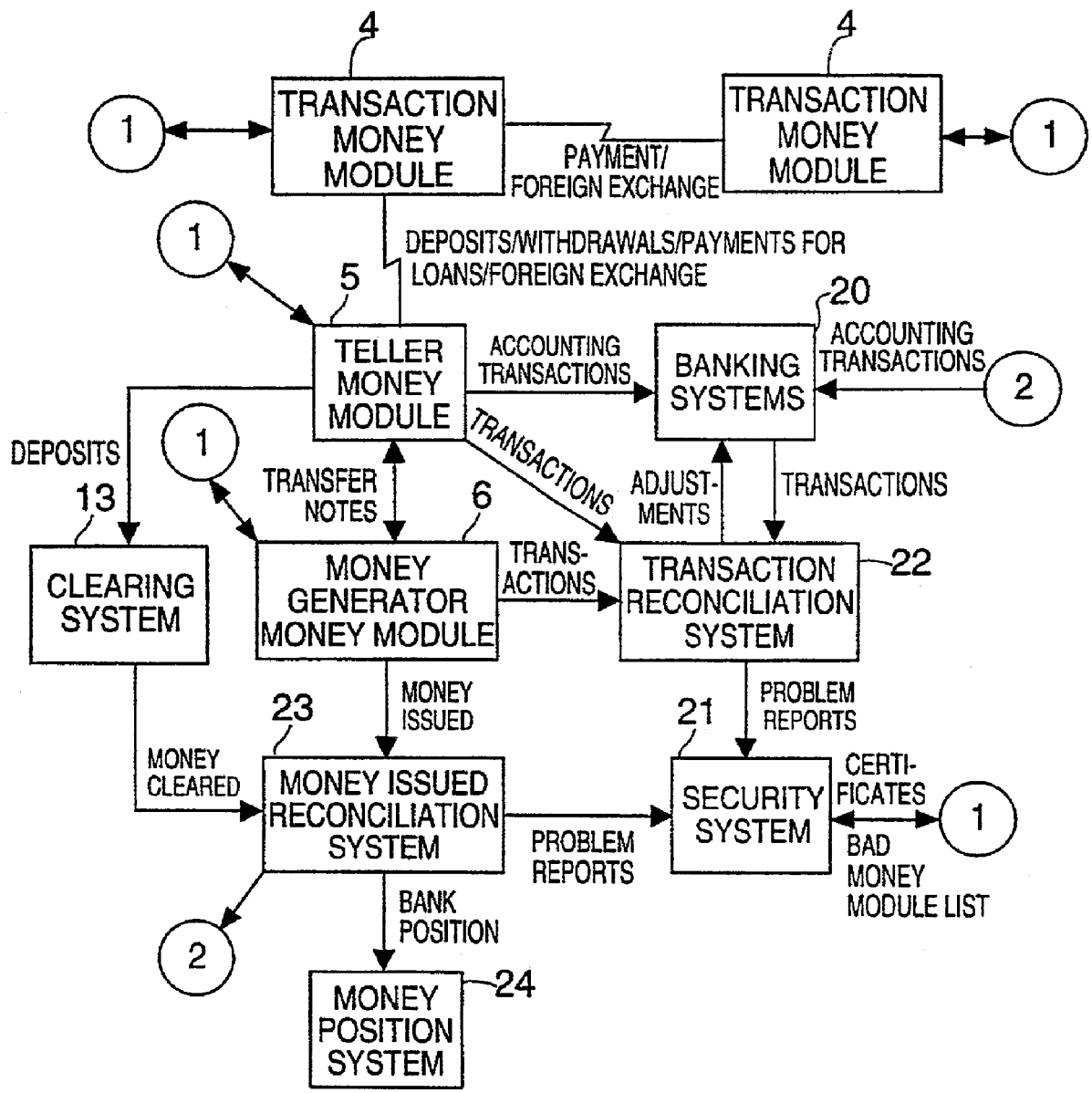
FIG. 2 is a schematic diagram of the operative arrangement of the components, according to the invention.

The components shown in FIG. 1 are best understood by referring to the system's operative arrangement illustrated in FIG. 2. As illustrated in FIG. 2, the preferred embodiment provides for supplements to the current banking systems that include the following additional components: a plurality of the Transaction money modules 4, the Teller money modules 5, and the Money Generator modules 6, for creating, transferring and storing the electronic notes 11 (money); a Clearing System 13 to balance the accounts of banks issuing currency and credit; a security system 21 to maintain the integrity of the electronic notes 11; the current banking systems 20; a network 25 (exemplified by the lines interconnecting modules and systems) to mediate transactions between money modules 4,5,6, the participating banks 1,2,3 of system 20 and the security system 21; a Transaction Reconciliation system 22 to detect money module malfunctions and insider tampering of the system; a Money Issued Reconciliation System 23 to detect counterfeiting and reuse of electronic money; and a Money Position System 24 to keep track of the electronic money in circulation.

Playing major roles in the preferred embodiment are three classes of "money modules" for creating, storing, and transferring the electronic objects that represent economic value. These include the Transaction money modules 4, the Teller money modules 5, and the Money Generator modules 6. It is contemplated that these money modules 4,5,6 will be a combination of tamper-proof hardware and application software that are meant to be components of a larger processing environment.

Referring to the top right-hand side of FIG. 2, a Transaction money module 4 containing electronic notes 11 stored therein (not shown) may be used to exchange foreign currency or make a payment with another Transaction money module 4, using a secure, encrypted protocol either by a telephonic link, or a proximate communication link. Because it is contemplated that an electronic note 11 will be fungible, i.e., it can be broken into any desired amount, the amount transacted between the Transaction money modules 4 may be of any amount up to the amount stored in the payor's Transaction money module 4.

A payee's Transaction money module 4 that has received the electronic notes 11 as a payment may, in turn, be used to transfer all or any amount of the electronic money contained therein to another subscriber's Transaction money module 4. Alternatively, the payee may deposit the electronic money into his/her bank account.

The value of the electronic money stored in the Transaction money module 4 may also be redeemed at any participating bank (e.g., Correspondent Bank 2 or Issuing Bank 1) for paper money by transferring any amount of the electronic money to a bank's Teller money module 5, whereby a teller or an Automated Teller Machine (ATM) will return an equal amount of paper money. Naturally, it is anticipated that paper money may also be exchanged for equal valued electronic money.

As will be appreciated, the Transaction money module 4 may be configured to make deposits, withdrawals, loan payments, inquiries and exchanges of currencies of electronic notes 11 directly through a Teller money module 5 at an Issuing 1 or Correspondent Bank 2 or remotely through a telephonic connection to an Issuing 1 or Correspondent Bank 2 Teller money module 5 (thereby providing, among other things, the transactions not available in current home banking systems). Upon a request to transact with a bank, the Teller money module 5 mediates the transactions for the subscriber's bank account as well as the banking system's electronic money accounts.

It should be noted that a subscriber will not be required to maintain a bank account in order to own and use a Transaction money module 4. For instance, a subscriber may obtain a stand-alone computing device that contains a Transaction money module 4 and use the device only in off-line peer-to-peer transactions with other devices containing a Transaction money module 4, such as a merchant's point-of-sale terminal. Of course, the merchant may then transfer the electronic money to another commercial organization to meet its obligations, or it may deposit the electronic money at its own bank.

In the preferred embodiment, electronic money deposited at any Issuing Bank 1 other than the original Issuing Bank 1 itself will subsequently be settled for value with the original Issuing Bank 1 through the central clearing and settling process performed by the Clearing System 13. It is anticipated that the clearing and settling processes will be managed by the Clearing Bank 3 (FIG. 1). Each Issuing Bank 1 Teller money module 5 sends all the electronic notes 11 deposited at its bank but issued from other Issuing Banks 1 to the Clearing Bank 3 in order to settle for the value posted to their customers' accounts.

When a withdrawal, an exchange for foreign currencies, an exchange of paper cash for electronic money, or an updating of the electronic money occurs, the Money Generator module 6, FIG. 2, creates and digitally signs electronic objects having economic value—either currency or credit notes 11 (FIG. 1)—that are to be sent to the Transaction money modules 4 through the participating bank's Teller money modules 5 in the form of a packet of electronic notes 11. As mentioned above, the electronic currency notes 11 are the equivalent of bank notes that are backed by deposits, and can be traded between Transaction money modules 4.

During the withdrawal transaction, the Teller money module 5 and the Transaction money module 4 may establish a communications link using an encrypted protocol to securely transfer the notes 11 from the Teller money module 5 to the Transaction money module 4.

Records of the notes 11 generated and conveyed by the Money Generator module 6 are sent to the local bank's Transaction Reconciliation System 22 and an Issuing Bank's 1 Money Issued Reconciliation System 23 for maintaining statistical and housekeeping functions. Records of the electronic notes 11 cleared and settled at the Clearing Bank 3 are also provided to the Money Issued Reconciliation System 23. From these compilations, a financial position of the system can be produced by the Money Position System 24.

Discrepancies and malfunctions are reported to the Security System 21 which downloads the lists of problem money modules to all money modules in the system when they are connected to the Network 25. By carrying this list, a Transaction money module 4 will be inhibited from transacting with other suspect Transaction money modules 4.

Having thus provided an overview of the preferred embodiment, there will now follow a more detailed description of the individual elements and the transactions between them.

Money Modules

Figure 3:
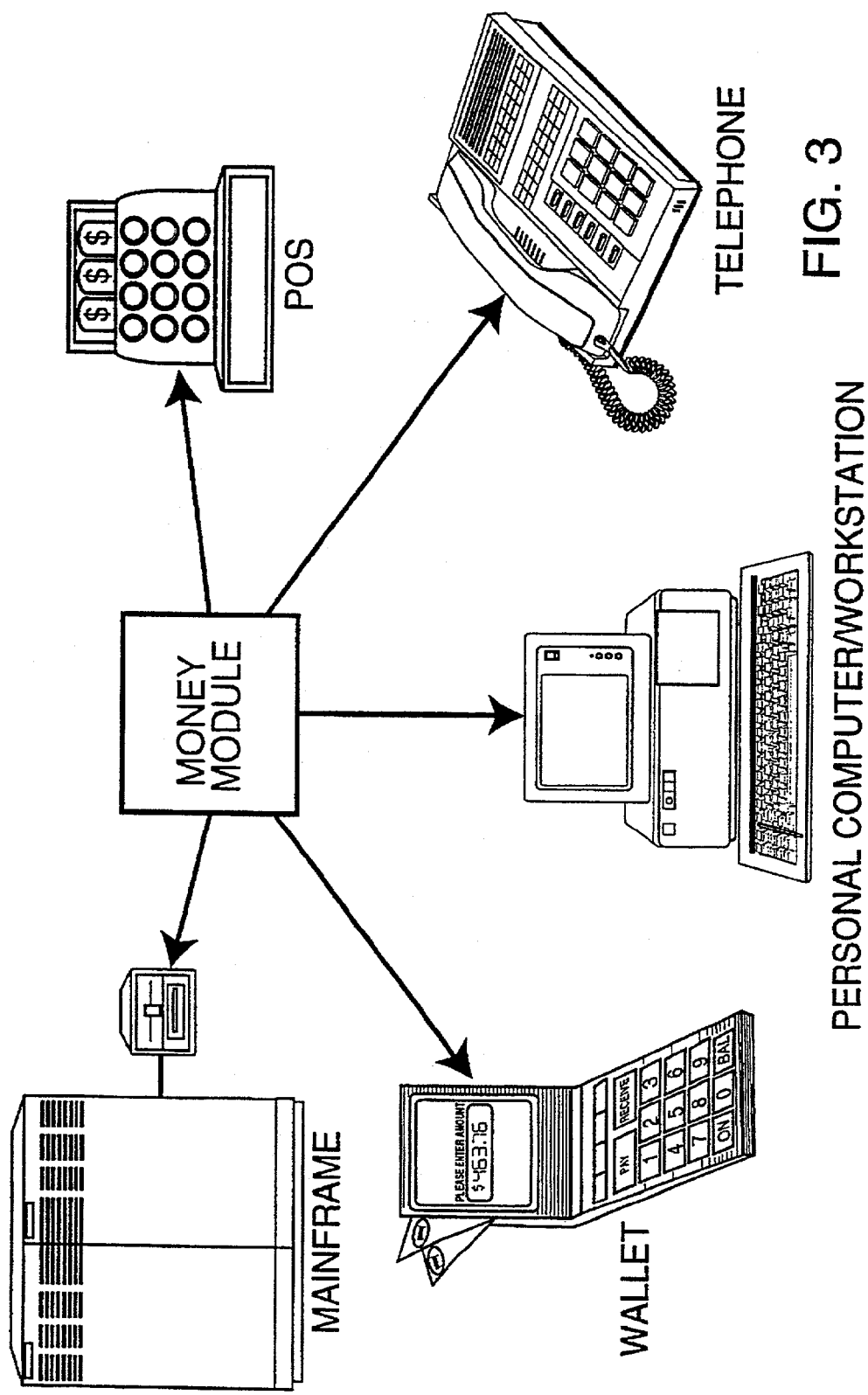
FIG. 3 is a perspective diagram of several embodiments of external systems that may house a money module, according to the invention.

FIG. 3 provides several embodiments of external systems or devices for housing money modules.

In the preferred embodiment, the external system or device will typically contain data display means, data input means, data processing means, memory storage means, direct connection or contactless bidirectional communications means, and the money module packaged in a tamper-proof housing, all interfaced by suitable means for information transfer, such as are well known in the art.

As will be understood, a money module may be embodied as a modular component of any larger processing environment while still performing the same functions. For example, Transaction money modules 4 may work as co-processors embedded in personal portable computing devices like the Hewlett-Packard 95LX, or as co-processors in mainframe computers, workstations, point-of-sale terminals or telephone devices (fixed or portable) connected to a network.

A Teller money module 5 may be embodied as a co-processor in the bank's financial computer systems. The Money Generator module 6 could be a separate processing unit networked to the bank, a co-processor in a general purpose computer, or it may be combined with an Issuing Bank's 1 Teller money module 5 in a larger processor as illustrated by the unitary device 1001 of FIG. 1.

Because it is anticipated that a money module will be implemented in a separate processing device, it is assumed that corresponding interface circuitry would be provided in the host processing device to provide communication between the processing device and the money module.

Notably, all classes of money modules contemplated by the invention may be implemented programmatically or by direct electrical connection through customized integrated circuits, or a combination of both, using any of the methods known in the industry for providing the functions described below without departing from the teachings of the invention. Those skilled in the art will appreciate that from the disclosure of the invention provided herein, commercial semiconductor integrated circuit technology would suggest numerous alternatives for actual implementation of the inventive functions of the money module that would still be within the scope of the invention.

Transaction Money Module

In one embodiment, the Transaction money module 4 may be imbedded in any computer of any size or use, like those serving as general purpose computers or work-stations, to provide functions not limited to E-M transaction use. This latter application will allow for such uses as real-time, off-line payments between personal computing devices, or on-line payments for network services such as information retrieval, telephone calls, or for purchasing airline tickets, theater tickets, etc.

In another embodiment, the Transaction money module 4 may be imbedded in an individual hand-held integrated circuit unit, such as a personalized hand-held computer that may be readily carried by an individual as though it were a wallet. As an illustration, the device of the preferred embodiment may include a keyboard, a pen or stylus, a touch screen or voice recognition circuitry as a data input means, an alphanumeric LCD dot matrix display as a display means, an infrared optical transceiver as a contactless bidirectional communications means, and an RJ-11 telephone jack coupled to modem circuitry as a telephonic communications means. Additionally, the device may also include various electronic processing and storage means for providing calculator capabilities, for storage and processing data of the owner, etc.

It is important to note that the particular design of the external device is not critical to the invention, and other technologies suitable for accomplishing the foregoing functions may also be used. For example, an LED instead of an LCD display panel may be used; radio, infrared, inductive or capacitive communications methods may be used instead of direct connection; optical communications methods may be used; etc.

In general, it is anticipated that any Transaction money module 4 owned by a subscriber will be embodied in a self-contained, tamper-resistant unit that contains components which are difficult to access, and thus prevent any person from improperly examining, counterfeiting or modifying any of its contents or arrangements. For example, integrated semiconductor circuits, whose contents are difficult to examine, encased in a tamper-resistant package such as that formed by an epoxy or plastic lamination may provide a high degree of physical security while providing the necessary storage, computation, timing, and other data processing functions.

However, the invention is not limited to any particular tamper-resistance means, inasmuch as there are a number of methods known in the industry for providing such security. Such tamper-resistance will also prevent the owner, who can control only some of the internal operations of the Transaction money modules 4, from certain accesses to thereby provide security from abuse to other relevant institutions and individuals.

Each Transaction money module 4 will have a way of ensuring its own association with a particular subscriber, so that its use by other individuals may be limited. In addition to the use of Personalized Identification Number (PIN) methods that are well known in the art, the Transaction money module 4 may also include means such as a fingerprint reader, voiceprint analyzer, written signature analyzer, or other so-called biometrics means, to determine the physical identity of an authorized subscriber.

Additionally, the Transaction money module 4 may utilize personalized interactive proofs using questions that only a true owner would be able to correctly answer, such as the owner's mother's maiden name, his/her favorite color, etc. Any such techniques may provide additional security for organizations, and may also be to the advantage of the authorized user since such security can protect the subscriber's data from inspection and use by someone else coming into possession of the Transaction money module 4.

Because the Transaction money module 4 can take on a variety of physical representations, it will be described by the functions performed in addition to the pertinent physical characteristics of a preferred embodiment.

Figure 4:
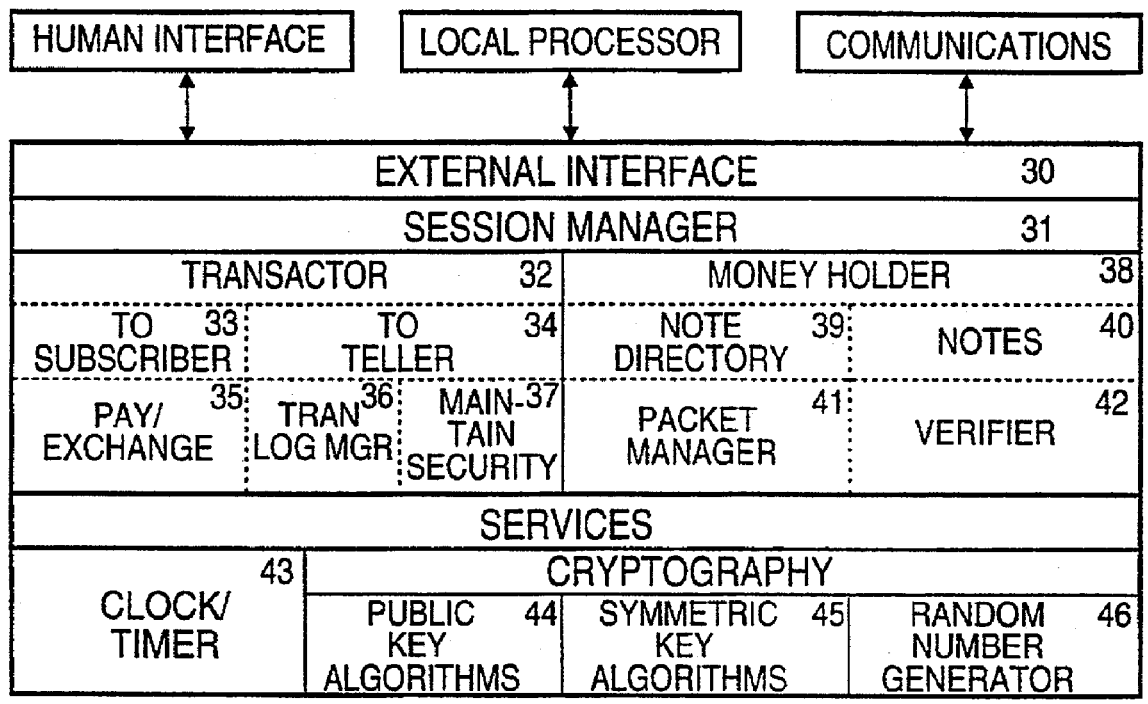
FIG. 4 is a block form diagram of a Transaction money module, according to the invention.

Referring now to FIG. 4, a Transaction money module 4 is shown diagrammatically in block form. Specifically, a Transaction money module 4 has (1) an external interface 30 that interfaces the Transaction money module 4 to the module's data processing means, the input/output means (human interface) and the communications circuitry of the external device; (2) a session manager 31 to control and commit (i.e., finalize) or abort a transaction session; (3) a transactor 32 to manage application functions; and (4) a money holder 38 to contain and manage the electronic representations of money.

According to the invention, the following application functions may be implemented in the preferred embodiment of the present invention:

The To Subscriber application 33 performs the function of comparing the owner identification characteristics, such as a user's personal identification number (PIN) and biometrics characteristic (e.g., fingerprint, voiceprint, etc.), that are stored in the memory of the Transaction money module 4, to those of the individual who is attempting to gain access to the Transaction money module 4. After the proper ownership is verified, the Transaction money module 4 may be activated, and the user is allowed certain accesses to the Transaction money module's 4 stored contents. Messages to the subscriber, and subscriber inquiries as to the information contained within the Transaction money module 4 are also handled by this application function.

The To Teller application 34 interfaces the Transaction money module 4 to the Teller money modules 5 for initiating and performing deposit, withdrawal, loan payment transactions, and bank inquiries with such Teller money modules 5.

The Pay/Exchange application 35 supervises the sending and receiving of electronic notes 11 between Transaction money modules 4, managing the process in which the electronic notes 11 are properly "packaged" as to amount, digital signatures, etc. This application provides that the electronic notes 11 are transferred in a recognized, valid format. Notably, this is the application that allows a money module to perform payments and foreign exchanges. Without this application in the preferred embodiment, a Transaction money module 4 cannot make a payment to another Transaction money module 4.

The Tran Log Mgr. application 36 provides the management and overseeing of a log that records completed transactions undertaken by the money module. For each completed transfer of electronic money, an illustrative Tran Log records:

(1) the type of transfer (i.e., payment, deposit, foreign exchange, etc.),
(2) the date of transfer,
(3) the amount of transfer,
(4) the Issuing Bank 1 identifier
(5) the note identifier,
(6) the monetary unit,
(7) the identifier of the other money module involved in the transaction, and for deposits, withdrawals and loan payments:
(8) the bank account number,
(9) the bank identifier, and
(10) the amount of the transaction.

In the preferred embodiment, every money module will have an identifier. A money module identifier may be thought of as the "serial number" of the money module and is never changed.

It is anticipated that a subscriber may have access to several of the fields of data stored in the Tran Log application, such as histories of the amount, date, and type of transfer. Information as to the expiration date of a certificate may also be accessed by the subscriber so that he/she will be informed as to the need to update or revalidate the money module's certificate.

The Maintain Security application 37 manages a list of money module identifiers that are known to have been generally compromised. In particular, this is a list that is distributed to each money module when it communicates with the Network 25, and is a list of money modules that have passed an invalid or counterfeit electronic note 11 or have performed acts deemed detrimental to the system.

When establishing a session between money modules, each money module checks its list of bad money modules to see if the other is an offending money module. If the other money module's identifier appears on the list, the communication is broken off.

This application also provides the process for obtaining the certificate unique to the money module, for synchronizing an internal clock, and for managing the creation of new cryptography keys.

The Note Directory 39 application performs the function of keeping track of the location, identification and value of each of the electronic notes 11 stored within the money module. A note 11, whether it is an electronic currency note or an electronic credit note, is the basic unit of electronic money. It is the electronic object representing the economic value, the electronic bits that contain the amount, expiration date, note identifier etc. (described in detail below) that gets digitally signed (described below) and encrypted when being transferred. Both electronic currency notes 11 and electronic credit notes 11 may be located by the Note Directory 39.

The Note Directory application 39 updates the current amount of electronic notes 11 (both currency and credit), after every transfer. A date-of-expiration, a note identification number and an Issuing Bank identifier is also recorded with the location of each note 11.

In summary, the Note Directory 39 keeps track of the note identification number, the Issuing Bank 1 identifier, the date-of-expiration of the note 11, the location of the note 11 as stored in the Transaction money module 4, and the current amount of the value of each of the notes 11 stored. These records are maintained for both electronic currency and electronic credit. For a credit note 11, the account number of the credit line is also maintained.

The Notes application 40 manages the storage of the representations of the electronic notes 11 themselves, both currency and credit notes 11. This application also generates the transfers when notes 11 are to be conveyed.

The Packet Manager application 41 manages the construction and formatting of a packet of electronic notes 11 that are to be transferred to another money module. For example, the Packet Manager 41 will utilize an algorithm so that the least number of electronic notes 11 are used to fulfill the requested amount of transfer, with the earliest dated electronic notes 11 being used first. Alternatively, when a packet of notes 11 is transferred to the receiving money module, the Packet Manager 41 application "disassembles" the packet, verifying the date and separating the data fields that represent the different electronic notes 11.

The formatted packet gets several data fields appended to it when electronic notes 11 are "assembled." An identifier data field provides the indicia that identifies it as a packet. Additionally, data fields for the total value of the notes 11, the number of notes 11, and the individual locations of the notes 11 are provided.

The Verifier application 42 verifies that a received packet contains valid electronic notes 11 before a receiving money module accepts them. The Verifier 42 also checks that the total amount received is equal to the sum of the electronic notes 11 that are to be transferred. If the total amount and the individual electronic notes 11 are valid, an acknowledgment is returned to allow for completion of the transfer. Otherwise, an "invalid" message is sent, and the transfer may be aborted.

Services applications that are provided fall under two categories: Clock/Timer 43 and Cryptography. The Clock/Timer 43 provides output pulses for controlling a transaction timeout, such as the time between the sending of a message and the return of a corresponding message.

As will be appreciated, when two money modules are communicating, they may be monitoring a time-out protocol. For example, after a first money module has sent a message to a second money module, the Session Manager 31 of the first money module ("A") may set a timer for a reply if the Transactor 32 indicates that a reply is required. The Session Manager 31 may also number the message sent. This number would appear in the reply message from the Session Manager 31 of the second money module ("B").

If the timer expires before the message has been received, then Session Manager A 31 will query Session Manager B 31 to determine if the transaction is still running in B. If B does not reply then Session Manager A 31 will abort the transaction. If a reply is received that the transaction is proceeding, then the timer will be reset to a new time. If A queries B a predetermined number of times without receiving a reply to the original message, then A may abort the transaction.

Separately, this application also maintains the current date and time, both for user display and for verifying that an electronic note 11 to be received is not an expired one, along with other general clock functions that are commonly used in the industry.

The Cryptography application contains a Public Key 44 operation, a Symmetric Key 45 operation, and a Random Number Generator 46. While the tamper-resistance of the Transaction money module 4 and its components makes it difficult for a person to modify the structure of the device or its contents, known cryptographic techniques are also employed to provide secure communications and payment transfers between money modules.

Public key cryptography 44, as is well known in the art, may be employed by this application to provide public key digital signatures, which are called "digital signatures" or simply "signatures" for brevity. The data in electronic notes 11, may be represented by a digital number. The electronic notes 11, are signed by digital signatures formed from this number. A digital signature can then be checked as corresponding to a particular message by anyone knowing the corresponding public key, which in the preferred embodiment would be all other money modules.

This application provides each money module with the ability to check the digital signature for authenticity. A money module receiving the digitally signed electronic note 11 can in turn sign and transfer it to others, who could also check, sign and distribute it.

Because of the "one way" nature and computational complexity of public-key digital signatures, it is thought to be infeasible to decipher and duplicate them within a feasible period of time, making such a security system resistant to forgery.

Lastly, this application also creates new public and private keys when needed.

Symmetric Key cryptography 45 provides private key algorithms that are well known in the art, for individual session security and privacy between money modules. In the preferred embodiment, this application provides encryption/decryption means in order to secure information being exchanged between two money modules.

Any well known symmetric key cryptography technique, such as the National Data Encryption Standard (DES) system or other cryptography techniques, may be provided in this application. For example, due to the increasing interest in providing cryptographically secured communications, manufacturers are providing various semiconductor integrated circuit devices which perform the encryption and decryption of data. Cylink corporation's CIDEC data encryption devices are examples of commercially available encryption/decryption circuitry that would be suitable in the present invention for this application. Due to the federally mandated use of the DES algorithm, devices such as these are widely utilized to implement that algorithm.

It is important to note that the details of the particular cryptographic methodology utilized by the money modules are not critical and are not limited to a particular cryptographic technique.

The Random Number Generator 46 generates random like numbers for creating new public/private keys for the Public Key application 44 and new private keys for the Symmetric Key 45 application. This application is utilized to vary in an unpredictable way the generation of temporary session keys.

Circuitry for providing such random number generation capability are well known in the art. For instance, a circuit utilizing a "noisy" diode may provide random values, as is well known in the industry. Random numbers may also be provided by a pseudorandom number generator circuit which implements a mathematical algorithm, such as the power-residue algorithm, that generates apparently random values from a "seed" number. The use of clocks or counters provides another often used source of random data. As will be understood, the Random Number Generator 46 may use techniques that are well known to a person of ordinary skill in the art to generate the temporary numbers, and thus need not be further described.

It should be further understood that the foregoing functions disclosed herein may be performed by known programming techniques and/or dedicated hardware and in some cases may be combination of both or shared resources from each. As may be appreciated by a person skilled in the art, many changes in form and detail can be made in dependance on specific application requirements without departing from the essential features of the money modules.

Teller Money Module

The banking systems 20 of both the Issuing Banks 1 and the Correspondent Banks 2 interface to the system of the invention through a Teller money module 5. The Teller money module 5 may be imbedded in any general purpose computer or workstation. The particular design of the Teller money module 5, like the Transaction money module 4, may be implemented in readily known programming techniques or dedicated computer hardware, or a combination of both. As will be appreciated by a person skilled in the art, various designs of the Teller money module 5 may be employed to implement the functions described herein.

Figure 5:
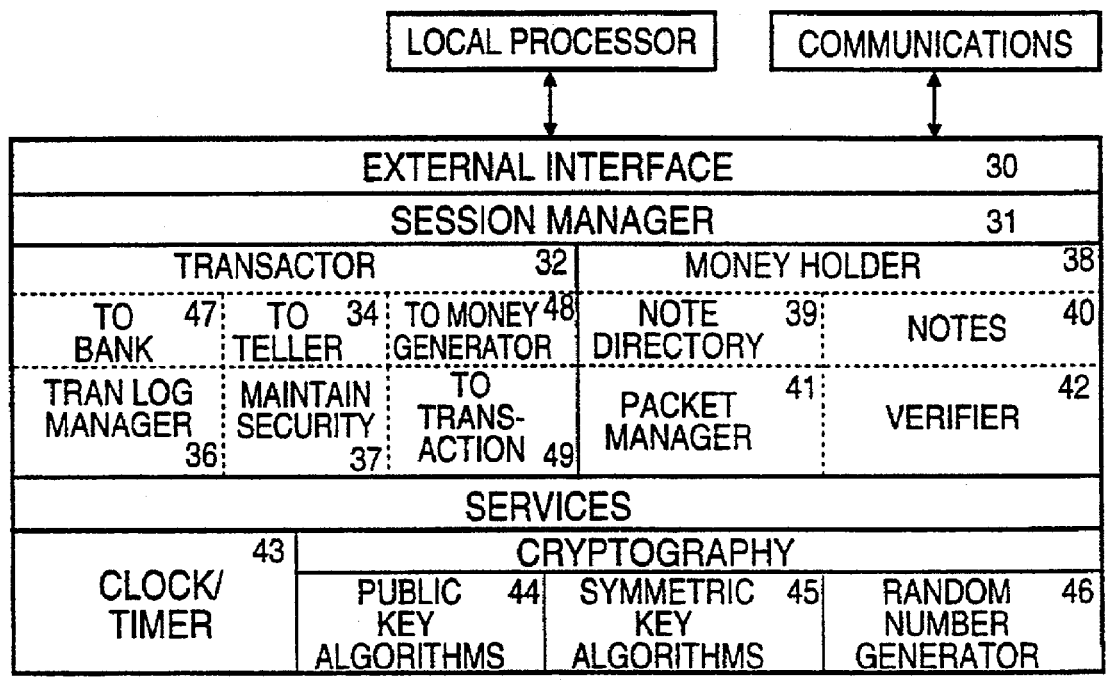
FIG. 5 is a block form diagram of a Teller money module, according to the invention.

The details of one embodiment of the Teller money module 5 is shown in block form in FIG. 5. The Teller money module 5 contains many of the same components and application functions of the Transaction money module 4 described above. Therefore, the identical components will only be repeated briefly here, while the distinguishing components will be fully described. It should be noted that the Teller money module 5, like other money modules of the system, is also contained within a tamper-proof enclosure of the type common in the industry, so as to ensure the necessary security involved.

The Teller money module 5 contains an External Interface 30, a Session Manager 31, a Transactor 32 and a Money Holder 38 that perform similar functions to the corresponding components in the Transaction money module 4 described above.

Briefly, the External Interface 30 interfaces the Teller money module 5 to other processing and communications means within the Teller money module 5 host processor; the Session Manager 31 acts to control and commit (i.e., finalize) or abort a transaction session between the Teller money module 5 and another money module; the Money Holder 38 manages the storing and retrieval of electronic money; and the Transactor 32 manages the application functions of a To Teller 34, the Tran Log Mgr. 36, the Maintain Security 37, the To Bank 47, a To Money Generator 48, and the To Transaction 49.

The following list describes in brief, the applications contained in the Teller money module 5 that are functionally identical to the applications found in the Transaction money module 4:

To Teller 34: Interfaces deposit and withdrawal functions to another Teller money module 5.

Tran Log Mgr. 36: Transaction log manager for recording transaction details.

Maintain Security 37: Manages the list of compromised money modules, applies for certificates, synchronizes the clocks, and manages the creation of new digital keys.

Note Directory 39: Keeps track of the location, value and identification of notes 11 by monetary unit. Summary totals are also maintained.

Notes 40: Manages storage for the electronic notes 11 of exchange, and creates the transfers for the notes 11.

Packet Manager 41: Manages the assembly and disassembly of a packet to be transferred to a different money module.

Verifier 42: Verifies that a received packet contains valid electronic notes 11.

Clock/Timer 43: Controls transaction timeout, expiration of the validity of the electronic notes 11, expiration of the certificate, and general clock functions.

Cryptography (i) Public key 44: used for signatures to sign and validate notes 11 and to set up a secure transaction session.

(ii) Symmetric key 45: Controls the security of a transaction session.

(iii) Random number generator 46: Generates random like numbers for new cryptographic keys.

Some of the distinguishing applications are the To Bank 47 and To Transaction 49 applications. The To Bank application 47 provides the interfacing means whereby the Teller money module 5 can perform exchanges of data for inquiries and account postings with the on-line systems of a bank. This application is also utilized for crosschecking the customer's account number with the accounts and type of transaction being requested.

The To Transaction application 49 performs deposits, withdrawals and payments to loans. This application operates whenever a Teller money module 5 is transacting with a subscriber's Transaction money module 4.

As mentioned above, a Teller money module 5 may be associated with an Issuing Bank 1 or a Correspondent Bank 2. When the Teller money module S is associated with a Correspondent Bank 2, it is utilized for intermediating deposits, withdrawals, and payments to loan accounts between a Transaction money module 4, the Correspondent Bank's 2 on-line systems, and an Teller money module 5 at an Issuing Bank 1.

When operating in an Issuing Bank 1 mode, the Teller money module 5 is used for intermediating deposits, withdrawals, and payments to loan accounts between other money modules and the Issuing Bank's 1 on-line systems. Additionally, when the Teller money module 5 is performing in an Issuing Bank 1 mode, a To Money Generator application 48 may be employed when requesting new notes 11.

Basically, the To Money Generator application 48 performs banking functions dealing with requests for electronic notes 11. It interfaces an Issuing Bank's 1 Teller money module 5 to a Money Generator Module 6.

All of the other elements performed in an Issuing Bank's 1 Teller money module 5 are essentially identical to the similarly named components and application functions described above.

Money Generator Module

Figure 6:
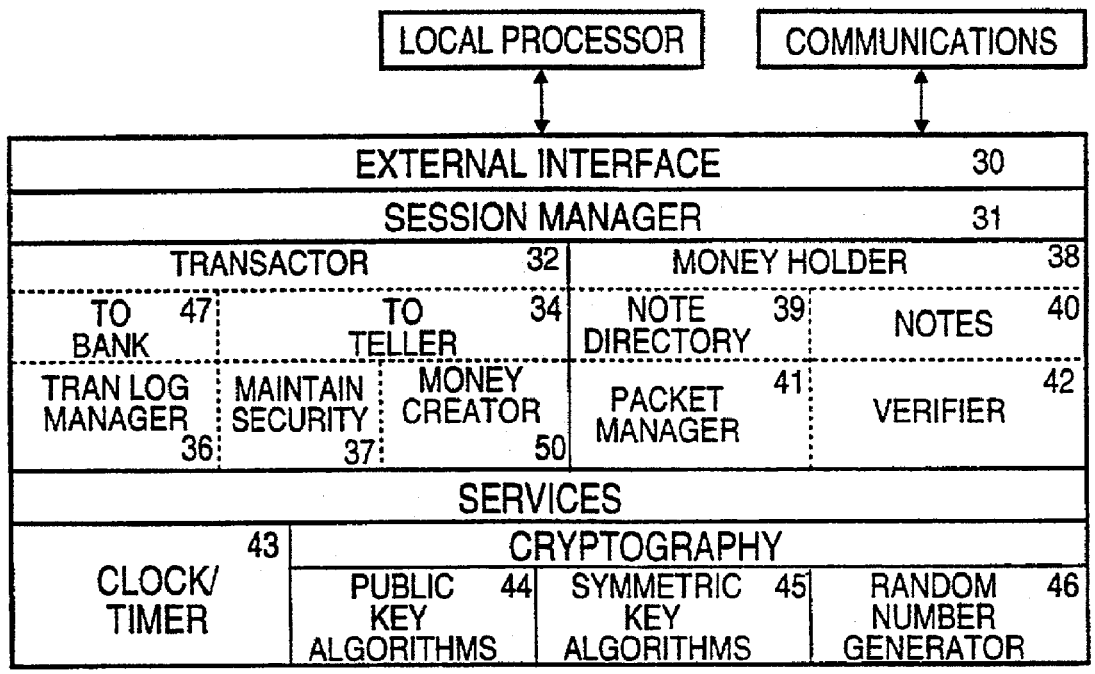
FIG. 6 is a block form diagram of a Money Generator module, according to the invention.

FIG. 6 is a block diagram illustrating the application functions of a Money Generator module 6. Money Generator modules 6 provide the mechanism that Issuing Banks 1 utilize to issue electronic money. A Money Generator module 6 is also encased in a tamper-resistant package for the same security reasons stated above for other money modules.

A Money Generator module 6 generates the electronic money (in the form of electronic notes 11, to be described in further detail below), and distributes them to other money modules through the Teller money module 5 of an Issuing Bank 1. The Money Generator module 6 includes a unique application not present in other money modules for responding to requests for electronic money. This is the Money Creator application 50.

The Money Creator application 50 creates and formats the electronic objects representing value—either currency backed by demand deposits, or credit authorizations—and digitally signs these "electronic notes 11" using public key cryptography in conjunction with its secret key, so that it may be sent to an Issuing Bank's Teller money module 5.

Notably, in a Money Generator module 6 the To Bank application 47 notifies the bank systems of any irregularities, off-loads transaction records in the Tran Log to the Transaction Reconciliation System 22 and transfers electronic notes 11 to the Money Issued Reconciliation System 23. All of the other applications of the Money Generator module 6 are identical to the similarly named applications of the money modules described above.

The Network

Figure 7:
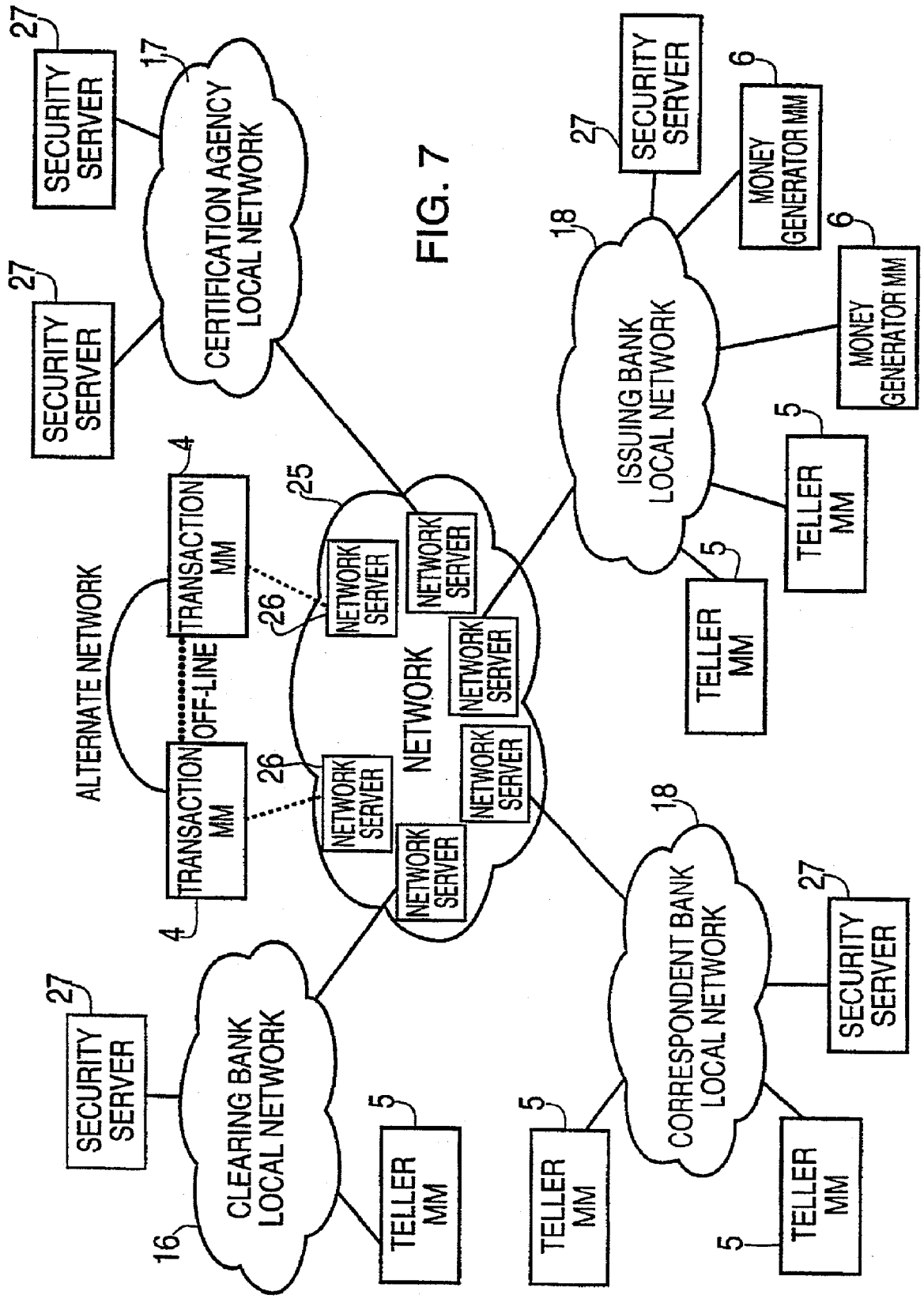
FIG. 7 is a block diagram of the network arrangement, according to the invention.

According to one embodiment of the invention, the individual components of the present invention may communicate over a Network 25, as shown in FIG. 7. The Network 25 will link together the Issuing Banks 1, Correspondent Banks 2, the Clearing Bank 3 and the Certification Agency 28.

Transaction money modules 4 may be coupled to the Network 25 over the telephone exchange or via special terminal facilities at bank locations (e.g., additional contact-less or cable connections at an ATM booth). A communication layer will carry transaction requests (e.g., deposits, withdrawals), packets of notes 11 and new certificates securely across the Network 25. In the preferred embodiment, the Network 25 will also provide directories of financial services, and update the money module clocks and the bad money module list of all money modules.

As will be understood, the Network 25 may use well known data link or communications systems and techniques that utilize, for example, telephone lines, fiber-optic land lines, and satellites, and that include connective, timing and control software and circuitry for allowing access and transmitting digital information. The Network 25 may use commercially available protocols and operating techniques such as those set forth by the International Standards Organization ("ISO") for Open Systems Interconnect network standards. It is important to note that the particular design of the Network 25 is not critical and suitable technologies for accomplishing the foregoing data communications functions may be used.

Each entity (Banks 1 and 2, Certifying Agency 28, or Clearing Bank 3) is also assumed to have an individual local network 16, 17, 18 and a gateway to the larger system Network 25. The larger Network 25 will provide directory services for the routing of messages to connect to the appropriate local network 16, 17, 18. The local network 16, 17, 18 has the responsibility of routing messages to the correct money module or a Security Server 27. A Security Server 27 is associated with each participating bank and the Certification Agency 28, and is used for implementing the security of the system.

FIG. 7 illustrates the preferred embodiment of the Network 25 generally, indicating that money modules of any participating bank may be intercoupled to the money modules of other banks and financial institutions, or another subscriber's Transaction money module 4 via a communications link directly connected into switching and processing centers and alternatively connected to a local network 16, 17, 18 at each entity.

A money module need only identify the local network 16, 17, 18 destination (typically a bank subnetwork) for the transmission of most messages. The local network 16, 17, 18 will route the message to an appropriate money module for establishing a session. Once a session is established, the Network 25 directs all messages between the two money modules. The Network 25 also controls messages between money modules and Security Servers 27.

Transaction money modules 4 may communicate over the Network 25 for deposits, withdrawals, payments to loan accounts, updates or inquiries. The Teller 5 and Money Generator modules 6 will sign on the Network 25 periodically to update security information. The sign-on will be initiated by the money module Session Manager 31, or by the bank Security Server 27 if recertification is required or if there are changes to the bad money module list.

A bank services directory may be available to the money modules primarily for updating the electronic notes 11 and performing foreign exchange. A list of participating banks for either service will be available from the Network 25.

In the preferred embodiment, the Network 25 will provide time services to the individual components of the present invention. Transaction 4, Teller 5 and Money Generator modules 6 and Security Server 27 clocks may be updated from a Network Server 26 in the Network 25 every time that the respective money module accesses the Network 25.

Network Servers 26 may provide the money module services described below, and gateway services to the local networks 16, 17, 18. The application functions of the preferred embodiment of the Network Server 26 are shown in the block diagram of FIG. 8. The following application functions are contemplated for the Network Server 26:

(1) External Interface 56—a communications layer which interfaces to the Network 25; and (2) Communication Session Manager 57—manages a communication session between money modules, and between a money module and the Security Server 27.

Application Services are provided by:

(3) Manage Network Sign-on 58—controls the money module Network sign-on process;

(4) Synchronized Time/Date 59—keeps money module Clock/Timer 43 services synchronized to a system time;

(5) Route Message 60—directory services for routing messages, controlling message routing during sign-on and during a money module session; and (6) Direct to Bank Services 61—provides information on services provided by participating banks.

As will be appreciated by one skilled in the art, switching and processing centers that are known in the industry may be used to enable the networking cooperation between a financial institution and any other that is coupled to the same centers.

Electronic Notes

We turn now to a further description of the elements of the electronic notes 11 themselves.

An electronic currency note 11 representing value is essentially an electronic object created from a transaction request (deposit or withdrawal) which is backed by demand deposits at an Issuing Bank 1. At various times and in various points of the system, the notes may appear in electrical or magnetic forms or as electromagnetic radiation. These notes 11 may be transferred over several transactions just like paper money, with the additional property of fungibility that allows the electronic notes 11 to be commuted and transferred in amounts less than or equal to the value of the note 11.

Notes 11 may be split by appending a transfer record to the note 11 and signing the note 11 using the private cryptographic key of the money module transferring the note 11. Electronic credit notes 11, however, can only be transferred once in the preferred embodiment, because it is anticipated that its receiver must deposit the credit note 11 so that the loan may be realized.

Credit notes 11, unlike currency notes 11 are drawn on a subscriber's loan account. Each credit note 11 carries the account number it is drawn on. The account may be a revolving credit or credit line on which the note 11 is drawn, operating much in the same way that a check or a credit card account works in today's banking industry. Credit notes 11 can represent a part of or all of the credit line of the account.

In the preferred embodiment, the credit notes 11 can only be transferred to another Transaction money module 4 by the owner of the account, and the receiver of a credit note 11 can only deposit it into his or her account as currency. From there, the credit note 11 is cleared with the currency at the Clearing Bank 3. The subscriber's bank recognizes the loan upon receipt of the cleared credit note 11.

When credit notes 11 are withdrawn, they do not trigger any accounting transactions in the preferred embodiment. Current credit line processing may need to be modified to keep track of the amount of the credit line in the subscriber's Transaction money module 4. Whenever the subscriber communicates with the Issuing Bank 1 maintaining the credit line, the amount of the credit line in the Transaction money module 4 is removed and replaced based on any adjustments to the credit line in the banking system 20. Total credit notes 11 plus outstanding loans must be less than or equal to the total amount of the credit line.

Electronic notes 11 are comprised of three collections of data fields, namely a Body group, a Transfer group, and a Signatures and Certificate group. The Body group of data fields includes the following information:

(1) the type of electronic note 11, i.e., whether it is a currency note 11 or a credit note 11;

(2) the Issuing Bank's 1 identifier;

(3) the monetary unit identifier;

(4) a Note identifier;

(5) its date-of-issue;

(6) its date-of-expiration;

(7) the subscriber's account number (used only for credit notes 11);

(8) the amount or value of the note 11; and (9) the Money Generator module 6 identifier.

The Transfer group of data fields includes:

(1) a total of the number of times that the electronic note 11 was transferred; (provided for currency notes 11 only)

(2) a list of transfer records that indicate, the date-of-transfer, the amount transferred and the identification number of the receiver.

The Signature and Certificates group of data fields includes:

(1) the digital signature of the Money Generator module 6;

(2) the Money Generator module 6 certificate;

(3) a list of payors which contains each payor's signature and certificate.

The body, transfer records, the signature and the certificate of the chain of the transferred payments constitute the electronic note 11 sent. The remaining amount of the note 11 is recorded in the Note Directory 39 of the money module in which it is stored.

It is important to note that the authenticity of an electronic note 11 is determined by the validity of the digital signature of the Money Generator module 6, and the validity of the signatures of past payors (if present). Any inconsistencies in this information will cause the transfer of any electronic notes 11 to be aborted.

It is also important to note that as a security measure, a note 11 will be valid for a limited time, up to its expiration date. An expired note 11 cannot be transferred, it must be updated by transacting with a participating bank. To this end, whenever a Transaction money module 4 performs any transaction with a Teller money module 5, all of the electronic notes 11 stored in a Transaction money module 4 will be transferred to the Teller money module 5 so that the notes 11 may be replaced with updated ones before they expire. This security procedure also helps to keep offending notes 11 from being circulated broadly.

As will be understood, every time that a note 11 is transferred to another money module, a digitally signed transfer record indicating to whom it is transferred is appended. Thus, the recipient of an electronic note 11 will also receive a record of all of the past holders of the note 11.

For example, a $50 electronic note 11 may be generated, and withdrawn by a Transaction money module 4. Assuming it is transferred to other money modules in $10, $10, and $30 denominations, the recipient money modules will receive the note 11 with the transfer record identifying the first Transaction money module 4. When a recipient of the $10 note 11 transfers $5 of it to a third party, the third party receives the note 11 along with the record indicating the previous two holders. Assuming this $5 note 11 is then deposited, a record of it will be matched with other segments of the original $50 note 11 that find there way back into the banking system by the clearing and reconciliation processes of the present embodiment.

Figure 51:
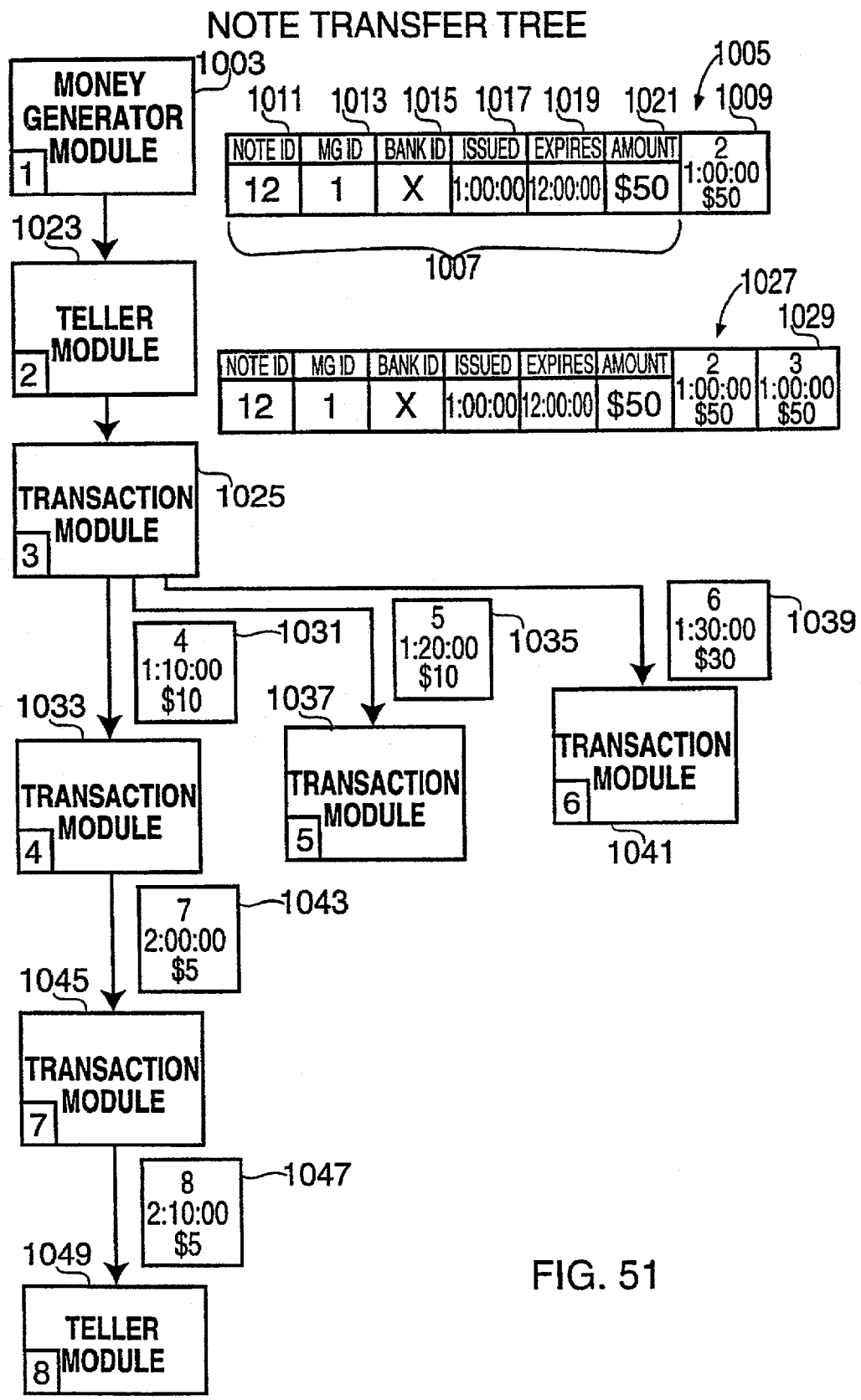
FIG. 51 shows an example of a note transfer tree.

In accordance with the previous example, FIG. 51 shows how the subsequent transfer of an electronic representation of currency produces a tree-like structure of electronic representations of currency derived from the initial note produced by the money generator module. The money generator module 1003 having identifier "1" (module identifiers are contained in digitally signed certificates) produces the electronic representation of currency 1005 having a body group of data fields 1007 and a transfer group of data fields 1009. The signatures and certificates group of data fields is not shown for convenience.

The body group of data fields 1007 includes a note identifier 1011 (e.g., "12"), a money generator module identifier 1013 (e.g., "1"), an issuing bank identifier 1015 (e.g., X), a date-of-issue 1017 (e.g., 1:00:00), a date-of-expiration 1019 (e.g., 12:00:00), a note amount and a monetary unit identifier 1021 (e.g., $50). Other body group data fields such as type of note are not shown for convenience.

The transfer group of data fields 1009 includes a transfer record having a transferee identification number (e.g., "2"), a date-of-transfer (e.g., 1:00:00), and a transfer amount (e.g., $50). The transfer group data field indicating total number of transfers is not shown for convenience. The various date fields in the electronic notes are shown for illustrative purposes as being in the form day:hr:min. Other time monitoring forms (e.g., including seconds) are, of course, possible.

The electronic representation of currency 1005 from money generator module 1003 is stored in teller module 1023 having identifier "2". As part of the withdrawal of $50 by transaction module 1025 having identifier "3" teller module 1023 forms electronic representation of currency 1027 by appending transfer record 1029 to a copy of the data fields in the electronic representation of currency 1005. The note 1027 is stored in transaction module 1025 upon completion of the withdrawal. For illustrative convenience, the remaining note transfers only show the newly appended transfer record portion of the transferred note.

At 1:10:00, transaction module 1025 pays $10 by transfer record 1031 to transaction module 1033 having identifier "4". At 1:20:00, transaction module 1025 pays $10 by transfer record 1035 to transaction module 1037 having identifier "5". At 1:30:00, transaction module 1025 pays $30 by transfer record 1039 to transaction module 1041 having identifier "6". At 2:00:00, transaction module 1033 pays $5 by transfer record 1043 to transaction module 1045 having identifier "7". At 2:10:00, transaction module 1045 deposits $5 by transfer record 1047 to teller module 1049 having identifier "8". Of course, alternatively transaction module 1045 could have deposited its electronic money in teller module 1023.

Only the receiver of the transferred note 11 can either deposit the note 11 or use it in payment. The Verifier 42 application of a money module is used to check the signature of each transfer, to determine if the note 11 is valid and to verify the identifier in the last transfer as the current holder of the note 11. This thwarts the new holder of a note 11 from trying to use a value greater than that which was transferred. It also inhibits copying notes 11 for use in another money module since the identifiers will not match.

As can be appreciated, a subscriber may be able to access certain information about the electronic notes 11 stored within the Transaction money module 4.

In particular, the subscriber may be able to select information on the total amount of the electronic notes 11 stored, the monetary unit of the notes 11, the type of electronic notes 11, i.e., currency or credit, and the denomination of each note 11.

System Security

The security of the system is maintained by the participating banks and the Certification Agency 28, which creates and distributes money module certificates. A certificate of a money module is actually the money module's identifier, its public key, a digital signature of the money module's identifier and public key using the certificatory key (described below), and the version of the certificatory key. The certificate is unique in that it is associated with only one particular money module.

The Certification Agency 28 provides a secure means for money modules to validate each other prior to transacting, first by controlling the money module certificate process and second, by distributing a list of bad money module identifiers.

In the preferred embodiment, the money module certificate will be initially loaded into the money module by the Certification Agency 28. The Certification Agency 28 generates the certificate for each money module using a certificatory key (a private key of the Certificatory Agency 28). It may be changed periodically and distributed under version control processes that are commonly used in the industry. As will be appreciated, every money module will store several versions of the certificatory key in order to verify certificates created by an older key. Because it is anticipated that certificates will expire over time, it is expected that only a few versions need be kept.

A certificate will only be valid for a limited period of time after its creation. Upon expiration of the certificate, the money module will not be allowed to transact with other money modules. Any money modules discovered to have been tampered with will be limited in the amount of damage that they can do to the system since their certificate will not be updated.

To block offending modules from transacting it is also desirable to have legitimate money modules receive the latest list of offending money modules soon after the list is updated. Naturally, this requires that Transaction money modules 4 access the Certification Agency 2e on a periodic basis to obtain the latest list. Placing a time limit on the Transaction money module's 4 ability to transact (in addition to the time limit placed on electronic notes 11) will force subscribers to access the Certification Agency 28 through the Network 25 on a periodic basis to receive the latest bad money module list along with a new certificate. Advantageously, the period of the certificate validity can be closely monitored and adjusted according to security needs.

Figure 9:
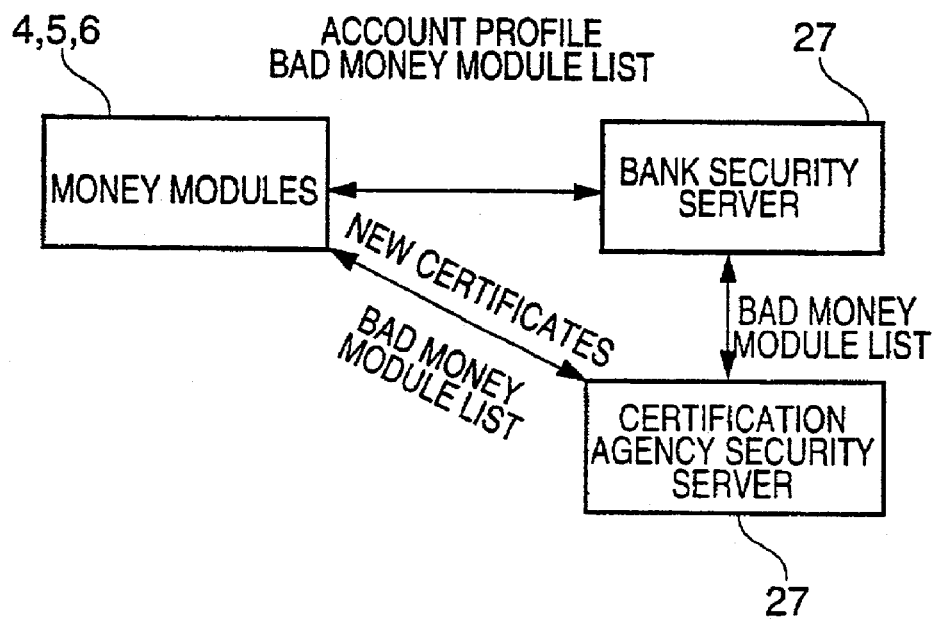
FIG. 9 is a flow diagram of the security system, according to the invention.

The Certification Agency 28 distributes its updated certificatory key and money module certificates on-line through the Security Server 27 (see FIG. 9). An important component of the system's security is provided by Security Servers 27 at the participating banks and Security Servers 27 at the Certification Agency 28.

Figure 10:
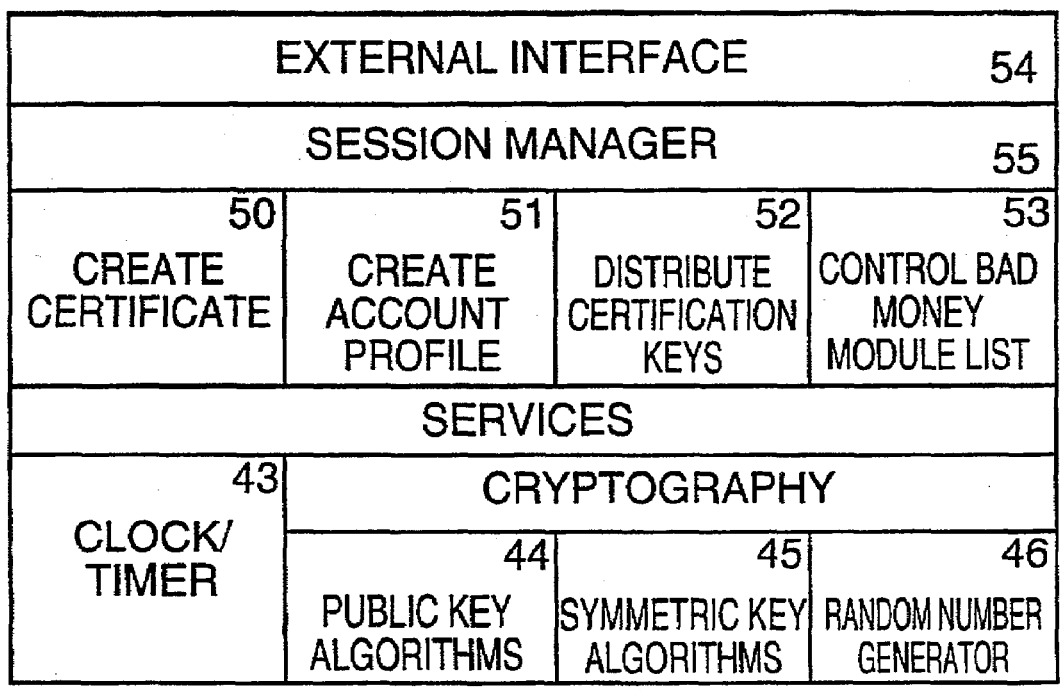
FIG. 10 is a block form diagram of a security server, according to the invention.

Referring now to FIG. 10, a block diagram of a preferred embodiment of the Security Server 27 is shown. It is contemplated that the Security Server 27 at the Certification Agency 28 or on a bank's local network 18 will contain the following application functions:

(1) External Interface 54—a communications layer for connecting to a bank's local network 18 or the Certification Agency's local network 17;

(2) Session Manager 55—controls the security aspects of a transaction session;

(3) Create Certificate 50—certifies a certificate for any of the money modules;

(4) Create Account Profile 51—certifies and signs a bank account profile (described in detail hereinafter) that allows a Transaction money module 4 to access the subscriber's different bank accounts;

(5) Distribute Certification Keys 52—distributes the Certification Agency's 28 list of valid public keys to the money modules;

(6) Bad Money Module Control 53—controls and distributes the list of bad money modules; and (7) Services—identical to the cryptographic functions 44, 45, 46 in the money modules described above Since certificates will expire over time, money modules will be required to apply for new certificates periodically. In order to receive a new certificate, the money module creates a new public key and private key. The new public key, the money module identifier and the old certificate are presented to the Certification Agency 28 after being digitally signed using the old private key.

The Certification Agency 28 checks the signature and if it is valid, signs the new public key and identifier and sends the certificate to the money module with a future expiration date. The Certification Agency's 28 Security Server 27 also distributes a list of bad money modules via the Network 25. Initially, each participating bank's Security Server 27 reports the identifiers of money modules which hold notes 11 invalidly or that are counterfeit. Those identifiers are passed through the Security Servers 27 and are compiled by the Certification Agency 28.

All such identifiers are distributed to the Teller and Money Generator modules 5, 6 respectively. A money module will not transact with another money module found on the list of bad money modules. Optionally, only those money modules which have demonstrated a flagrant breach of security will be distributed to Transaction money modules 4.

If a Transaction money module 4 is lost or stolen, the subscriber would report it to his/her bank or to the Certification Agency 28 so that the money module identifier may be placed on the bad money module list to inhibit any further transactions.

While the security of the system is provided by being able to block a money module from transacting, system security is also maintained by providing the expiration date on the electronic notes 11 in addition to the money module certificates.

As mentioned previously, a note 11 will be valid only for a limited time period after it is generated. Its date-of-expiration is a security parameter which may also be monitored and varied as needed. The period of validity of a note 11 can be varied by the value of the note 11. Preferably, a large note 11 will expire in a shorter time period than a smaller one. For example, a $1,000,000 note may be set to expire five days after the date of its creation since it would provide a significant incentive to counterfeit, while a $50 note 11 may be set to expire after a month from the date of its creation.

A Transaction money module 4 will not accept expired notes 111, but it can deposit or exchange expired notes 11 it may contain for new notes 11. The expiration dates are checked by the Verifier 42 and Clock/Timer 43 applications in a money module before any electronic note 11 is transferred. Separately, it is also anticipated that if the money module loses power then it will not be able to pay or exchange notes 11 after power has been regained until it has communicated again with the Network 25 and has its security parameters updated.

As stated above, a subscriber will typically obtain a Transaction money module 4 already loaded with a certificate. Securing the Transaction money module 4 itself to a subscriber may be accomplished by assigning it a unique PIN, biometrics or other personal secret characteristics.

Before any personalization of the money module 4 may proceed, the Transaction money module 4 checks if there is a bank account already stored in the To Teller 34 application or if the Notes 40 application contains any electronic notes 11. In either of these cases, the Transaction money module 4 will inhibit the subscriber from securing the module with new secret information.

If the Transaction money module 4 has no account numbers or no stored notes 11, then the subscriber can secure it by either entering a PIN, which is reverified by the Transaction money module 4, or by executing a process in which the Transaction money module 4 learns the subscriber's biometrics. Once the personalization has been completed, subscriber access to the Transaction money module 4 requires the successful completion of a sign-on in which the secret information is presented to the Transaction money module 4. If the subscriber can sign on to the Transaction money module 4, then he/she will be permitted to change PIN's or reintroduce biometrics.

In the situation where a subscriber has forgotten his/her PIN or had an incident which has affected his/her biometric reading, then the subscriber may take his/her Transaction money module 4 to a participating bank. A special transaction may be executed which deposits any electronic notes 11 in a holding account and destroys the stored bank account numbers. The subscriber can now enter new secret sign-on numbers and characteristics. Any electronic notes 11 that were removed are returned to the Transaction money module 4 and the bank account numbers may then be recreated (see Bank Access below).

It should be noted that it is not a requirement for a subscriber to identify himself to the system when he takes possession of a Transaction money module 4. Though the identity of the money module is contained in every transaction, the holder of a Transaction money module 4 can be kept secret. If the relationship is revealed then one could trace all of the transactions of a subscriber for the period that the relationship can be corroborated. The only time a subscriber must reveal his identity is if he/she links the money module to a bank account or wishes to redeem money lost.

If the subscriber chooses to use the Transaction money module 4 only for payments and foreign exchange then he/she can keep the relationship secret. As may be appreciated, the subscriber may also acquire a plurality of Transaction money modules 4 and, for example, link one to bank accounts and maintain the others for anonymous payments. The other Transaction money modules 4 may be loaded with notes 11 by exchanges with other money modules or by exchanging cash for electronic notes 11.

Replacement of Money Module Value

If a Transaction money module 4 malfunctions or is lost or stolen, it may be possible for the subscriber to recoup the value that was stored in the money module at the time of the incident. This would necessitate that the subscriber relinquish the option of anonymity for that money module, since upon making a claim for the lost money, he/she would have to verify that he/she is the owner of the Transaction money module 4.

To provide for the replacement of electronic notes 11, the subscriber may first link his/her Transaction money module 4 to a bank account or register ownership of the Transaction money module 4 with the Certification Agency 28. After every transaction involving the transfer of electronic notes 11, the subscriber could save the Tran Log, which identifies the counterparty money module identifier and the note identifier, to inexpensive, non-volatile storage which is removable from the host computing environment. This log may be presented by the subscriber when making a claim to replace value. The log may then be compared to reconciliation files to determine the true value of the lost electronic money.

An alternative to this procedure would be to refresh the money in the Transaction money module 4 frequently. This would mean that the notes 11 in the Transaction money module 4 would be represented by transaction records at the Issuing Banks 1. The existence of the notes 11 could be verified by scanning these files.

A third alternative would allow the system to capture a money module's Tran Log when money is refreshed. These records would be copied and routed to Issuing Banks 1 for storage on their transaction histories. The existence of the notes 11 could then be verified as in the previous alternative.

Bank Access

According to one aspect of the invention, a customer's Transaction money module 4 may access his/her accounts for deposits, withdrawals, transfers, etc., at any bank participating in the system and in particular any bank holding an account with the subscriber. For instance, a typical subscriber may have a savings account and a checking account at one of the participating banks, while maintaining a so-called money market account at a separate financial institution, and perhaps a credit-line account at a third participating bank. It is anticipated that a subscriber's Transaction money module 4 will access his/her accounts for deposits, withdrawals, loan payments and inquiries at any bank or financial institution which can be accessed through the Network If a subscriber has multiple accounts, the subscriber's account relationships with a bank will be stored in an account profile in the To Teller 34 application of the Transaction money module 4. The multiple accounts can be linked together by the personal account number ("PAN") associated with the individual subscriber.

The account profile may be created either in person, under the control of a bank subscriber service representative at a branch, or over the telephone utilizing a special dialogue. For example, the subscriber may identify himself by his PAN and PIN. He may then enter each account number he wishes to access from his Transaction money module 4. The account numbers may be verified in the bank's account reference files. A cross-reference of accounts to Transaction money modules 4 may be maintained by each bank if they so choose.

The composition of an exemplary account profile may be:
(1) Bank Identifier—one for each bank;
(2) Account Numbers;
(3) Account Types—e.g., checking, savings, credit; and
(4) Security Server's 27 signature on the list of accounts.

It will be understood that the list of account numbers will be digitally signed by the bank Security Server 27. As a further security measure the account profile may be re-signed with an updated public key on a periodic basis. The fundamental access security is provided by the digital signature of the bank's Security Server 27.

Banking System (Accounting Architecture)

It is a notable feature of the preferred embodiment, that the method of the system can parallel the existing and varying types of accounting methods that exist today. The system of the preferred embodiment follows the various types of accounting methods practiced presently in various banks. However, it is important to note that unlike the present banking system, in the preferred embodiment of the invention, economic value is created on demand. Thus, there is no inventory of cash or checks involved; electronic currency from demand deposits and electronic credit are created on a real-time basis. This elimination of a paper inventory by using an electronic media of exchange requires certain supplements to the commonly practiced accounting techniques to provide the real-time accounting needed.

Accordingly, the embodiment of the present invention provides an accounting structure to supplement those used in the present banking systems 20. The improved accounting arrangement may be utilized to monitor the electronic money and each bank's obligation when a financial transaction between a Transaction money module 4 and a Teller money module 5 occurs, or when a Clearing Bank 3 performs any clearing processes.

When electronic notes 11 are transferred to or from a Teller money module 5, in most cases accounting transactions affecting the records of the banking system 20 are created. Conversely, transfers between Transaction money modules 4 do not involve any formal accounting procedures—they involve only the transfer of electronic notes 11.

In the system being described, it is anticipated that the following arrangements of accounts are to be utilized for each type of bank, categorized under each monetary unit:

At an Issuing Bank 1
(1) Money Issued Account: A liability account which reflects the money issued but not cleared.
(2) Money Due Account: An asset account reflecting the money deposited to the bank's accounts.
(3) Deposited at Clearing Bank Account: An asset account reflecting the balance of a clearing account at a Clearing Bank 3.
(4) Correspondent Bank Money Account: A liability account owned by a Correspondent Bank 2 which is drawn upon by the Correspondent Bank 2 to dispense electronic money.
(5) Money In Transit Account: A zero-balance liability account owned by each bank, which is used to temporarily maintain electronic money during a financial transaction.
(6) Foreign Exchange Account: A zero-balance liability account owned by each bank, which is used to handle multiple currency exchanges.

At a Correspondent Bank 2
(1) Deposited at Issuing Bank Account: An asset account reflecting the balance of the Correspondent Bank 2 account at the Issuing Bank 1.
(2) Money Due Account: An asset account reflecting the money deposited to the bank's accounts.
(3) Foreign Exchange Account: A zero-balance liability account owned by each bank, which is used to handle multiple currency exchanges.
(4) Money In Transit Account: A zero-balance liability account owned by each bank, which is used to temporarily maintain electronic money during a financial transaction.

At the Clearing Bank 3:
(1) Issuing Bank Clearing Account: A liability account to net the amount of money cleared for an Issuing Bank 1.

The accounts, with their corresponding symbols, are summarized below:
Type of Bank
  Account Name
    Type Owner Symbol
  Issuing Money Issued
    Liability
      Issuing MI
  Money Due
    Asset Issuing MD
  Deposited at
    Asset Issuing DC
  Clearing Bank
  Correspondent
    Liability
      Correspondent
      CM
  Bank Money
  Money hi Liability
    Issuing IT
  Transit
  Foreign Liability
    Issuing FX
  Exchange
  Correspondent
    Deposited at
      Asset Correspondent
      DI
  Issuing Bank
  Money Due
    Asset Correspondent MD
  Money In Liability
    Correspondent
      IT
      Transit
      Foreign Liability
        Correspondent
          FX
          Exchange
  Clearing Clearing Liability
    Issuing CA
      Account Transaction processing, for a transaction such as a request for a withdrawal from savings, selects accounting processes so that the appropriate accounts may be credited and debited accordingly. It is anticipated that the accounting processes will be using software programs and methods that are well known in the art and presently available; inasmuch as any of the programs and methods currently practiced and known for providing the foregoing accounting procedures would be suitable for use in the invention. To better understand the accounting processes of the invention, several examples of typical transactions and their associated accounting steps will be described.

Accordingly, FIGS. 11-24 illustrate the accounting transactions for deposits, withdrawals, foreign exchanges, receipt of cleared money, electronic money/cash exchanges, and note 11 updates. FIGS. 11-14 and 19-22 also illustrate the accounting flows when a Transaction money module 4 contains notes 11 that are not involved in the particular transaction that is occurring. The notes 11 that are not part of the transaction are removed and replaced with updated notes as discussed in the security procedures described above. For example, when a subscriber deposits less electronic money than is stored in his/her Transaction Money Module 4 and leaves a balance, the electronic notes 11 representing the balance are then replaced with electronic notes 11 containing the most up-to-date certificates. This latter case is indicated in the parenthetical entries on FIGS. 11-14 and 19-22.

In an example of the accounting arrangements according to the invention (illustrated by FIG. 11), if a subscriber were to deposit $50.00 out of $100.00 of electronic money contained in his/her Transaction money module 4 at a Correspondent Bank's Teller money module 5 (Step 1), the entire $100 of electronic money would be extracted of which $50.00 would first be credited to his/her customer account (herein denoted by "A"), the remaining $50.00 would be credited to the Correspondent Bank's Money In-Transit account, and $100 would be debited to the Money Due account at the Correspondent Bank 2. See "IT" and "MD" in FIG. 11.

After the $100 of electronic notes 11 is removed, the notes 11 are deposited from the Correspondent Teller money module 5 to the Teller money module 5 of an Issuing Bank 1 (Step 2). In accomplishing this transfer, the Money Due account at the Correspondent Bank 2 is credited $100 while its Deposited at Issuing Bank account is debited by $100; the Issuing Bank 1 credits its Correspondent Bank Money account by $100 and debits its Money Due account by $100.

In Step 3, the updated notes 11 are requested. Thus, the Correspondent Bank 2 requests from the Issuing Bank 1 the withdrawal of $50 of electronic money containing the most recent certificates from its Money Generator module 6. To support this request, $50 is credited to the Deposited at Issuing Bank account and $50 is debited from its Money In Transit account. The Issuing Bank 1 then debits $50 from its Correspondent Bank Money account and credits $50 to its Money Issued account.

To complete the transaction, the $50 is then transferred from the Money Generator module 6 to the Correspondent Bank's 2 Teller money module 5 through the Issuing Bank's 1 Teller money module 5, and finally to the Transaction money module 4 (Steps 4-6). The net result of all of these transactions is that $50 remains deposited in the subscriber's account and $50 of newly issued electronic notes 11 are now stored in the Transaction money module 4 of the subscriber.

Figure 11:
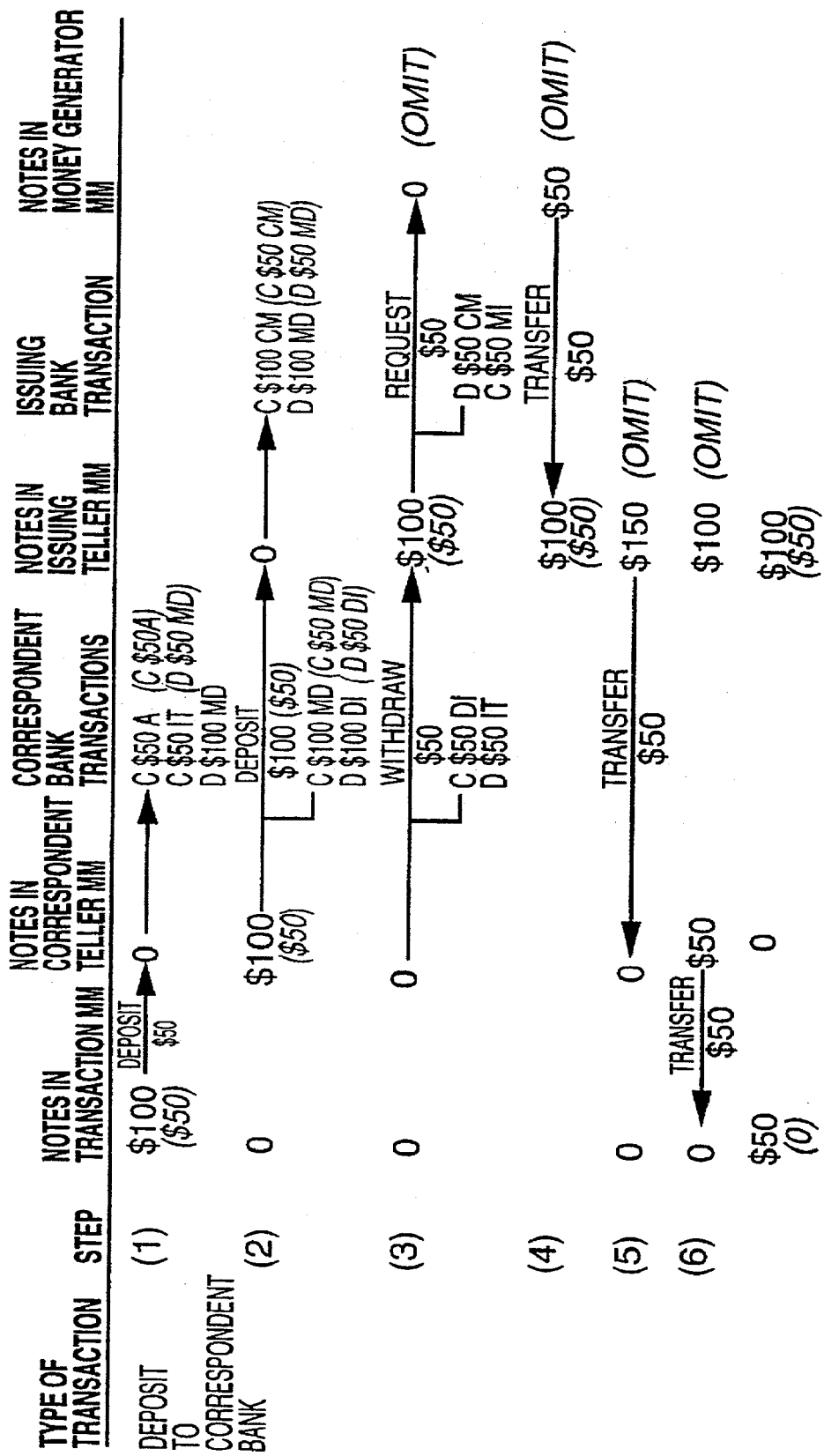

Alternatively, if a subscriber begins with $50 in his/her Transaction money module 4 and deposits all of it, the customer account would be credited $50 and the Money Due account would be debited by $50 (Step 1 of FIG. 11; parenthetical entries).

When there are only $50 of electronic notes 11 that are removed, the Correspondent Bank 2 credits the Money Due account $50 and the Deposited at Issuing Bank account is debited $50 (Step 2, parenthetical entries). This money is then deposited at the Issuing Bank 1 for later clearing, wherein the Correspondent Bank Money account is credited by $50 and the Money Due account is debited by $50. Because no updated electronic notes 11 need be returned in this situation, the deposit and its corresponding accounting is completed at Step 2.

Figure 12:
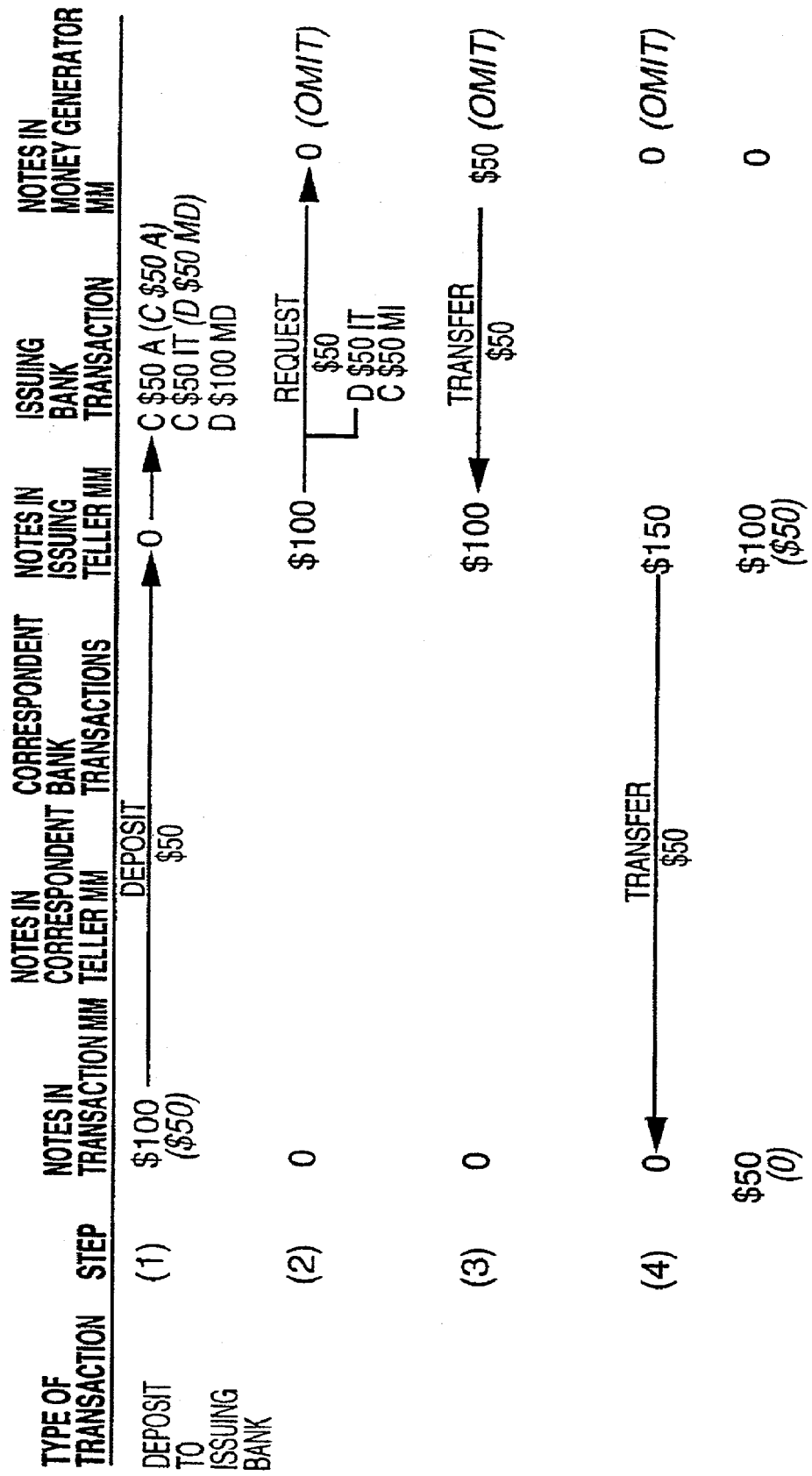

The accounting processes of an electronic money deposit at an Issuing Bank 1 instead of a Correspondent Bank involve fewer operational steps, which are illustrated in FIG. 12. Using the same dollar amounts as in the previous exemplary transaction, when $50 of $100 in electronic money stored in the Transaction money module 4 are deposited directly to an Issuing Teller money module (Step 1), $50 would be credited to the customers account (A). Fifty dollars would simultaneously be credited to the Money In Transit account, and $100 would be debited to the Money Due account at the Issuing Bank 1.

Since the entire $100 stored in the Transaction money module 4 is removed and transferred to the Issuing Bank's Teller money module 5, it is necessary to return $50 of updated notes to the Transaction money module 4. Accordingly, as shown in Step 2 the Teller money module 5 requests $50 from its Money Generator module 6, debiting its Money In Transit account by $50 and crediting its Money Issued account by $50.

In response, $50 is created by the Money Generator module 6 and transferred to the Teller money module 5, which in turn transfers this electronic money to the Transaction money module 4 (Steps 3-4).

When only $50 is stored in the Transaction money module 4 and all of it is deposited, the customer's account (A) is credited $50, the Money Due account is credited $50, and that is the end of it. See parenthetical entries in Step 1 in FIG. 12.

In the case of a withdrawal from a Correspondent Bank (see FIG. 13), a withdrawal request of $100 by a subscriber using a Transaction money module 4 at a Correspondent Bank 2 will cause the subscriber's account (A) to be debited by $100 and the Correspondent Bank's 2 Money In Transit account to be credited by $100 (Step 1). The request for the $100 withdrawal is forwarded to the Issuing Bank 1 from the Correspondent Bank 2, and the Correspondent Bank's Deposited at Issuing Bank account is credited by $100 while its Money In Transit account is debited by $100 (Step 3).

Next, the request for $100 is forwarded by the Issuing Bank's 1 Teller money module to the Money Generator module 6. Accordingly, the Correspondent Bank Money account gets a $100 debit while the Money Issued account gets a $100 credit (Step 4).

The Money Generator module 6 then creates the $100 of electronic notes 11, and transfers it to the Transaction money module 4 via the Issuing Bank's 1 Teller money module 5 and the Correspondent Bank's 2 Teller money module 5 (Steps 5-6).

When, e.g., the subscriber makes the $100 withdrawal request with a Transaction Money Module 4 that contains $50 of electronic notes 11, the notes 11 are removed and now the Money Due account is debited $50, the subscriber's account is still debited $100, and the Money In Transit account is credited $150 (parenthetical entries, Step 1).

The $50 is then deposited to an Issuing Bank 1, causing the Money Due account to be credited $50 and the Deposited at Issuing Bank account to be debited by $50. At the Issuing Bank 1, the Correspondent Bank Money account is credited $50 while the Money Due account is debited $50 (Step 2, parenthetical entries).

Because $50 of notes 11 have been removed, the withdrawal request in Step 3 must be for $150. This request causes the Deposited at Issuing Bank account to by credited by $150 and the Money In Transit account to be debited by $150 (Step 3 parenthetical entries).

At the Issuing Bank, $150 is requested from the Money Generator Module 6 and the Correspondent Bank Money account gets a $150 debit while the Money Issued account gets a $150 credit (Step 4 parenthetical entries). As above, the money generated by the Money Generator Module 6 ($150) gets conveyed to the Transaction money module 4 via the Issuing Bank 1 and Correspondent Bank 2 Teller money modules 5 (Steps 5-6, parenthetical entries).

Figure 14:
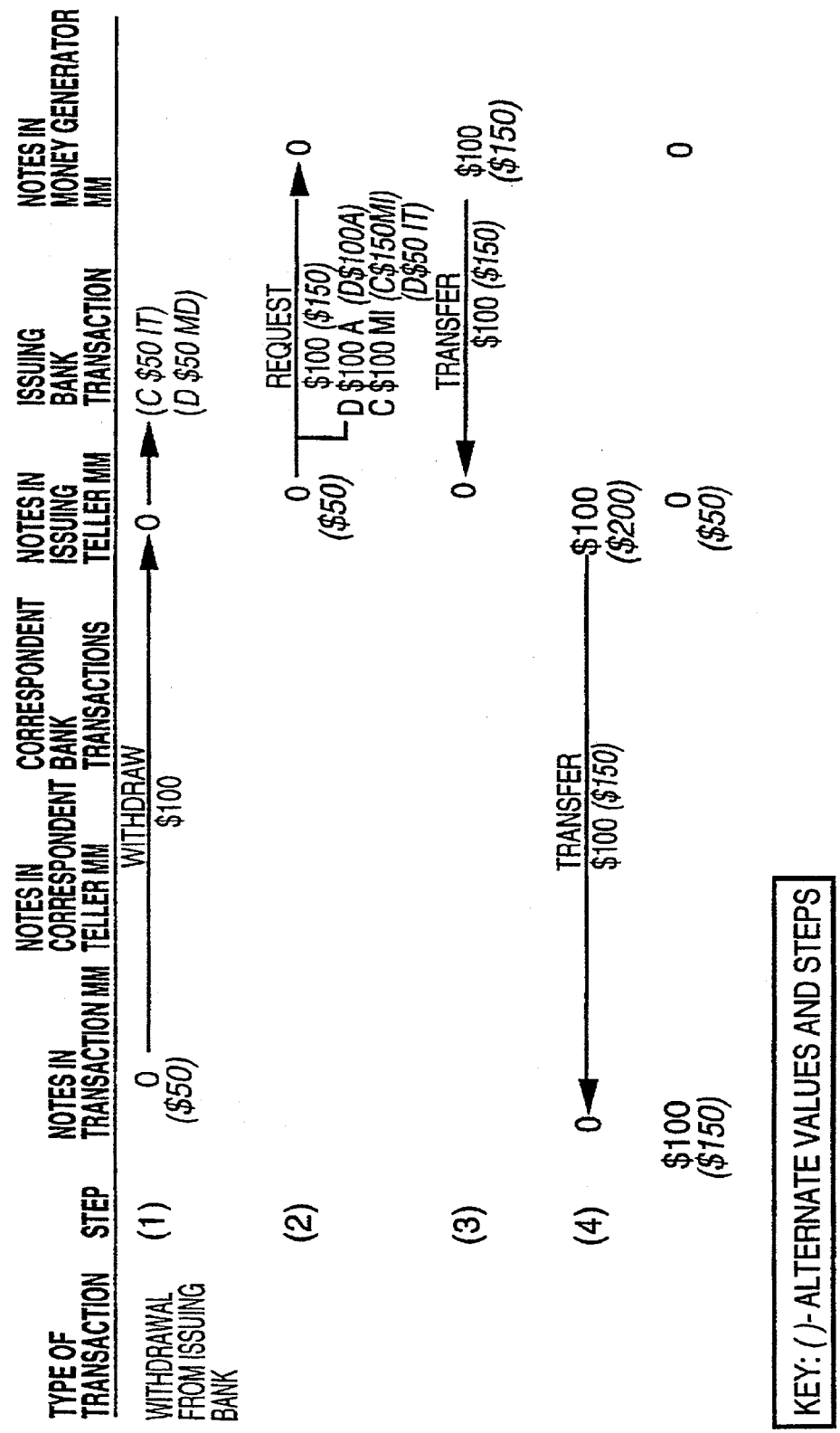

A withdrawal from an Issuing Bank 1 involves fewer accounting procedures. Referring now to FIG. 14, a withdrawal request by a Transaction money module 4 from an Issuing Bank 1, will cause the Issuing Bank 1 Teller money module 5 to debit the subscriber's account (A) by $100 and credit its Money Issuing account by $100 (Steps 1-2).

A request for an updated $100 is then made by the Issuing Bank's 1 Teller money module 5 to the Money Generator module 6, which upon its creation will return $100 to the Issuing Bank's Teller money module 5 (Step 3). In completing the transaction, the Issuing Bank's 1 Teller money module 5 simply transfers this new $100 containing the most recent certificate to the Transaction money module 4 (Step 4).

Alternatively, when the Transaction money module contains $50 at the time of the $100 withdrawal, (parenthetical entries) the $50 will be removed, the Issuing Bank's Money In Transit account will be credited $50 and the Money Due account will be debited $50 (Step 1).

The Issuing Bank 1 must now request $150 from the Money Generator module 6. Naturally, the customer's account is debited $100. The Money Issued account is credited by $150 when the new notes 11 are created, and the Money In Transit account is debited $50 (Step 2). From there, $150 is returned to the Transaction money module 4 via the Issuing Bank's 1 Teller money module 5 (Steps 3-4).

Figure 15:
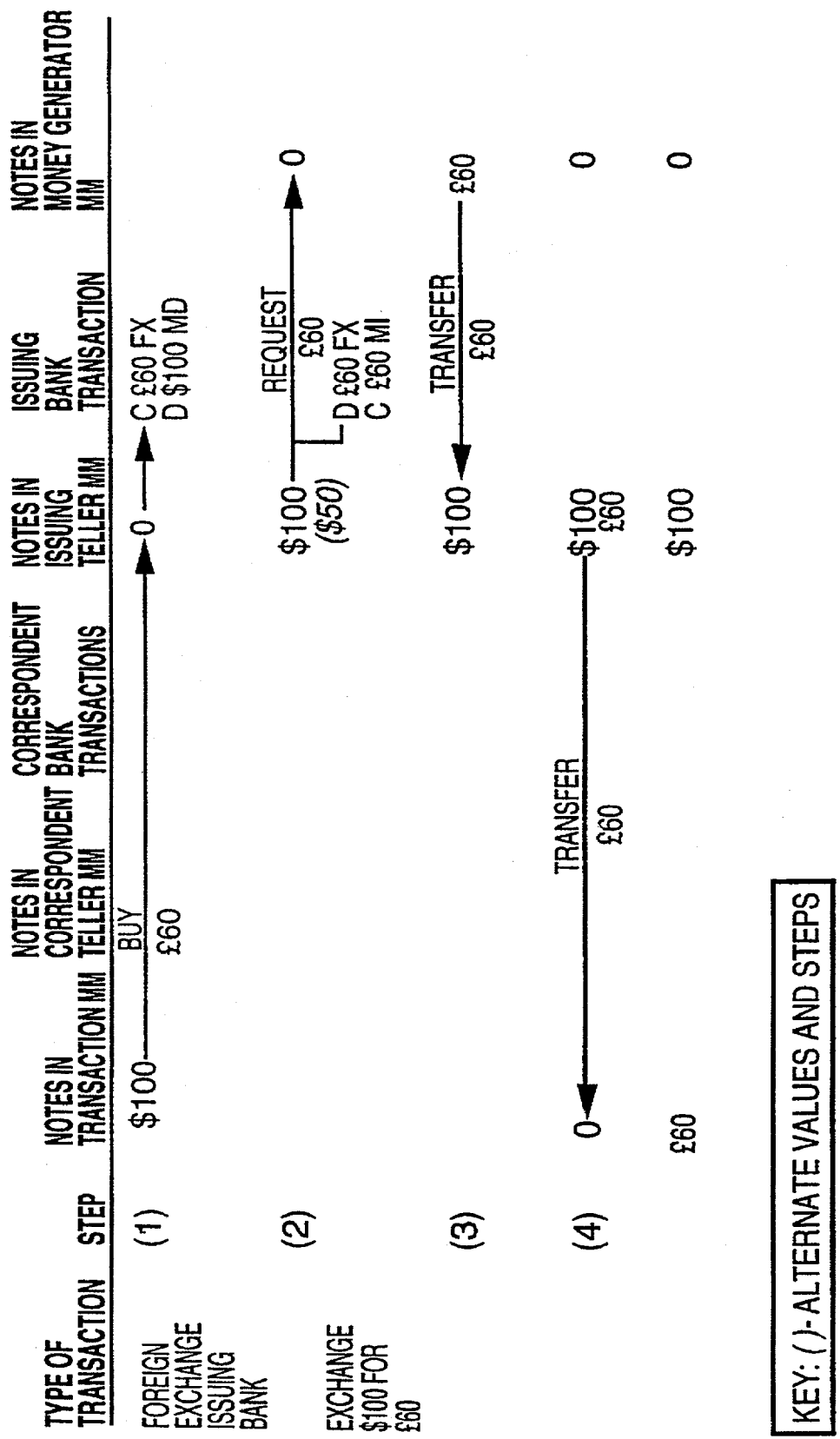

FIG. 15 illustrates the case of a foreign exchange with an Issuing Bank 1. In this example, a subscriber wishes to exchange $100 of electronic money stored in his/her Transaction money module 4 for 60 of British currency. The deposit at the Issuing Bank's 1 Teller money module 5 will cause the Issuing Bank's 1 Foreign Exchange account to be credited by 60, while its Money Due account would be debited by $100 (Step 1). Here, the $100 is transferred from the Transaction money module 4 to the Teller money module 5, which then requests that an electronic note 11 representing 60 be created by the Money Generator module 6 (Step 2).

At the Issuing Bank 1, the foreign exchange account is now debited by 60 while the Money Issued account is credited by 60. The 60 electronic note 11 created by the Money Generator module 6 is transferred to the Teller money module 5, which now stores both the $100 and the 60 (Step 3). The 60 is then transferred from the Teller money module 5 to the Transaction money module 4 resulting in a net balance of 60 in the Transaction money module 4 and $100 remaining in the Teller money module 5, completing the transfer (Step 4).

Figure 16:
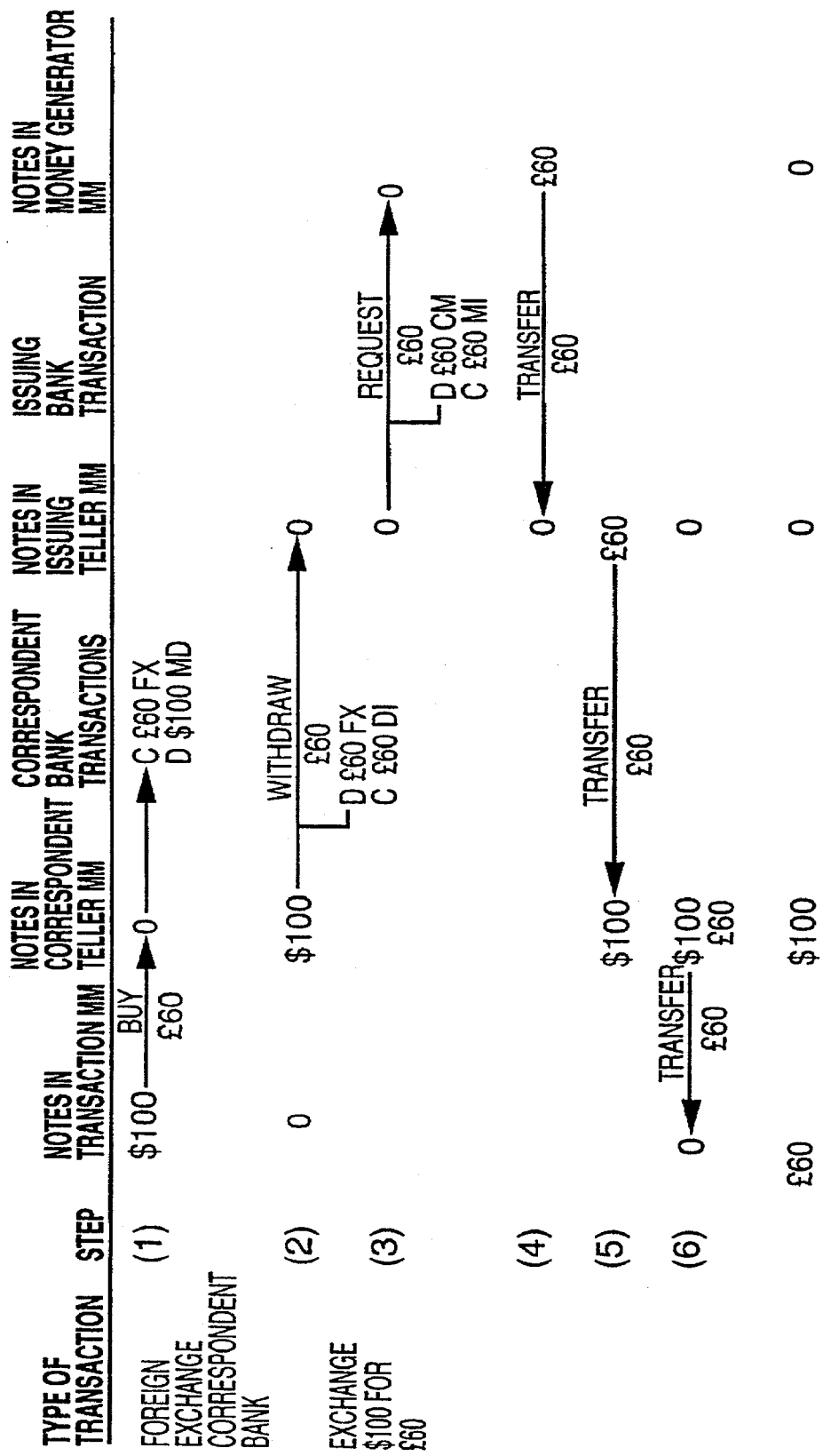

The accounting procedures for a foreign exchange of $100 for 60 at a Correspondent Bank 2 are shown in FIG. 16. The Transaction money module 4, in this example, requests that its $100 be used to "purchase" 60 from the Correspondent Bank's Teller money module 5, which causes the Correspondent Bank's Foreign Exchange account to be credited by 60 while its Money Due account is debited by $100 (Step 1). The $100 stored in the Transaction money module 4 is transferred to the Correspondent Bank's 2 Teller money module 5, which sends a request to the Issuing Bank's 1 Teller money module 5 to withdraw 60, and debits its Foreign Exchange account by 60 and credits its Deposited at Issuing Bank account by 60 (Step 2).

The corresponding account transaction at the Issuing Bank 1 debits the Correspondent Bank Money account by 60 and credits the Money Issued account by 60 (Step 3). The Issuing Bank's Teller money module 5 then requests that the Money Generator module 6 create 60 and transfer it to the Issuing Bank's Teller money module 5, which in turn transfers it to the Correspondent Bank's 2 Teller money module 5 (Steps 4-5). From there, the 60 note 11 is transferred to the Transaction money module 4, leaving it with a balance of 60 while the Correspondent Bank's 2 Teller money module 5 finishes with a balance of $100 (Step 6).

Figure 17:
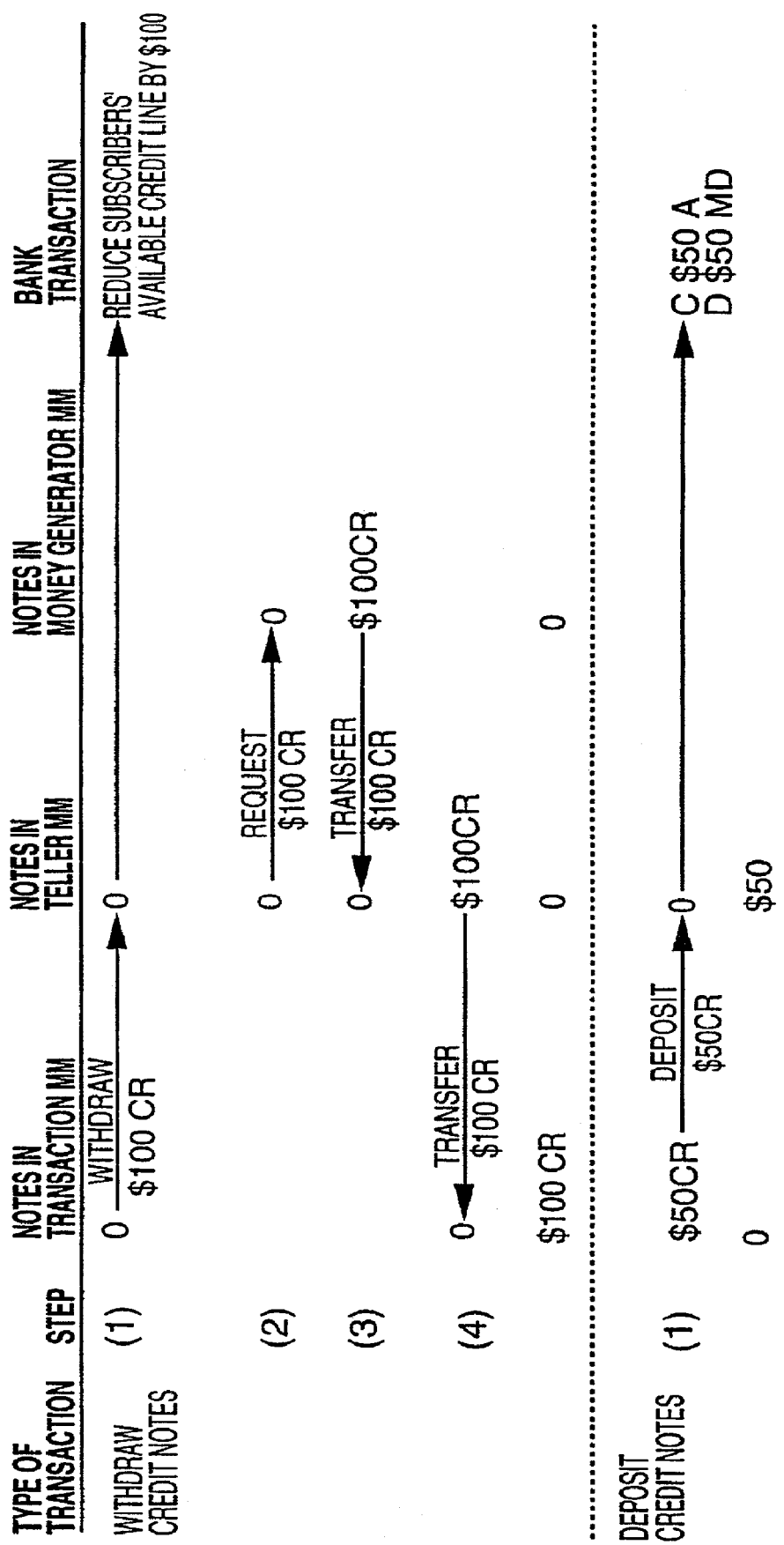

The accounting transactions for a withdrawal or deposit of credit notes 11 also involves several accounting operations, as shown in FIG. 17. When a subscriber wishes to withdraw money from his/her credit line (Step 1), the proper credit note 11 is simply transferred from the Money Generator module 6 to the Transaction money module 4, reducing the customer's available credit line by an equal amount to the amount transferred (Steps 2-4).

Alternatively, when credit notes 11 are deposited by a subscriber's Transaction money module 4, the subscriber's account is increased by the amount deposited, and the Money Due account is debited by an equal amount (Step 1).

The accounting operations involving the Issuing Bank's 1 receipt of cleared electronic money will now be described. Referring to FIG. 18, in this example $100 of electronic money and $100 of credit notes 11 have been cleared by the Clearing Bank 3 to settle the balances among several Issuing Banks 1. The $100 of electronic money and the $100 of credit notes are transferred to the proper Issuing Bank 1 (Step 1). Additionally, $50 of electronic notes 11 that it has issued are also deposited at the Issuing Bank 1. Consequently, the Issuing Bank 1 will debit the subscriber's account A by $100, debit the Issuing Bank's Money Issued account by $150, credit the Money Due account by $50 and credit the Issuing Bank's Deposited at Clearing Bank account by $200 to complete the transaction.

Figure 19:
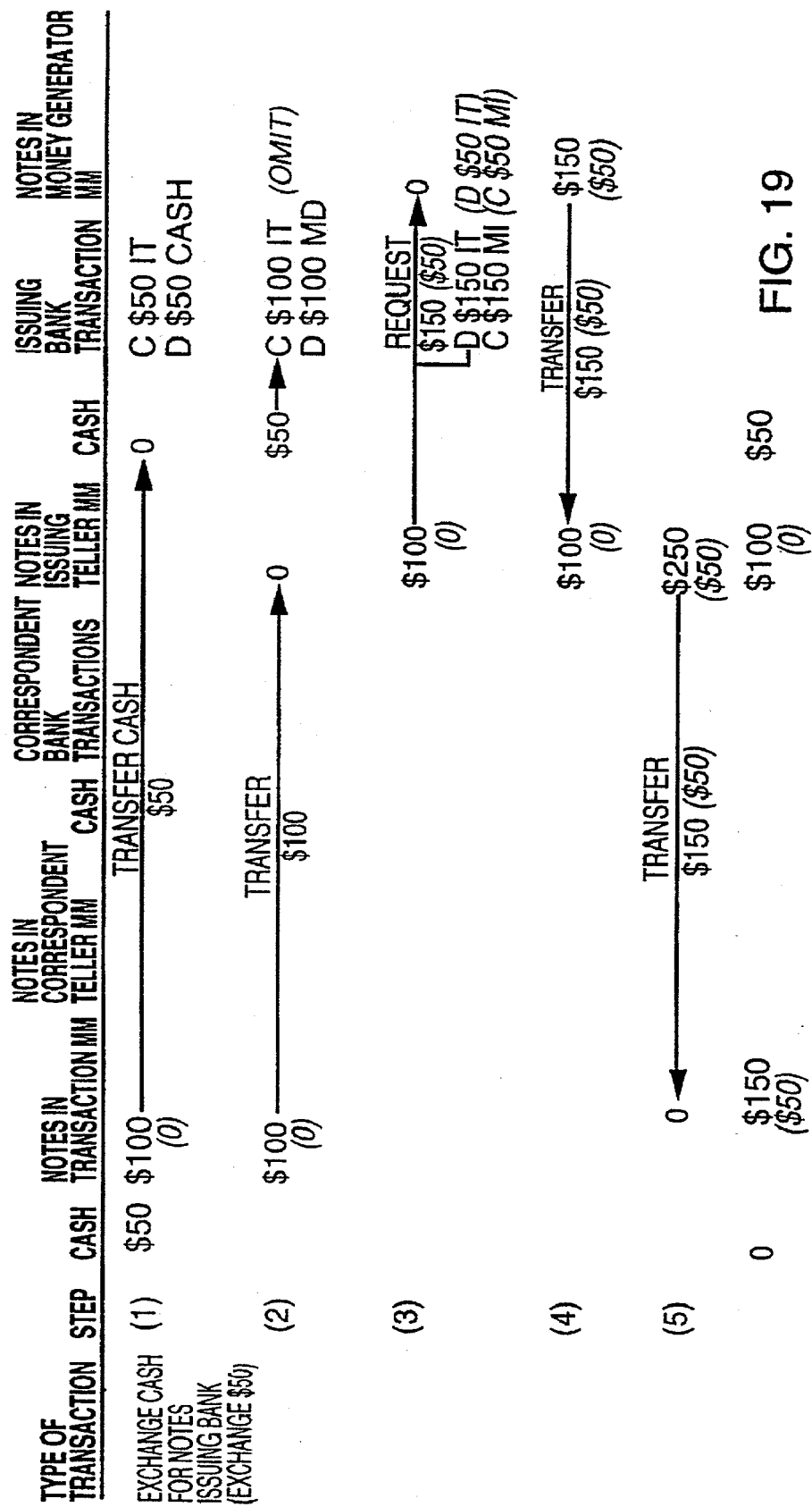

Turning now to FIG. 19, an accounting example of an exchange of cash for electronic notes 11 at an Issuing Bank 1 is shown. In this example, the subscriber wishes to exchange $50 of cash for $50 of electronic notes 11 to add to the $100 of electronic notes 11 already stored in his/her Transaction money module 4.

In the first transaction, the $50 of cash is deposited at the Issuing Bank 1 which causes the Money In Transit account to be credited by $50, while the cash account is debited by $50 (Step 1).

Next, the $100 of electronic notes 11 in the Transaction money module 4 is removed, resulting in the Money In Transit account being credited by $100, while the Money Due account is debited by $100 (Step 2).

The Teller money module 5 will now request $150 of electronic notes 11 from the Money Generator module 6 to return $150 of electronic notes 11 to the subscriber (Step 3). Accordingly, the Money In Transit account is debited by $150 while the Money Issued account is credited by $150.

The newly generated $150 of electronic notes 11 is then transferred from the Money Generator module 6 to the Teller money module 5, which in turn transfers the $150 to the subscriber's Transaction money module 4 (Steps 4-5). The completed transaction leaves the subscriber with $150 of electronic notes 11 and the Issuing Bank's Cash account containing a $50 balance.

Also shown parenthetically in FIG. 19 is the case when the subscriber exchanges $50 of cash for electronic notes 11 when there is a zero balance in his/her Transaction money module 4. In Step 1, the $50 of cash is deposited at the Issuing Bank 1 which causes the Money In Transit account to be credited by $50, while the cash account is debited by $50. Since no notes 11 are removed, no accounting is performed in Step 2.

In Step 3, only $50 is requested from the Money Generator module 6, and the Money In Transit account is debited by $50 while the Money Issued account is credited by $50. The same transfer between money modules occurs as in Steps 4-5 of FIG. 19 described above, using only the $50 that was requested. This would leave the subscriber with $50 of electronic notes 11 in lieu of his original $50 of paper money.

Figure 20:
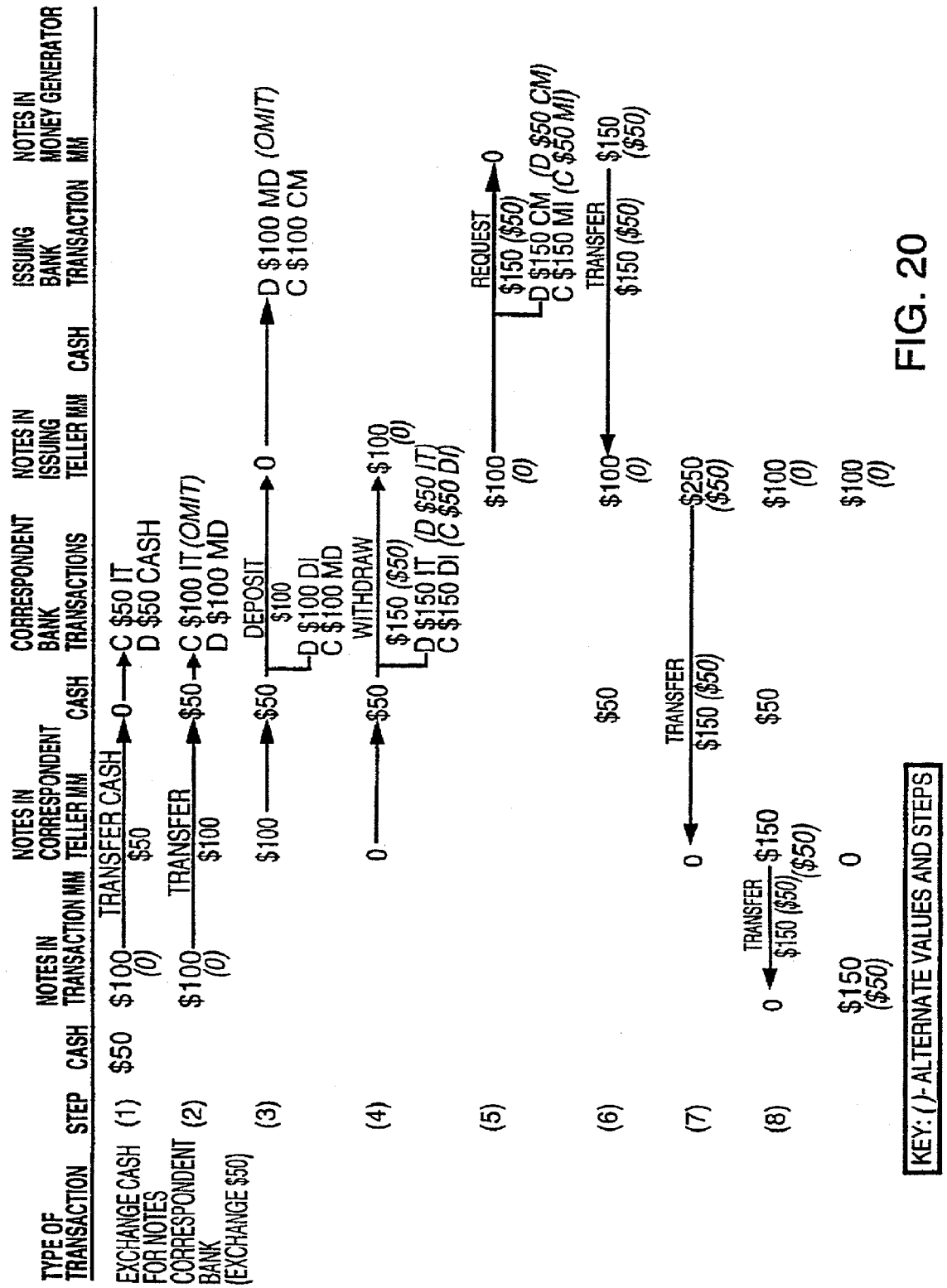

In FIG. 20, an exchange of cash for electronic notes 11 at a Correspondent Bank 2 is shown. This example uses the same parameters as in FIG. 19, namely, the subscriber has $50 of cash and $100 of electronic notes 11 in his Transaction money module 4.

When the $50 in cash is deposited to the Correspondent Bank 2, its Money In Transit account is credited $50 while its Cash account is debited $50 (Step 1). The $100 of electronic notes 11 is then transferred from the Transaction money module 4 to the Correspondent Bank 2 which credits its Money In Transit account by $100 and debits its Money Due account by $100 (Step 2).

From there, the $100 of electronic notes 11 is deposited at the Issuing Bank 1, wherein its Money Due account is debited by $100 while its Correspondent Bank Money account is credited by $100 (Step 3). At the Correspondent Bank 2, the Deposited at Issuing Bank account is debited by $100 while the Money Due account is credited by $100.

A withdrawal request is then made by the Correspondent Bank 2 for $150 from the Issuing Bank 1 (Step 4). This request results in the Correspondent Bank 2 debiting its Money In Transit account by $150 and crediting its Deposited at Issuing Bank account by $150.

Correspondingly, the Issuing Bank 1 Teller money module 5 requests $150 of notes 11 from the Money Generator Module 6, debits its Correspondent Bank Money account by $150 and credits its Money Issued account by $150 (Step 5).

Finally, the $150 of electronic notes 11 is transferred from the Money Generator module 6 to the Issuing Bank's 1 Teller money module 5 which transfers it to the Transaction money module 4 after passing through the Correspondent Bank's 2 Teller money module 5 (Steps 6-8).

Alternatively, a subscriber having $50 of cash and no notes 11 in his/her Transaction money module 4 is also shown in FIG. 20. As in the first case, the $50 in cash is deposited to the Correspondent Bank 2, its Money In Transit account is credited $50 while its Cash account is debited $50 (Step 1).

A $50 withdrawal request is then made to the Issuing Bank 1, and the Money In Transit account is debited by $50 while the Deposited at Issuing Bank account is credited $50 (Step 4, parenthetical entry). Thereafter, $50 is requested from the Money Generator Module 6, the Correspondent Bank Money account is debited $50 and the money issued account is credited $50 in Step 5 (parenthetical entry). Here, $50 in electronic notes 11 are transferred through the same money module path as Steps 6-8 above, to reach the Transaction money module 4.

Figure 21:
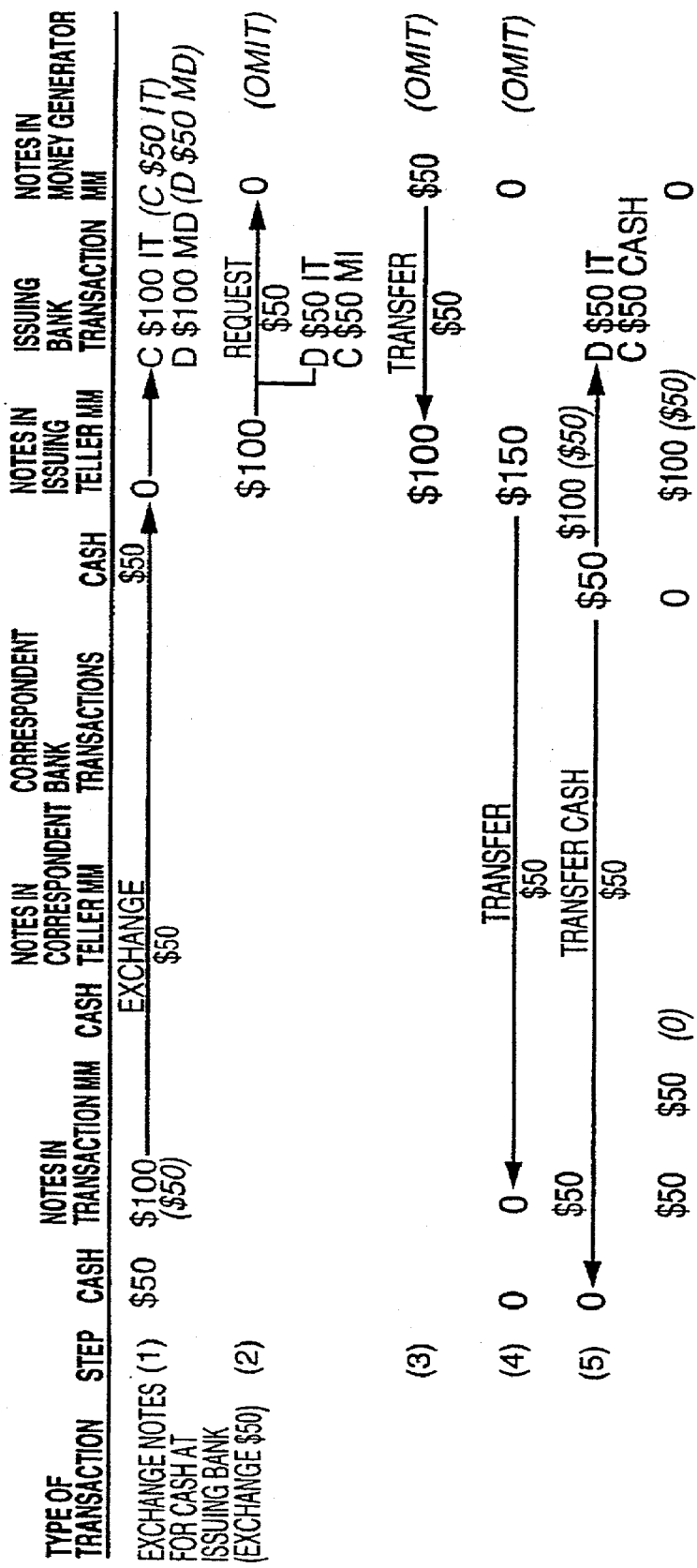

FIG. 21 illustrates the exchange of electronic notes 11 for cash at an Issuing Bank 1. Here the subscriber has $100 of electronic notes 11 stored in his/her Transaction money module 4 and wishes to exchange $50 of the electronic notes 11 for $50 of paper cash.

After the Transaction money module 4 establishes communications with the Issuing Bank's 1 Teller money module 5, all $100 of the electronic notes 11 is removed from the Transaction money module 4 (Step 1). This causes the Money In Transit account to be credited by $100 and the Money Due account (at the Issuing Bank 1) to be debited by $100.

The Teller money module 5 then requests $50 of updated electronic notes 11 from the Money Generator module 6, and this transaction requires the Money In Transit account to be debited by $50 and the Money Issued account to be credited by $50 (Step 2). The newly generated $50 of electronic notes 11 is then transferred to the Transaction money module 4 through the Teller money module 5. The $50 of paper cash is then transferred to the subscriber through a Teller or ATM (Steps 3-5).

Also shown in this figure (parenthetically) is the subscriber making the same exchange for cash when only $50 is stored in his/her Transaction Money Module 4. At the Issuing Bank, $50 of electronic notes 11 is removed for which the Money In Transit account is credited $50 and the Money Due account is debited $50. Fifty dollars of paper cash is then returned to the subscriber since he/she only deposited $50 of electronic notes 11 (Step 5).

Completing this transaction, in both cases the Money In Transit account is debited by $50 while the cash account at the Issuing Bank 1 is credited by $50. The net result is that the subscriber ends up with $50 of paper cash and, in the former case only, $50 of updated electronic notes 11 in his/her Transaction money module 4.

Figure 22:
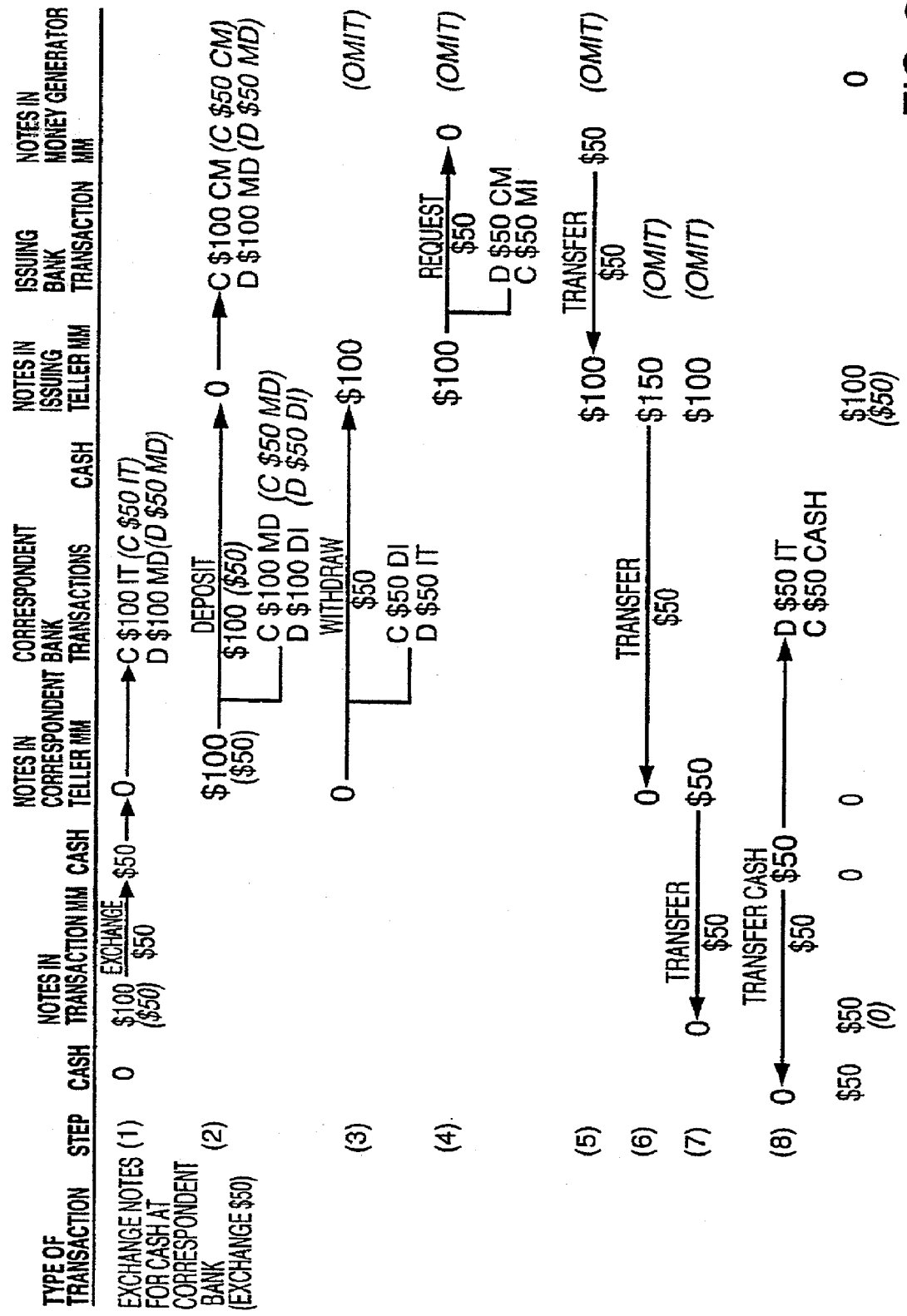

The exchange of electronic notes 11 for paper cash at a Correspondent Bank 2 is illustrated in FIG. 22. As in the example illustrated in FIG. 21, although the subscriber is only exchanging $50 of electronic notes 11, all $100 of electronic notes 11 are transferred from the subscriber's Transaction money module 4 (Step 1).

After the notes 11 are transferred, the Correspondent Bank's 2 Teller money module 5 credits its Money In Transit account by $100 and debits its Money Due account by $100. This $100 of electronic notes 11 is now deposited at an Issuing Bank 1, causing the Correspondent Bank 2 to credit its Money Due account by $100 while debiting its Deposited at Issuing Bank account by $100 (Step 2).

At the Issuing Bank 1, $100 is credited to the Correspondent Bank Money account while $100 is debited to the Money Due account. The Correspondent Bank 2 now makes a request to withdraw $50 of electronic notes 11 from the Issuing Bank 1 (Step 3). Consequently, the Deposited at Issuing Bank account is credited by $50 while the Money In Transit account at the Correspondent Bank 2 is debited by $50.

Now, the Issuing Bank's 1 Teller money module 5 requests $50 from the Money Generator module 6 and debits its Correspondent Bank Money account by $50 while crediting its Money Issued account by $50 (Step 4). The $50 of updated electronic notes 11 is transferred from the Money Generator module 6 through Issuing Bank 1 Teller money module 5 and the Correspondent Bank 2 Teller money module 5, back to the Transaction money module 4 in Steps 5-7.

Also illustrated is this same example with only $50 stored in the Transaction money module 4, which is deposited at a Correspondent Bank 2, to be exchanged for paper money. For this deposit, the Money In Transit account is credited $50, and the Money Due account is debited $50 (Step 1). The $50 is then deposited by the Correspondent Bank 2 to its account at the Issuing Bank 1. At the Correspondent Bank 2, the Money Due account receives a $50 credit, while the Deposited at Issuing Bank account receives a $50 debit. On the Issuing Bank 1 side, it credits the Correspondent Bank Money account by $50 and debits the Money Due account by $50 after receiving the $50 deposit (Step 2).

In both illustrations, fifty dollars of paper cash is then transferred from the Correspondent Bank 2 to the subscriber, while the Correspondent Bank 2 debits its Money In Transit account by $50 and credits its cash account by $50 (Step 8). The subscriber is now left with $50 of paper cash and, in the first illustration, $50 of electronic notes 11 stored in his/her Transaction money module 4.

Figure 23:
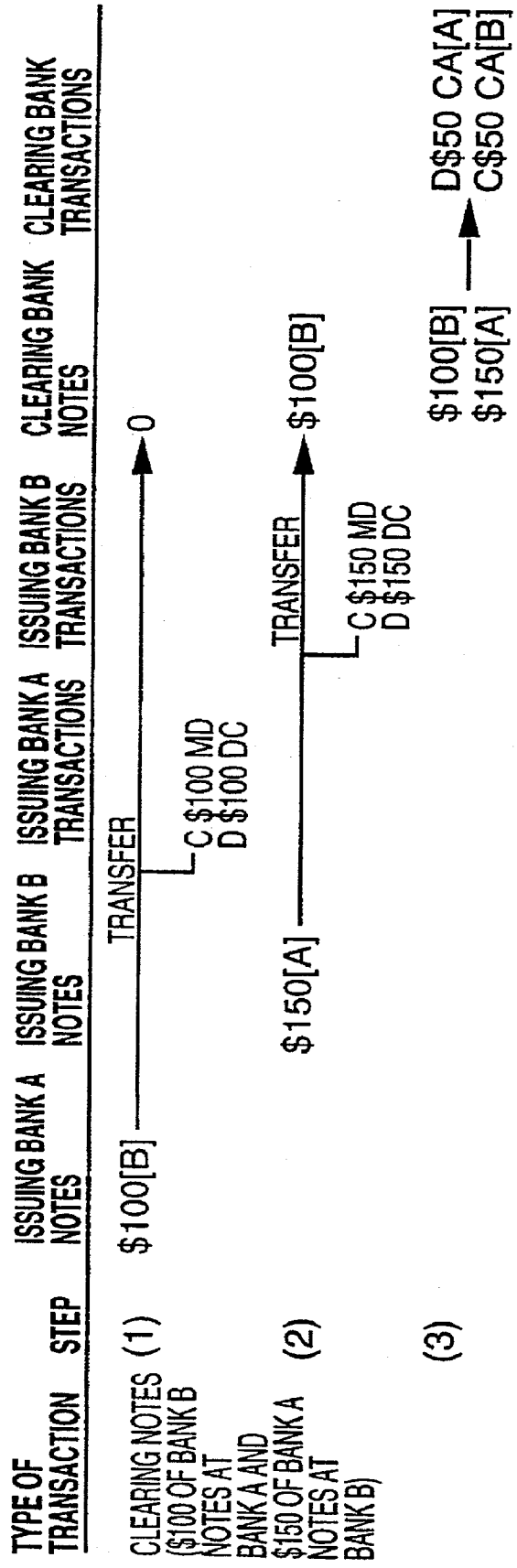

In FIG. 23, the accounting process for clearing the electronics money issued by different Issuing Banks is shown. This illustration uses an example in which $100 of electronic notes 11 issued by Bank B has been deposited at Issuing Bank A, and $150 of electronic notes 11 issued by Bank A have been deposited at Issuing Bank B.

In Step 1, Issuing Bank A transfers the $100 issued by Bank B to the Clearing Bank 3. It then credits its Money Due account by $100 and debits its Deposited at Clearing Bank account by the same amount. In Step 2, Issuing Bank B transfers the $150 of Issuing Bank A's money to the Clearing Bank 3. Its Money Due account is credited by $150, while its Deposited at Clearing Bank account is debited $150.

In sum, $50 is due to Bank B. Accordingly, $50 gets debited to the Clearing account of Bank A, while $50 gets credited to the Clearing account of Bank B (Step 3).

Figure 24:
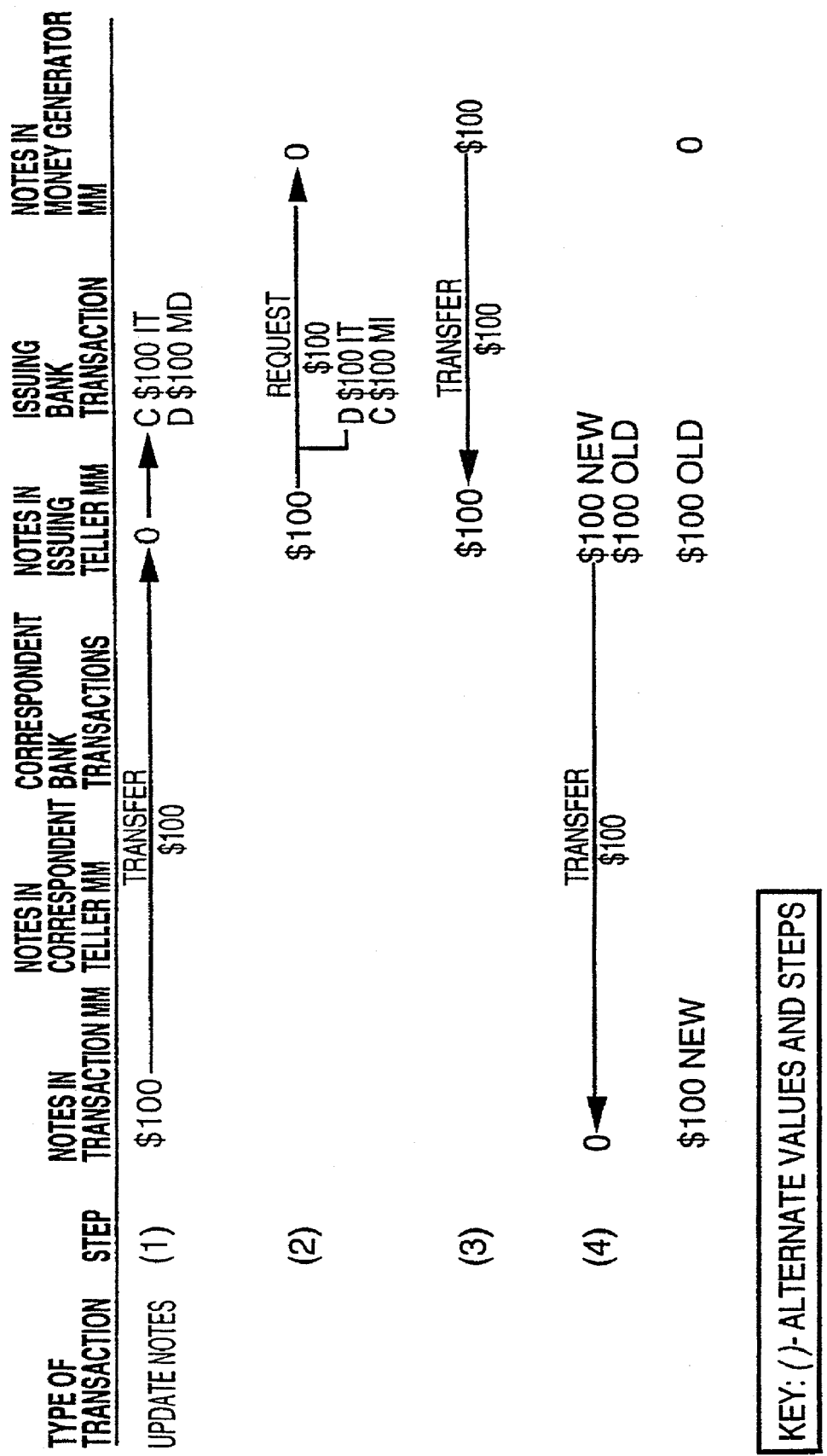

In FIG. 24, the accounting transactions corresponding to updating electronic notes 11 is shown. Here, $100 of electronic notes 11 are stored in a Transaction money module 4 and are transferred to an Issuing Bank 1, where 1000 is credited to the Money In Transit account and $100 is debited to the Money Due account (Step 1).

One hundred dollars of electronic notes 11 are requested from the Money Generator module 6 causing the Money In Transit account to be debited by $100 while the Money Issued account is credited by $100 (Step 2). With this accomplished, the $100 of electronic notes 11 is transferred from the Money Generator module 6 to the Issuing Bank's I Teller money module 5, which in turn transfers the money to the subscriber's Transaction money module 4 (Steps 3-4).

Reconciliation and Clearing Systems

Figure 25:
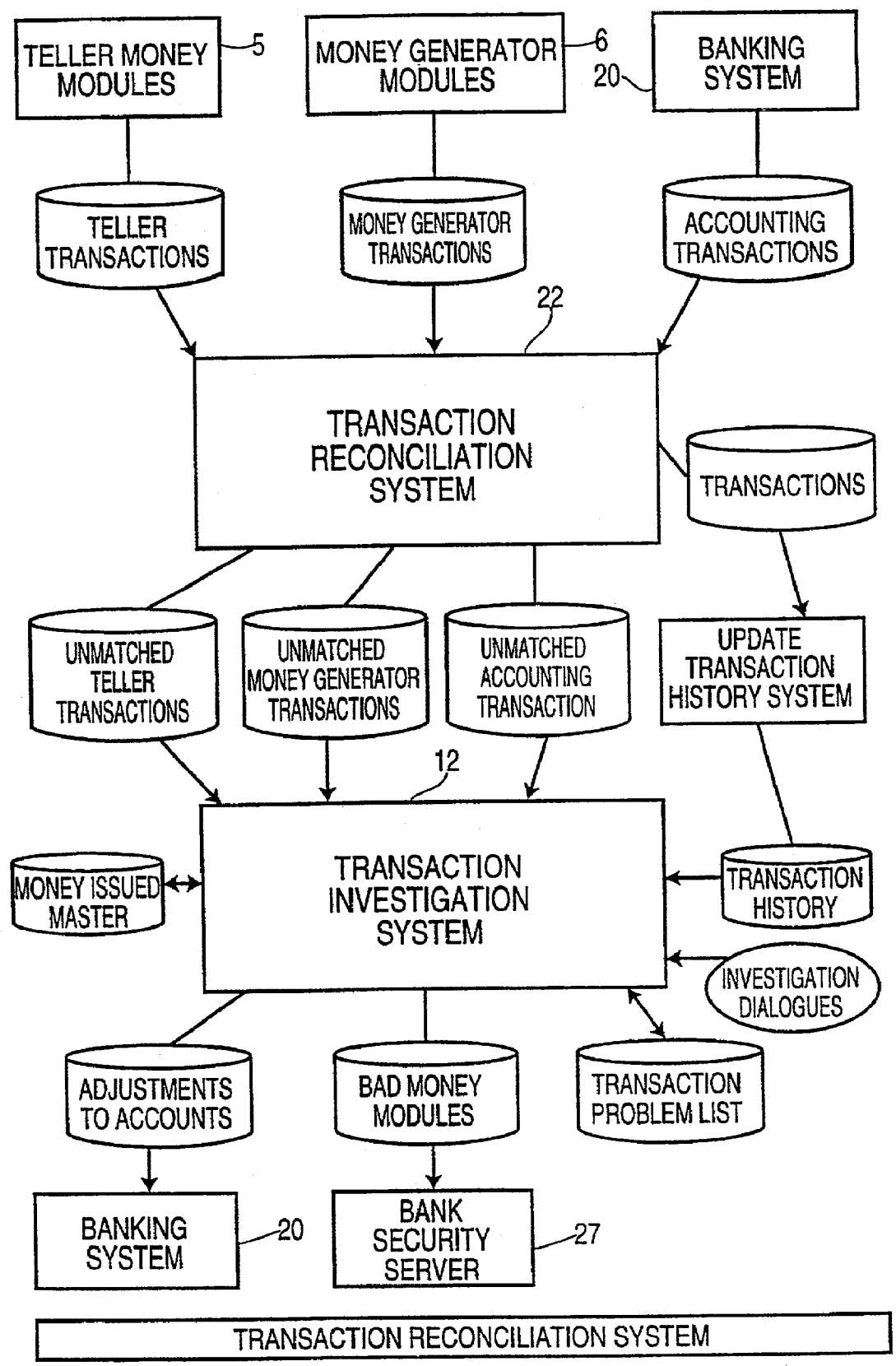
FIG. 25 a flow diagram of the Transaction Reconciliation System, according to the invention.

Referring to FIG. 25, the Transaction Reconciliation System 22 is shown. It will be understood that the Teller money modules 5, the Money Generator modules 6 and the banking system 20 may periodically pass transaction records to a Transaction Reconciliation System 22 maintained at each participating bank. These transactions will be analyzed and matched to determine if there is any faulty process occurring in the system of the invention.

The Transaction Reconciliation System 22, which may be embodied in any appropriately sized and suitably programmed general purpose computer but is not so limited, will ensure that all Teller money module 5 transactions with a financial impact, e.g., deposits, withdrawals and payments, match the appropriate accounting transactions. Any mismatches could indicate incomplete transactions or possible fraudulent actions.

Transactions reflecting the money issued by the Money Generator modules 6 also should correspond to Teller money module 5 transactions and have the appropriate accounting transactions recorded. Any mismatched data may indicate incomplete processing or a security breach. Unmatched accounting transactions may be caused by incomplete transactions or an attempt to tamper with the records of the banking system 20.

In the preferred embodiment, these unmatched transactions may then be transferred to an investigation system 12 where the causes of the problems may be determined. On-line dialogues may be provided to allow investigators to review the mismatches against transaction records and to determine appropriate actions to correct the situation. Investigators may then take corrective actions by adjusting accounts, deactivating faulty Teller money modules 5 and Money Generator modules 6, and notifying subscribers of the actions.

Figure 26:
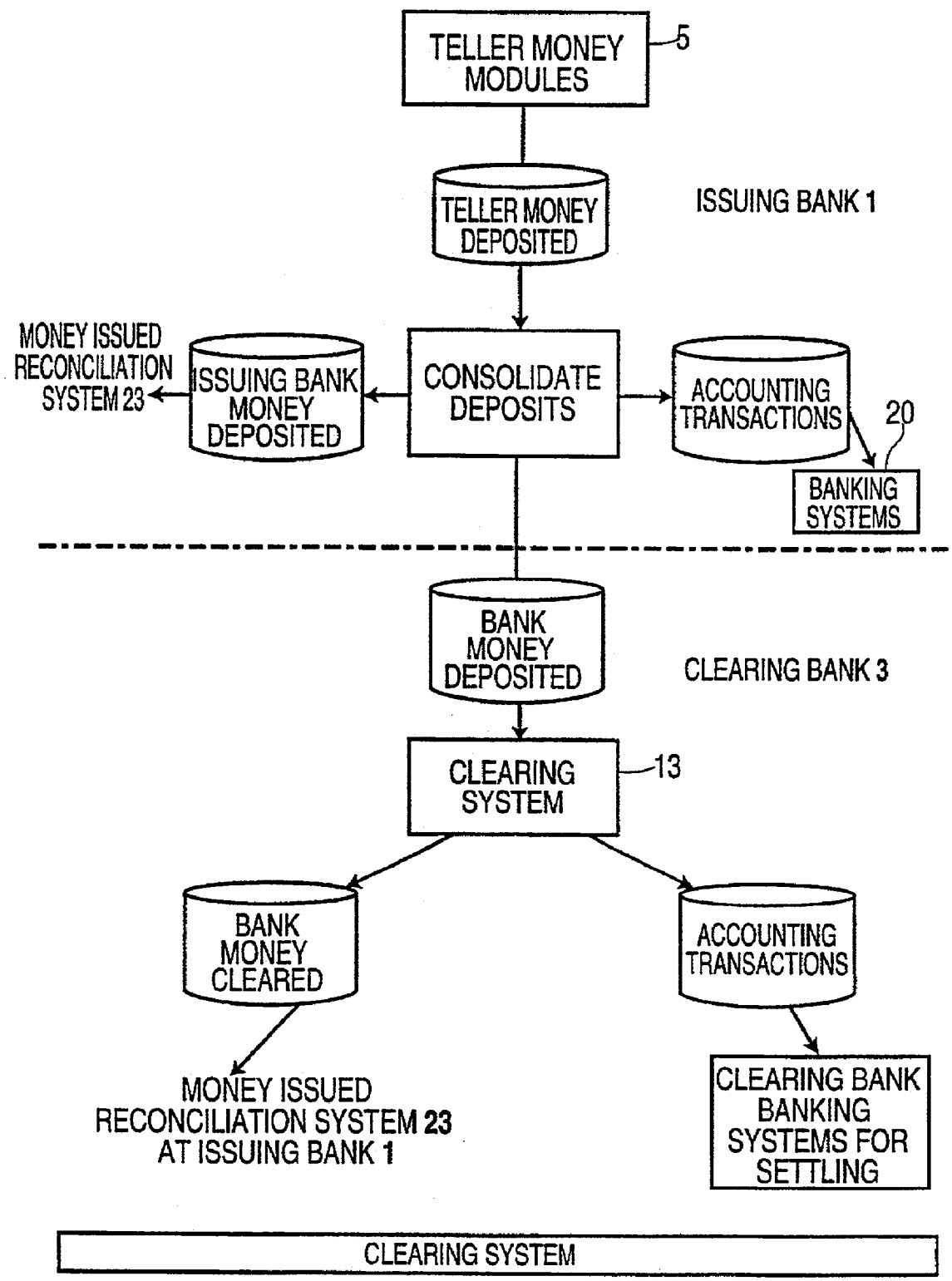
FIG. 26 is a flow diagram of the Clearing System, according to the invention.

Attention is now directed to FIG. 26, which illustrates the clearing process for handling deposit transactions. Correspondent Banks are not involved in this process because subscriber deposits are deposited to their accounts at Issuing Banks 1 on a real-time basis. At Issuing Banks, deposits are aggregated by the Clearing System 13 to consolidate all deposited electronic money (including the deposits from Correspondent Banks) for transmission to the Clearing Bank 3.

The Clearing Bank 3 may be implemented in any computer processing facility capable of accommodating the large number of transactions and corresponding amounts of data which the system will typically handle. A high volume mainframe computer, a suitably sized minicomputer system, a number of networked work stations having the necessary data processing capabilities or a combination of the foregoing may also be used. As will be appreciated by a person skilled in the art, the particular design of the Clearing Bank 3 hardware system is not critical to the invention.

It is anticipated that Issuing Banks 1 may clear money in one of several procedures. In one of these procedures, electronic money may be deposited on-line from the Issuing Bank 1 to the Clearing Bank 3. This could be done on-line in a real-time mode when transactions are actually occurring. Alternatively, an Issuing Bank 1 may record the details of transactions being performed during the course of the day for later batch processing. Interbank processing could occur several times a day.

As shown in FIG. 26, an Issuing Bank 1 may periodically transfer its electronic money to a deposit consolidation file (consolidate deposits) which may be processed and transmitted to the Clearing Bank 3. Transaction records from this file are also conveyed to the bank's Transaction Reconciliation System 22 for statistical and housekeeping functions.

At the Clearing Bank 3, the deposit consolidation files are processed creating a single debit or credit by monetary unit for each Issuing Bank's 1 demand account. Of course, the appropriate accounting transactions for these demand accounts are posted during the clearing processes. Any accounts which are overdrawn will be settled via the usual interbank settlement processes that are commonly used in the industry.

The processed electronic money that is cleared is sent back to the Money Issued Reconciliation System 23 of each of the banks that issued it in order to be reconciled and checked for tampering and duplication.

Figure 27:
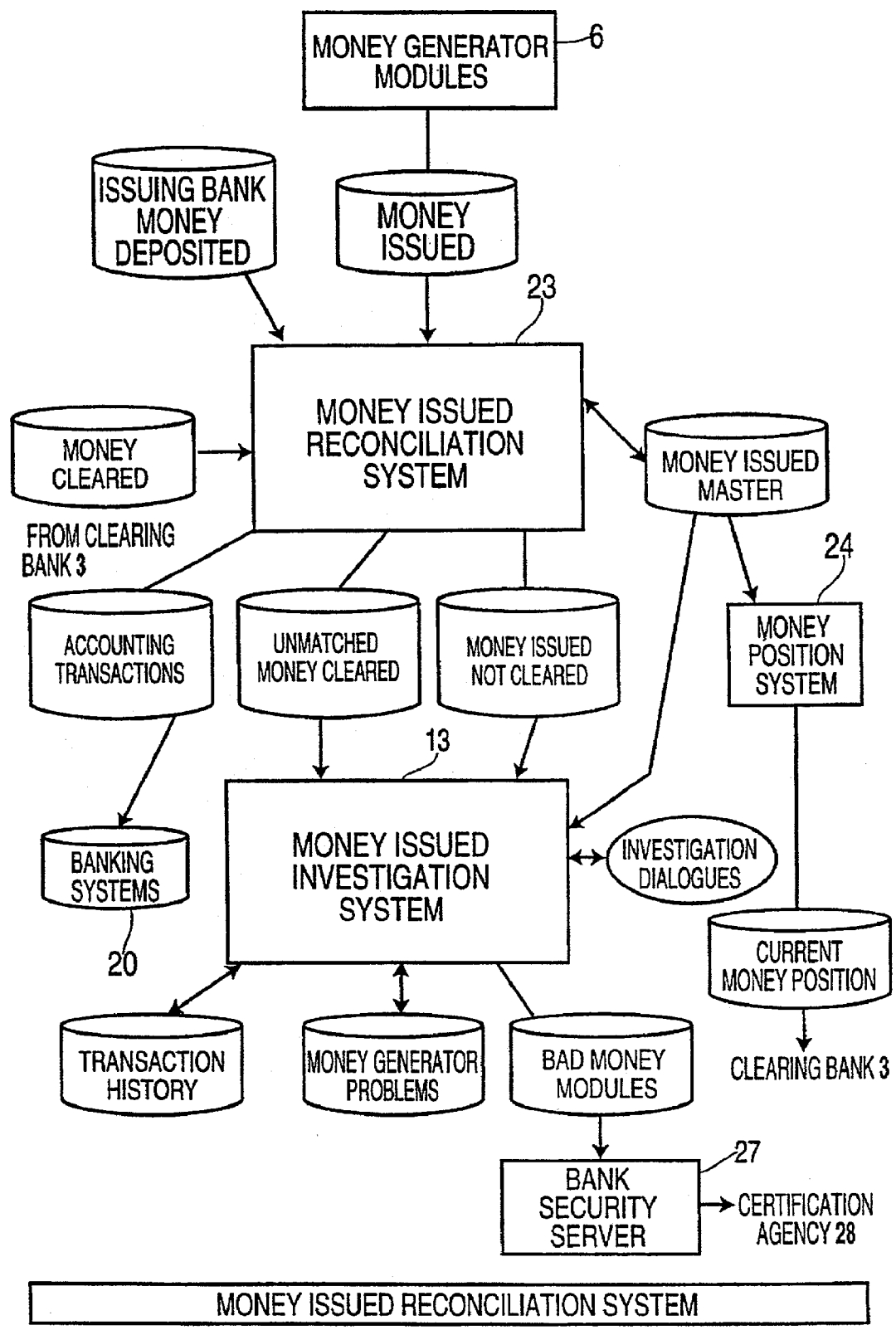
FIG. 27 is a flow diagram of the Money Issued Reconciliation System, according to the invention.

Additional statistical and housekeeping functions are implemented in the Money Issued Reconciliation System 23, as shown in FIG. 27. Issuing Bank's 1 provide their own Money Issued Reconciliation System 23, typically embodied in a general purpose computer but not so limited, for matching the electronic money issued to the electronic money cleared at the Clearing Bank 3.

As indicated in FIG. 27, the electronic money issued and electronic money deposited at Issuing Banks 1, and money cleared transactions received from Clearing Bank 3 are conveyed to the Money Issued Reconciliation System 23. The Money Issued Reconciliation System 23 generates accounting transactions for the money cleared, and updates a master file of all the bank's money issued. Additionally, the Money Issued Reconciliation System 23 passes to an investigation subsystem 13 money which has cleared but which was not issued or was possibly transferred more than once.

Any unmatched cases may indicate a potential breach of security. Investigators may then determine whether Money Generator modules 6 are not working properly or money modules are being tampered with. Money module identifiers of faulty or abused money modules are passed to each bank's Security Servers 27 for distribution to the other money modules on the bank's local network be. The identifiers are also sent to the Certification Agency 28 for appropriate distribution throughout the Network 25.

Separately, the Money Issued master file is accessed by the Money Position system 24 which creates a file to be transmitted to the Clearing Bank 3 to create a consolidated money position. It is contemplated that all Issuing Banks 1 will provide a report reflecting their position at the end of a specified period, typically at the end of every day. The Money Position System 24 may consolidate these reports to reflect the amount of money issued by the Issuing Banks 1 for each monetary unit. The reports will reflect the outstanding position of each Issuing Bank 1 in order to assess the risk of interbank settlement problems.

Operational Sequences

Although some aspects of the preferred embodiment may be described in terms of detailed schematic diagrams, the transaction functions are best illustrated by use of process flowcharts. Thus, to facilitate understanding of the operation of the money modules, several examples of transactions are set forth in the flowcharts of FIGS. 28-50A. Referring to these figures, a detailed description of the system processes and the associated application functions that incorporate the principles of the preferred embodiment of the present invention will now be described.

Throughout the descriptions of the flowcharts (except where indicated otherwise), the application functions of the Transaction money module 4, whether they are imbedded in a hand-held unit or other type of processing device, are hereinafter designated with the suffix "A" and the Teller money module 5 applications and its associated bank are hereinafter designated with the suffix "B". In the case where a Correspondent Bank 2 interacts with an Issuing Bank 1, the Issuing or Correspondent Bank 1 and its associated Teller money module 5 applications are hereinafter designated with a "C."

Additionally, transitions to steps in another figure are indicated by a pentagonal tag having an alphanumeric symbol, and continue on the other figure with a circle having the same alphanumeric symbol therein.

Withdrawal from an Issuing Bank

In FIGS. 28-35A, a process flowchart of a transaction between a Transaction money module 4 and a Teller money module 5 is shown. In this process example, it is assumed that the subscriber is desirous of completing a monetary transaction with a participating bank; specifically, a withdrawal of some amount of electronic money from his/her account, to be stored in his/her Transaction money module 4.

Figure 28:
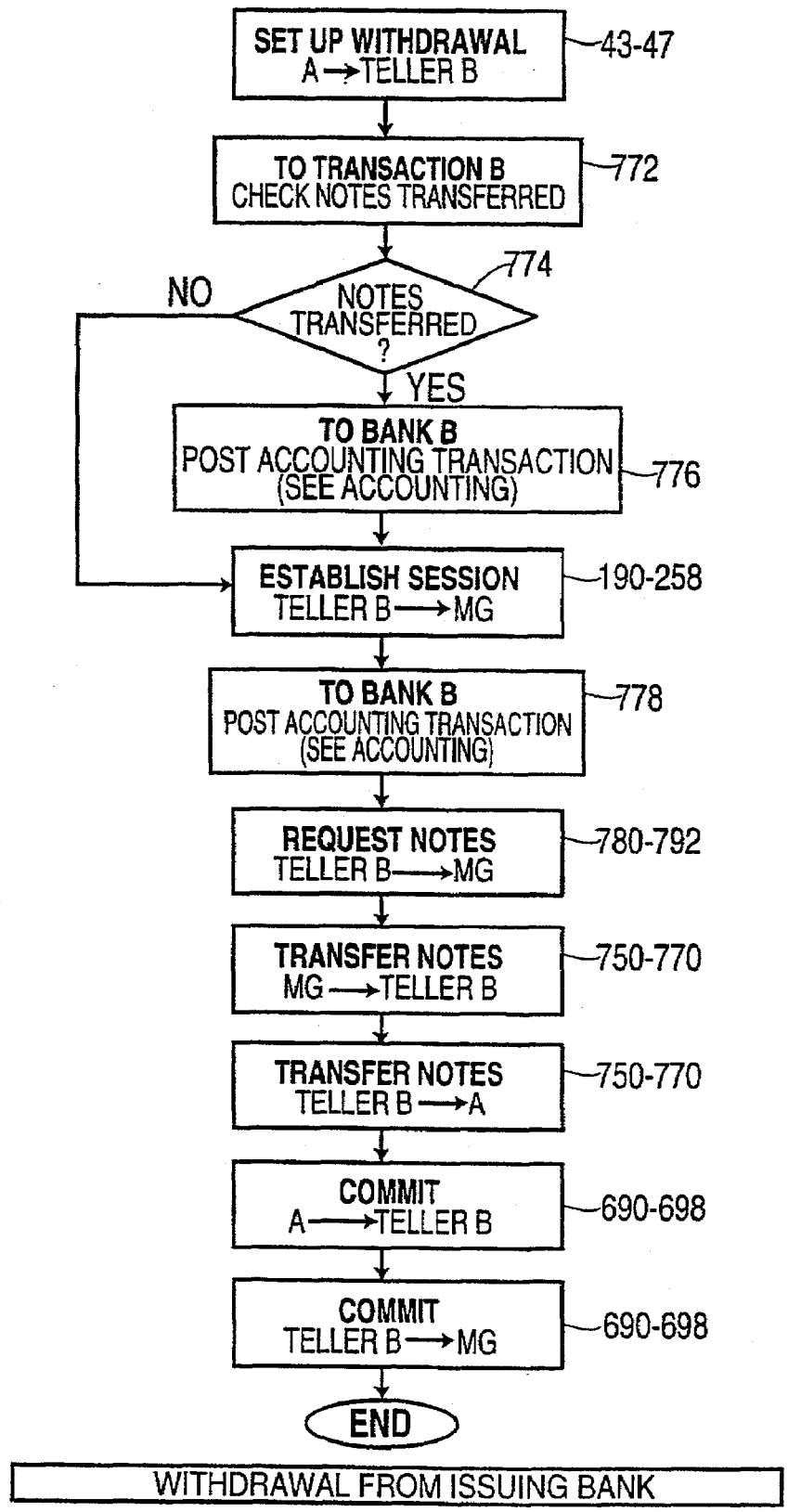

The process flow to set up a withdrawal transaction begins at the top of FIG. 28. The first flow block is a withdrawal set up between a money module A and a bank's Teller money module B 5, which is described further in FIG. 29. This process begins with money module A performing a sign-on process that is also described in further detail in another figure, specifically FIG. 31.

Subscriber Sign-On

Figure 31:
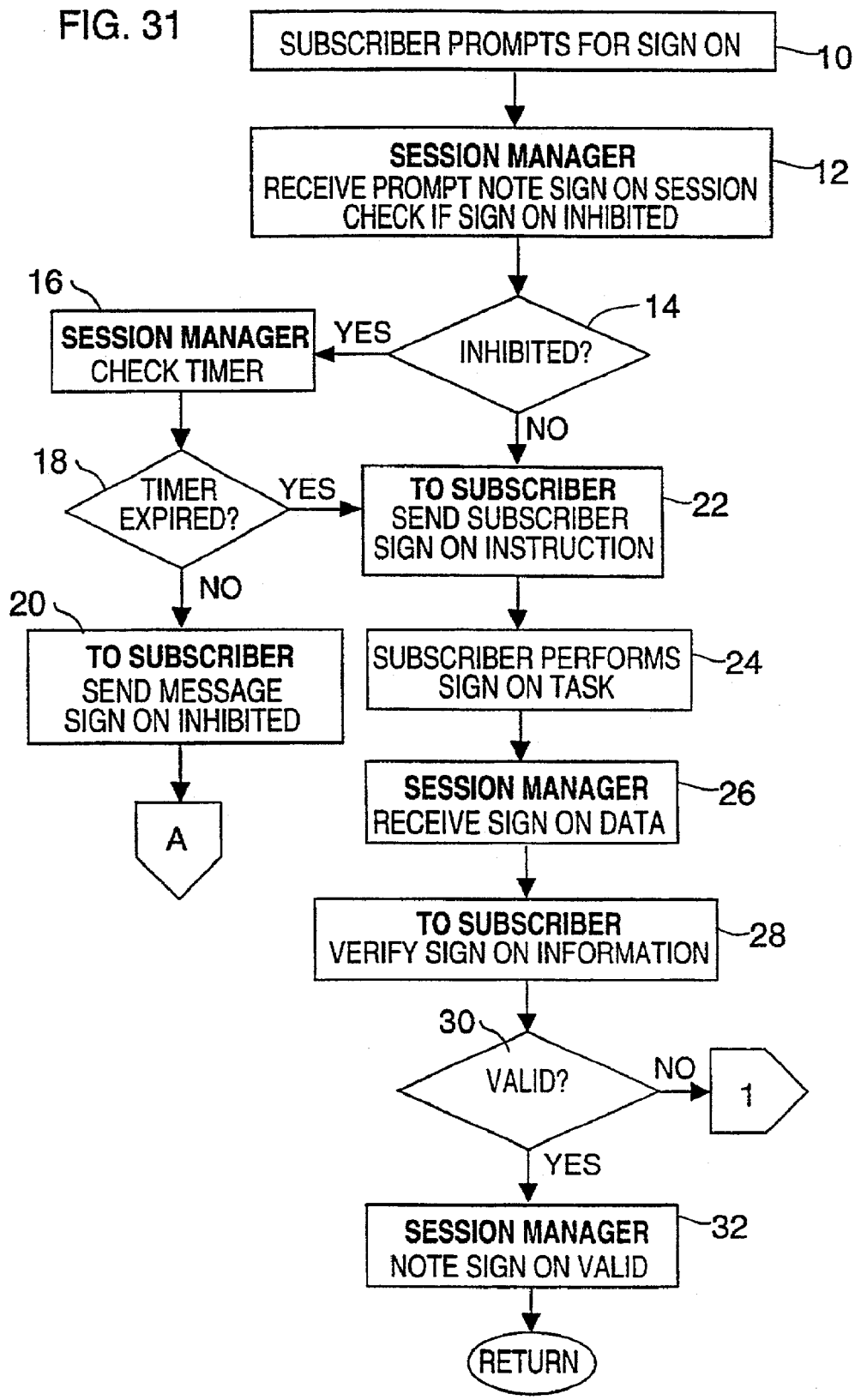

Referring to the top of FIG. 31, the subscriber prompts his/her Transaction money module 4 to perform a sign-on function (Step 10). The Session Manager 31 application receives the sign-on message (Step 12) and checks to see if the Transaction money module 4 has inhibited subscribers from signing on (Step 14).

Subscriber sign-on may be inhibited if a user makes several unsuccessful attempts to sign-on to the Transaction money module 4. For example, the allowable attempts to sign-on may be limited to three, such that if a person makes more than three consecutive unsuccessful attempts to sign-on to the Transaction money module 4, the Session Manager 31 will prohibit any further sign-on attempts. Additionally, this "lock-out" feature may be maintained for any predetermined time period, such as twenty-four hours, for example. Such an arrangement will provide security from use by persons who come into possession of the Transaction money module 4 but who are not properly authorized to access it.

It should be noted that while this type of an arrangement is anticipated in the preferred embodiment of the invention, the invention should not be limited as such, since any of the methods known in the industry for providing security from unauthorized persons would be suitable for use herein.

When the sign-on is not inhibited, as will typically be the case, To Subscriber 33 prompts the subscriber to enter his/her sign-on characteristics, such as his/her PIN and biometric identifiers (Step 22). Inputs from the subscriber are forwarded through the Session Manager 31 to the To Subscriber 33 application (Steps 24-28), which responds to the characteristics entered and entitles the subscriber to operate the Transaction money module 4 if the subscriber's identification characteristics are the correct ones when compared to those stored in the memory of the Transaction money module 4 (Steps 30-32).

If the subscriber's identification characteristics do not match the identifiers stored in memory, the To Subscriber 33 application notifies the subscriber of the invalid sign-on condition (Step 34). From there, the To Subscriber 33 application checks to see how many times the user has attempted to sign-on (Step 36), and if the predetermined count has not been reached, the Session Manager 31 is notified (Step 38).

The Session Manager 31 works in conjunction with the Clock/Timer 43 application to set and to monitor the time that has elapsed between unsuccessful sign-on attempts (Step 40). In one embodiment, too many unsuccessful attempts within the set time period will cause the Session Manager 31 to prohibit any further sign-on attempts, effectively shutting down the Transaction money module 4. The Session Manager 31 notes that the sign on is terminated in Step 42.

Turning back to Step 14 of FIG. 31, assuming that the Transaction money module 4 is inhibited, the Session Manager 31 checks to see if the predetermined time period has expired (Step 16). If the Transaction money module 4 is still in the prohibited sign-on mode, the To Subscriber 33 sends a message to the subscriber that further access to the Transaction money module 4 is prohibited (Steps 18-20). The Session Manager 31 then notes that the sign-on attempt is terminated, again in Step 42.

Setup Withdrawal

Figure 29:
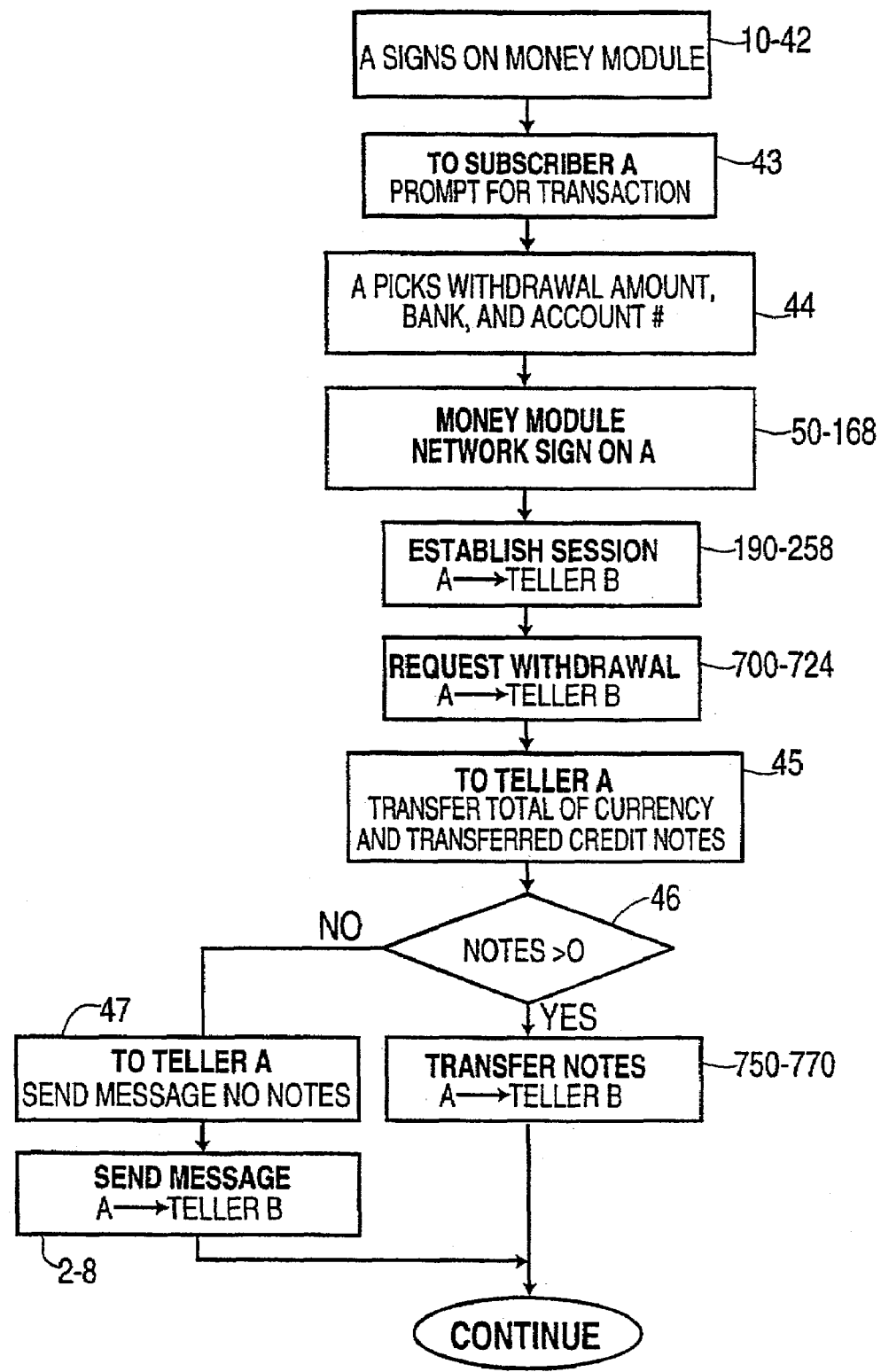

Turning to FIG. 29, when a proper sign-on is accomplished, the To Subscriber A 33 prompts the subscriber for the type of transaction that is desired (Step 43). As mentioned previously, it is anticipated that a subscriber may transact with any one of a multitude of accounts at several different participating banks and financial institutions.

Figure 33:
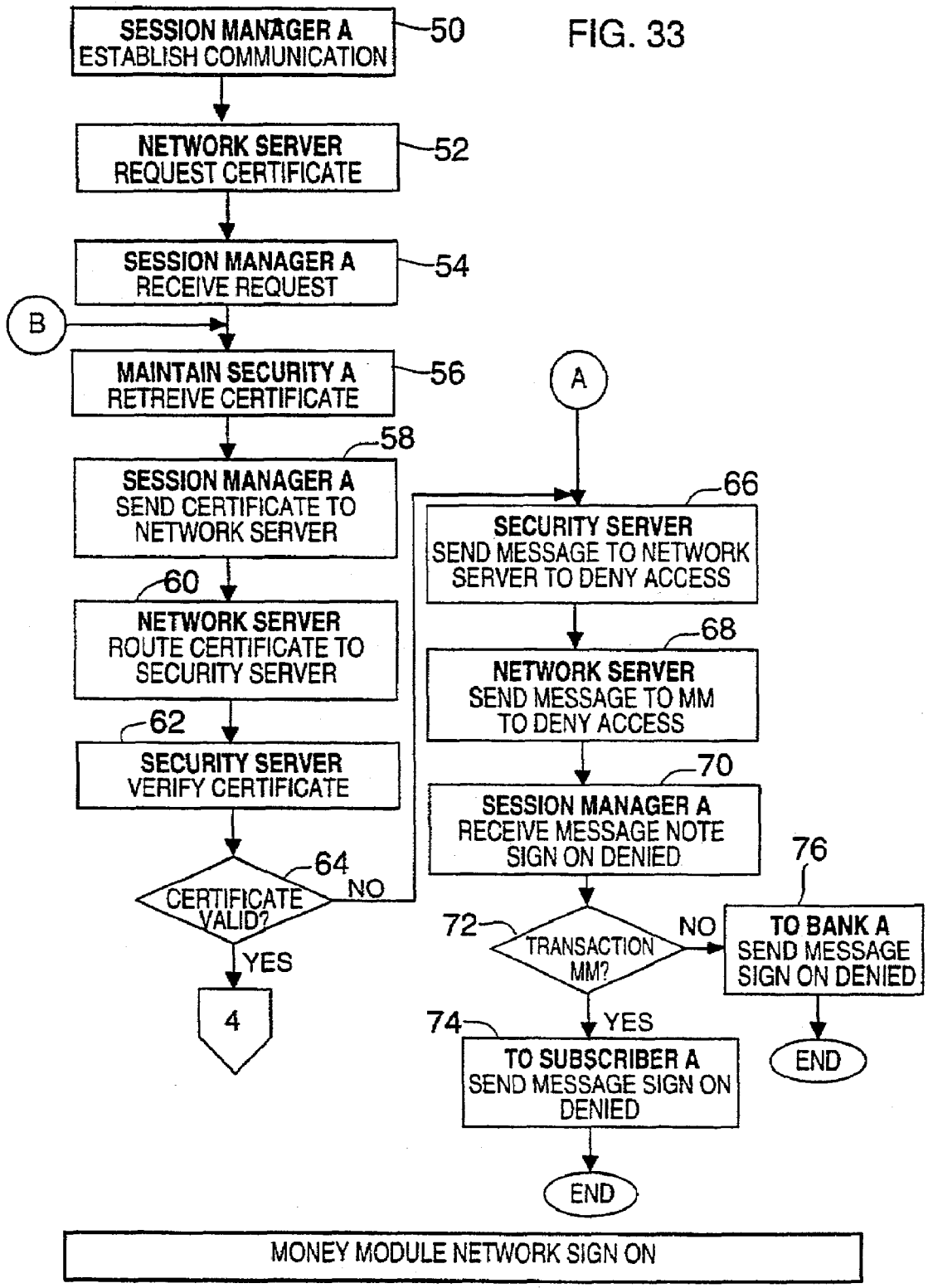

After selecting the particular bank and account (Step 44), the Transaction money module 4 initiates a procedure for communicating with the bank that was selected, by engaging the Network 25. The overall program flow now passes to the procedures illustrated by flowcharts in FIG. 33. In FIG. 33, there is shown the data processing and flow for implementing a sign-on to the Network 25.

Network Sign-On

The illustrative Network 25 sign-on method about to be described is in general applicable to any of the money modules 4,5,6 of the present embodiment. Thus, in this example, "A" denotes any class of money module.

After the bank that is to be accessed is selected, the money module initiates communication with the Network 25 under the control of its Session Manager A 31 (Step 50). The Network Server 26 begins by requesting the certificate of the Transaction money module 4 from Session Manager A 31 (Steps 52-54). The Maintain Security A application 37 retrieves and sends the certificate to Session Manager A 31 (Step 56). Session Manager A 31 sends the certificate to the Network Server 26 (Step 58), which, upon receipt, routes it to the Security Server 27 (Step 60).

The Security Server 27 tests the certificate to check its validity (Steps 62-64), and if it is not valid for any reason, the Security Server 27 will signal the Network Server 26 to deny access (Step 66). The Network Server 26 may in turn convey an access-denied message to Session Manager A of the Transaction money module 4 (Steps 68-70).

If the Session Manager A that receives the denied access message is a Transaction money module 4, its To Subscriber application A will inform the subscriber of this condition (Step 74). If it is a Teller money module 5 or Money Generator Module 6 that is trying to access the Network 25, the To Bank A application 47 notifies the bank's systems 20 that its access will not be permitted (Step 76).

Assuming the certificate validity check is satisfied, the Security Server 27 sends an updated list of the bad money modules, and a new list of certificatory keys to the Session Manager A, (Step 78, FIG. 33A). The keys are signed using the last version of the certificatory key. This information is received by Session Manager A and forwarded to the Maintain Security A 37 application, which validates the certificatory key list and the bad money module list (Steps 80-82, FIG. 33A).

Public Key A 44 tests the validity of the signature (Step 84) and if the signature is not valid, a message warning of a network security problem is sent by the To Subscriber application A 33 of a Transaction money module 4 (Steps 86-90), or alternatively, by the To Bank application A 47 of a Teller money module 5 or Money Generator module 6, (Steps 86-88, & 92). Advantageously, all money modules will check the validity of a signature received from even the Security Server 27. This helps to ensure the integrity of the overall system.

In the case of a valid signature, Maintain Security A updates the bad money module list and the certificatory key list. (Step 94). If the certificate is to be recertified or the certificate has expired (Steps 96 and 98), the Maintain Security A generates a new certificate (Step 126 of FIG. 33C) while Public Key A generates new keys and signs the certificate using the old private key (Step 128). Session Manager A sends the new certificate to the Security Server 27 which accepts the certificate and tests the validity of the signature (Steps 130-136).

Assuming that the signature of the new certificate is not valid at this stage, Steps 66-76, FIG. 33, are repeated so as to terminate the communication link into the Network 25.

On the other hand, a valid signature, FIG. 33C, will allow the Security Server 27 to sign the new certificate and send it back to the money module (Step 138). Session Manager A 31 receives the new certificate, Step 140, FIG. 33D, and forwards it to its Maintain Security application A to again validate the certificate through use of the Public Key application (Steps 142-146). Here, the money modules will repeat the test of the validity of the certificate issued from the Security Server For a valid signature, the Session Manager A 31 sends an acknowledgment to the Security Server 27 (Step 148) who responds by returning the process to Step 78, FIG. 33A.

Figure 33B:
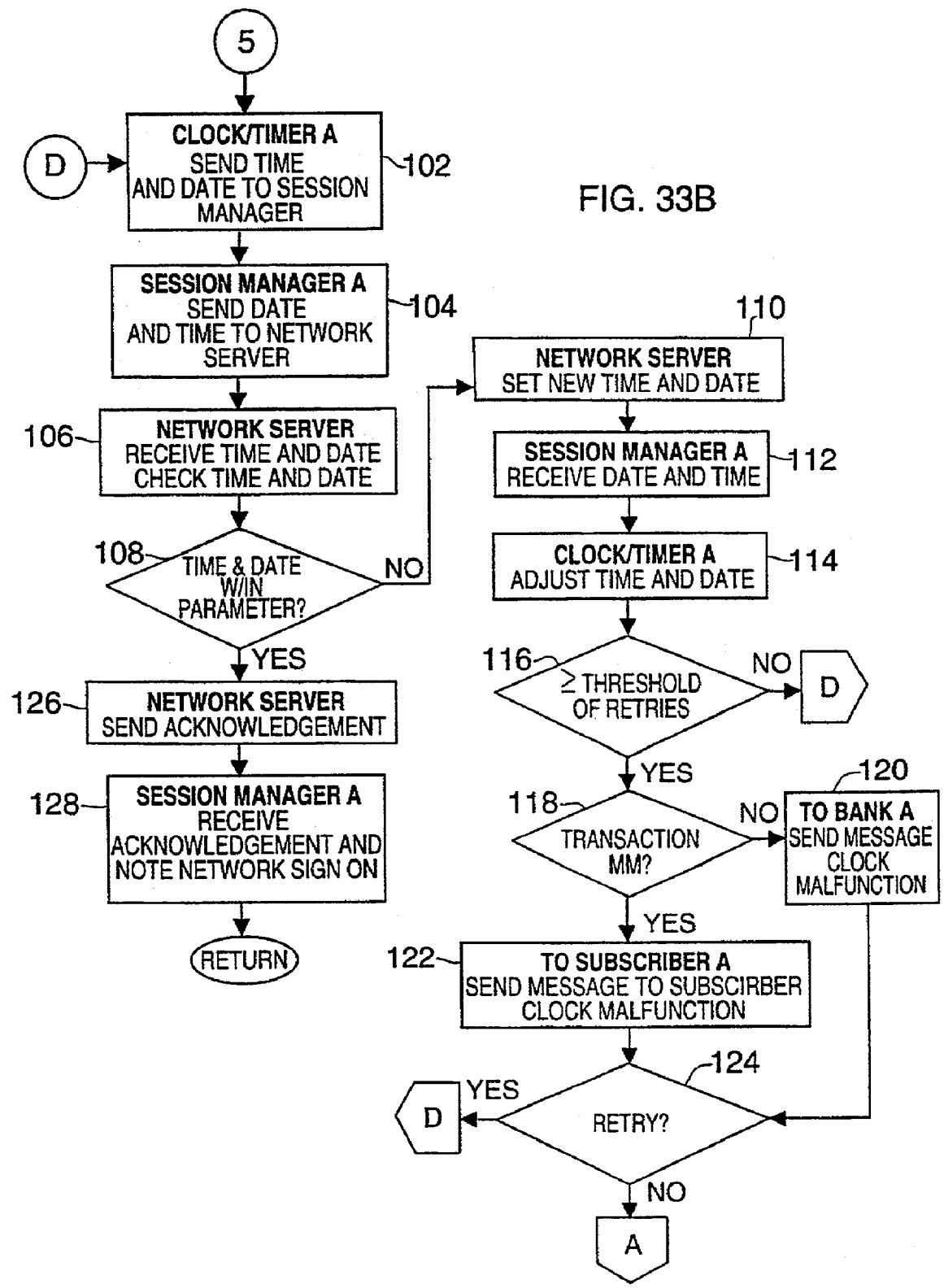
Figure 33D:
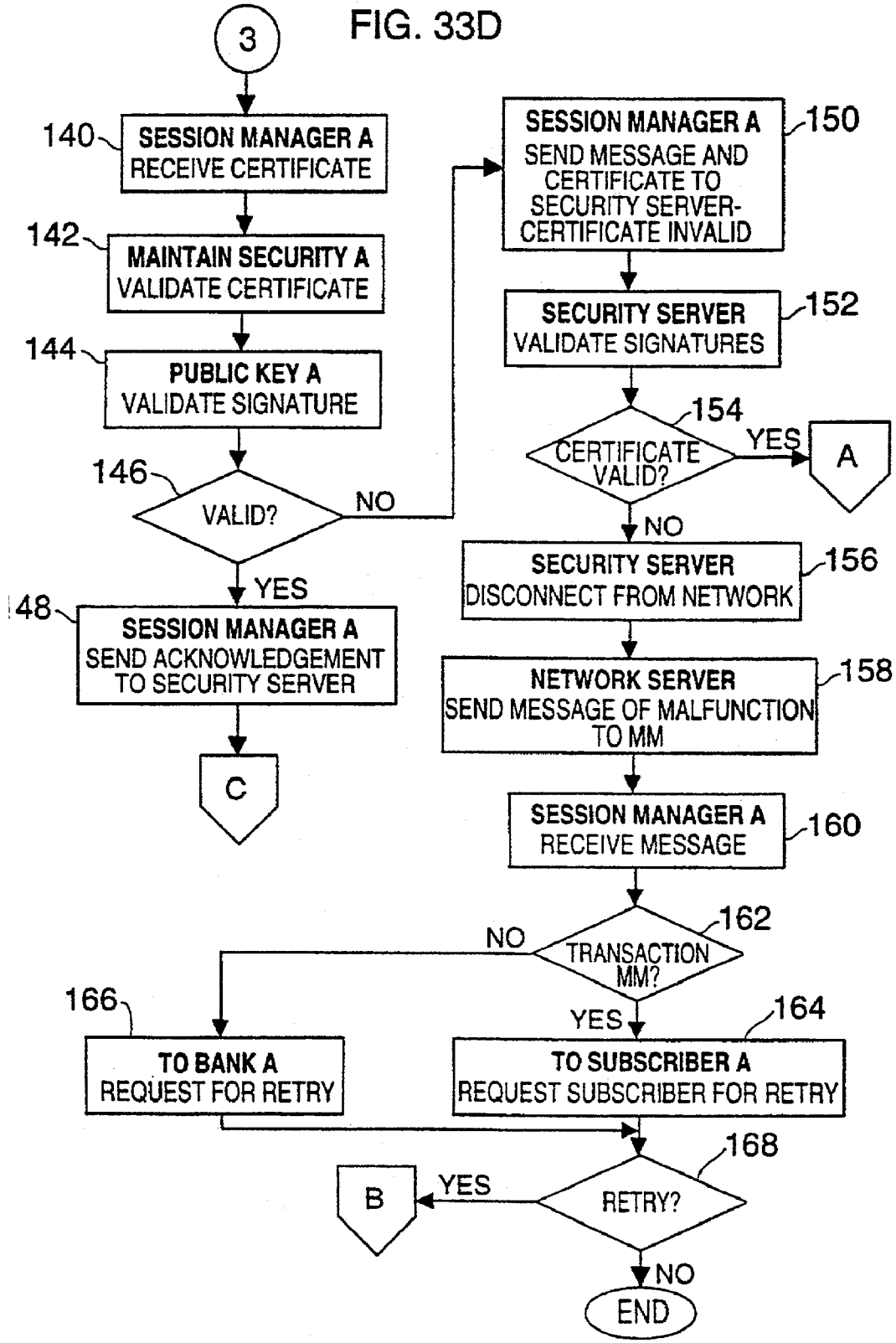

Conversely, if the Security Server's signature on the new certificate generated by Transaction money module A proves to be invalid, FIG. 33D, Session Manager A will send an invalid certificate message along with the certificate back to the Security Server 27 (Step 150), which will again attempt to validate the signature on the certificate (Step 152). A valid signature will return the process to Step 66, FIG. 33. Alternatively, an invalid signature will cause the Security Server 27 to disconnect from the Network 25 (Step 156, FIG. 33D) and cause the Network Server 26 to notify the money module of a malfunction (Step 158).

The Session Manager A that receives the message (Step 160) will, in the case of a Transaction money module 4, get the To Subscriber A 33 to inquire of the subscriber if they desire to retry the whole process of signing on to the Network 25 (Steps 164 & 168). In the case of a Teller money module 5 or a Money Generator Module 6, the To Bank application A will inquire if there is a request to retry the Network 25 sign-on procedure (Steps 166 & 168).

No attempts for a retry will, of course, end the communication link into the Network 25, and conversely, a request for retry of Network 25 access will return the procedure back to Step 56, FIG. 33, wherein Maintain Security A will again retrieve the Transaction money module's certificate for the Network Server 26.

Back at Step 98, FIG. 33A if the certificate does not need to be recertified or has not expired, Session Manager A 31 will request the date and time (Step 100) from Clock/Timer A (Step 102, FIG. 33B), and forward this data to the Network Server 26 (Step 104).

The Network Server 26 checks the time and date after receiving it (Step 106) and if it is outside of an acceptable predetermined parameter, the Network Server 26 will send the new time and date (Step 110) to Clock/Timer A through Session Manager A (Steps 112 & 114). If Clock/Timer A 43 cannot adjust the date and time to be synchronized with the Network 25, the operator of the money module for the subscriber or the bank is notified of the clock malfunction (Steps 116-124).

In response to the apparent malfunction, the operator may attempt to have the time and date resent from the Network Server 26, Step 124, and the procedure reverts back to Step 102 in which it attempts to send the new date and time to the money module. Alternatively, an acceptable date and time check, Step 108 allows the Network Server 26 and Session Manager A to exchange acknowledgements and note the successful Network 25 sign-on (Steps 126-128).

Establishing a Session

Figure 34:
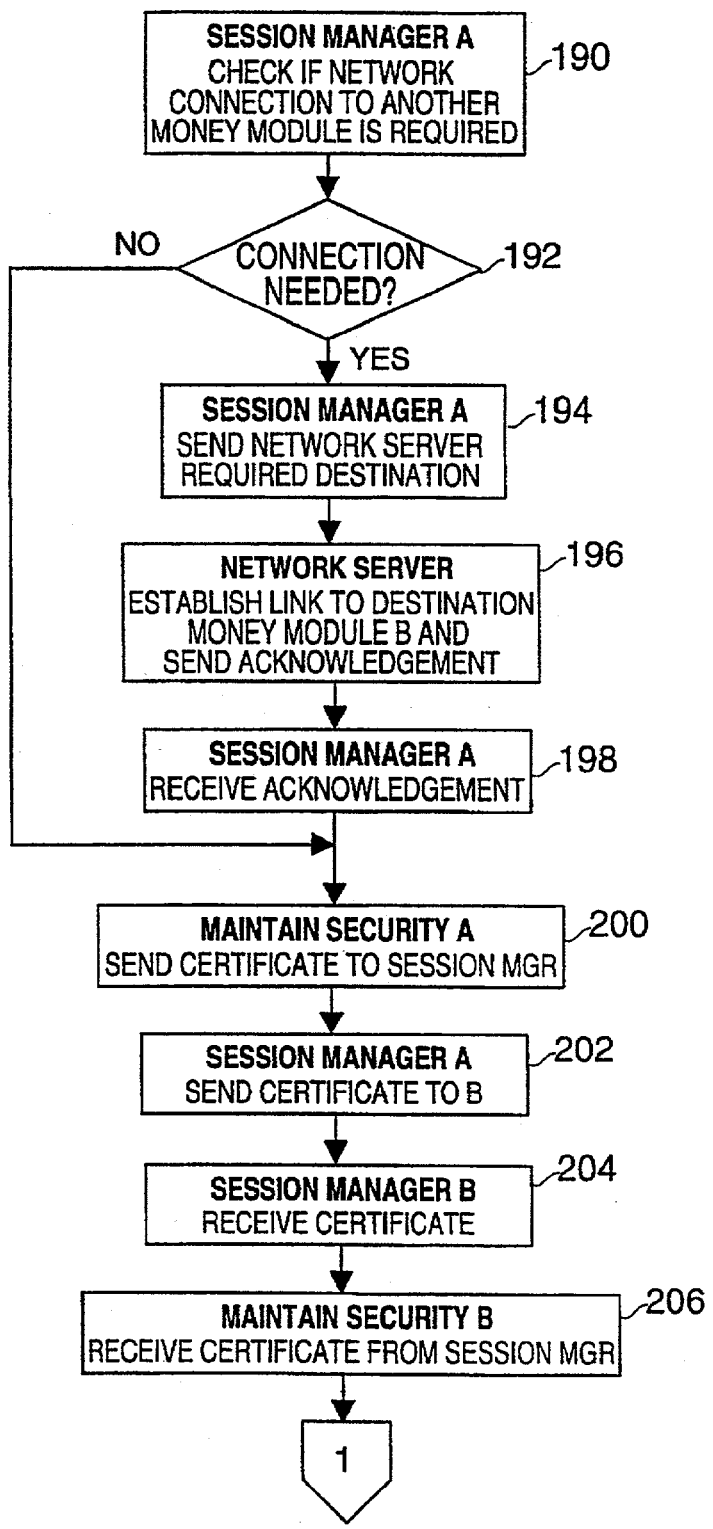

As shown in FIG. 29, after the steps of money module sign-on, transaction selection and network sign-on are completed, sessions are established between the money modules. FIG. 34 diagrams the flow process for establishing a money-module to money-module session, which, as will be understood by one skilled in the art, will in general be applicable as well to other sessions established between the various types of money modules of the present invention.

Referring to the top of FIG. 34, the Session Manager A will first check to see if the subscriber has requested connection to a specific destination in the Network 25 (Step 190). For instance, where a subscriber is desirous of transacting with his/her account at a specific bank, the Network 25 will connect the Transaction money module 4 to the selected bank, Steps 192-198. Conversely, when a subscriber is performing updating functions on the Network 25, there is no need to establish a session with any specific bank, and the Network Server 26 may decide where to route the connection, based on Network 25 traffic.

If a specific destination has been selected by the subscriber, Session Manager A conveys the destination information to the Network Server 26 (Step 194). The Network Server 26 initiates a communication link to the money module of the selected destination (Step 196) and sends an acknowledgement to Session Manager A 31.

After receiving the acknowledgement that the destination money module has been contacted (Step 198), the Maintain Security application A will send its certificate to the Maintain Security application B through each application's respective Session Manager (Steps 200-206).

It is anticipated that the money modules will exchange certificates to verify that each money module is interacting with another valid money module. To this end (as seen in FIG. 34A), the Public Key application B 44 tests the certificate of money module A by using the public key algorithm and the public key corresponding to the private key used by money module A, to encrypt and check A's certificate and verify that it is valid (Step 208).

If the certificate is found invalid, the session Manager B will note the session is terminated (Step 210). In the case of a Transaction money module 4, the To Subscriber B informs the subscriber of the transaction termination (Step 212). Likewise, a Teller money module 5 or Money Generator module 6, uses the To Bank application B 47 to notify the bank of the termination, Step 213. It is anticipated that the counterparty money module will then timeout to end the exchange.

Figure 34A:
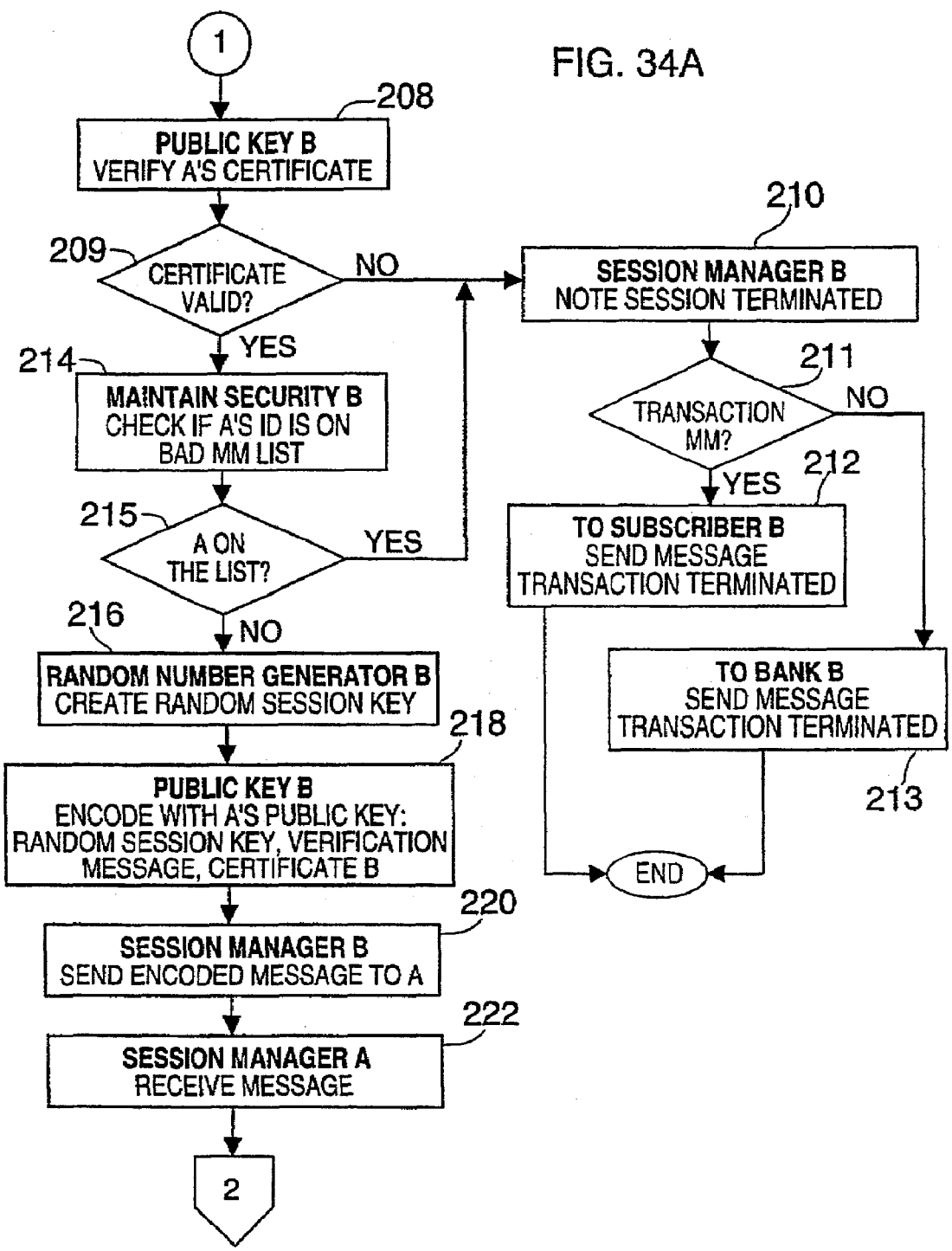

In Step 214, FIG. 34A, assuming that the certificate of money module A is valid, the Maintain Security application B 37 checks to see if money module A is on the list of compromised money modules (Step 215). If money module A is on that list, the process flow returns to Step 210 so that the communications can be terminated.

Alternatively, when money module A is not on the list of compromised money modules, the Random Number Generator B 46 creates a session key (Step 216) and encodes the session key along with money module B's certificate and a verification message, using money module A's public key (Step 218). This encoded message is sent to money module A by Session Manager B 31 (Step 220).

Session Manager A 31 receives the message from money module B (Step 222), and uses its Public Key 44 algorithms application to decode the message (Step 224, FIG. 34B), and to verify money module B's certificate (Step 226).

If the test determines that money module B's certificate is invalid, the operation branches to an "abort transaction" procedure to terminate the steps taken thus far in establishing a session (Steps 500-524). This procedure may be used, for example, to end the communication session and to functionally shut off money module A, which results in the communication link ending. (Steps 500-524, FIG. 32).

Abort Transaction

Branching to FIG. 32, the functional shut-off of a money module through the abort transaction process will now be described in detail. It will be understood that the following process may be used when any two money modules are abnormally terminating the transactions occurring between them. Accordingly, the money modules will be designated "X" and "Y" to illustrate the generic applicability of the process steps.

An abort transaction process initiated by money module X to terminate communications with money module Y begins with Session Manager X 31 capturing and then reversing or rolling back any programmatic changes that were made to the money module (Step 500), and then noting that the session has been aborted (Step 502).

In the case where the money module that is initiating the termination is a Transaction money module 4, the To Subscriber application 33 informs the subscriber of the communication termination (Step 510). Likewise, a Teller money module 5 informs its To Bank application 47 of the termination so that any accounting changes may be undone (Step 508). Next, the Session Manager X 31 of the terminating money module sends an encoded message to the other money module involved (Step 512).

Figure 37:
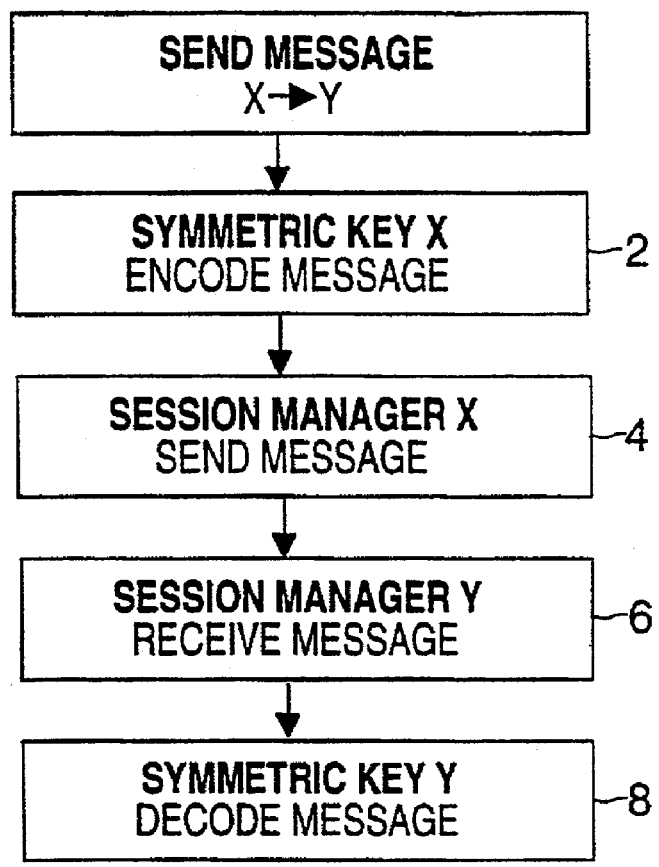

Briefly referring to FIG. 37, all encrypted messages between modules will be exchanged by the following steps. The sending money module (here also referred to as "X") uses its Symmetric Key 45 to encode the message to be sent to the receiving money module (here also referred to as "Y") (Step 2). Again, it will be appreciated that there are a number of known encryption techniques which may be utilized.

The Session Manager X 31 sends the encoded message to Session Manger Y 31 which in turn decodes the message using its Symmetric Key Y 45 (Steps 4-8).

Continuing with FIG. 32, the Session Manger Y responds to the termination notice sent by also undoing any changes it may have made towards establishing the session, and noting the aborted session (Steps 514-516). If it is a Transaction money module 4 that is now shutting down, the To Subscriber application 33 alerts the subscriber of the condition (Steps 518 & 524). Correspondingly, in a Teller money module 5, the To Bank application 47 will reverse all accounting transactions that have been undertaken (Steps 518-522).

Returning to FIG. 34B, assuming that the money module B certificate is valid, in Step 228 Maintain Security A checks to see if money module B is on the list of compromised money modules. If money module B is on the list (Step 230), the session reverts to the abort transaction procedure, Steps 500-524. Thereafter, the communications session is dissolved.

More typically, money module B will not be on the list of compromised money modules, and the Clock/Timer A 43 will retrieve the date and time (Step 232) and send this information to the Maintain Security application A 37 so that the verification message may be assembled with the date and time (Step 234).

Symmetric Key A 45 then encrypts the verification message with the date and time information, using the random session key provided by money module B (Step 236). Session Manager A 31 sends this encrypted message (Step 238) to Session Manager B 31 (Step 240). From there, the Symmetric Key application B 45 decrypts the message (Step 242) and passes it to the Maintain Security B 37 for message verification (Step 244, FIG. 34C). An incorrect message will cause the session to be aborted through Steps 500-524, while a correct message will advance the procedure so that Maintain Security B 37 can compare the time and date with that of money module A (Step 248).

Clock/Timer B 43 will verify that money module A's clock is within a preset amount of deviation from the clock of money module B (Step 250). If the discrepancy between the two clocks is greater than a predetermined amount, the session will be aborted by branching to Steps 500-524.

If there is no discrepancy that is greater than the permissible amount, Session Manager B 31 will note its start of a session (Step 252), and send an acknowledgement to money module A to start the transaction (Step 254). After the encoded message is sent from money module B to Session Manager A 31 using process steps 2-8, FIG. 37, Session Manager A 31 acknowledges the message receipt and also notes the start of session (Steps 256-258).

Request Withdrawal

After a session is established between the Transaction money module 4 and Teller money module 5, the Transaction money module 4 makes a withdrawal request from the Teller money module 5. See FIG. 29. Referring now to FIG. 30, a process for requesting a withdrawal will now be described. It should be noted that although the figure denotes the parties as "X" and "Y" in the process steps described below, they are applicable to any money module transacting with a Teller money module 5.

To begin, the To Teller X 34 sends a withdrawal request to the Teller money module 5, requesting a certain amount of money to be withdrawn from a specific account. In its transmission of the withdrawal request, the account number and the account profile will be transmitted from the requesting money module to the Teller money module 5 (Step 700). To send this request, the process Steps 2-8 are repeated, in which the message is encrypted using the previously described cryptographic techniques.

Validate Account Number

Figure 38:
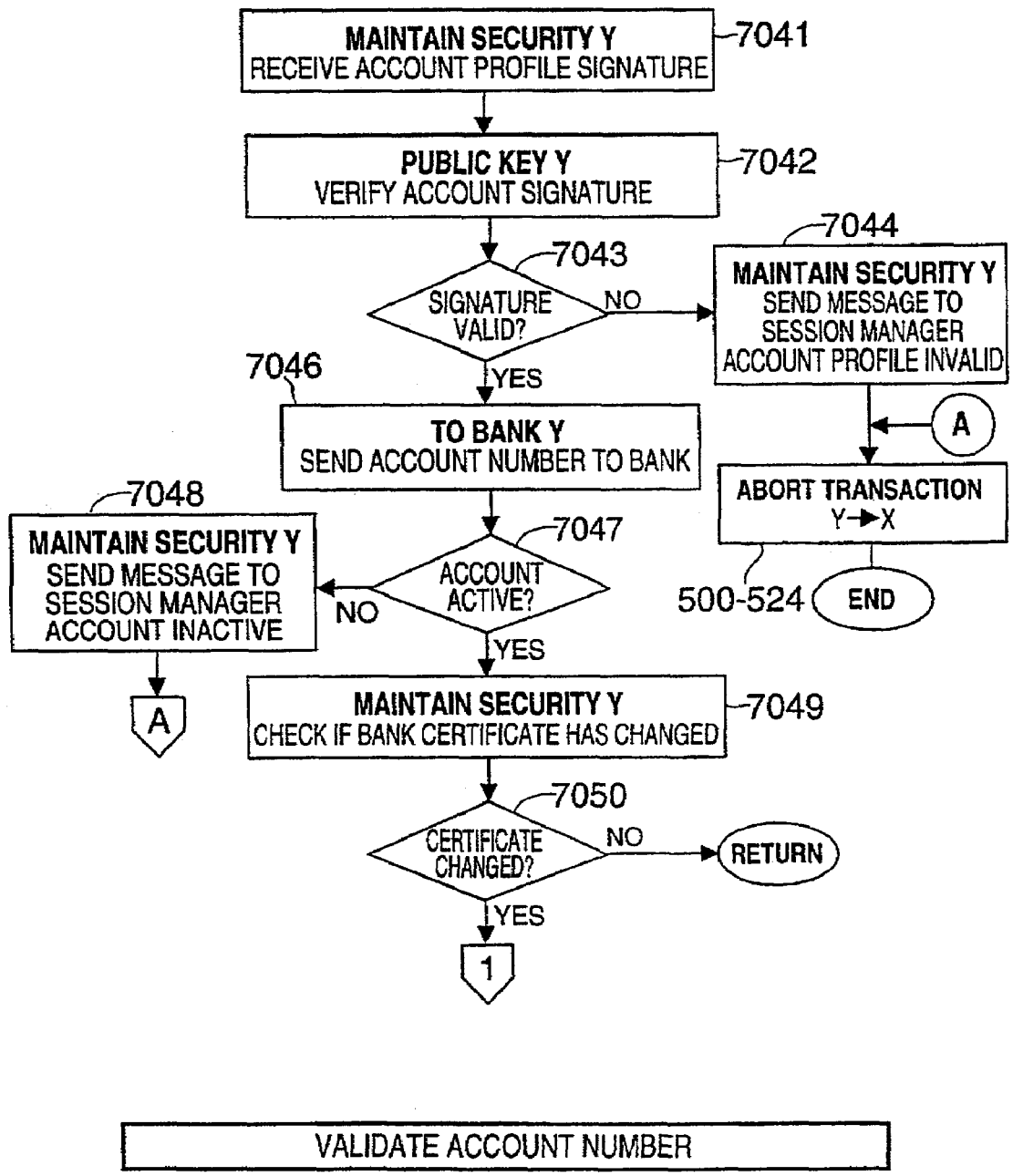

Once the withdrawal request and the account number and profile are transmitted to the Teller money module 5, a procedure to validate the account number is initiated (Steps 7041-7056). A flow diagram depicting how an account number is validated is shown in FIG. 38.

In this process, the Maintain Security application 37 of the Teller money module 5 receives the account profile and signature and conveys them to its Public Key application 44 to verify the profile signature (Steps 7041-7042). The signature is tested using the public key generated and distributed by the Bank's Security Server 27. An invalid signature causes the Maintain Security 37 application to inform the Session Manager that the account profile is invalid (Step 7044), whereby Steps 500-524, FIG. 32, are followed to abort the transaction between the two money modules.

If the signature test confirms a valid signature, the procedure advances to the To Bank application 47 which sends the account number it has received to the bank's computer systems (Step 7046). An inactive account will cause the Maintain Security application 37 to inform the Session Manager of the inactive account (Step 7048) and have the transaction aborted following steps 500-524; an account that has not been inactivated will allow the Maintain Security application 37 to check if the account profile needs to be recertified (Steps 7047-7050).

Figure 38A:
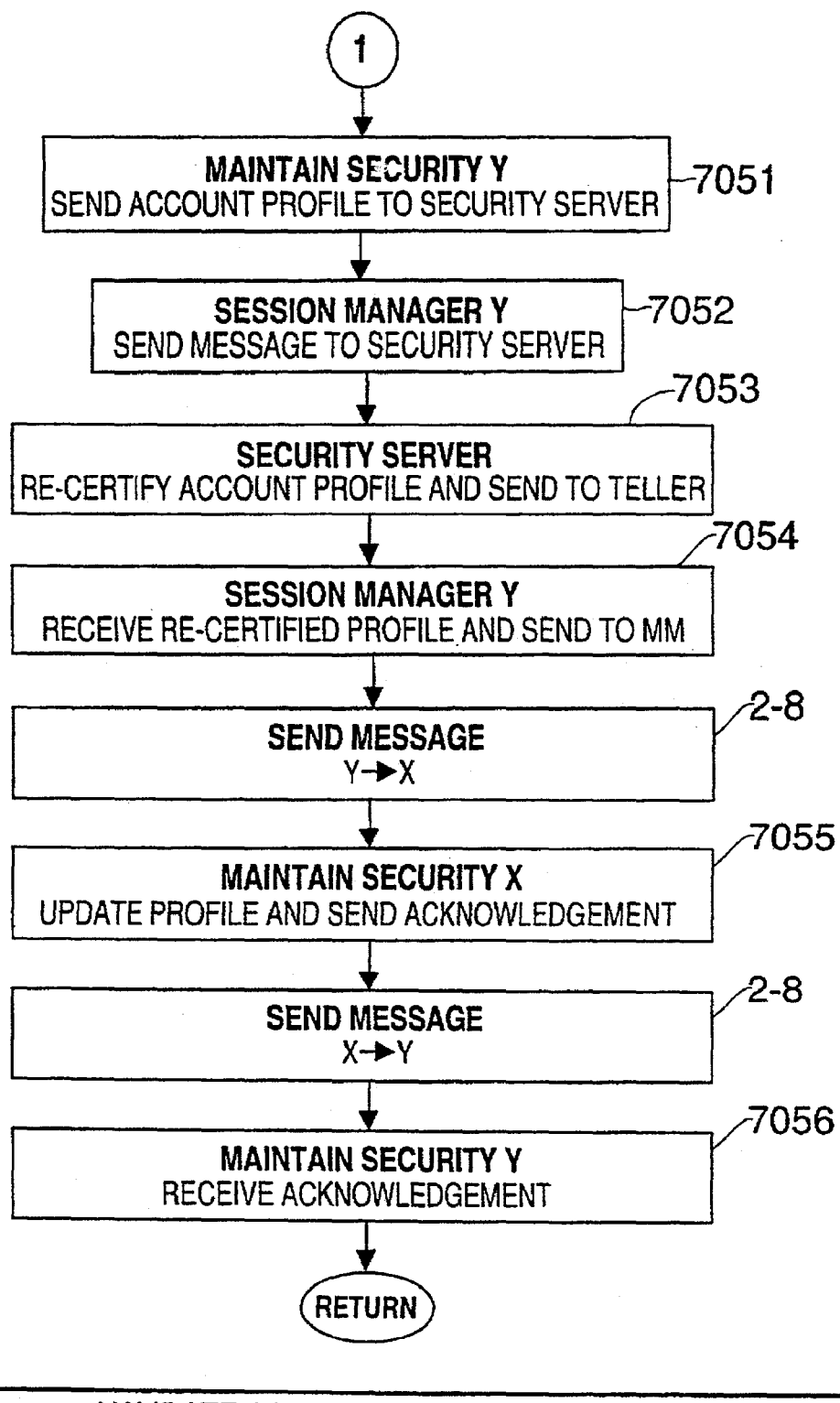

If the account profile does need to be recertified, the Maintain Security application 37 will send the account profile to the Security Server 27 (FIG. 38A, Steps 7051-7052), which will recertify the account profile and send it to the Teller money module 5 (Step 7053). In response, the Teller money module 5 sends it to the money module making the withdrawal request (Step 7054).

The communication from the Teller money module 5 to the money module utilizes the previously described routine for sending messages Steps 2-8. The Maintain Security application 37 then updates the account profile in the money module and returns an acknowledgement to the Maintain Security application 37 in the Teller money module 5 (Step 7055), also using Steps 2-8. The electronic message is received by the Maintain Security application 37 of the Teller money module 5, and acknowledged in Step 7056.

With the account information checked, the process returns to Step 704 of FIG. 30. The To Bank application 47 now verifies that there are sufficient funds to support the withdrawal request (Step 704). Sufficient funds will prompt the return of an acknowledgement to a Transaction money module 4, utilizing process Steps 2-8 to transmit the acknowledgement to its To Teller 34 application function (Steps 706-714). In the case of a Teller money module 5, no acknowledgement is required.

Figure 30A:
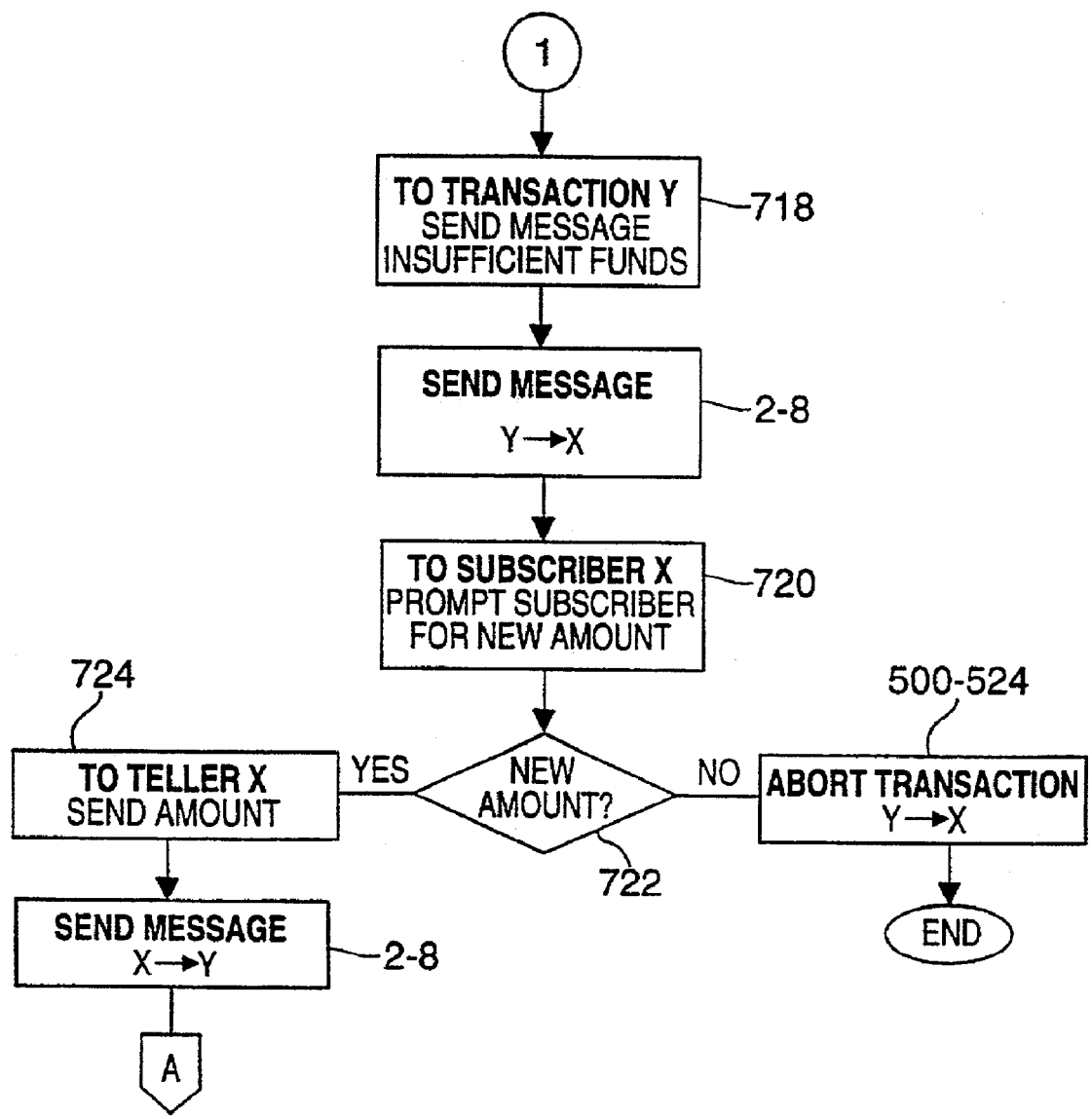

In the case of a Transaction money module 4, an insufficient amount of funds will cause the subscriber to be prompted to enter a new amount for the withdrawal (Steps 718-720, FIG. 30A). As shown by Step 724, the newly entered amount causes the To Teller application 34 to send the new request to the To Bank application 47 (using Steps 2-8) of the Teller money module 5 to verify if there are sufficient funds to cover the latest requested amount, returning to Step 704 of FIG. 30. If the new request is still greater than the funds on balance at the bank, the Teller money module 5 will initiate Steps 500-524 to abort the transaction between the two money modules. In the case of a Teller Money Module 5, the transaction is allowed to overdraw the account.

Transfer Notes

Referring back to FIG. 29, To Teller A 34 transfers the total of its currency notes 11 to the Teller money module 5 (Step 45). If there are no notes 11 being held in the Transaction money module 4 at the time the withdrawal request is made, the To Teller A application 34 sends a message to the Teller money module 5 that there are no notes 11 present (Step 47), using process Steps 2-8.

Electronic notes 11 are transferred between money modules using the procedure described below (referring now to FIG. 39). The Note Directory application 39 of the transferor money module chooses the notes of proper values for the transfer and updates the current amount of each electronic note after transfer (Step 750), and has the Notes application 40 create a transfer for each note 11 (Step 752). The Public Key application 44 creates signatures for all the notes 11 (Step 754) and sends the notes 11 to the Packet Manager application 41, for assembling the note 11 transfers and signatures into a packet to be sent to the requesting money module (Step 756).

Steps 2-8 are utilized to transfer the packet of electronic notes 11 to the Packet Manager application 41 of the requesting money module for receipt and disassembly (Step 758). The Verifier application 42 verifies the transfers appended to the certificates, and verifies that the total amount conforms to the notes 11 that should be sent (Step 760).

Any invalid information will cause the transaction between the two money modules to be aborted, using the procedure outlined in steps 500-524 above (Step 761). Valid notes 11 will have their expiration dates checked (Step 762) by the Verifier application 42 when it is a Transaction money modules 4 that has conveyed the notes 11 (Step 763). Any expired notes 11 (Step 764) will cause the sessions to be aborted using the procedures outlined in Steps 500-524, FIG. 32.

Figure 39A:
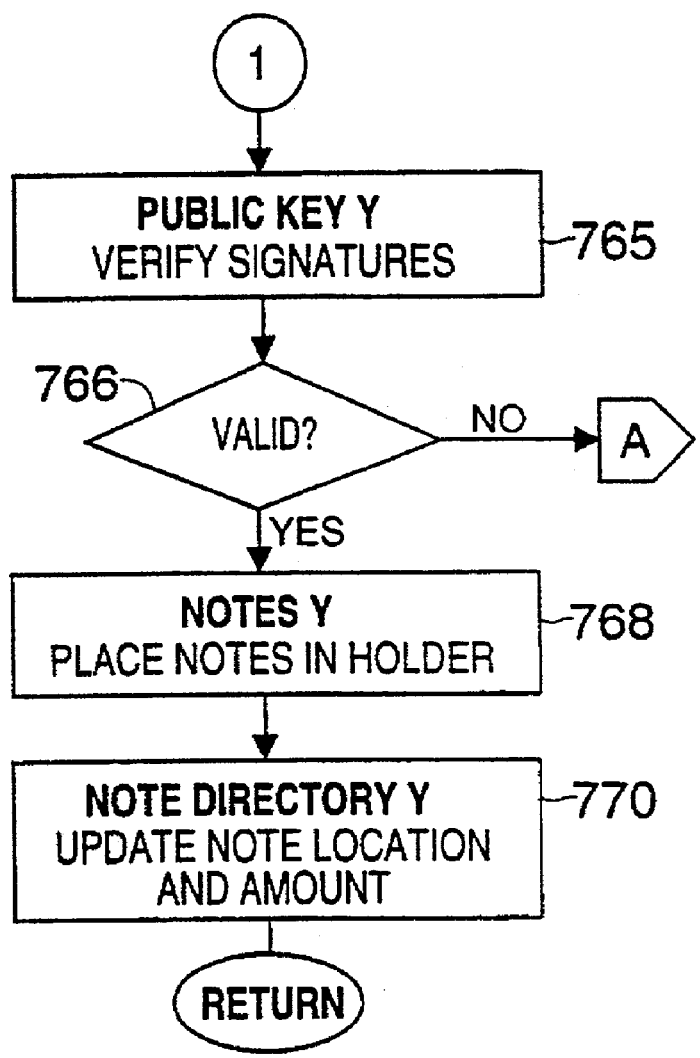

Assuming the notes 11 have not expired, or in the case where a Teller money module 5 is accepting them, the process flow resumes at Step 765, FIG. 39A. In this Step, the Public Key Y application 44 verifies the digital signatures. Invalid signatures invoke the transaction abort process of Steps 500-524.

Valid electronic notes 11 are then sent to the Notes application 40 (Step 768) and the Note Directory 39 is updated with the new note locations and amount (Step 770).

Returning to FIG. 28, the To Transaction B 49 checks if any electronic notes 11 have been transferred (Step 772), and if notes 11 have indeed been transferred from a Transaction money module 4, accounting transactions are posted to reflect this situation (Step 776; see also FIG. 14, Step 1) by the To Bank application B 47. Both in the case when no notes 11 have been transferred from the money module and after the latter accounting transactions are posted in Step 776, a session is established between the Teller money module 5 and the Money Generator module 6 using the procedure outlined above in Steps 190-258, FIGS. 34, 34A-C.

As notes 11 are requested to satisfy the withdrawal, an account posting occurs to reflect the request. The To Bank application B 47 will post the proper accounting transactions (Step 778, FIG. 28) as also illustrated in FIG. 14, Step 2.

Request Notes

Directing attention to FIG. 40, notes 11 may be requested between Teller money modules 5 and Money Generator modules 6 using the following procedure described below.

The To Money Generator application 48 of the requesting Teller money module 5 will issue a request for a specific amount of electronic money to be created (Step 780). The request will be sent using the above described Steps 2-8 for encrypted transmission, to the To Teller application 34 of the Money Generator module 6 so that the Money Creator application 50 may be activated (Step 784) to create the electronic notes 11 (Step 786).

After the creation of electronic notes 11, they are signed by the Public Key application 44 of the Money Generator module 6 (Step 788) and placed in a holder by its Notes application 40 (Step 790). Finally, the Note Directory 39 is updated with the information about the newly created electronic notes 11 (Step 792).

The process flow now returns to the procedures shown in FIG. 28. The requested notes in the Money Generator module 6 are transferred to the Teller money module B 5 using process Steps 750-770 outlined above for transferring electronic notes 11. The notes 11 are then transferred from the Teller money module B 5 to the Transaction money module 4 using these same process Steps 750-770 for transferring electronic notes 11.

Figure 41:
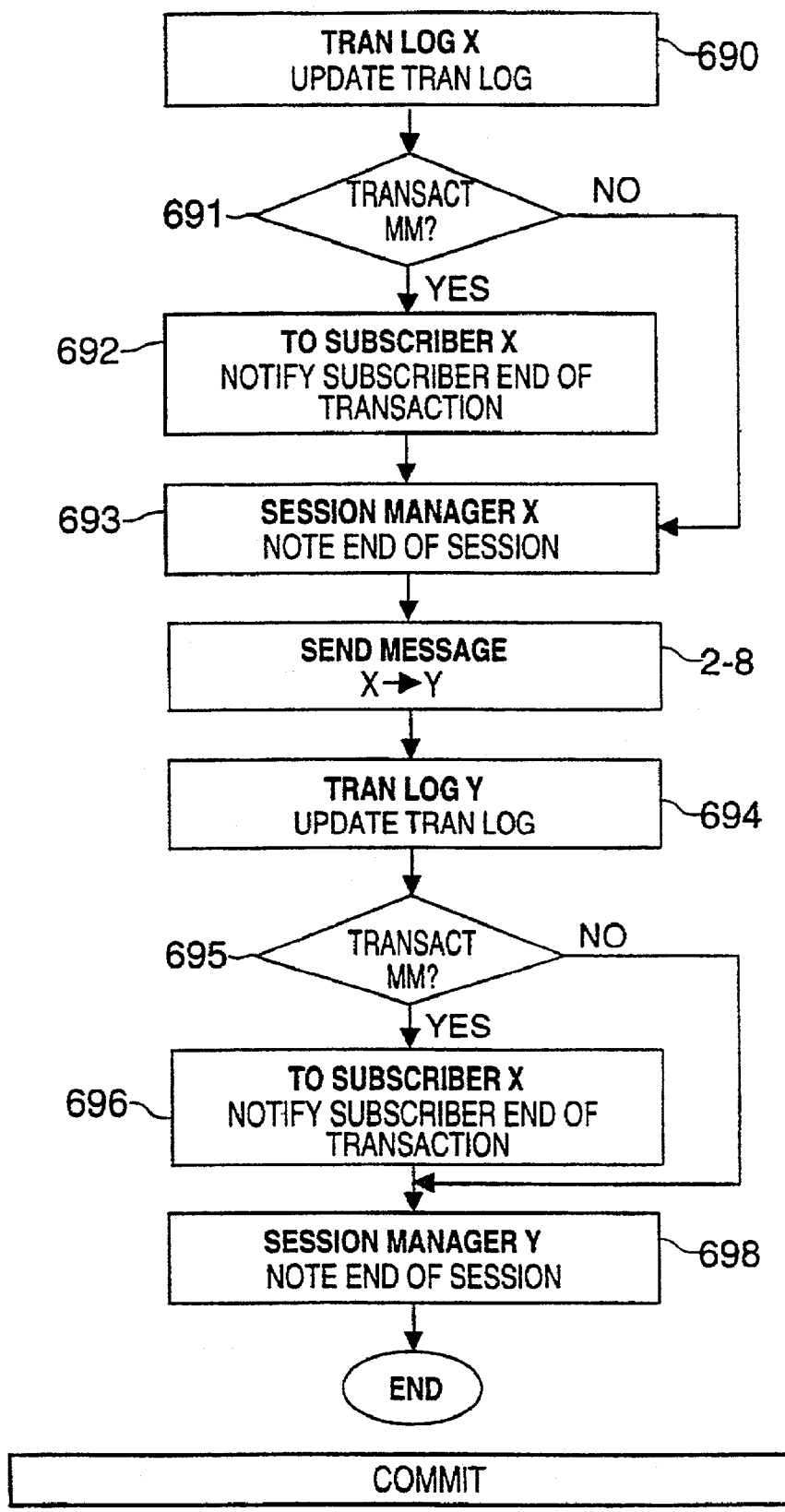

Finally, to successfully complete the withdrawal of electronic notes 11, the money modules will "commit" to or finalize the transaction by utilizing the following procedure. Referring now to FIG. 41 for a detailed description of this process, the Tran Log Mgr. application 31 updates its Tran Log to record the transaction that has occurred above (Step 690). When it is a Transaction money module 4 that is committing to the exchange (Step 691), the To Subscriber application will notify the subscriber that the transaction has been successfully completed (Step 692). Of course, the Session Manager application A 31 will note the end of session (Step 693), and employ process Steps 2-8 to send the message to the money module it is transacting with.

With this end of session notice received, the other money module, in this example a Teller money module 5, will use its Tran Log Mgr. application 36 to update its own Tran Log (Step 694). Assuming, however, the second money module receiving the end of session notice is not a Teller money module 5, an additional step of having the To Subscriber application 33 notify the subscriber of the end of the transaction occurrence (Step 696) will be necessary. Thereafter, the Session Manager 31 of the second money module in both cases will also make note of the end of the session (Step 698).

Directing attention back to FIG. 28, the process to commit is initiated first by the Transaction money module 4 committing its transaction with the Teller money module B 5 (Steps 690-698). The process steps are also applied to commit the transaction between Teller money module B 5 and the Money Generator module 6 (Steps 690-698). That completes the processing for one complete withdrawal of electronic money from an Issuing Bank 1.

Withdrawal from a Correspondent Bank

Figure 35:
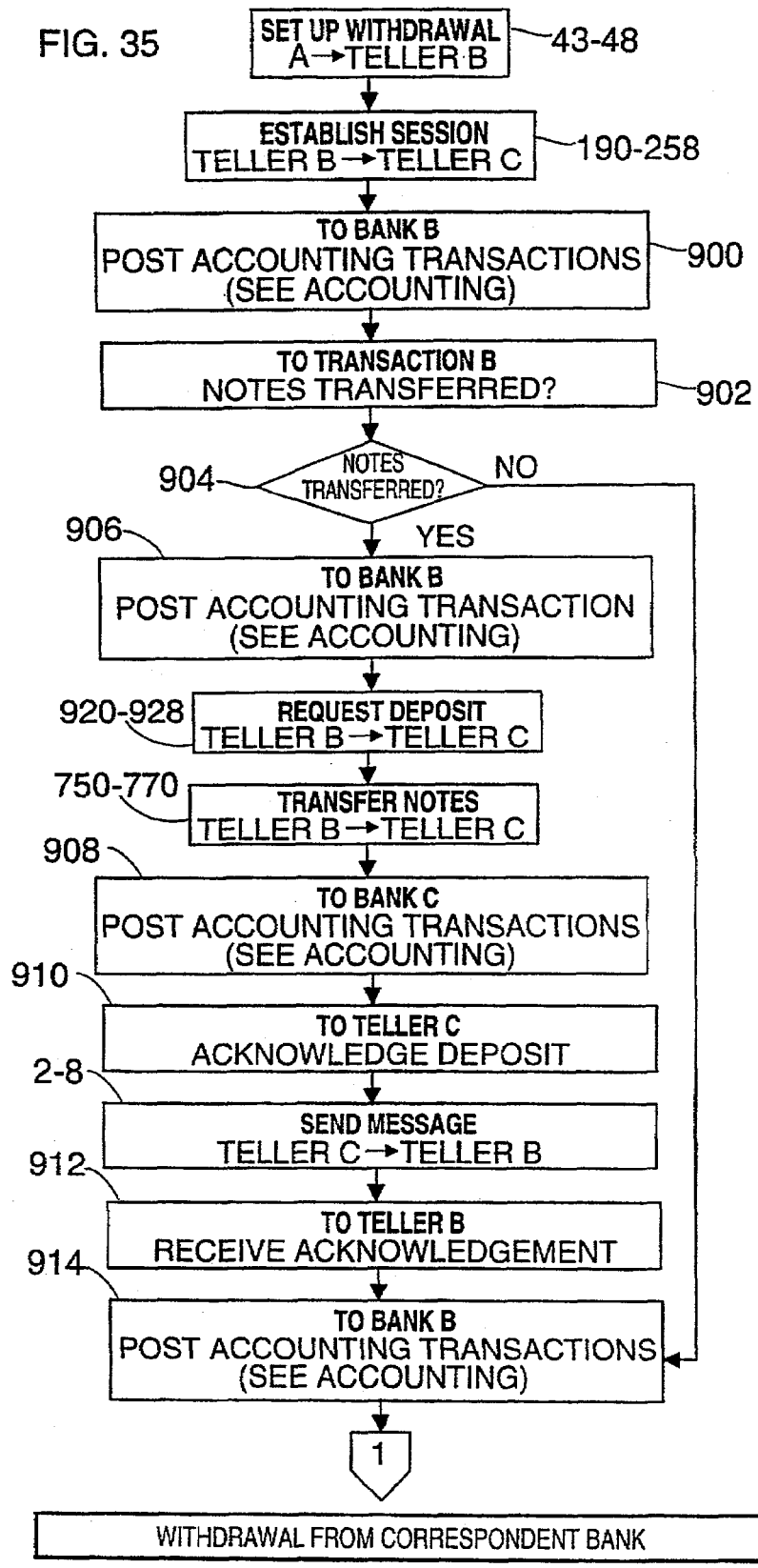
Figure 35A:
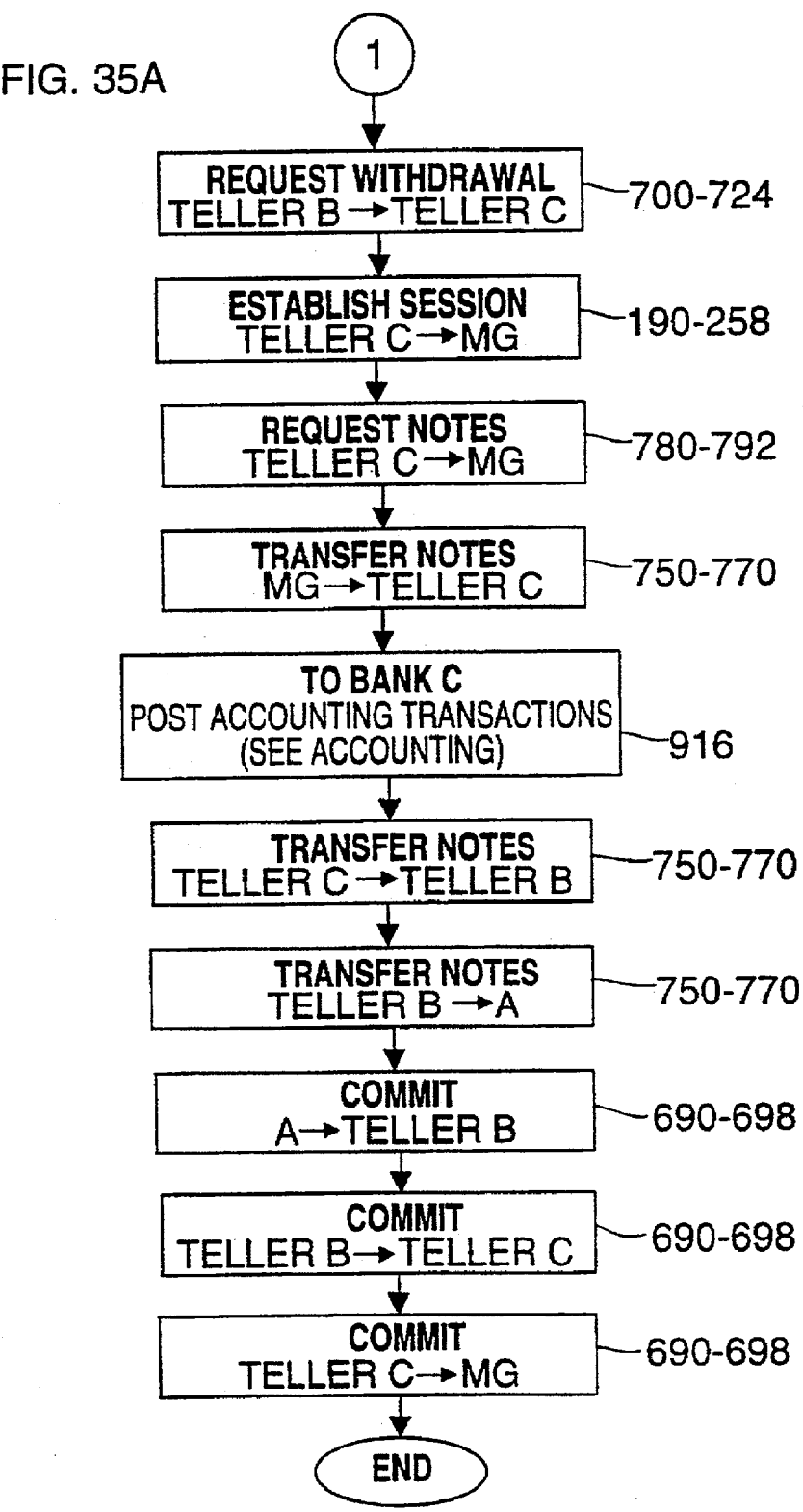

A withdrawal from a Correspondent Bank 2 will now be described, aided by reference to FIG. 35. To begin, the previously described Steps 43-48 to set up a withdrawal are undertaken by a Transaction money module A 4, in conjunction with a Teller money module B 5. Next, Steps 190-258, used to establish a session, also described above, are initiated between Teller money module B 5 and Teller money module C 5. After the sessions have been established, the To Bank application B 47 will post the accounting transaction corresponding to the withdrawal that is going to subsequently occur (Step 900; see also FIG. 13, Step 1).

As previously noted, it is contemplated that whenever a Transaction money module 4 interacts with a bank, both Issuing 1 and Correspondent 2, all electronic notes 11 that are stored within the Transaction money module 4 are removed and replaced with electronic notes 11 containing the most recent certificate. To perform this operation, To Transaction B 49 will check to see if there are notes 11 stored within the money module 4 (Steps 902-904). If there are notes 11, To Bank B 47 will post the appropriate accounting transactions (see accounting procedure illustrated in FIG. 13; Step 2) (Step 906), and perform a deposit request to the Teller money module C 5 (associated with an Issuing Bank 1) to return the notes that need to be replaced.

Figure 44:
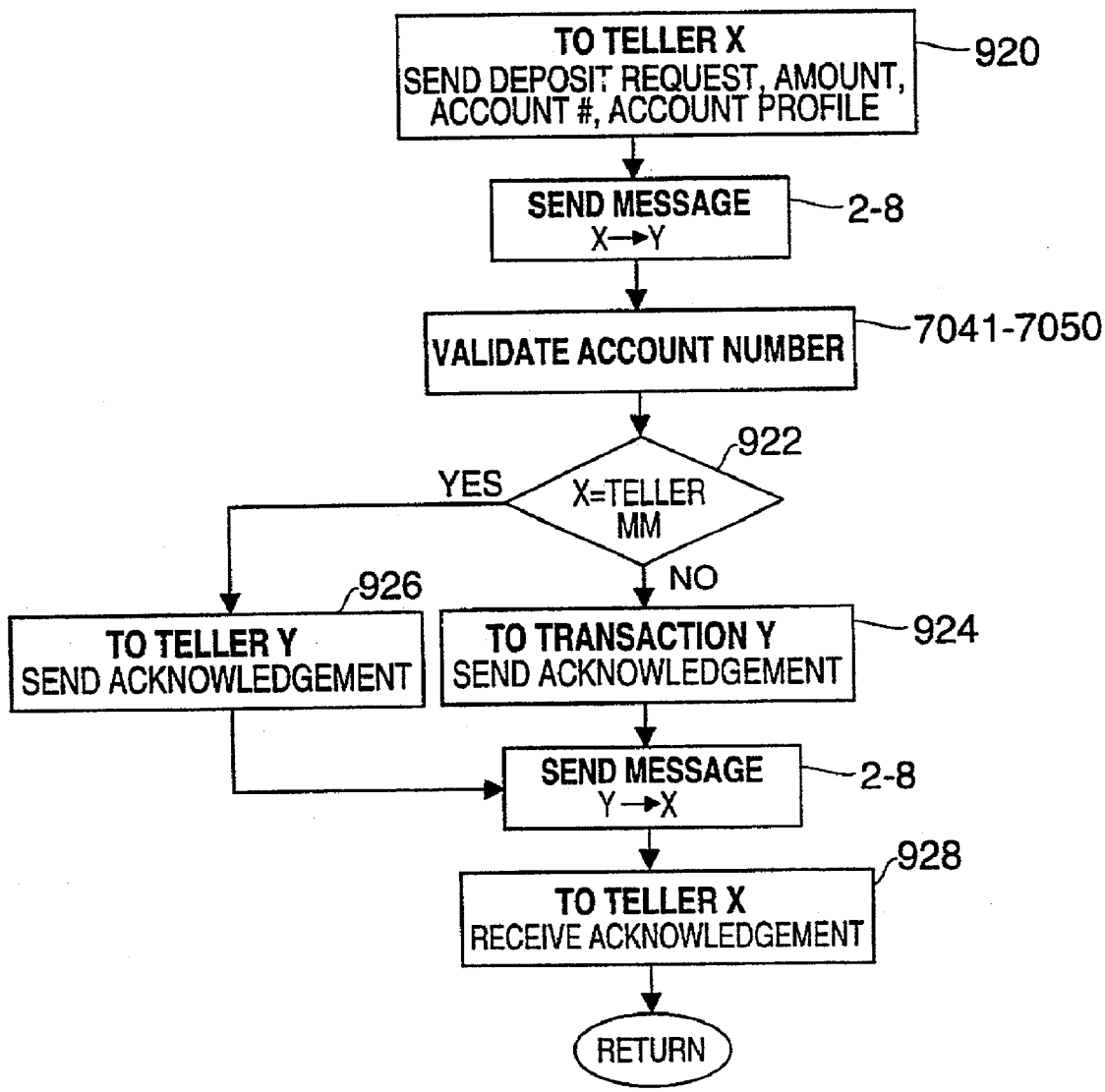

For a detailed description for performing a deposit request, attention will be directed to FIG. 44. Here, the To Teller application 34 sends a deposit request message, the amount of the deposit to be sent, the account number and the account profile of the account to which the notes 11 will be deposited (Step 920). This information is transferred to the Teller money module 5 using Steps 2-8 for sending messages, and then Steps 7041-7056 (see FIG. 38) are performed to validate the account profile and number.

In the case where the depositor is a Transaction money module 4, the To Transaction application 49 of the Teller money module 5 will send an acknowledgement to the Transaction money module 4 that the transfer of notes 11 is ready to proceed (Step 924). Alternatively, if it is another Teller money module 5 that is making the deposit, it is the To Teller application 34 that issues the acknowledgement to the Teller money module 5 (Step 926).

In either case, the acknowledgement is encrypted and transmitted using the procedure outlined in Steps 2-8, whereby it is received by a To Teller application 34 of the depositing money module (Step 928).

Referring back to FIG. 35, once the deposit request is completed, the notes 11 are transferred from the Teller money module B 5 to the Teller money module C 5 using Steps 750-770, FIGS. 39, 39A detailed above for transferring notes. Accordingly, To Bank C 47 posts the proper accounting transactions (see FIG. 13, Step 2) to reflect this transfer of notes 11 (Step 908). In Teller money module C 5, the To Teller application 34 acknowledges' the deposit by sending a message back to the To Teller B 34 application (Steps 910-912), using Steps 2-8. Naturally, the To Bank B 47 will now post accounting transactions to reflect the withdrawal request it will make to Teller money module C 5 (Step 914; see also FIG. 13, Step 3).

After all electronic notes 11 have been removed from the Transaction money module 4 and the proper accounts have been posted, a withdrawal is requested of a total amount that includes both the amount originally requested to be withdrawn from the subscriber's bank account and the amount that was removed from the Transaction money module 4 to be replaced with updated electronic notes 11.

The withdrawal request is performed between Teller money module B 5 and Teller money module C 5 using the process Steps 700-724, FIGS. 30, 30A, described above. Teller money module C 5 transacts with a Money Generator module 6 to withdraw new electronic money and in doing so it establishes a session between the two modules using the process Steps 190-258, FIGS. 34, 34A-C.

Figure 40:
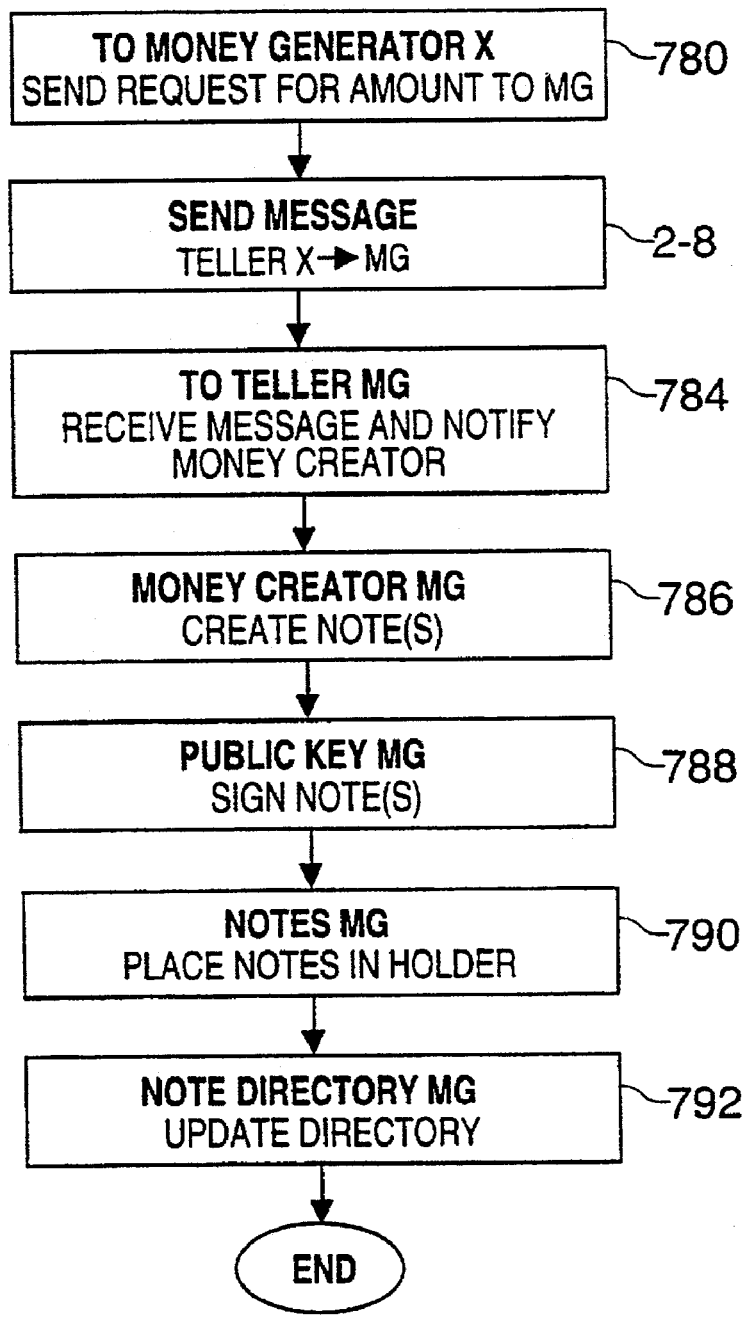

The electronic notes 11 are requested by the Teller money module C 5 from the Money Generator module 6 using process Steps 780-792, FIG. 40, and the notes 11 are transferred from the Money Generator module 6 to the Teller money module C 5 using the Steps 750-770, FIGS. 39, 39A.

Figure 13:
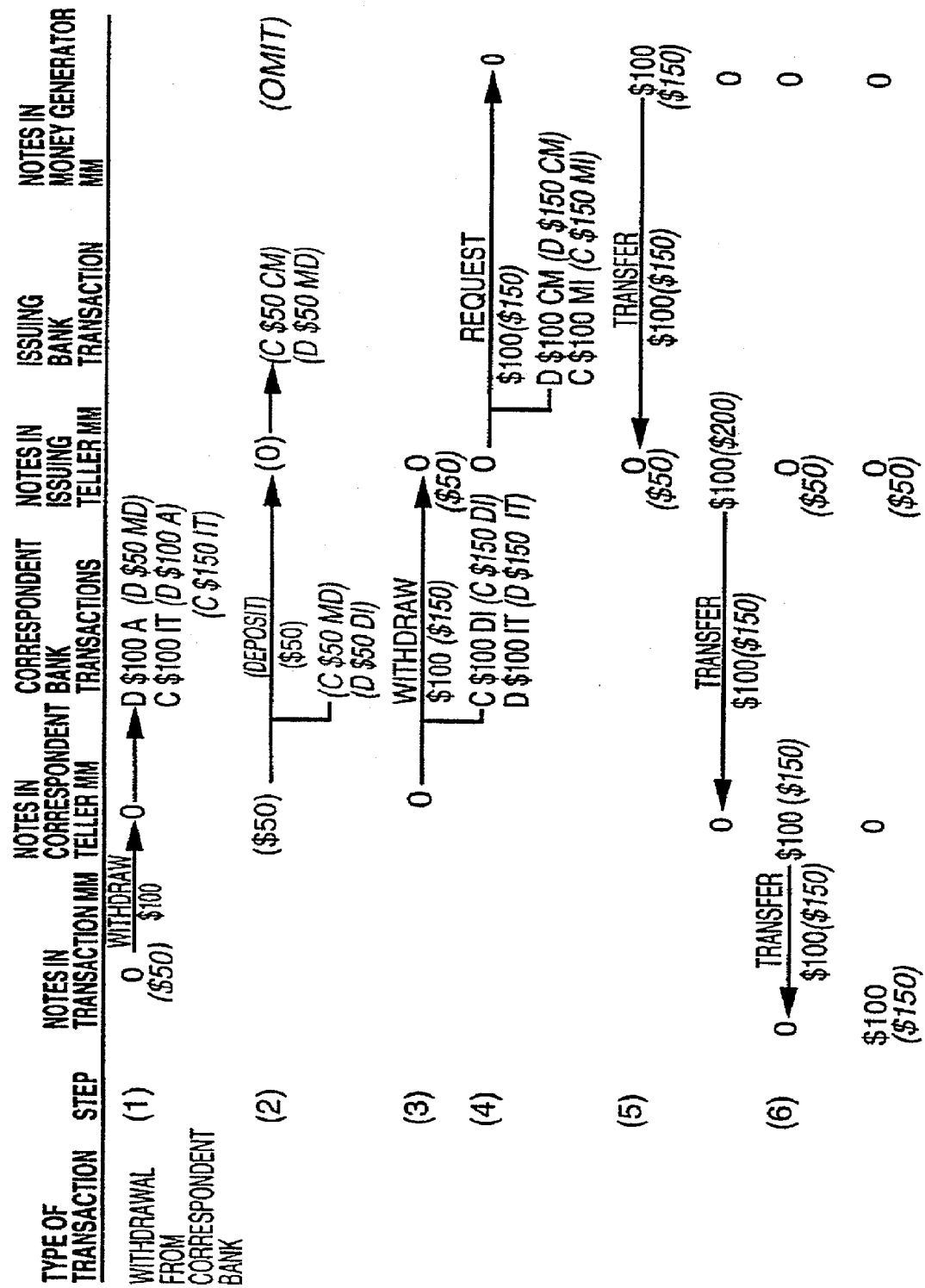

The To Bank application C 47 performs the accounting postings (Step 916; see also FIG. 13, Step 4). After this, the electronic notes 11 are transferred from Teller money module C 5 to Teller money module B 5 using the Steps 750-770; the notes 11 are than transferred to Transaction money module A 4 also using Steps 750-770.

To finalize the withdrawal from the Correspondent Bank 2, each money module must commit to the transaction it has just had with the corresponding money module. Thus, Transaction money module A 4 commits to Teller money module B 5 using Steps 690-698, FIG. 41, and thereafter Teller money module B 5 commits to Teller money module C 5. Finally, Teller money module C 5 commits to the Money Generator module 6, using the same process Steps 690-698.

Deposit to an Issuing Bank

Figure 42:
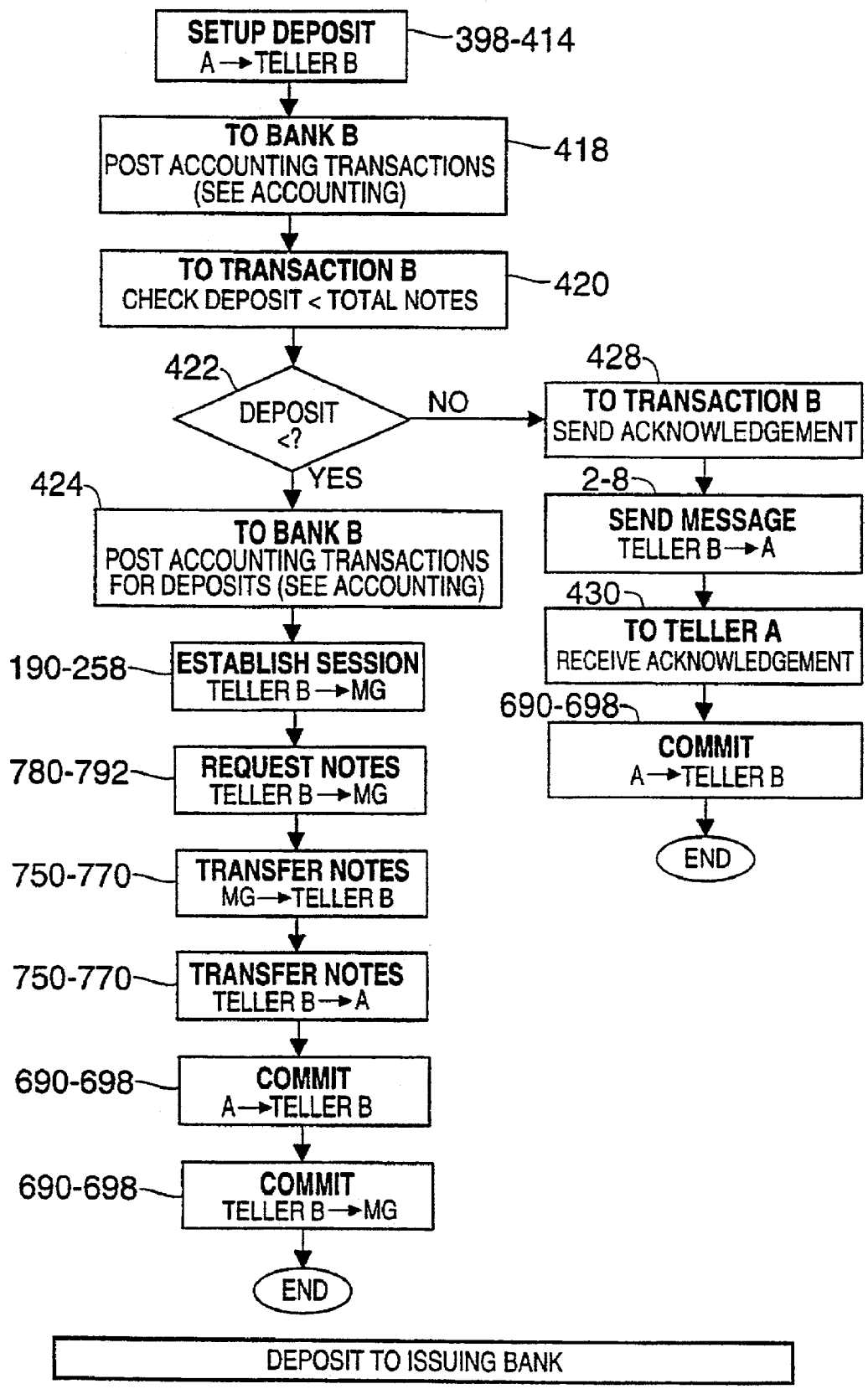

Referring to FIG. 42 in combination with FIG. 43, an example of a deposit to an Issuing Bank 1 will now be described in detail. To start the transaction, a deposit set up must be done which uses the process steps shown in FIG. 43.

Figure 31A:
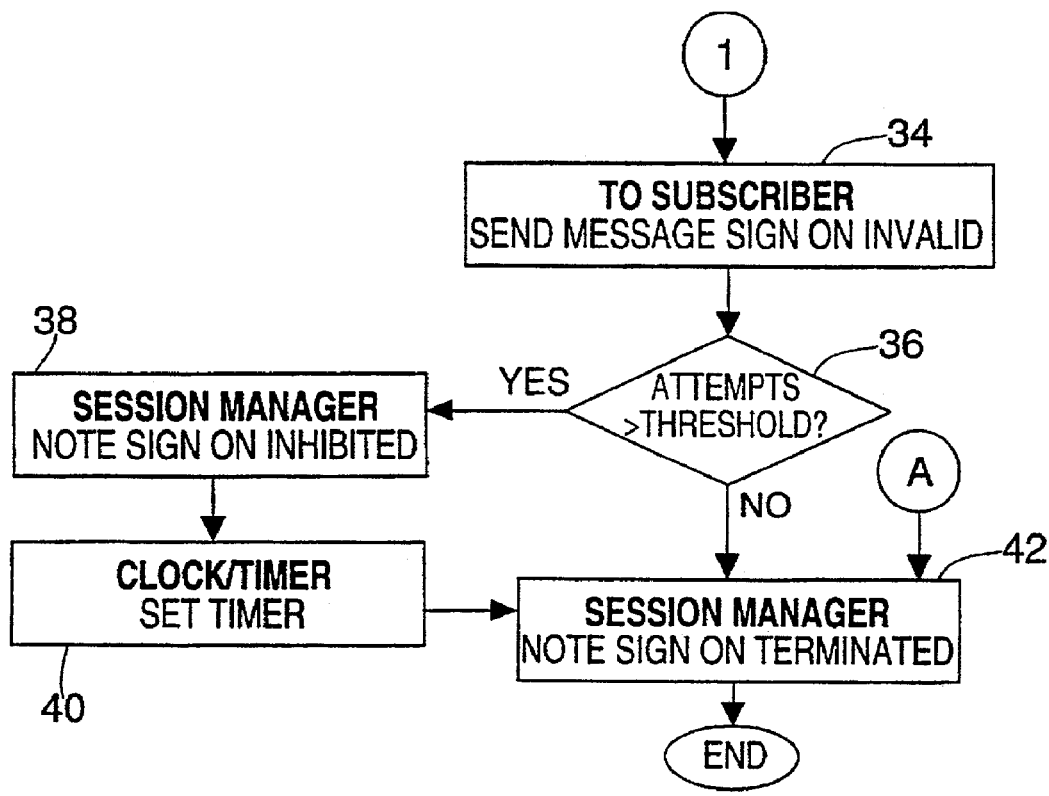
Figure 43:
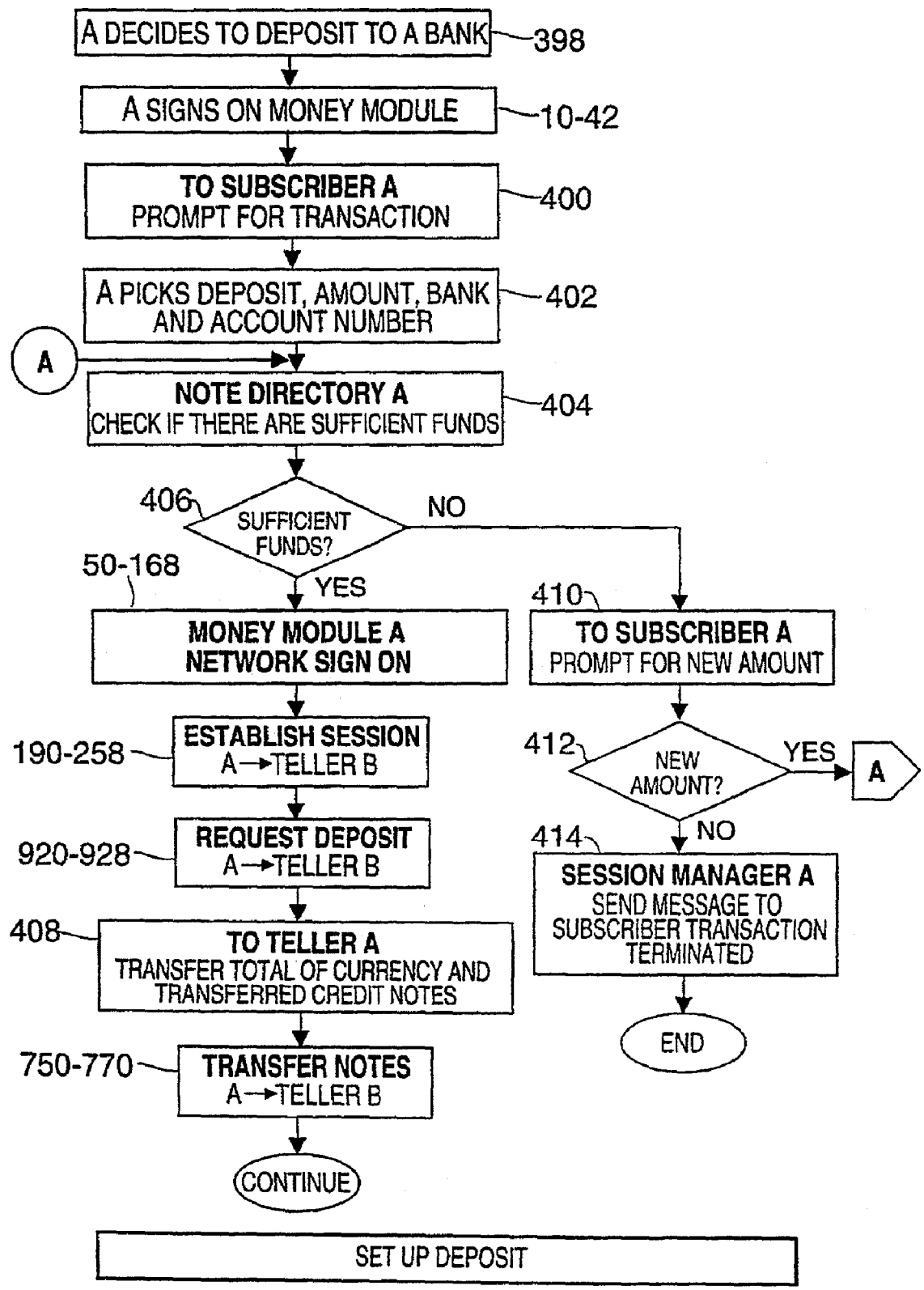

In Step 398 at the top of FIG. 43, the subscriber decides to deposit some money to a bank. After performing the sign on routine for a Transaction money module 4 (following Steps 10-42, FIGS. 31-31A), the To Subscriber A 33 prompts the subscriber for the transaction desired (Step 400).

In this example, the subscriber chooses the deposit transaction, the amount to be deposited, and the bank and account number in which to deposit the electronic money (Step 402). Before any other procedures, Note Directory A 39 checks to see if the money module contains funds sufficient to support the deposit request (Step 404).

Assuming there are insufficient funds for the deposit, To Subscriber A 33 prompts the subscriber for a new amount (Step 410) and if no new amount is selected, the Session Manager A 31 informs the subscriber that the transaction must be terminated (Step 414). If the subscriber enters a new amount, Step 412, the process flow returns to Step 404, wherein the Note Directory 39 application again checks for sufficient funds for the transaction.

Assuming there are adequate funds within the money module, the process flow advances to the Network 25 sign on procedures outline in Steps 50-168, FIGS. 33-33A. A successful Network 25 sign on then advances the process flow to Steps 190-258, for establishing a session between the Transaction money module A 4 and Teller money module B 5.

Once the session is established between the two money modules, the deposit request steps outlined in procedures 920-928 are followed conveying the request from Transaction money module A 4 to the Teller money module B 5. The To Teller A 34 transfers all of the electronic notes 11 stored within the money module to the Teller money module B 5 (Step 408) using the Steps 750-770 described above for transferring electronic notes 11 between two money modules.

Continuing with FIG. 42, the To Bank B 47 posts the accounting transactions for the notes deposited (Step 418, see FIG. 12 Step 1). In Teller money module B 5, the To Transaction application 49 checks to see if the amount deposited is less than the total notes 11 that were stored in module A and then transferred to the Teller money module 5 (Step 420). If the deposit is less than the total amount of transferred notes 11, updated notes 11 must be generated and sent back to the Transaction money module 4.

When all the notes that are contained in the Transaction money module 4 are deposited, i.e., the amount to be deposited is not less than the total amount of electronic notes 1, the To Transaction B 49 will send an acknowledgement to the Transaction money module 4 (Step 428) using the Steps 2-8 for sending messages between money modules. The To Teller A 34 receives the acknowledgement (Step 430) and initiates the Steps 690-698 to commit the deposit transaction between the two money modules.

When the electronic notes 11 removed exceed the desired deposit amount, new updated notes 11 must be returned to the Transaction money module 4. To perform this, the To Bank application B 47 of the Teller money module B 5 posts the proper accounting transactions (Step 424; FIG. 12, Step 2). Thereafter, Teller money module B 5 establishes a session with the Money Generator module 6 using process Steps 190-258, and requests electronic notes 11 from the Money Generator module 6 in the amount that should be returned to the Transaction money module 4, by performing Steps 780-792.

The electronic notes 11 are created by the Money Generator module 6 and transferred to the Teller money module B 5 using Steps 750-770. With the electronic notes 11 in the possession of the Teller money module B 5, they are transferred to the Transaction money module A 4 using Steps 750-770.

After Transaction money module A 4 receives the electronic notes 11, it must finalize the transaction by committing Teller money module B 5 to Transaction money module A using Steps 690-698. Likewise, Teller money module B 5 must commit to the Money Generator module 6 using the same Steps 690-698.

Deposit to a Correspondent Bank

Figure 45:
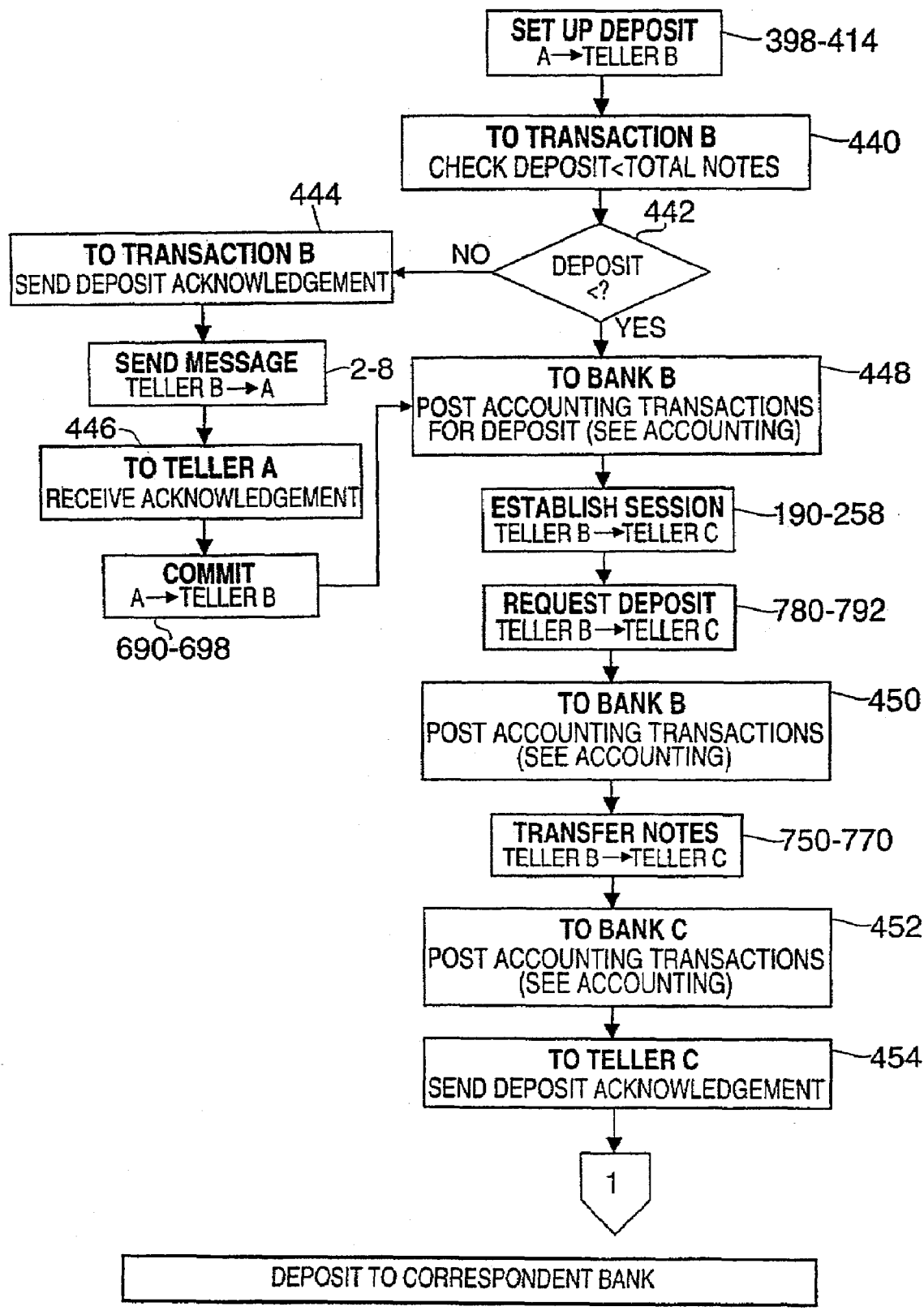

FIG. 45 illustrates the process flow for a deposit at a Correspondent Bank. In depositing to a Correspondent Bank 2, the deposit set up described in Steps 398 through 414 are repeated in the first stage of the transaction. From there the To Transaction B 49 tests to see if the deposit is less than the total amount of electronic notes 11 that have been withdrawn in the deposit set up procedures that were just processed (Step 440).

In the case where all the electronic notes 11 stored in the Transaction money module 4 are equal to the amount of notes 11 to be deposited, then To Transaction B 49 sends a deposit acknowledgement back to the Transaction money module 4 (Step 444), using steps 2-8 to send the message from the Teller money module B 5 to Transaction money module A 4.

On the Transaction money module 4 side, the To Teller 34 application receives the acknowledgement (Step 446) and uses Steps 690-698 to commit the transaction with Teller money module B 5. The Transaction money module 4 is now finished and removed from the process. The finalization of the deposit provides for the account posting transactions to be made by the To Bank application 47 (Step 448). See FIG. 1, Step 1 for the accounting transactions.

A session is now established between Teller money module B 5 and Teller money module C 5 using Steps 190-258.

Teller money module B 5 issues a request to make a deposit, to the Teller money module C 5 by using process Steps 780-792. The To Bank B 47 then posts the accounting transactions (Step 450; see also FIG. 11, Step 2).

Figure 45A:
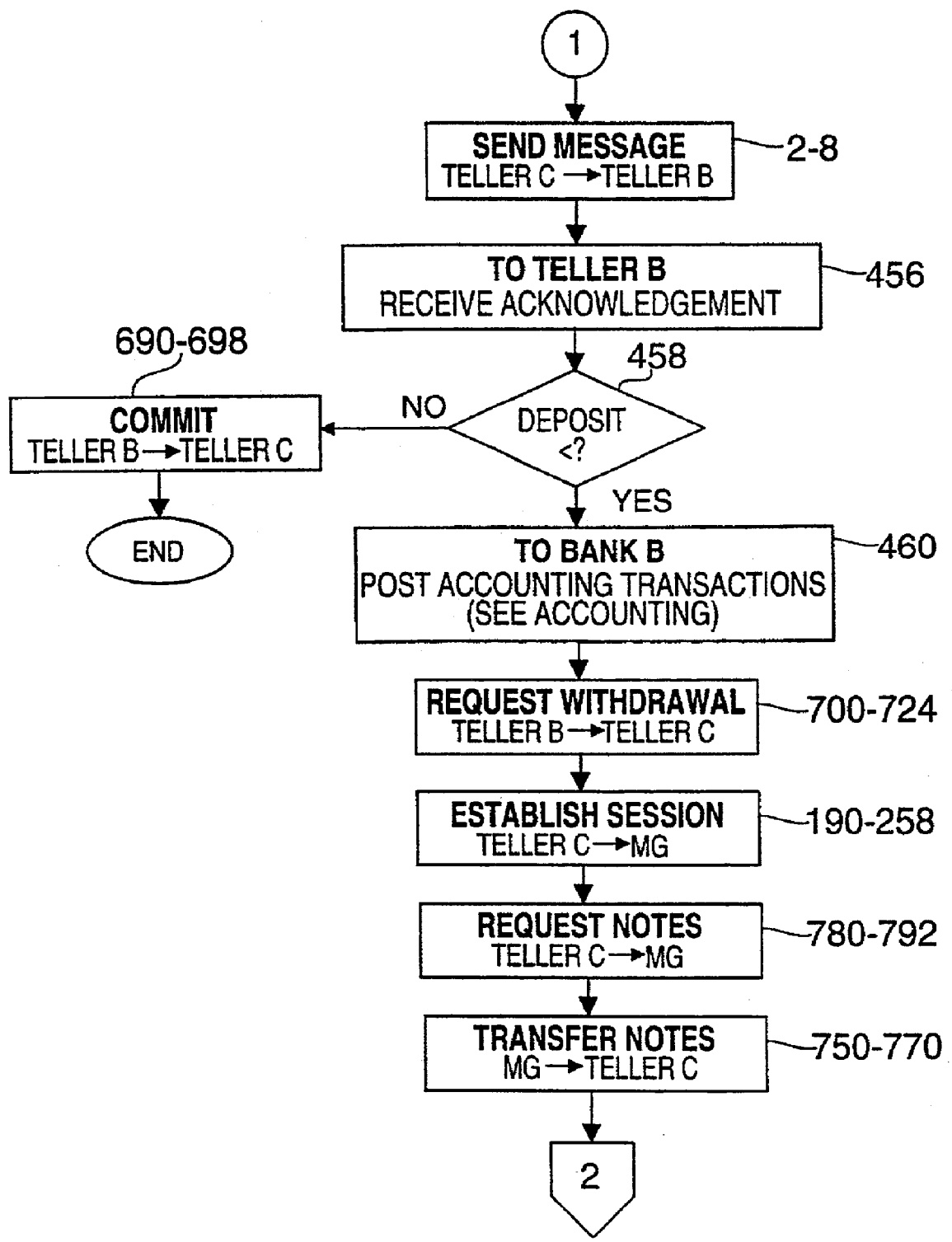

Notes 11 are now transferred from the Correspondent Bank B 2 to the Issuing Bank C 1 using Steps 750-770; the Issuing Bank C 1 posts the corresponding accounting transactions (Step 452; see also FIG. 11, Step 2). The To Teller C 34 responds by sending the deposit acknowledgement (Step 454) using Steps 2-8, to To Teller application 34 of Teller money module B 5 (FIG. 45A, Step 456).

Here again, the deposit is checked to see if it is less than the amount of electronic notes 11 that have been removed earlier, and when it is not, the withdrawal is completed with the process Steps 690-698, FIG. 41, to commit Teller money module B 5 to Teller money module C 5.

A deposit request that is less than the amount of notes 11 that are withdrawn requires account updating (Step 460; see also FIG. 11, Step 3), and new notes 11 to replace the additional notes 11 that were taken. Accordingly, a withdrawal request following the process Steps of 780-724 from Teller money module B 5 to Teller money module C 5 is made to provide these new electronic notes 11.

Teller money module C 5 must first establish a session with the Money Generator module 6, using the process Steps 190-258. The new electronic notes 11 are requested by the Teller money module C 5 from the Money Generator module 6 following process Steps 780-792, which are then transferred to the Teller money module C 5 using Steps 750-770 to transfer notes 11 between money modules.

Figure 45B:
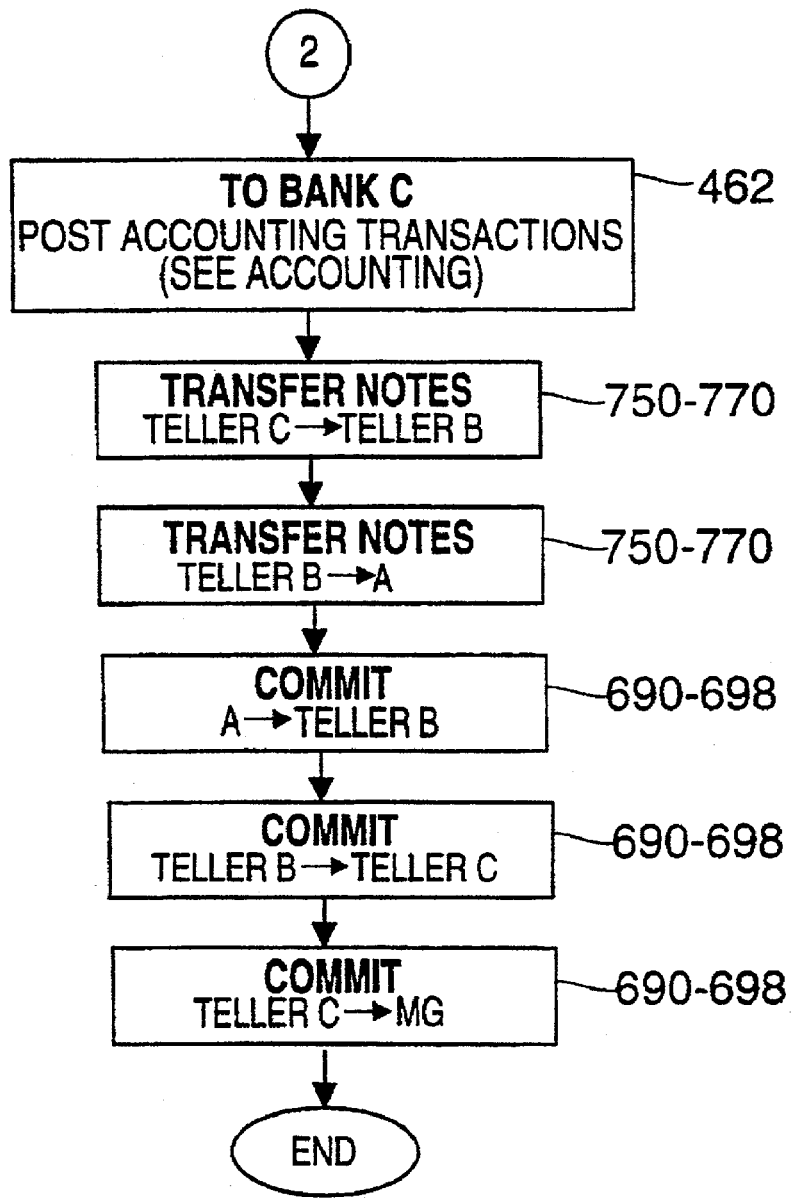

This transfer of electronic notes 11 to the Teller money module C 5 requires that accounting transactions be posted by the To Bank application C 47 (Step 462, FIG. 45B; see also FIG. 11, Step 3).

From there, the notes 11 are transferred from the Issuing Bank's 1 Teller money module C 5 to the Correspondent Bank's 2 Teller money module B 5 and to the Transaction money module 4 by using Steps 750-770 for transferring notes 11. Thereafter, each money module must commit to the money module with which it has established a session. Thus, Transaction money module A 4 commits to Teller money module B 5, Teller money module B 5 subsequently commits to Teller money module C 5, which then commits to the Money Generator module 6. All three of these commitment transactions use process Steps 690-698, described above.

Subscriber to Subscriber Payment

Figure 36:
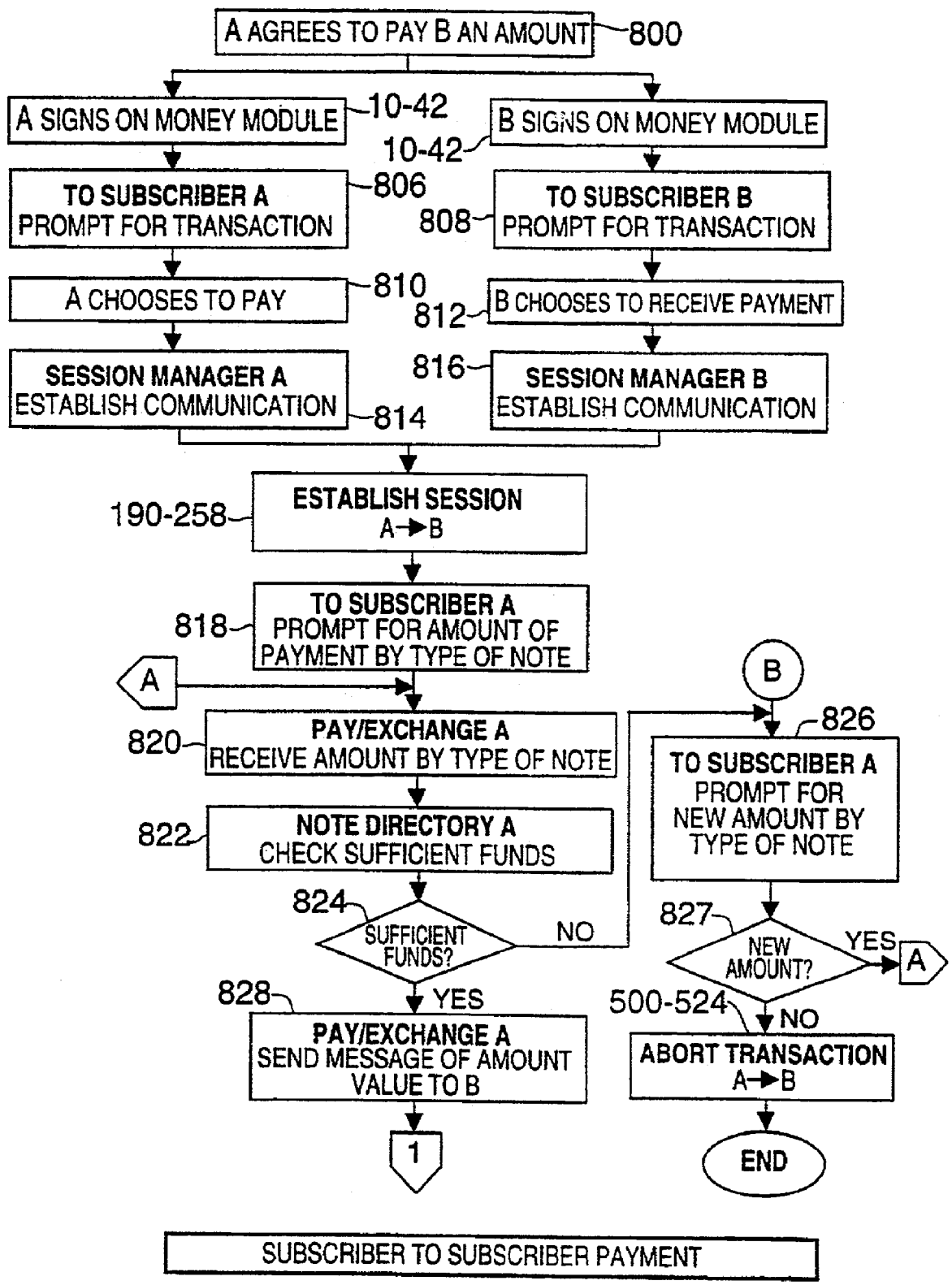

FIG. 36 illustrates the process flow for a payment transaction from one Transaction money module 4 to another and in this example of a preferred embodiment, Alice (or a hypothetical payor corporation, is denoted "A" in FIG. 36) will agree to pay Bob (or a hypothetical payee corporation, is denoted "B" in FIG. 36) a specific amount of electronic money (Step 800). Both Alice and Bob sign on to their respective Transaction money modules 4 using the process Steps 10-42 described above. Through the To Subscriber A 33 application, Alice directs her Transaction money module 4 to make a payment (Steps 806 & 810), while Bob operates his Transaction money module 4 such that the To Subscriber B 33 application will issue an entitlement to receive payment (Steps 808 & 812).

In Steps 814 & 816, the Session Managers 31 of both Alice's Transaction money module 4 and Bob's Transaction money module 4 establish communications. From there, a session is established, as described in Steps 190-258 above for transacting between any two money modules.

With a session established, To Subscriber A 33 prompts the subscriber to enter the amount of payment that she desires to transfer (Step 818), which is displayed to the subscriber.

Alice enters the amount that she wishes to transfer to Bob. Pay/Exchange application A 35 receives the amount entered (FIG. 36, Step 820). The amount entered by type (currency or credit) is now compared by Note Directory A 39 to the balance of the value of the electronic money stored in the Transaction money module 4, to see if there are sufficient funds available to permit the transaction to proceed (Step 822).

If there are insufficient funds, To Subscriber A 33 sends the subscriber a notice that there are not sufficient funds to cover the transaction desired (Steps 824-826), and prompts the subscriber again for a new amount of payment (Step 827). If the subscriber prefers not to enter a new amount, the abort transaction process Steps 500-524 are activated to terminate the communications link between the two Transaction money modules 4. On the other hand, a newly entered amount will return the process to Step 820, to check for sufficient funds again.

When there are sufficient funds stored in Transaction money module A 4 to process the transfer, Pay/Exchange A 35 sends a message disclosing the amount of the transfer to Bob's Transaction money module 4 (Step 828), using the process disclosed in Steps 2-8. See FIG. 36A. From there, To Subscriber B 33 prompts the owner to verify that the amount to be transferred will be accepted by him (Step 830). Bob can then decide whether to accept or reject the amount to be transferred (Step 832).

If Bob responds in the negative, then Pay/Exchange B 35 will send a message back to Transaction money module A 4 using Steps 2-8, that the amount to be transferred is incorrect (Step 834); the process again returns to Step 826, FIG. 36, to prompt Alice for a new amount to be entered.

When Bob responds in the affirmative in Step 832, Pay/Exchange B 35 will send an acknowledgement to Transaction money module A 4 using Steps 2-8 (Step 835). Back in Transaction money module A 4, the message will be conveyed to Pay/Exchange A 35 to receive the acknowledgment sent by Transaction money module B 4 (Step 836).

With this acknowledgement received, Pay/Exchange A 35 will send the amount desired to be transferred to the Money Holder 38 (Step 838) so that the electronic notes 11 may be transferred using Steps 750-770. With the transfer completed, the two Transaction money modules 4 must commit to the transfer using Steps 690-698 described above. The communication link between the two transaction modules may now be terminated.

Subscriber to Subscriber Foreign Exchange

Figure 46:
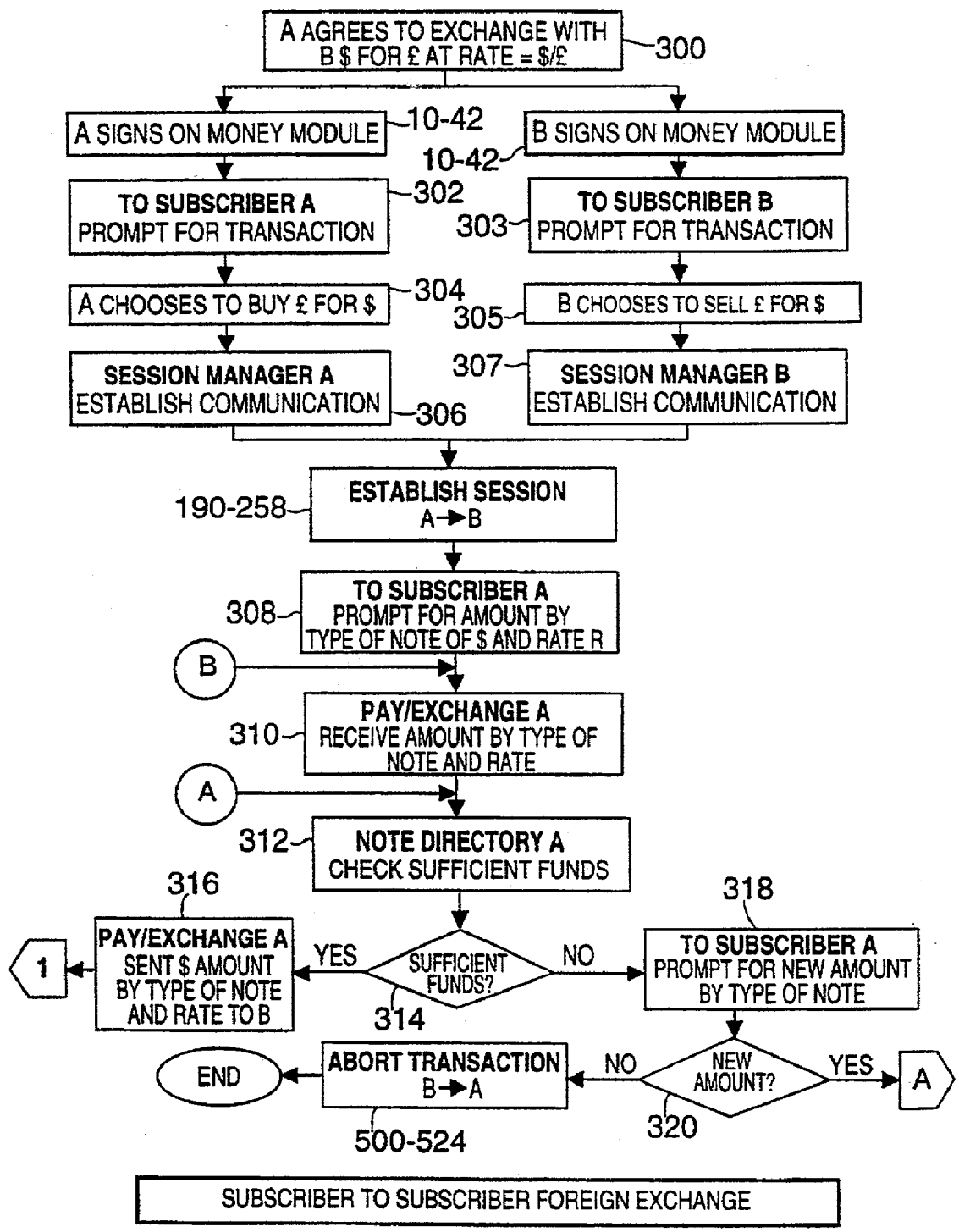

Referring to FIG. 46, the process flow for an exchange of foreign currencies between two Transaction money modules 4 will now be illustrated. In this example Alice (or a hypothetical corporation, denoted "A" in FIGS. 46-46A) agrees to exchange dollars for pounds with Bob (or a hypothetical corporation, denoted "B" in FIGS. 46-46A). The exchange rate that they have agreed to will be a ratio of dollars to pounds (Step 300).

Alice begins by signing on to her Transaction money module 4 (using Steps 10-42 described above) while Bob signs on to his Transaction money module 4 (using Steps 10-42). Thereafter, the To Subscriber 33 applications of both Transaction money modules 4 prompt the respective users to select a type of transaction (Steps 302-303). In this example, Alice and Bob agree to exchange her dollars for his pounds.

By requesting the foreign exchange transaction, Session Manager A 31 will establish a communications link with Session Manager B 31 (Steps 306, 307) so that a session may be established between the two money modules using Steps 190-258. Alice is then prompted by To Subscriber A 31 for the amount of dollars she will sell, and the exchange rate that she will use in the transaction (Step 308).

Pay/Exchange A 35 receives the input (Step 310) and Note Directory A 39 checks for sufficient funds by comparing the amount requested to the amount of value contained in the Transaction money module 4 (Step 312). An insufficient funds condition will cause the To Subscriber A 33 to send an insufficient funds message to Alice and prompt the subscriber to select another amount of dollars and exchange rate (Steps 318-320). When new selections are entered, the process flow returns to Step 312 and continues from there. If Alice does not select a new amount, the session is dissolved using abort transaction Steps 500-524.

Figure 46A:
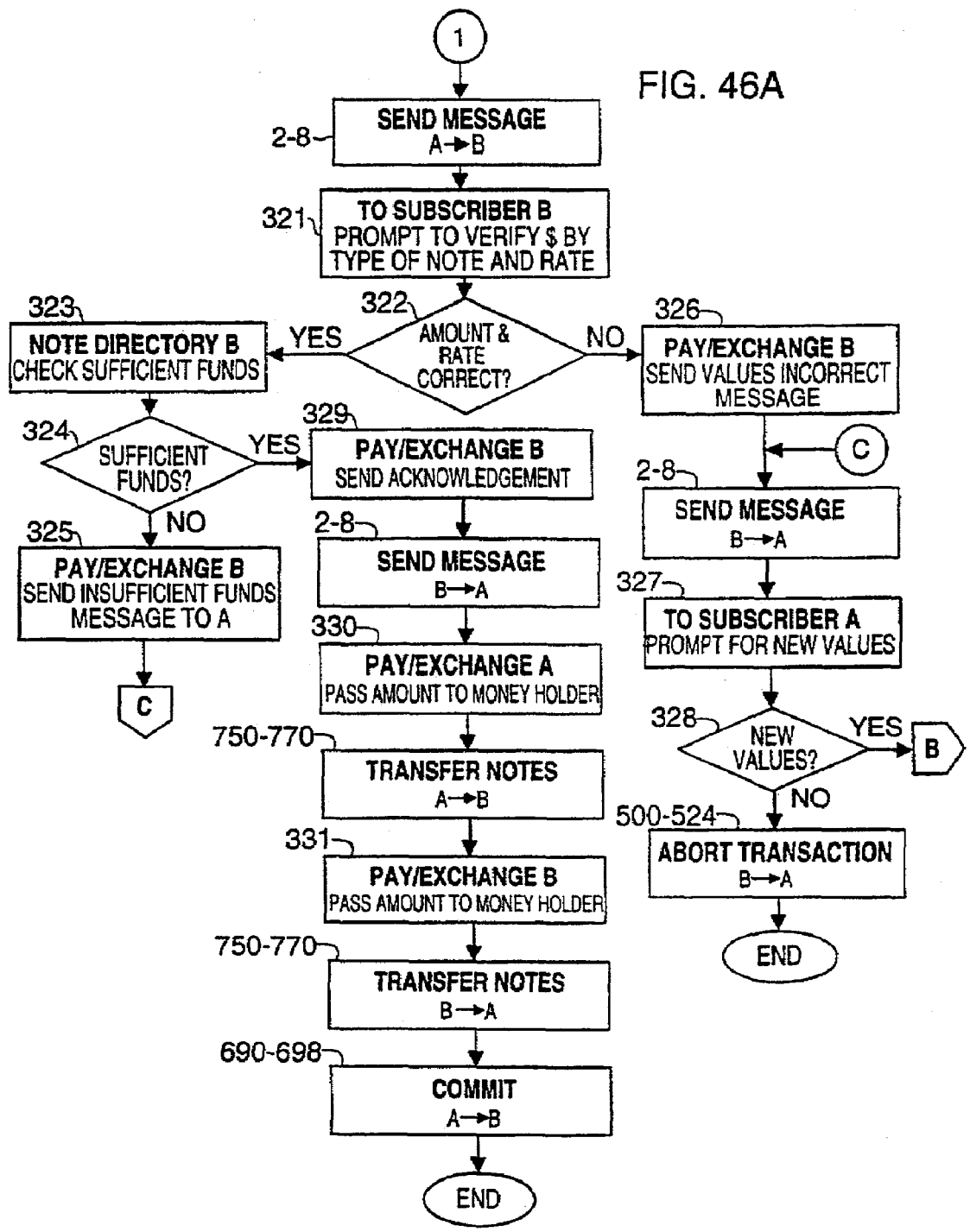
Figure 47A:
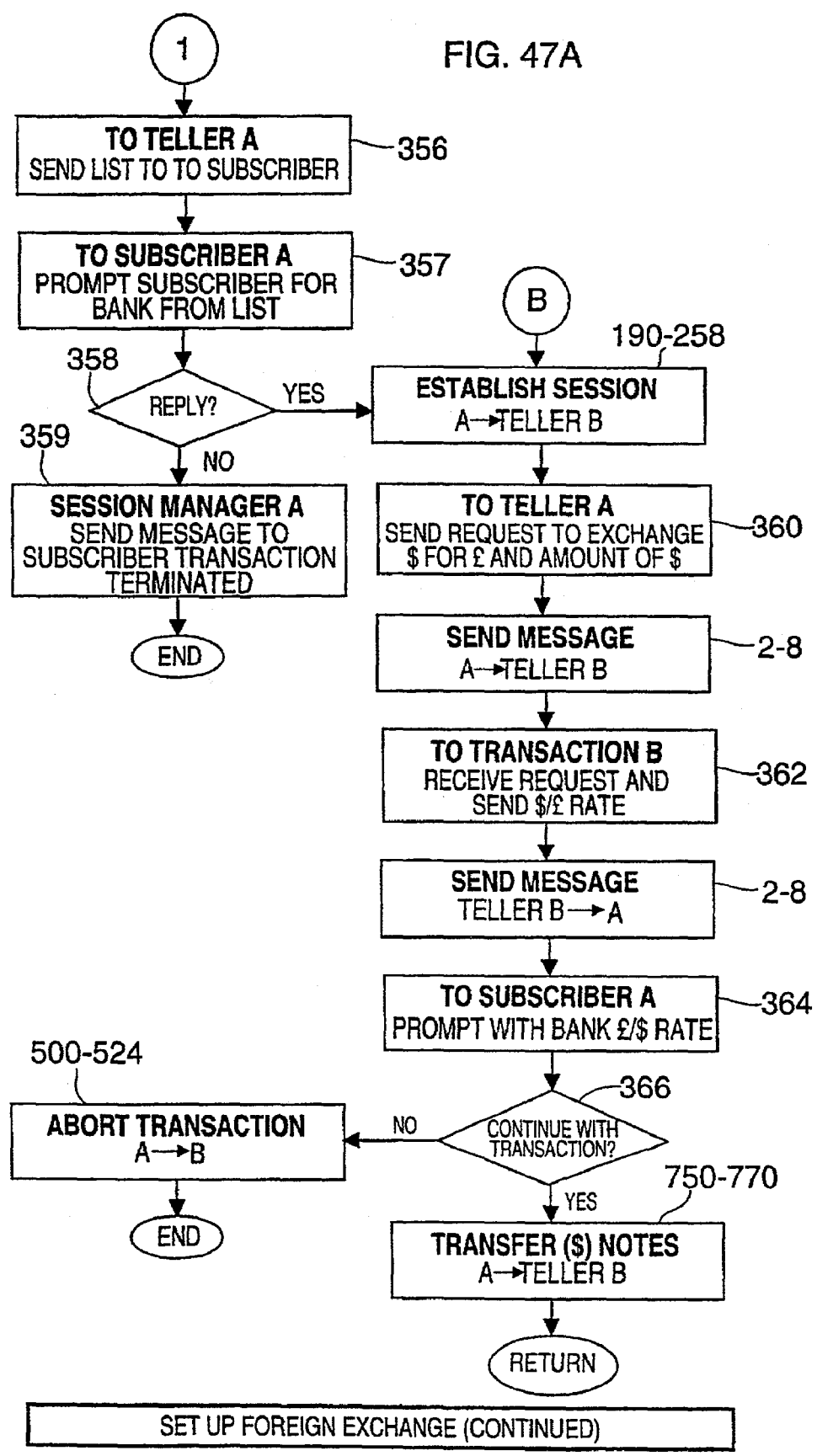

When the funds are sufficient to meet the amount requested, the Pay/Exchange A 35 sends the amount of the dollars and the proposed dollar/pound exchange rate (Step 316) to the To Subscriber application 33 of Transaction money module B 4 using the Steps 2-8 (see FIG. 46A). At this point, To Subscriber B 33 prompts Bob with the amount and rate proposed by Alice, to determine if the values are what Bob will agree to exchange (Step 322).

The Pay/Exchange B 35 receives the dollar amount and the rate that is proposed by Alice and if the amount and rate are not agreed to by Bob, Pay/Exchange B 35 will send a message indicating that the value or exchange rate is incorrect (Step 326), through the Steps of 2-8 for sending messages. To Subscriber A 33 prompts Alice for the dollar amount and exchange rate over again (Step 327). Entry of new values returns the process to Step 310 for continuation, see FIG. 46, while the lack of new values entered causes the abort transaction process of Steps 500-524 to be initiated.

If the amount and rate are agreed to by Bob, Pay/Exchange B 35 will calculate the equivalent amount in pounds, based on the rate provided (not shown), and then initiate the step of having Note Directory B 39 check to see that Transaction money module B 4 contains sufficient funds to fulfill the exchange (Step 323). When the funds in Transaction money module B 4 are insufficient to meet the exchange, Pay/Exchange B 35 sends a message to Alice of insufficient funds (Step 325) using Steps 2-8. The process flow returns to Step 327.

Proceeding with the case in which sufficient funds do exist in Transaction money module B 4, Pay/Exchange B 35 will send an acknowledgement using Steps 2-8 to Transaction money module A 4 (Step 329). After receiving this acknowledgement, Pay/Exchange A 35 sends the amount of dollars requested to its corresponding Money Holder 38 application in Step 330. The dollars are transferred from Alice to Bob via the Steps 750-770 described above for transferring notes 11.

Pay/Exchange B 35 receives the notes 11 and then transfers the amount of pounds to its Money Holder 38 application (Step 331). From there, the electronic pounds are transferred to Alice using the transfer notes process described in Steps 750-770. To record this exchange, Transaction money module A 4 commits with Transaction money module B 4 by using process Steps 690-698 described above. With a satisfactory exchange, the communications link between the two transaction money modules may now be terminated.

Foreign Exchange at an Issuing Bank

Figure 48:
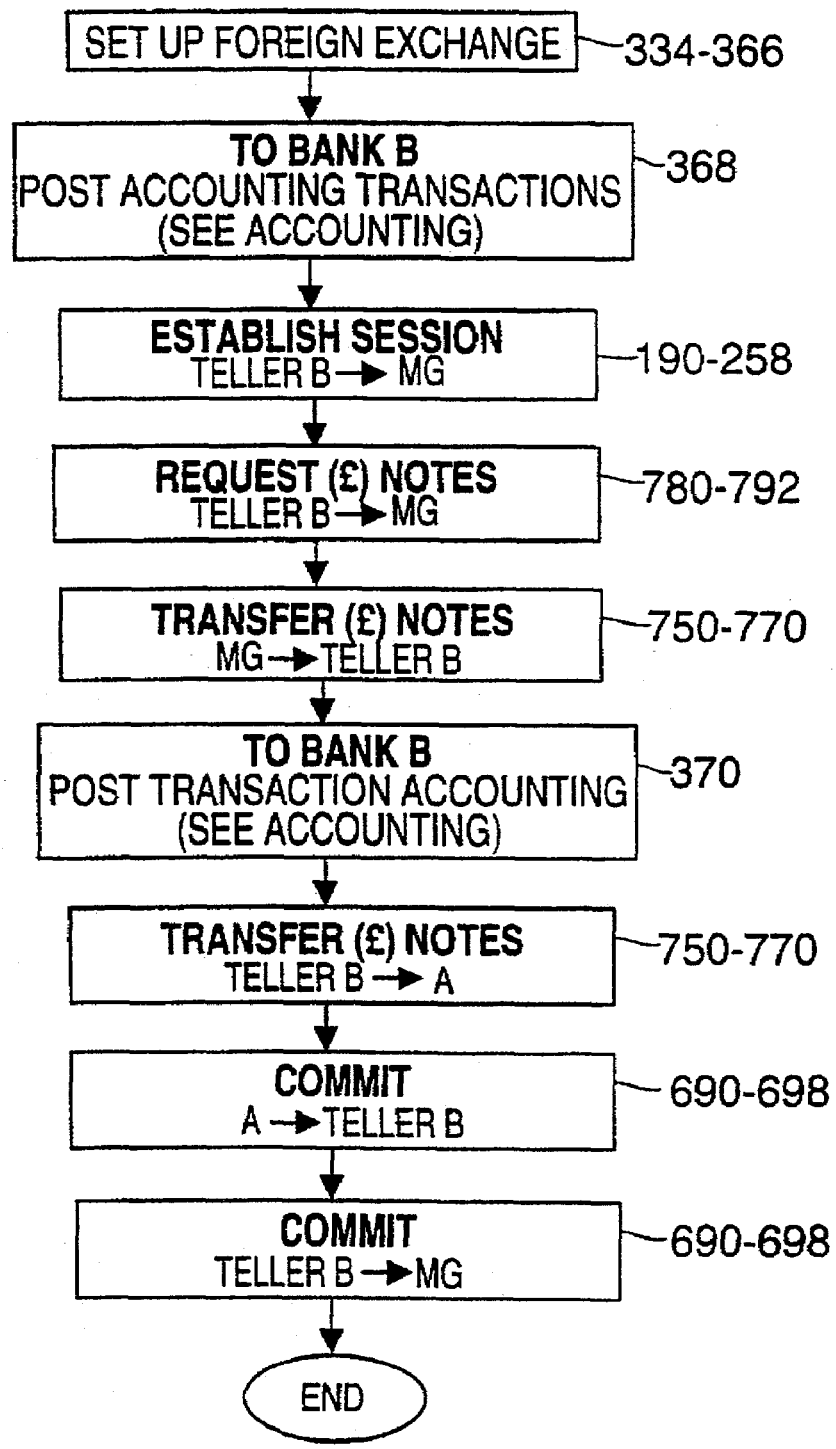

Turning attention now to FIG. 48, if a subscriber were to exchange his/her dollars for pounds with an Issuing Bank 1 instead of with a subscriber, the following process is followed.

Subscriber A sets up the foreign exchange transaction by signing on to his/her Transaction money module 4 (referring now to FIG. 47) using Steps 10-42 described above. To Subscriber A 33 prompts the subscriber for the transaction desired (Step 334), and in this example, the subscriber chooses the dollar/pound exchange, and the amount of dollars the subscriber will exchange. It is anticipated that the choice of the bank to transact with may be an option offered to the subscriber (Step 336).

The Note Directory A 39 checks for a sufficient balance to complete the request (Step 338). An insufficient balance permits the subscriber to again enter the amount he/she will exchange (Steps 340-342), whereby Session Manager A 31 will terminate the transaction (Step 345) if no new amount is entered. Entry of a new amount returns the process to Step 338 to check for sufficient funds to meet the new request. When the funds are sufficient for the exchange request, a Network 25 sign-on using Steps 50-168 is commenced.

After the Network 25 sign-on, the Network 25 checks if a bank or financial institution has been selected (Step 346). If a bank or financial institution was not chosen earlier, To Teller A 34 must prompt the Network Server 26, through Session Manager A 31, for a list of banks or financial institutions that will provide the exchange (Steps 348-350). The Network Server 26 sends the list (along with rates) to the subscriber through the To Teller A 34 and the To Subscriber A 33 applications (Steps 352-356).

After the prompting (Steps 357, FIG. 47A), the subscriber chooses a bank or financial institution, or ends the transaction (Step 359). When a bank or financial institution is chosen, a session is established with the Teller money module 5 chosen using Steps 190-258 described above. After a session is established, To Teller A 34 sends the amount of dollars to be exchanged for pounds (Step 360) using Steps 2-8 for encrypting and transmitting a message.

To ensure that the subscriber still wants to proceed with the exchange, To Transaction B 49 sends the current exchange rate to the subscriber using process Steps 2-8 (Step 362). At this point, To Subscriber A 33 prompts the subscriber with the bank's exchange rate and if the subscriber does not wish to proceed, the transaction is aborted by following Steps 500-524 (Steps 364-366). If the transaction is to proceed, the dollars are transferred from Transaction money module A 4 to Teller money module B 5 using Steps 750-770 described herein.

Returning to FIG. 48, once the set up of the foreign exchange transaction is accomplished, the proper accounting transactions are posted (Step 368; also illustrated in FIG. 15, Step 1) to reflect the dollars that have just been transferred. A session is established between Teller money module B 5 and a Money Generator module 6 via Steps 190-258. Teller money module B 5 requests the proper pound notes 11 through process Steps 780-792. The notes 11 are returned from the Money Generator module 6 to the Teller money module B 5 using Steps 750-770.

This latter transfer of notes 11 requires a corresponding updating of the accounts involved (Step 370; see also FIG. 15, Step 2). The notes 11 are transferred to the Transaction money module A 4 through process Steps 750-770. To complete the exchange, Transaction money module A 4 commits to Teller money module B 5 who subsequently commits to the Money Generator module 6 using process Steps 690-698.

Foreign Exchange at a Correspondent Bank

Figure 49:
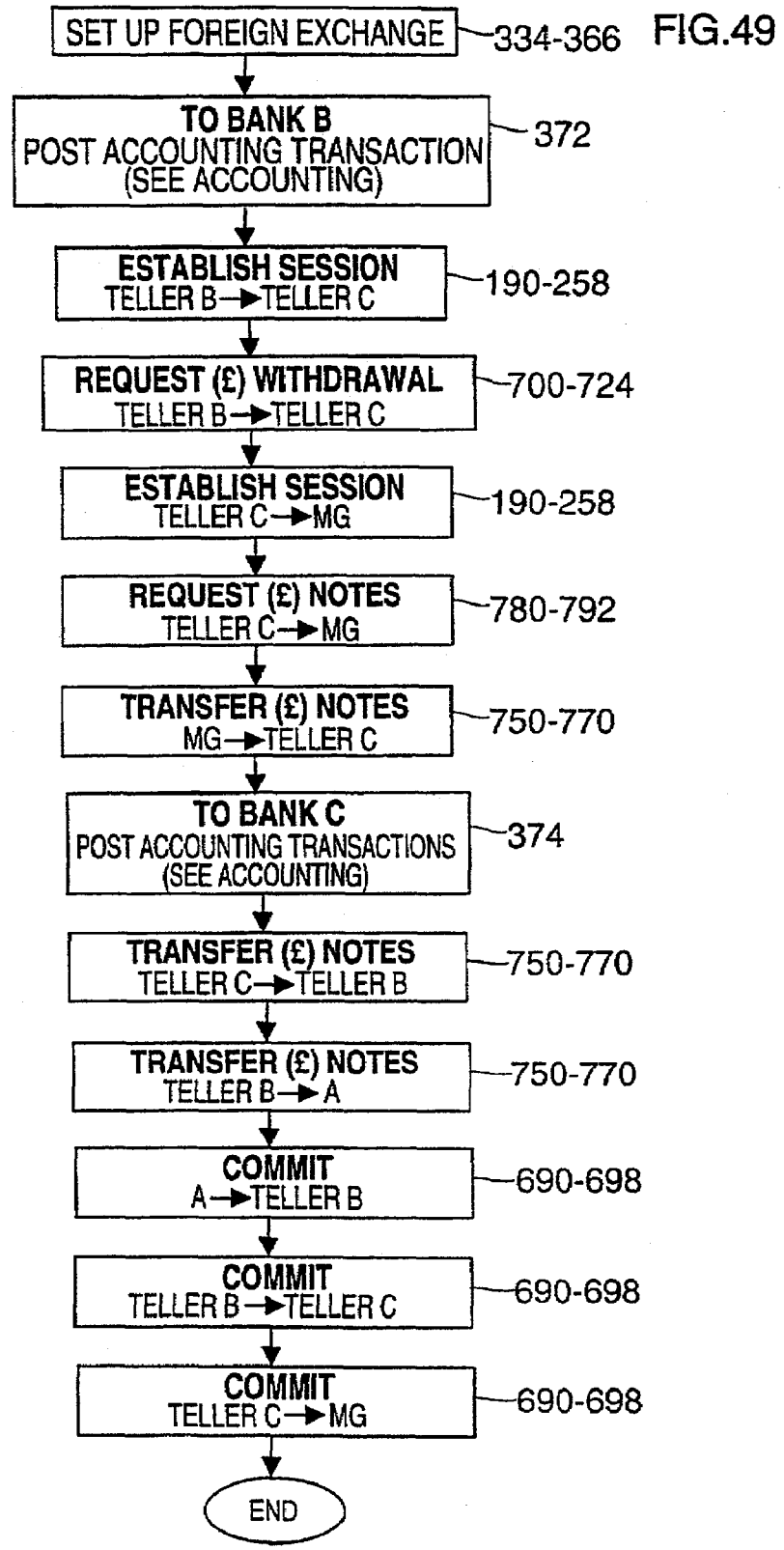

The foreign exchange with a Correspondent Bank 2 is described with the aid of FIG. 49. Initially, the foreign exchange transaction is set up by repeating process Steps 334-366, (FIGS. 47-47A) and updating the proper accounts (see FIG. 16, Steps 1-2) to reflect the notes 11 that have just been transferred from the subscriber's money module 4 to Teller money module B 5 (Step 372). Thereafter, Teller money module B 5 will establish a session with Teller money module C 5 at an Issuing Bank 1, by performing process Steps 190-258.

A withdrawal is requested by Teller money module B 5 to Teller money module C 5 using process Steps 700-724 described above. To obtain the notes 11 for the request, Teller money module C 5 must get them from a Money Generator module 6. Accordingly, a session is established between the two money modules via Steps 190-258, and the notes 11 are requested following process Steps 780-792 outlined above.

The Money Generator module 6 will create the notes 11 requested and transfer them to Teller money module C 5 using process Steps 750-770. This is followed by a posting to the proper accounts in the bank C's systems (Step 374, see FIG. 16, Step 3 for accounting transactions). The notes 11 are now transferred from Teller money module C to Transaction money module A 4 via Teller money module B 5 using for each transfer the process Steps 750-770. Finally, all the sessions must be committed, and Transaction money module A 4 commits to Teller money module B 5 who in turn commits to Teller money module C 5 using Steps 690-698. Teller money module C 5 commits to the Money Generator module 6 to complete the exchange of dollars for pounds.

Updating Notes, Certificate

As mentioned above, it is anticipated that the date of expiration of a note, used as a security measure, may expire while it is stored in a Transaction money module 4. If this occurs, the holder of expired notes 11 will not be able to transfer them to another Transaction money module 4, but the holder may deposit them or exchange them for new notes 11 by transacting with a participating bank or financial institution.

Additionally, if the certificate associated with a particular Transaction money module 4 expires, the subscriber must sign on the Network 25 to update the certificate in order to transact with another money module 4. The following is a description of the process flow for updating an expired certificate or expired notes 11.

Figure 50:
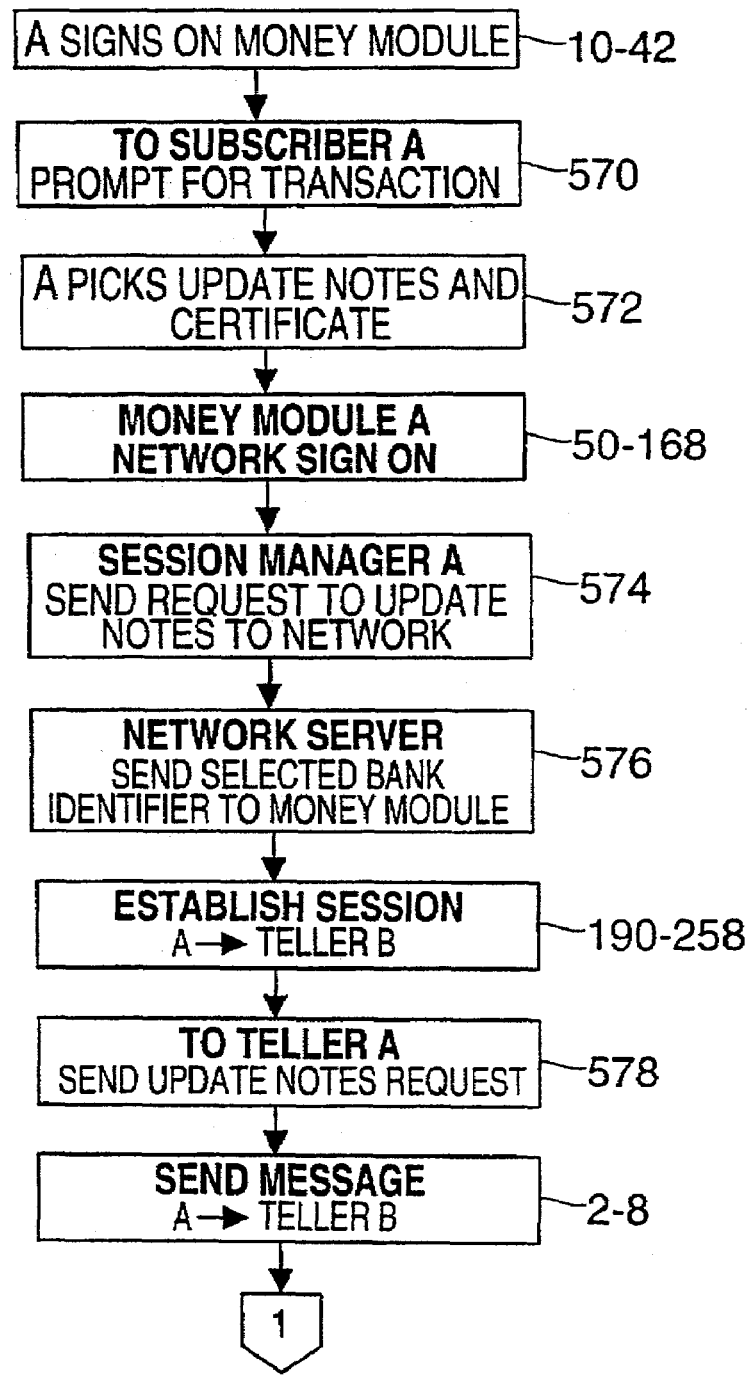
Figure 50A:
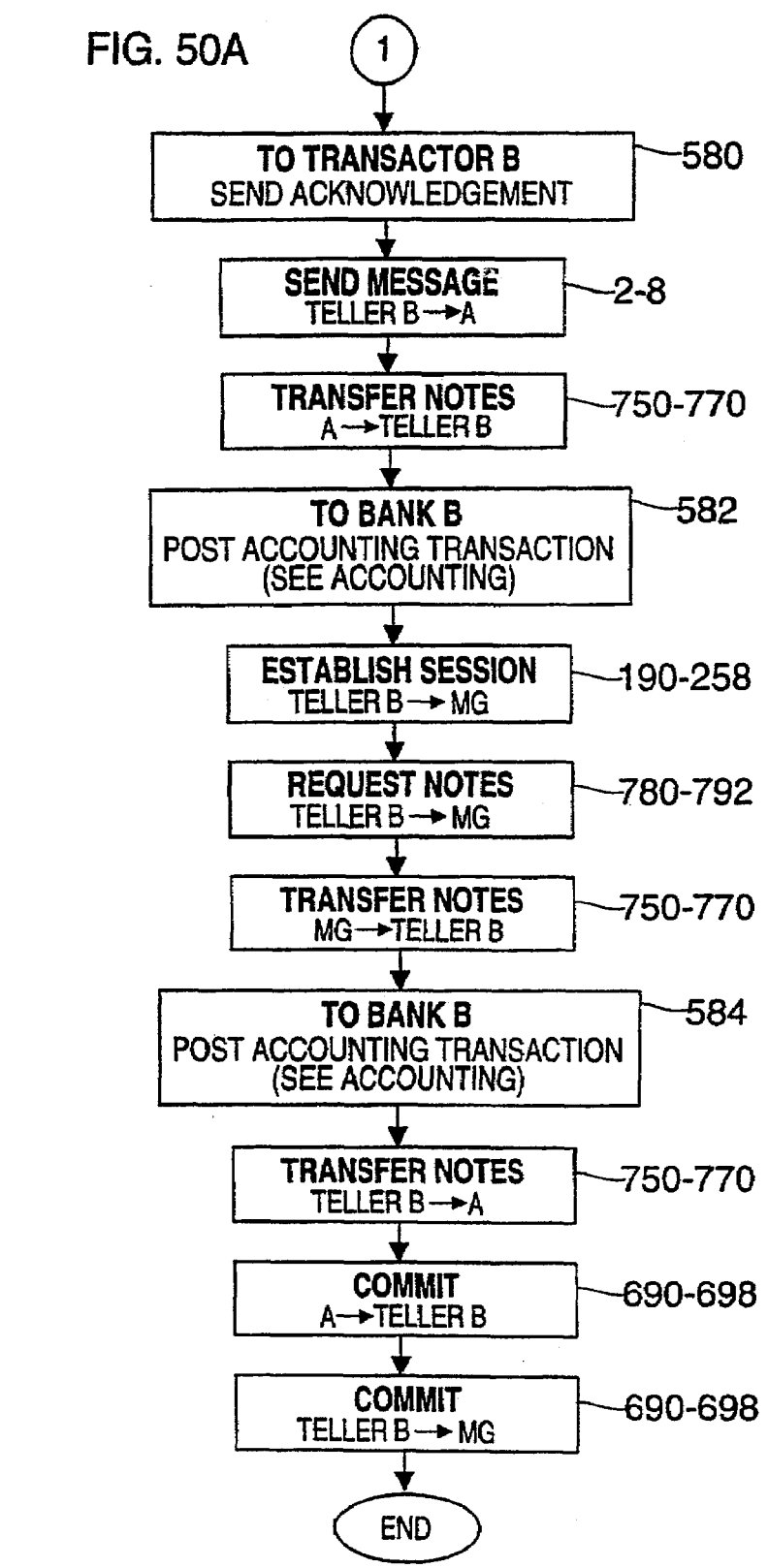

Beginning at the top of FIG. 50, a subscriber signs on to the Transaction money module 4 using the Steps 10-42 described above, and is prompted by To Subscriber A 33 to select a transaction (Step 570). After selecting the transaction for "updating" (Step 572), a sign-on to the Network 25 is performed using Steps 50-168. The sign-on to the Network 25 will perform the updating of the certificate, as described above with reference to FIGS. 33-33A.

For updating the notes 11, the Session Manager A 31 sends the update notes request to the Network 25 (Step 574); The Network Server 26 responds by sending the selected bank identifier back to the Transaction money module 4 (Step 576). Now, a session may be established between the Transaction money module A 4 and a Teller money module B 5 of the bank selected, using Steps 190-258.

Once the session is established, To Teller A 34 sends the request to update notes 11 (Step 578) using the message sending routine in Steps 2-8. To Transactor B 32 responds, FIG. 50A, with an acknowledgement (Step 580) sent using Steps 2-8. Transaction money module A 4 can now transfer the expired notes 11 to Teller money module B 5 using Steps 750-770. Thereafter, the corresponding accounting (see FIG. 24, Step 1) is performed in the bank's records (Step 582), and a session is established between Teller money module B 5 and the Money Generator module 6 through Steps 190-258.

The request notes routine of Steps 780-792 is then performed. The Money Generator module 6 sends the requested notes 11 via Steps 750-770, and updates the accounts at the bank (Step 584; see also FIG. 24, Step 2). Teller money module B 5 takes the updated notes 11 and passes them to Transaction money module A 4 using the same Steps 750-770.

Now that the notes 11 have been updated in the Transaction money module 4, the sessions are completed by having Transaction money module A 4 commit to Teller money module B 5, and having Teller money module B 5 then commit the transaction with the Money Generator module. Finally, both committing routines are performed using Steps 690-698 described above.

The above described process flows illustrate the capability of the invention to provide an improved system for exchanging electronic representations of economic value, while avoiding the inherent limitations of paper based monetary systems.

Operation of the invention has been described primarily with currency notes and credit notes that can be used by subscribers in the same processes. It will be understood that the described system can also be adapted to other monetary instruments. For example, personal and corporate checks and bank drafts could be provided by enhancing several of the Transactor applications. More complicated multiparty payment processes such as letters of credit and banker's acceptances could also be provided with appropriate changes to the system. It may also be possible to adapt the system of the invention to provide corporate financial obligations such as commercial paper.

In another aspect, the present invention contemplates a system for enabling the secure delivery of electronic merchandise with real-time anonymous payment or authorization-based payment. The system allows both the customer and merchant to feel secure that their interests are being served.

Figure 52:
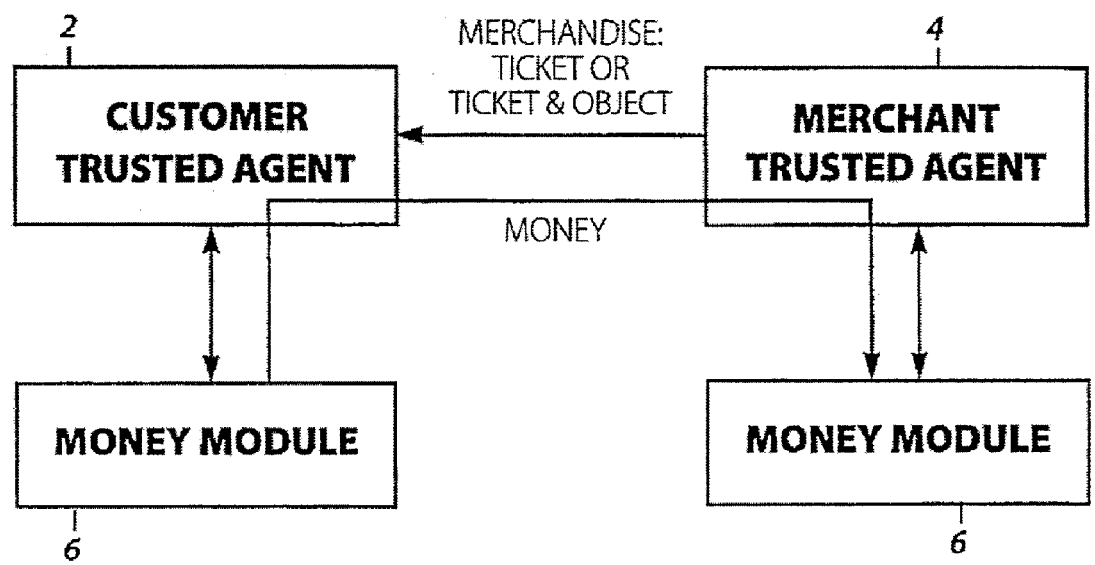
FIG. 52 is a diagram showing the trusted agent/money module interaction.

Referring to FIG. 52, there is shown the basic interaction between system components during an anonymous payment transaction. To achieve the secure exchange of payment for electronic merchandise when buyer and seller are transacting electronically, the present invention introduces trusted agents 2, 4 for both the customer and merchant. A trusted agent is a combination of hardware and software components. It is tamperproof and contains secure protocols which cooperate with a money module 6 to synchronize secure payment to delivery.

The money modules contemplated herein are tamperproof devices capable of storing and transferring electronic money. The electronic money is preferably in the form of electronic notes that are representations of currency or credit. Money modules are also capable of establishing cryptographically secure communication sessions with other devices. The preferred embodiment of the present invention utilizes the transaction money modules described in U.S. Pat. No. 5,453,601, together with any modifications or improvements described hereafter.

Conceptually, a trusted agent is a surrogate actor for an entity who wants to transact remotely (electronically) in a secure way. The trusted agents are under control of transaction protocols and behave in a way calculated to resolve the transaction to the satisfaction of both parties. In order to guarantee the behavior of a trusted agent, the protocols are physically protected. Thus neither party can modify the protocols to the disadvantage of the other party.

The trusted agents exchange electronic merchandise and payment. As shown in FIG. 52, the merchant's trusted agent 4 (MTA) sends electronic merchandise to the customer's trusted agent 2 (CTA). In return, the customer's money module 6 sends electronic money to the merchant's money module 6 via CTA 2 and MTA 4.

Tickets

Electronic merchandise is any goods that can be represented in electronic form, and in the preferred embodiment described herein consists of either a ticket or an encrypted electronic object (EO) and its associated decryption ticket. Referring to FIGS. 1 and 2, a ticket 8 is an electronic item created by a MTA 4 and transferred to a CTA 2 during a purchase transaction. Tickets may be thought of as the property of the trusted agents. A customer whose CTA 2 has just received a ticket 8 may only use that ticket upon successful completion of the transaction.

The present invention supports a variety of ticket types used for various purposes:

1. A decryption ticket is always associated with a particular encrypted electronic object. Examples of electronic objects are computer software, games, movies, or information products like electronic newspapers and books. In this case, the merchant's goods are the electronic objects, which are encrypted by a MTA prior to being delivered to a customer. An encrypted electronic object can be decrypted by unique information in its associated decryption ticket. Together, the encrypted electronic object and its decryption ticket comprise the electronic merchandise transferred by the merchant.

The transferred electronic object is cryptographically secure from inspection and use by the receiving customer or any other third party unless they have access to the decryption ticket. The decryption ticket, in turn, is the "property" of the CTA and may only be used upon successful completion of the purchase transaction.

2. A credential ticket identifies the "owner" and permits specific privileges. Examples of credentials include a driver's license, passport, credit card, debit card, social security card, and corporate seal.

3. A transportation ticket can serve as an airline, rail or bus ticket in electronic form.

4. An event ticket can provide access to various events such as a theater, concert, play, or sporting event.

5. A communications ticket can provide access to various communications services including satellite, cable, radio, cellular telephone and Plain Old Telephone Service (POTS). For example, a communications ticket may be used to unscramble TV or radio broadcasts.

6. A physical object ticket can serve as purchase order, invoice, payment advice, receipt, or title for physical objects.

Other types of ticket are, of course, possible and may be desirable in implementing open electronic commerce in accordance with the present invention.

A trusted agent can not only purchase tickets but can also present them to other trusted agents for a variety of purposes. For example, event tickets can be electronically presented for entry into an arena. Once the ticket holder is inside, the ticket can again be presented electronically for automated directions to his/her seat. A driver's license in ticket form can be presented as proof of identity. A ticket can be presented as proof of purchase of non-electronic goods and exchanged for a physical object, either delivered to the customer or picked up by the customer at a store or warehouse. A credit or debit card ticket can be presented for authorization-based payment. In a purchase dispute, a ticket may be presented as proof of purchase of defective merchandise.

Figure 53:
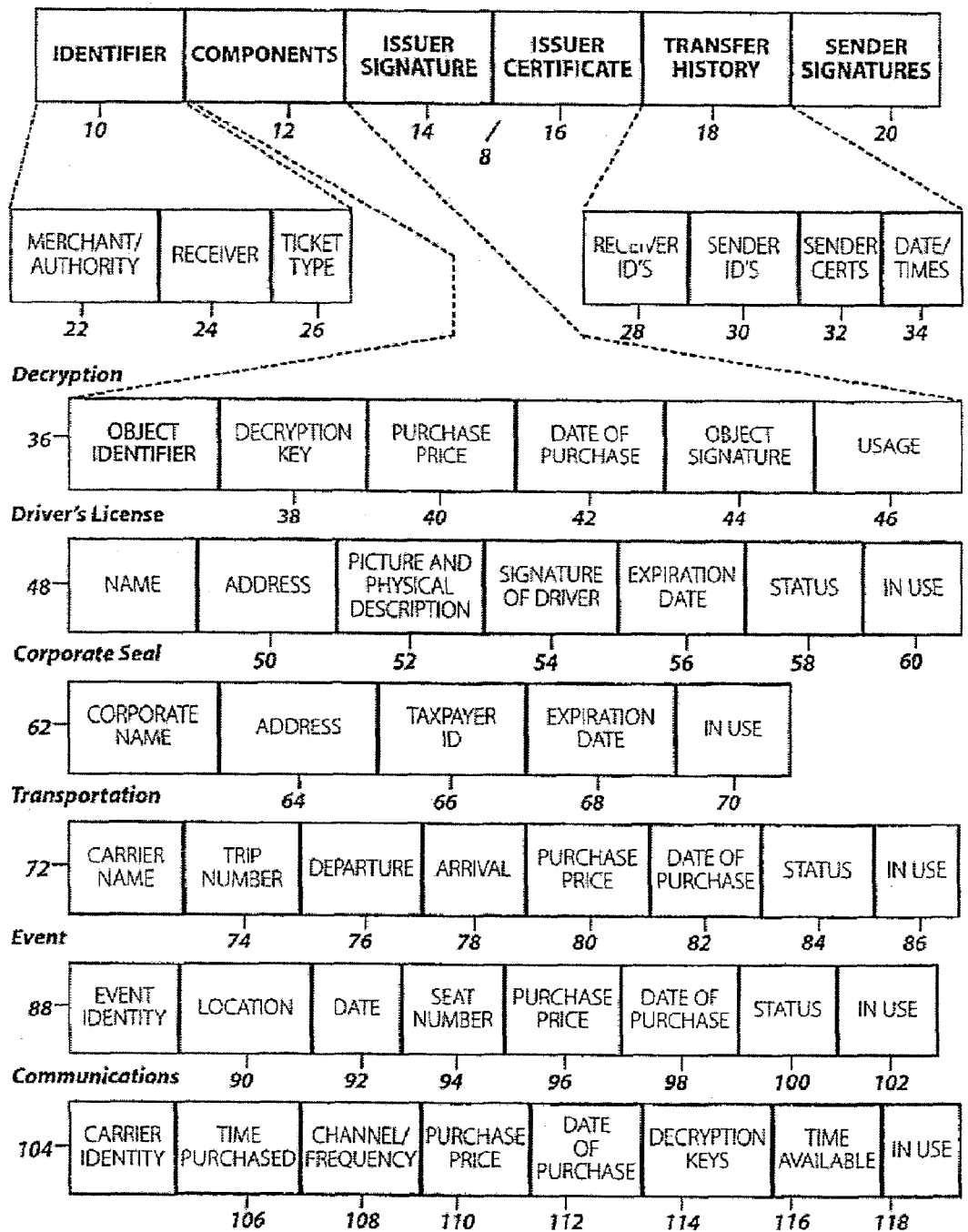
FIG. 53 illustrates the sections and fields of various tickets.

FIG. 53 shows a preferred embodiment of a ticket 8 in which the ticket is comprised of six major sections: Identifier 10, Components 12, Issuer Signature 14, Issuer Certificate 16, Transfer History 18 and Sender Signatures 20. The sections, in turn, are comprised of various information containing fields.

The Identifier section 10 has a field 22 which holds information that identifies the merchant or authority creating the ticket. Such information, for example the merchant's or authority's name, is copied from a merchant or authority credential held by the ticket issuer. The field 22 also contains the expiration date of the merchant or authority credential. A field 24 contains the receiving trusted agent's identification number. The field 24 also contains the expiration date of the ticket receiver's trusted agent credential. A field 26 designates the ticket type (e.g., decryption ticket, event ticket, etc.).

The Components section 12 contains the basic ticket content which varies depending upon the ticket type and its specific purpose. FIG. 53 shows examples of components found in different ticket types.

The Component section 12 of a decryption ticket has an Object Identifier field 36 which uniquely identifies a particular electronic object and may also contain a short description of the electronic object (e.g., title and author). Electronic objects themselves (e.g., movies) are comprised of a header and a body. The header contains an object identifier which ties to the object identifier 36 in the decryption ticket. The header also contains descriptive information which could be presented to the buyer for preview of the object content. The body is the content which the purchaser can interact with, peruse, or watch.

A Decryption Key field 38 contains the information used to decrypt the ticket's associated electronic object. A Purchase Price field 40 has the electronic object's price information. A Date of Purchase field 42 has the date on which the electronic object was purchased. An Object Signature field 44 contains a digital signature of the electronic object. Digital signatures are well known in the art and are used to detect if a signed electronic object has been altered in any way since the time it was signed. Thus, electronic object integrity may be checked. A Usage field 46 specifies restrictions on usage of the electronic object.

A credential ticket such as a driver's license may have: a Name field 48; an Address field 50; a Picture and Physical Description field 52; a Signature of Driver field 54 holding an electronic image of the driver's signature; an Expiration Date field 56; a Status field 58 indicating if the license is valid, suspended, or revoked; and an In Use field 60 indicating when a copy of the ticket has been presented to a MTA 4 for use, so that the original ticket held by the CTA 2 cannot be reused during the presentation period. A credential ticket such as a corporate seal may have: a Corporate Name field 62; an Address field 64; a Taxpayer ID field 66; an Expiration Date field 68; and an In Use field 70.

A transportation ticket may have: a Carrier Name field 72; a Trip Number field 74 specifying for example a flight, train or bus number; Departure and Arrival fields 76, 78 each specifying a time and location; a Purchase Price field 80; a Date of Purchase field 82; a Status field 84 indicating whether the ticket is unused or has already been used; and an In Use field 86.

An event ticket may have: an Event Identity field 88; a Location field 90; a Date field 92; a Seat Number field 94, a Purchase Price field 96, a Date of Purchase field 98; a Status field 100; and an In Use field 102.

A communications ticket may have: a Carrier Identity field 104; a Time Purchased field 106; a Channel/Frequency field 108; a Purchase Price field 110; a Date of Purchase field 112; a Decryption Keys field 114 for decrypting if the communication is encrypted; a Time Available field 116 indicating the remaining value of the ticket; and an In Use field 118.

A physical object ticket (not shown) may serve as a purchase order and contain the following information: reference number, date, customer identifier, list of items to purchase, instructions, and status (on order, invoiced, etc.). A physical object ticket may also serve as an invoice and contain: invoice number, date, PO reference numbers, vendor identifier, and amount. Similarly, a remittance advice would contain: invoice reference numbers, customer identifier, date, and amount paid. A receipt would contain: date, vendor, identifier, list of items or invoice reference numbers, and amount paid.

Trusted agents may be used for retail purchasing of physical objects either in person or remotely. If purchasing in person with the trusted agent, the entire transaction can be accomplished at electronic speeds with no paper for both anonymous and identity-based transactions. For the merchant, this means he can reduce the cost of the customer payment. For the customer, it means more convenience and control, since the transaction time has been reduced and the agent has an electronic list of purchases which can be easily analyzed at a later time.

When purchasing physical objects remotely over the phone or over interactive TV, a nagging restriction for the merchant and customer is that merchandise has to be shipped to the customer's address. This is to secure the merchant from fraud. Payment is usually provided using a credit card or the customer is billed, disclosing the customer's identity.

If the purchase was made using a trusted agent, then the merchandise would not have to be delivered to the customer's address, and the customer would not have to disclose his identity. Anonymity can be accomplished if the customer pays with electronic money at the time of order or receipt of the merchandise. The restriction on delivery location can be lifted in either case. The merchant can be secured from fraud because he/she will get paid before or at the time the goods are delivered. Moreover, the receiver is validated at the time the merchandise is delivered. The customer can feel secure because it will be difficult for a third party to defraud him/her, since they have a secure receipt. Also, the transaction can be disputed using the secure receipt if the merchandise is faulty. At the end of the transaction, both the customer's trusted agent 2 and the merchant's trusted agent 4 will have recorded that the ordered merchandise was paid for and delivered to the correct party.

For commercial transactions, trusted agents provide secure, authenticated, automated transactions and records from order to payment. Vendors can be efficiently paid upon delivery of goods, and customers can have authenticated receipts without the hassle of paperwork. All ancillary systems such as accounts payable, accounts receivable, purchase order, and invoicing can be integrated with trusted agents to provide a seamless, secure system for procurement.

The Issuer Signature section 14 of a ticket 8 holds a digital signature, formed by the ticket creator, over the Identifier and Components sections 10, 12. Such signature is made using a private key belonging to the issuer's trusted agent. The Issuer Certificate section 16 contains a certification by a trusted third party (hereinafter referred to as the "Trusted Agency") used in conjunction with the issuer signature to verify the authenticity of the issued ticket 8. Such certification is in the form of a certificate belonging to the issuer's trusted agent. The general use of certificates and digital signatures is known and described, for example, in D. W. Davies and W. L. Price, Security For Computer Networks (John Wiley & Sons, 1984).

The Transfer History section 18 contains information generated when tickets are transferred between trusted agents after the initial issuing of the ticket 8 by a merchant or authority. A Receiver ID's field 28 contains the receiving trusted agent's identification number. A Sender ID's field 30 contains the sending trusted agent's identification number. A Sender Certs field 32 contains the sending trusted agent's certificate. A Date/Times field 34 contains the date and time of transfer of the ticket 8. As subsequent transfers are made, additional receiver and sender ID's, sender certificates, and dates and times are appended to each field, thus creating a list of transfer history information. It may be noted that the trusted agent ID found in the Receiver field of the Identifier section, should be the same as the first ID in the Sender ID's field.

In addition, whenever a ticket 8 is transferred between trusted agents, the sender digitally signs the ticket over the five preceding ticket sections using a private key belonging to the sender's trusted agent. The Sender Signatures section 20 is then updated by appending the newly created digital signature, thus forming a list of sender signatures.

Transaction Devices

Figure 54:
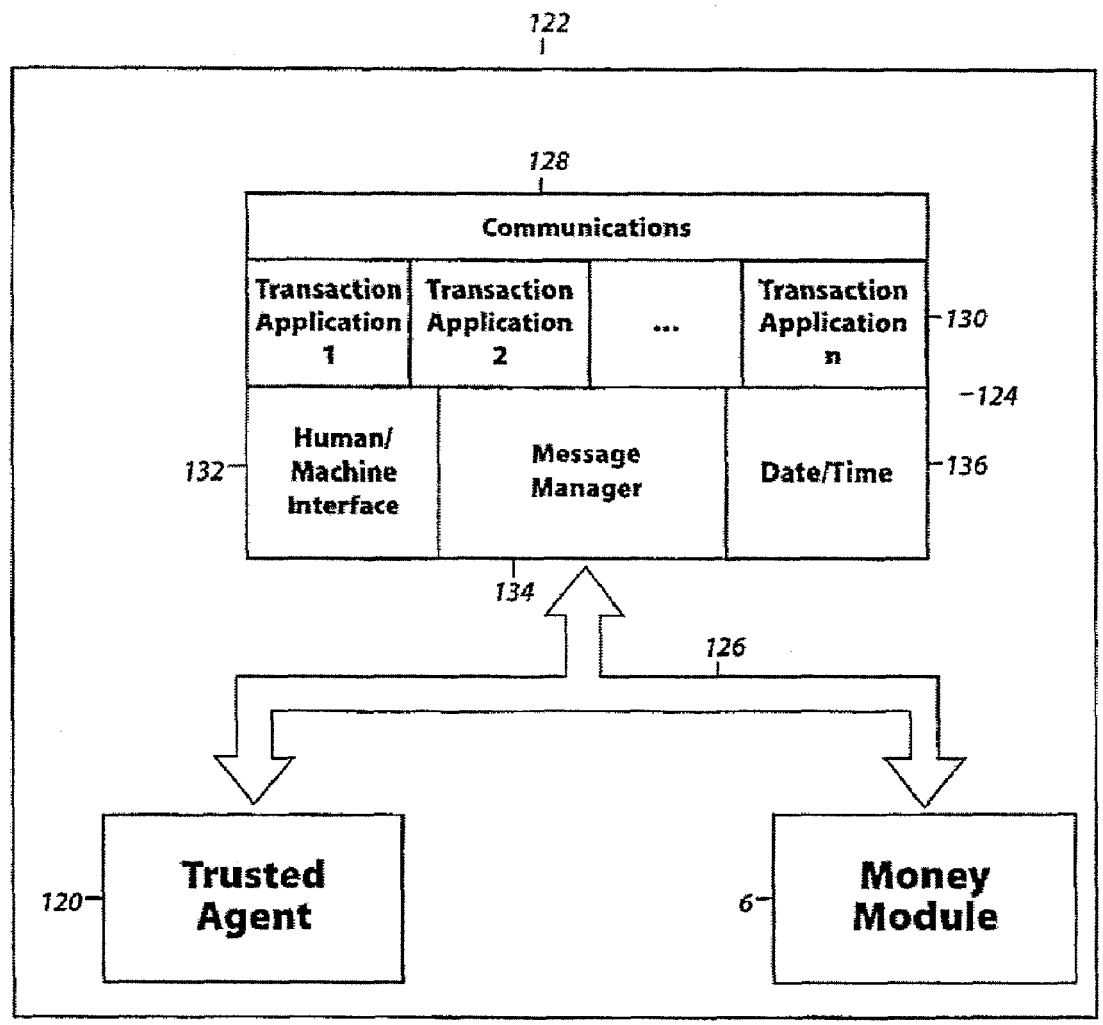
FIG. 54 illustrates the components of a transaction device.

Referring to FIG. 54, a trusted agent 120 is embedded in a transaction device 122. The transaction device 122 is composed of three major components for both the merchant and the customer. There is a host processor 124, a trusted agent 120, and a money module 6. These components are connected, for example, by a bus 126. When trusted agent 120 is a MTA 2, the device 122 is referred to as a merchant transaction device (MTD). When trusted agent 120 is a CTA 4, the device 122 is referred to as a customer transaction device (CTD).

FIG. 54 shows the functional components of the host processor 124. The host processor provides the following functions: Communications 128, Transaction Applications 130, Human/Machine Interface 132, Date/Time 136, and a Message Manager 134.

The Communications function 128 supports communications between the transaction device 122 and the outside world. Such communications may be wired or wireless, broad or narrow band, so long as CTD 2 and MTD 4 communications are compatible. The Communications function 128 sets up the connection between two transaction devices 122, or connects a transaction device to a network for indirect connection to another transaction device or a trusted server.

Transaction Applications 130 may perform a variety of tasks. For example, a transaction application may perform the shopping task by interfacing to a merchant server's catalogue services for browsing activities, choosing the products, and initiating payment and delivery. Another transaction application may provide for the interim storage of electronic objects and possibly execute objects. In order to execute an electronic object, there may be additional object processors depending on the type of electronic object (e.g., movie, book, multimedia game, etc.). In short, a transaction device 122 contains all the processes to choose, buy and possibly use electronic objects, credentials, and other tickets 8, or the processes to sell the same.

The Human/Machine Interface function 132 provides the look and feel of the transaction device 122. It could include a keyboard, mouse, pen, voice, touch screen, icons, menus, etc. The Human/Machine Interface 132 communicates with other functions in the trusted agent 120 and the money module 6 through the message manager 134. In some applications a Human/Machine Interface 132 may not be necessary, for example, in a fully automated merchant transaction device.

The Date/Time function 136 is set by the owner of the transaction device 122 and includes date, time and time zone. The Date/Time information is fed to the embedded trusted agent 120 whenever the trusted agent is opened for use.

The Message Manager 134 routes inter-host messages (i.e., messages between transaction devices) and messages among the host processor 124, the trusted agent 120 and the money module 6.

Trusted Agents

Figure 55A:
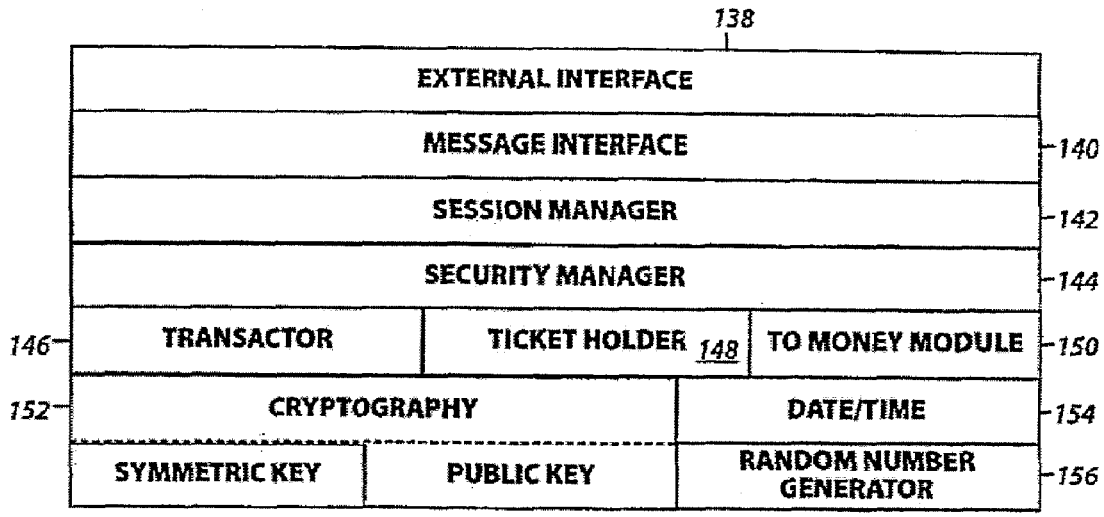
FIGS. 55A-55D illustrate the functional components of trusted agents.
Figures 55B, 55C:
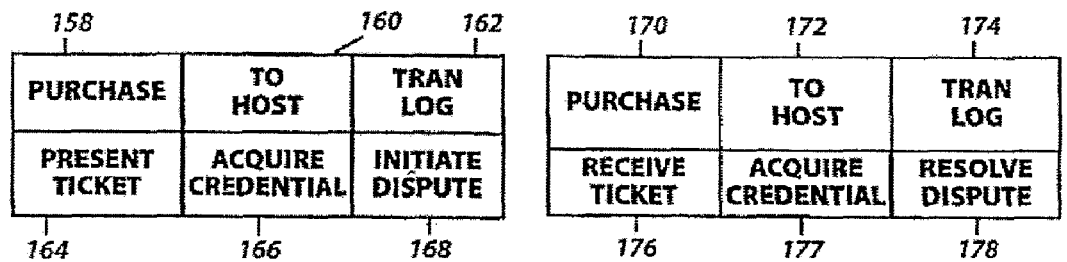

FIG. 55A shows the functional components of a trusted agent 120. The contemplated system for open electronic commerce uses three types of trusted agent 120 which differ in certain unique Transactor functions 146 that they provide. FIG. 55B shows the transactor functions found in a CTA 2. FIG. 55C shows the transactor functions found in a MTA 4. FIG. 155D shows the transactor functions found in an Authority Trusted Agent (ATA) which, in turn, is embedded in an Authority Transaction Device (ATD). ATDs are associated with credential issuing authorities such as the Department of Motor Vehicles.

An External Interface function 138 provides physical communication with the host processor 124 and the money module 6 of the transaction device 122 in which the trusted agent 120 is embedded. A Message Interface function 140 processes and routes inter-agent and intra-agent messages. A Session Manager function 142 sets up and breaks down inter-agent sessions and agent to trusted server sessions. A Security Manager function 144 maintains security information (e.g., a trusted agent certificate and an untrusted agent list) and establishes secure communication with a counter-party trusted agent (via the host processor 124) and with the local money module 6 within the same transaction device 122. The Transactor function 146 provides the protocols to perform a transaction. Customer, merchant and authority transactors are used for CTAs, MTAs and ATAs, respectively.

FIG. 55B shows the customer transactor functions. A Purchase function 158 exchanges payment for tickets 8 and electronic objects. A To Host function 160 provides an interface to the transaction device's host processor 124. A Present Ticket function 164 presents tickets 8 to obtain information or services. An Acquire Credential function 166 interacts to receive a credential ticket. A Tran Log function 162 maintains a log of trusted agent transactions. Both CTAs 2 and MTAs 4 maintain a transaction log which stores the following information: transaction type (e.g., ticket type); a pre-transaction ticket image; a post-transaction ticket image; dispute information including the date of dispute (as maintained by each trusted agent in the dispute dialog), status, and merchant resolution (e.g., replace, refund, denied); and recertifying information (e.g., date of recertification). An Initiate Dispute function 168 presents electronic merchandise if a customer is dissatisfied.

FIG. 55C shows the merchant transactor functions. A Purchase function 170 exchanges tickets 8 and electronic objects for payment. A To Host function 172 provides an interface to the transaction device's host processor 124. A Receive Ticket function 176 processes a received ticket 8 to provide service or information. An Acquire Credential function 177 obtains a merchant credential. A Tran Log function 174 maintains a log of trusted agent transactions. A Resolve Dispute function 178 receives tickets 8 and electronic objects to resolve a customer complaint.

Figure 55D:
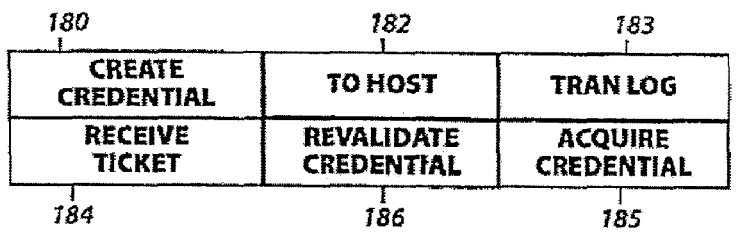

FIG. 55D shows the authority transactor functions. A Create Credential function 180 constructs and delivers credential tickets to a requester. A To Host function 182 provides an interface to the transaction device's host processor 124. A Receive Ticket function 184 processes a received ticket 8 to provide service or information. A Revalidate Credential function 186 accepts a current credential and reissues the credential with a new expiration date. A tran Log function 183 maintains a log of transactions. An Acquire Credential function 185 obtains an authority credential.

Referring again to FIG. 55A, a To Money Module function 150 communicates with the money module 6 in the same transaction device 122 to provide payment. A Cryptography function 152 provides public key and symmetric key cryptographic functions. Any well known public and symmetric key cryptography techniques may be used, for example, RSA and DES. A Ticket Holder function 148 creates tickets 8 in a MTA 4 or stores and retrieves tickets 8 in a CTA 2. A Random Number Generator function 156 generates random numbers to produce cryptographic keys. A Date/Time function 154 manages the date and time delivered from the host processor 124 to date tickets 8 and validate certificates and presented tickets. Current clock information is fed to the trusted agent 120 every time the trusted agent is opened (i.e., signed on for use) and maintained until the trusted agent is closed.

System Overview

Figure 56:
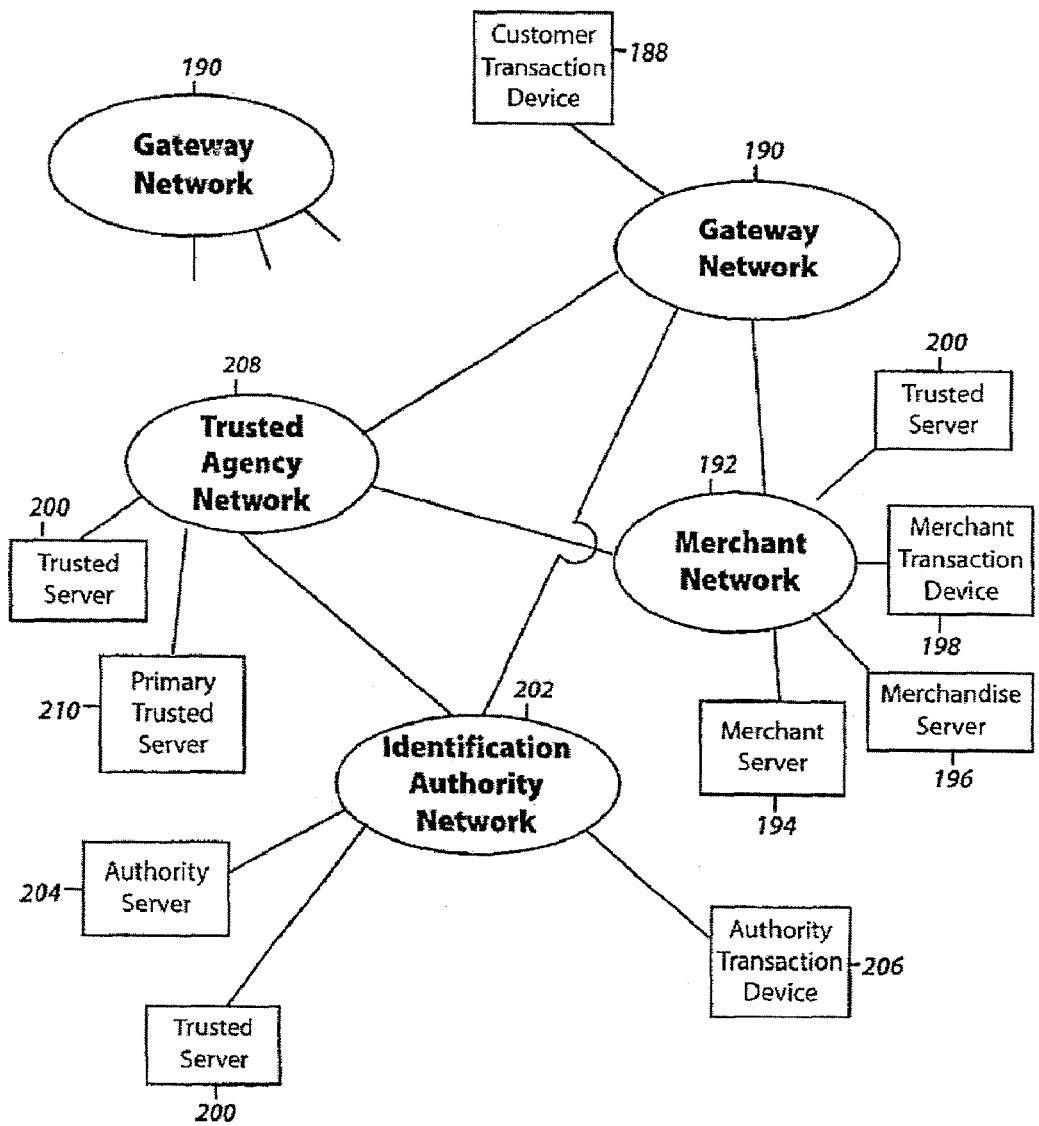
FIG. 56 is a diagram showing the network structure of a system for open electronic commerce.

FIG. 56 shows the general network architecture of the contemplated system for open electronic commerce. Customer transaction device 188 can communicate with a merchant through an gateway network 190 without revealing the owner. Thus, customer can travel the networks anonymously, paying each in real-time for access. They can search out merchants' electronic space and enter it anonymously, select the item for purchase, and deliver payment in real-time. The system also provides for secure authorization-based payment via credit or debit card. This is accomplished by the customer presenting credit or debit card information stored within the trusted agent 120 as a credential.

In the preferred embodiment, the gateways 190 provide CTDs 188 with access to local merchant networks 134 for commerce and local identification authority networks 192 for acquiring and revalidating credentials (e.g., driver's licenses, credit cards, etc.) Merchant networks 192 may consist of merchant servers 194 that provide a merchandise catalogue, merchant transactor devices 198 to deliver goods for payment, and merchandise servers 196 which constitute an electronic warehouse. Merchant networks 192 also preferably have trusted servers 200 for distributing security information.

Identification authority networks 202 may have authority servers 204 which manage a database of credentials and an authority transaction device 206 which issues and revalidates credentials. Examples of identification authorities connected to networks 202 are foreign offices, departments of motor vehicles, banks, and the Social Security Administration. Identification authority network: 202 also have trusted servers 200 for distributing security information.

System Security

With reference to FIG. 56, security for the open electronic commerce system is provided by a network of trusted servers 200 situated at a Trusted Agency Network 208, at merchant networks 192, and at identification authority networks 202. The trusted servers 200 are tamper-proof processors that perform four primary functions: certification of trusted agents 120, distribution of untrusted lists, distribution of primary trusted server public key lists, and resolution of customer/merchant disputes.

Figure 57A:
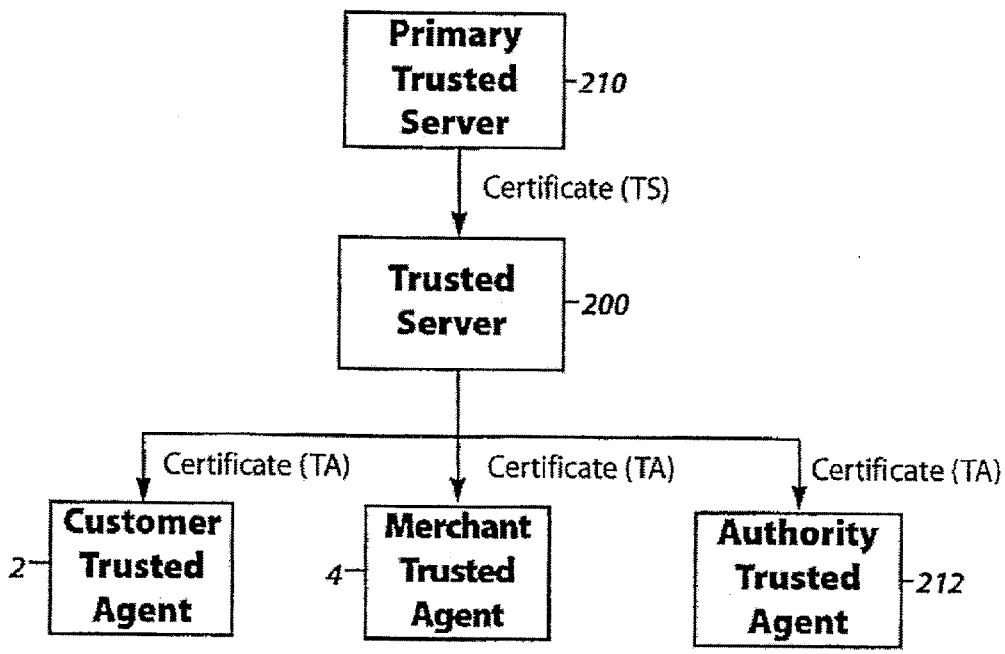
FIG. 57A is a diagram showing the security hierarchy for the trusted agents.

FIG. 57A shows the system security hierarchy. At the top of the hierarchy, and located at the Trusted Agency Network 208, are primary trusted servers 210 which certify and provide trusted server certificates (cert(TS)) to all the trusted servers 200 in the system.

Each primary trusted server 210 has its own public key and corresponding private key. The primary trusted server public keys are commonly shared by all trusted servers 200 and trusted agents 120 in the system. These public keys are stored in a primary trusted server public key (PTS(PK)) list. The term "public" key as used here and throughout the specification, does not imply that the key is known to the public at large. In this case, for example, the public key is known only to all trusted servers 200 and trusted agents 120 and is sealed within their tamper-proof housings. This limited sense of "public" provides added security to the system as a whole.

Beneath the primary trusted server 210 on the security hierarchy are the trusted servers 200 which may be located throughout the overall commerce system. The trusted servers 200 provide trusted agent certificates (cert(TA)) to the trusted agents 120 (i.e., CTAs 2, MTAs 4, and ATAs 212).

The Trusted Agency guarantees the protocols and physical protection of each trusted agent 120 in the system. Trusted agents 120 are manufactured in a physically secure environment under control of the Trusted Agency. The components are fabricated, assembled, and loaded with software in this environment. The trusted agents 120 are then tamper-proofed and can only be communicated with through their external interface.

At initialization, each trusted agent 120 is placed in communication with a trusted server 200. The trusted server 200 assigns each trusted agent 120 a unique identification number TA(id). Then the trusted server 200 requests the trusted agent 120 to generate a public and private key pair. The trusted agent 120 generates the key pair and passes its public key (TA(PK)) to the requesting trusted server 200. The trusted server 200 incorporates this information and the TA(id) into a trusted agent certificate cert(TA) and passes it back to the trusted agent 120 along with a PTS(PK) list, and an untrusted list. Finally, the trusted agent 120 tests its newly received certificate and makes sure the certificate is valid.

These initialization steps are performed only once, prior to distribution of the trusted agent 120 to the public. Upon purchase, a trusted agent 120 is personalized by its owner via biometrics or secrets (e.g., a personal identification number (PIN) is chosen).

In a similar fashion, a trusted server 200 is initialized by a primary trusted server 210. Upon conclusion of trusted server initialization, each trusted server 200 holds a trusted server certificate (cert(TS)) containing a unique trusted server identification number (TS(id)) and a trusted server public key (TS(PK)). The trusted server 200 also holds the private key corresponding to its public key TS(PK), a PTS(PK) list, and an untrusted list.

A cert(TS) is encrypted by a primary trusted server 210 and carries a unique identification number (PTS(id)) for that primary trusted server 210 in the clear. A cert(TA) is encrypted by a trusted server 200 and carries that trusted server's certificate (cert (TS)) for validation.

The structures of the cert(TS) and the cert(TA) are as follows:

$$Cert(TS) = \underbrace{(E_{PTS}[TS(id)][TS(PK)\|expire\ data\|\sigma_{PTS}(X)\|PTS(id)}_{x}$$

$$Cert(TA) = \underbrace{(E_{TS}[TA(id)][TA(PK)\|expire\ data\|\sigma_{TS}(Y)\|Cert(TS)}_{y}$$

Where:
PTS=Primary Trusted Server
TS=Trusted Server
TA=Trusted Agent
‖=Concatenate
id=identification number
PK=Public Key
σ=digital signature
Cert=Certificate
E=Algorithm with private key used for encrypting and for creating digital signature The certificate validation protocols are:
1) Validate Cert (TS)
  a) $D_{PTS}(E_{PTS}(X\|\sigma_{PTS}(X)))=X\|\sigma_{PTS}(X)$
  b) Check if date is valid
  c) Check if $D_{PTS}(\sigma_{PTS}(X))=h(X)$
2) Validate Cert (TA)
  a) Validate Cert (TS)
  b) $D_{TS}(E_{TS}(Y\|\sigma_{TS}(Y)))=Y\|\sigma_{TS}(Y)$
  c) Check if date is valid
  d) Check if $D_{TS}(\sigma_{TS}(Y))=h(Y)$ Where:
h=hash function used in creating and checking digital signature (i.e., one-way function)
D=Algorithm with public key used for decryption and for checking digital signature
σ=E°h Note: E and D may also be used for decrypting and encrypting, respectively, when applied in other applications.

The Trusted Agency in addition to its role during system component fabrication and initialization also provides ongoing security for the system by recertifying trusted agents 120 and trusted servers 200 and providing system-wide information on updated untrusted lists and updated PTS(PK) lists.

Trusted agents 120 and trusted servers 200 must be periodically recertified because their certificates are given an expiration date. Trusted servers 200 periodically recertify in order to protect overall system security by changing their cryptographic keys. A time limit is placed on a trusted agent's ability to transact so that if someone breaks into the system he can only use his trusted agent 120 for a predetermined maximum time period (e.g., three months) before needing to recertify. During recertification trusted agents 120 connect with the Trusted Agency to get security information (e.g., updated untrusted lists) and to receive an updated PTS(PK) list.

The public key associated with each primary trusted server 210 never changes. If new primary trusted servers 210 are implemented or old primary trusted servers 210 decommissioned then these corrections to the PTS(PK) list are broadcast to the trusted servers 200 on the Trusted Agency Network 208. These list change are then distributed to the trusted servers 200 at the identification authority networks 202 and the merchant networks 192, and may be requested by and transferred to trusted agents 120 at any time. Also, list changes are always distributed to trusted agents 120 when their certificates expire and they recertify. New PTS (PK)s are distributed before they are implemented in order to eliminate the possibility of a trusted agent 120 not having them when needed for certificate validation.

The identification numbers of trusted agents 120 or trusted servers 200 which have been identified as untrusted are placed on an untrusted list and distributed by the primary trusted servers 210 to the trusted servers 200 and ultimately to the trusted agents 120 in the same fashion as the PTS(PK) list. Merchants which are deemed untrustworthy will have their trusted servers 200 decommissioned by the Trusted Agency and made identifiable to the trusted agents 120.

Figure 57B:
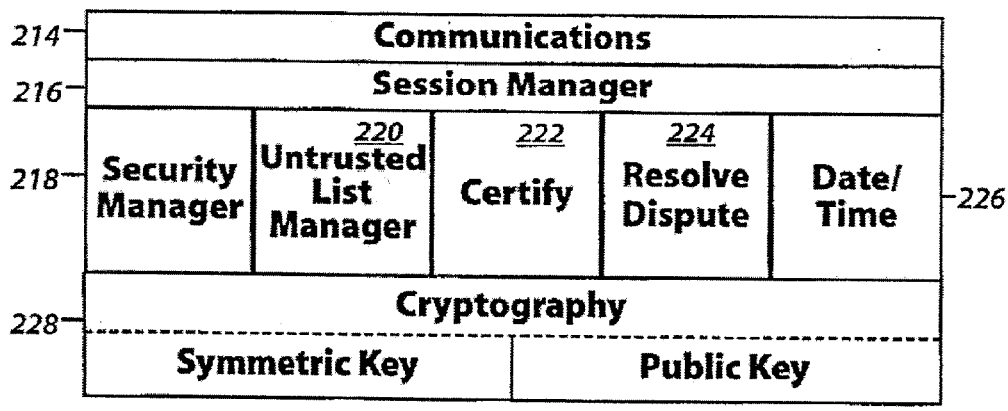
FIG. 57B illustrates the functional components of a (primary) trusted server.

FIG. 57B shows the functional components of a trusted server 200 or a primary trusted server 210. A Communications function 214 provides an interface to the local network. A Session Manager function 216 manages inter-server and server-to-agent sessions. A Security Manager function 218 establishes secure communications. An Untrusted List Manager 220 provides updates to the list of untrusted agents, servers and organizations. A Certify function 222 manages the recertification of trusted agents 120 for the trusted server 200. In the case of the primary trusted server 210, this process recertifies trusted servers 200. A Resolve Dispute function 224 receives tickets 8 and electronic objects (merchandise) to resolve customer complaints. A Cryptography function 228 provides symmetric and public key cryptography to secure communications and authenticate counterparties. A Date/Time function 226 provides current date, time, and time zone information for certificate validation.

The question of trusted agent 120 malfunction or loss is similar to the loss of a receipt, airline ticket, etc. In cases where loss or malfunction need to be overcome, transactor identities may be needed. This can be accomplished by using credentials which identify the customer and the trusted agent 120. The credential and ticket 8 can be saved separately as secondary records. In case of agent malfunction the customer can pursue a dispute as he/she would today by presenting these secondary records.

Flow Charts

The flow charts shown in the following figures use the designations "A" and "B" to indicate two interacting trusted agents 120, or a trusted agent 120 to trusted server 200 interaction. The same designations A and B, may also be applied to the host processor 124 or money module 6 associated with a particular trusted agent 120 (i.e., within the same transaction device 122). The flow charts indicate the functional component primarily responsible for carrying out a given task. For example, SECURITY MANAGER A means that the recited task is carried out by the Security Manager function 144 (see FIG. 55A) in trusted agent A.

The flow charts also call subroutines some of which use parameter designations X and Y. For example, ESTABLISH SESSION A→B is a call to the subroutine Establish Session. The Establish Session flow chart should then be followed with the understanding that X=A and Y=B throughout the flow.

Abort and Commit

In transaction processing of the type contemplated it is desirable to pass electronic items such as tickets 8 and electronic notes between two parties, while maintaining a zero-sum game. In other words, it is undesirable to duplicate electronic items so that at the completion of an electronic transaction there are twice as many items as before the transaction. Similarly, it is undesirable to lose electronic items so that there are fewer items after the transaction than before. For example, if at the start of a transaction A has an electronic ticket 8 and wishes to pass it to B, then it is desirable to ensure that at the end of the transaction, B has the electronic ticket 8 and A does not have the electronic ticket 8. In the real world, however, it is possible to have two other outcomes, namely, both A and B have the same electronic ticket 8 (duplication) or neither A nor B have the electronic ticket 8 (loss).

In order to render the likelihood of duplication or loss negligible, the transaction protocol must take into account the possibility that natural or intentional events may interrupt a typical transaction flow. A natural interruption is exemplified by a breakdown of the communications link between A and B during the transaction. To minimize the possibility of duplication or loss from such a random event the window of opportunity for creating a duplication or loss must be minimized. In order to minimize intentional interruptions (i.e., overt attacks), it is desirable to eliminate the economic incentive for such an attack. For example, if an attacker could only lose the tickets and or the money by trying to interrupt a transaction, the attacker would have no incentive to initiate the attack in the first place.

These concepts are embodied in the efficient transaction protocols of the described system. In particular, it is desirable to ensure consistent abort and commit states between the two transacting trusted agents 120 (or money modules 6). For example, if A commits to a transaction, then B should also commit to the transaction; or, if A aborts the transaction, then B should also abort the transaction. To achieve consistency and minimize the possibility of duplication or loss (in the event there is an inconsistency) the transaction protocols take into account the order and timing of A's and B's committing to a given transaction.

FIG. 58 shows two subroutines, Abort and Commit. The abort subroutine is internally executed within a given trusted agent 120 when the transaction it is involved in fails. The abort subroutine rolls back or returns the trusted agent 120 to the exact state it was in prior to being involved with the failed transaction. Conversely, the commit transaction is internally executed within a given trusted agent 120 when the transaction it is involved in has been successfully completed. The trusted agent 120 therefore records the completed transaction in its transaction log and is now ready for a new transaction. For example, during a ticket transfer transaction an electronic ticket 8 is passed from trusted agent A to trusted agent B. Since at this point in time neither A nor B have committed or aborted the transaction, A provisionally retains the ticket 8 while B provisionally also has the ticket 8. If both A and B commit then A will delete its ticket 8, and B's retention of the ticket 8 will no longer be provisional. If, however, both A and B abort then A will retain its ticket 8 and the ticket 8 that B was retaining provisionally will be deleted by rolling back the transaction. Note that the deletion operation may be implemented in various ways well known in the art. As mentioned before, it is desirable to minimize the possibility of one trusted agent 120 committing while another trusted agent 120 aborts because this may in some limited circumstances result in duplicating or losing electronic items.

A similar situation exists with respect to money modules 6 exchanging electronic notes. During a purchase transaction, electronic notes are passed from money module A to money module B, so that A provisionally decrements its electronic notes (by the amounts transferred) while B provisionally has electronic notes (in the transferred amount). If both A and B commit then A will retain the notes in the decremented amounts and B's retention of the electronic notes will no longer be provisional.

Figure 58A:
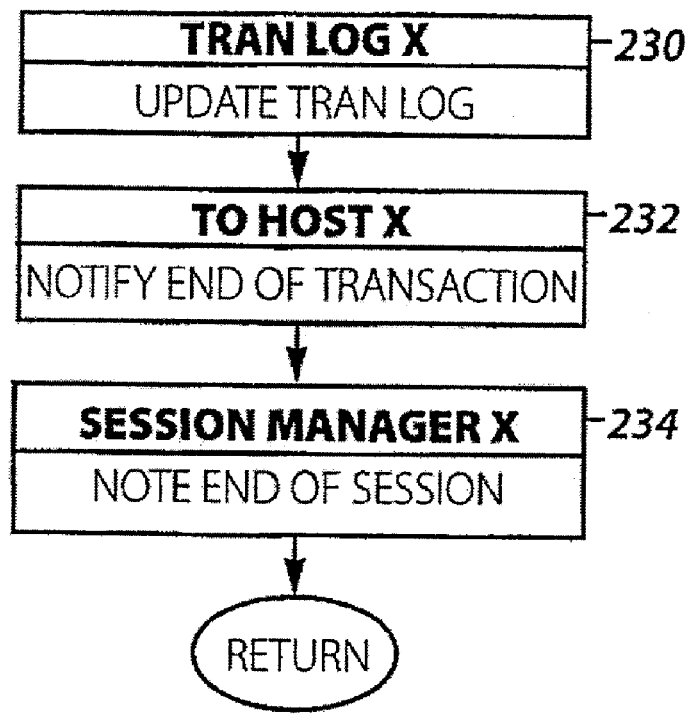
FIG. 58A illustrates a Commit protocol.

FIG. 58A shows the commit subroutine. Tran Log X updates the transaction log. To Host X notifies the host that the transaction is complete. Session Manager X notes the end of the session. (Steps 230-234).

Figure 58B:
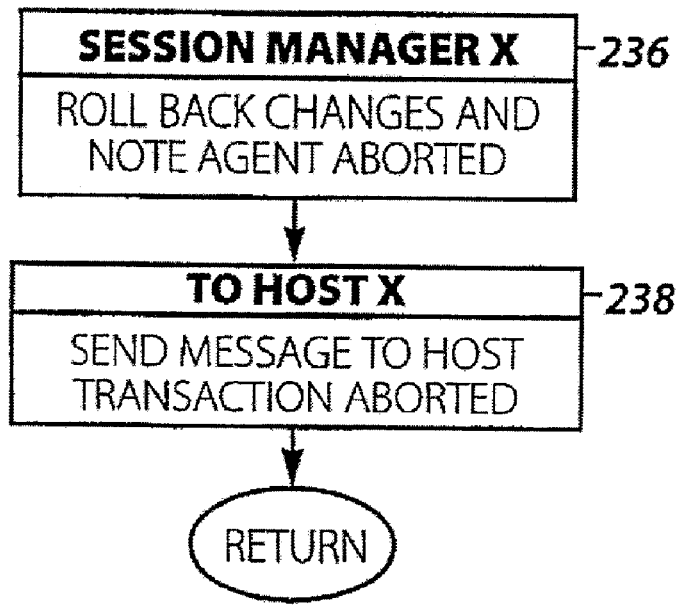
FIG. 58B illustrates an Abort protocol.

FIG. 58B shows the abort subroutine. Session Manager X rolls back changes and notes agent aborted. The Session Manager keeps track of what has been done since the start of a session and when rolling back undoes these steps. To Host X sends a message to the host that the transaction is aborted. (Steps 236-238).

The abort subroutine may be called directly from a flow diagram, for example, when a trusted agent 120 determines that a certificate is not valid. The abort subroutine may also be called when an expected action does not occur. In particular, when two trusted agents 120 are communicating, they will be monitoring a time-out protocol. For example, after a first trusted agent 120 has sent a message to a second trusted agent 120, the Session Manager of the first trusted agent (A) will set a timer for a reply if a reply is required. The Session Manager may also number the message sent. This number would appear in the reply message from the Session Manager of the second trusted agent (B).

If the timer expires before the message has been received, then Session Manager A will query Session Manager B to determine if the transaction is still running in B. If B does not reply then Session Manager A will abort the transaction. If a reply is received that the transaction is proceeding, then the timer will be reset to a new time. If A queries B a predetermined number of times without receiving a reply to the original message, then A will abort the transaction. A similar time-out function exists in the money modules 6.

Recertify Trusted Agent

Figure 59A:
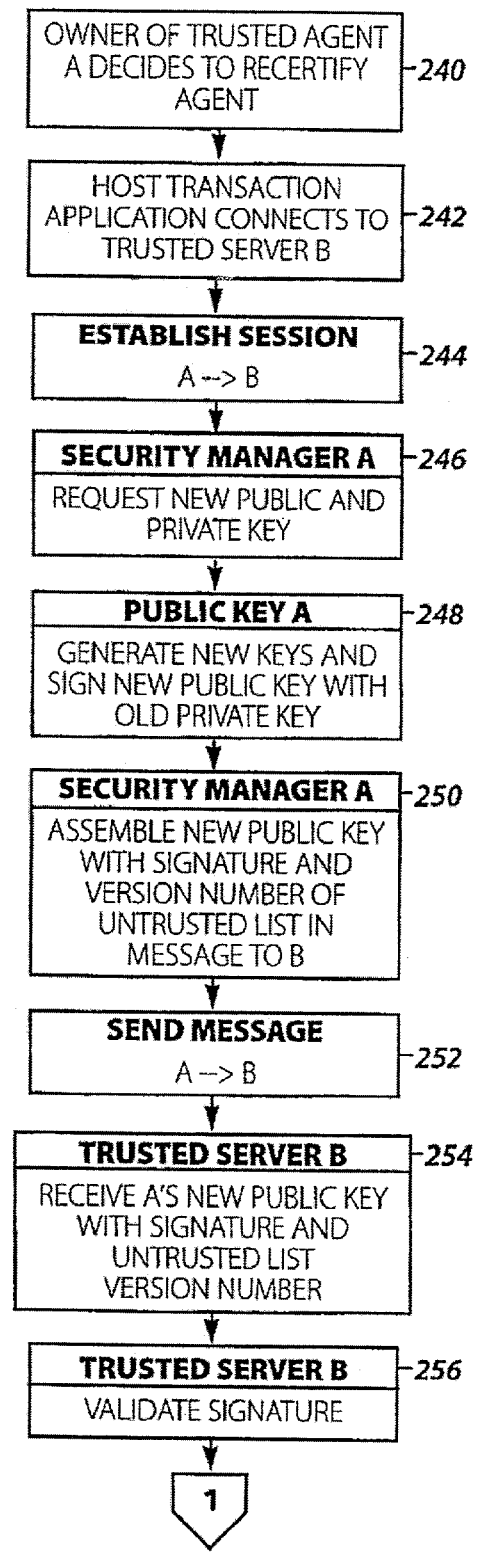
FIGS. 59A-59C illustrate a Recertify Trusted Agent protocol.
Figure 59B:
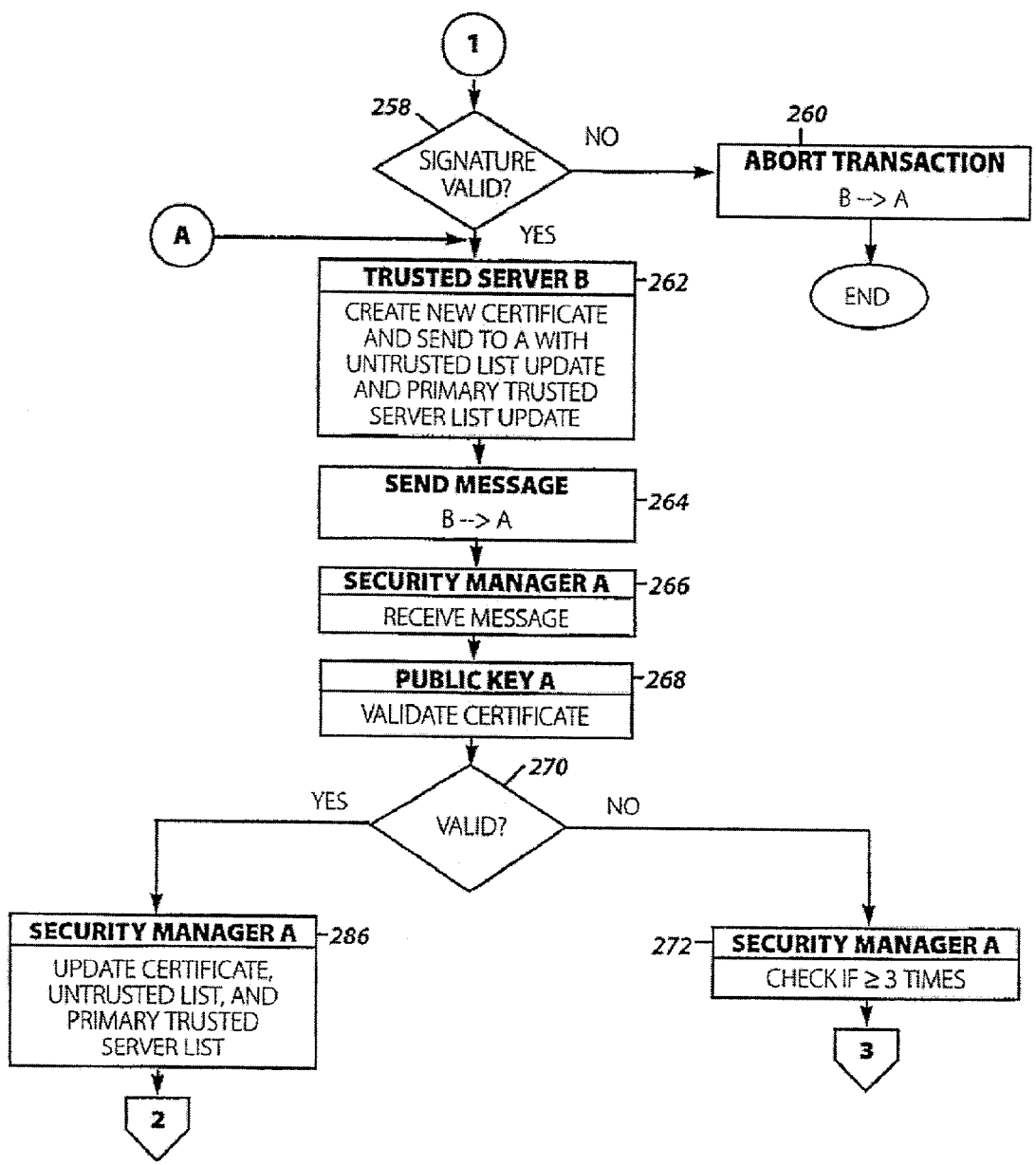
Figure 59C:
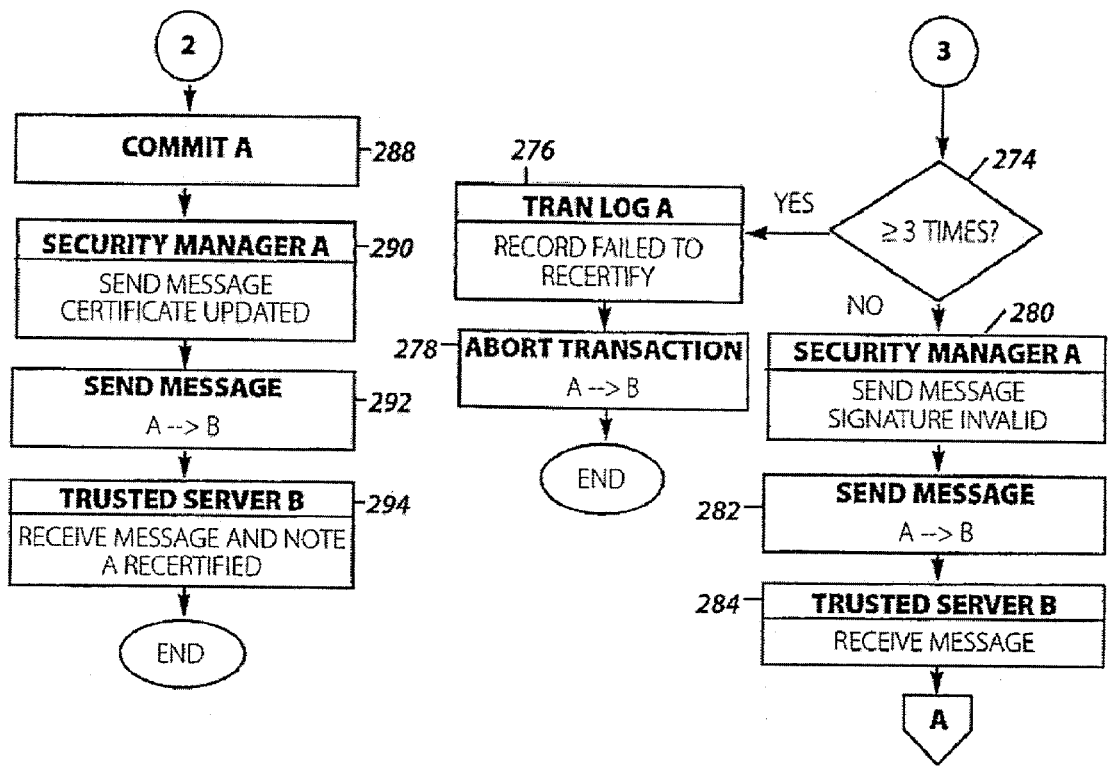
Figure 60A:
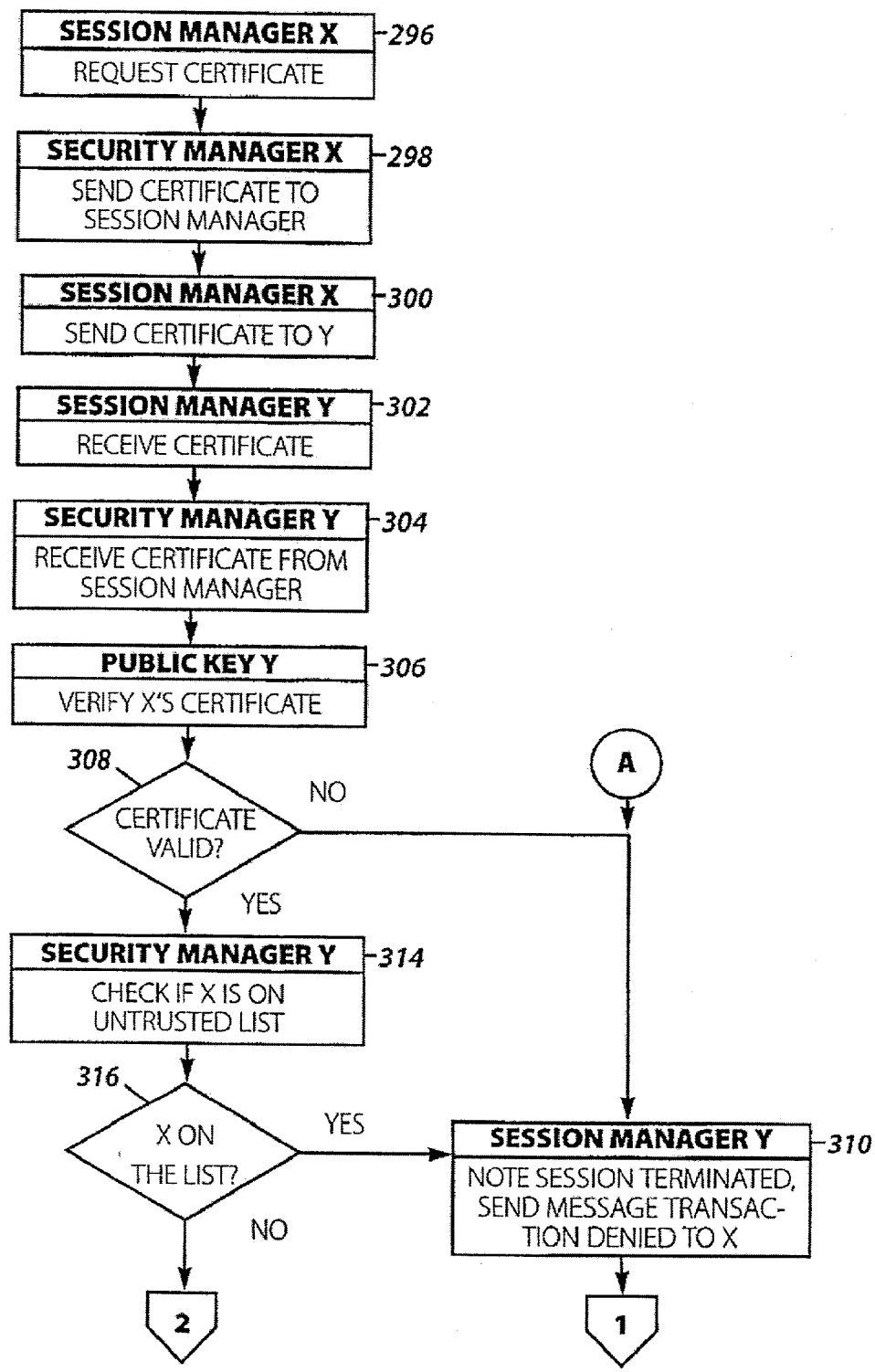
FIGS. 60A-60E illustrate an Establish Session protocol.
Figure 60B:
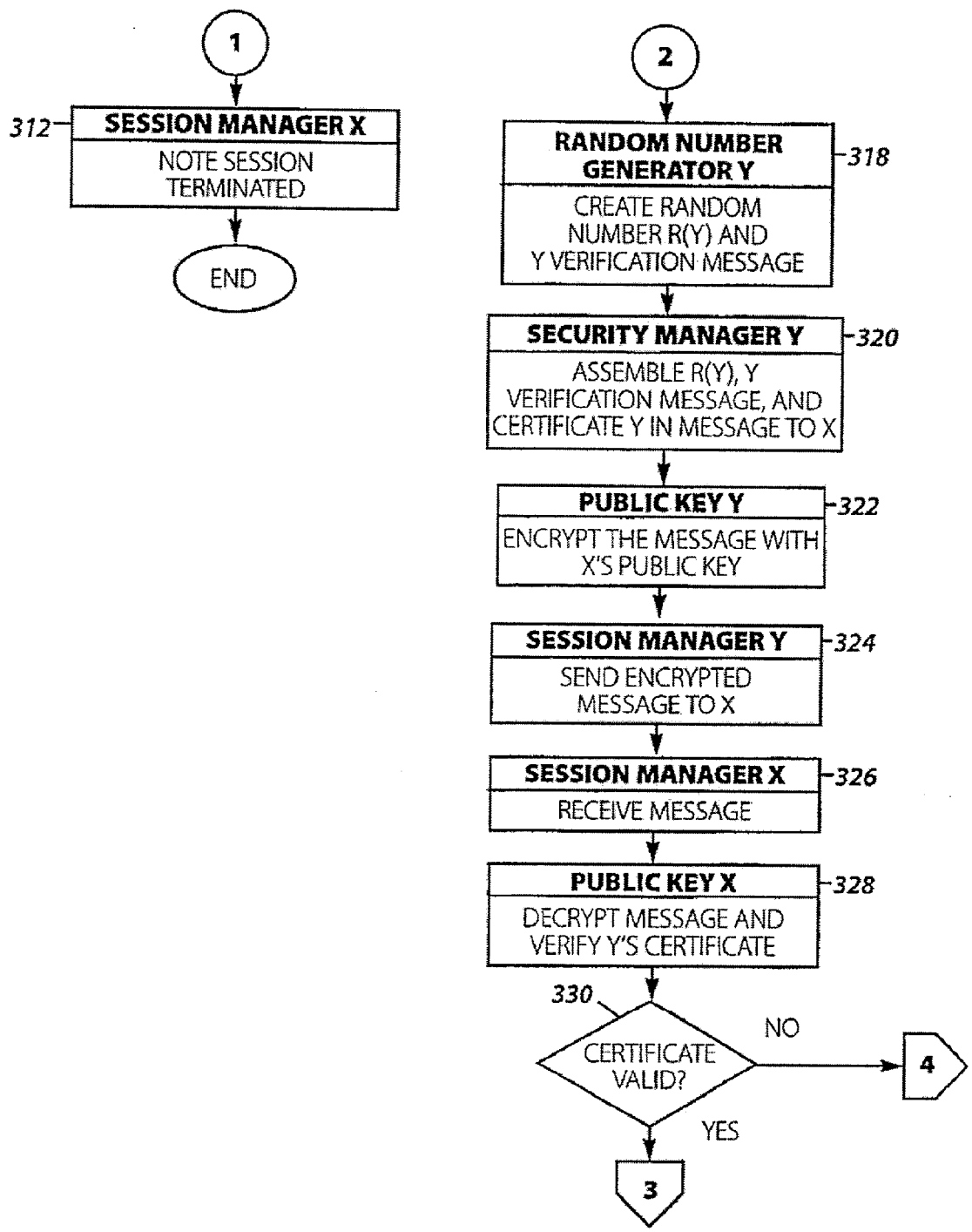
Figure 60C:
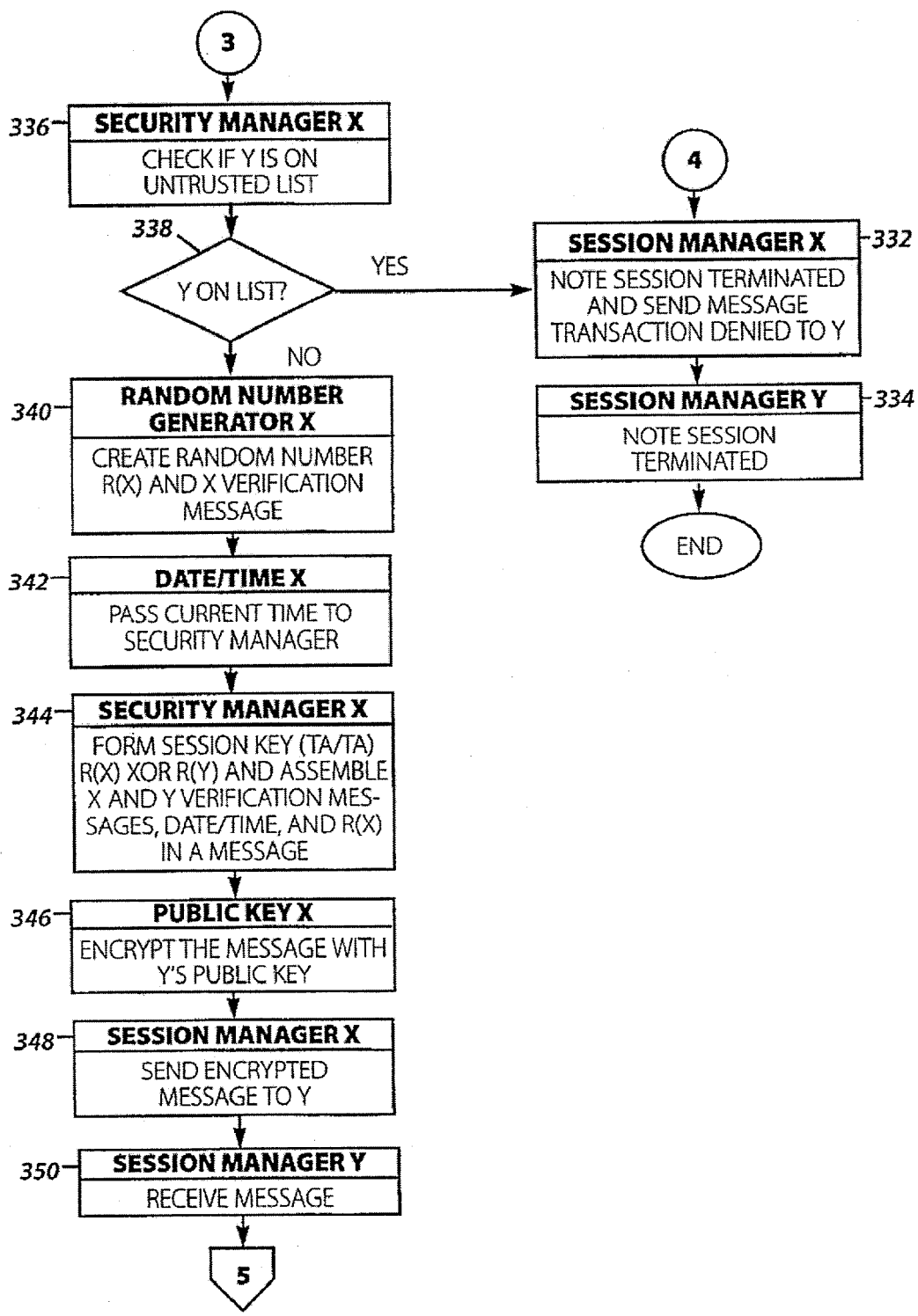
Figure 60D:
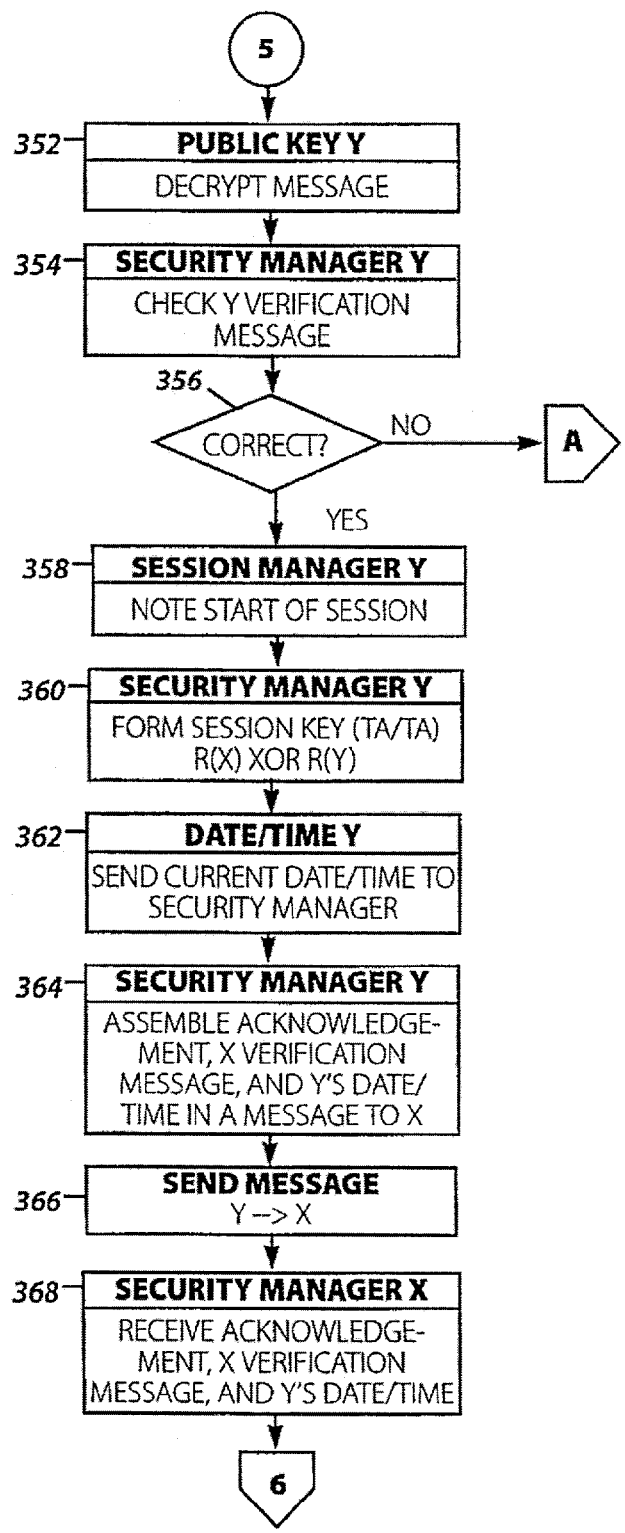
Figure 60E:
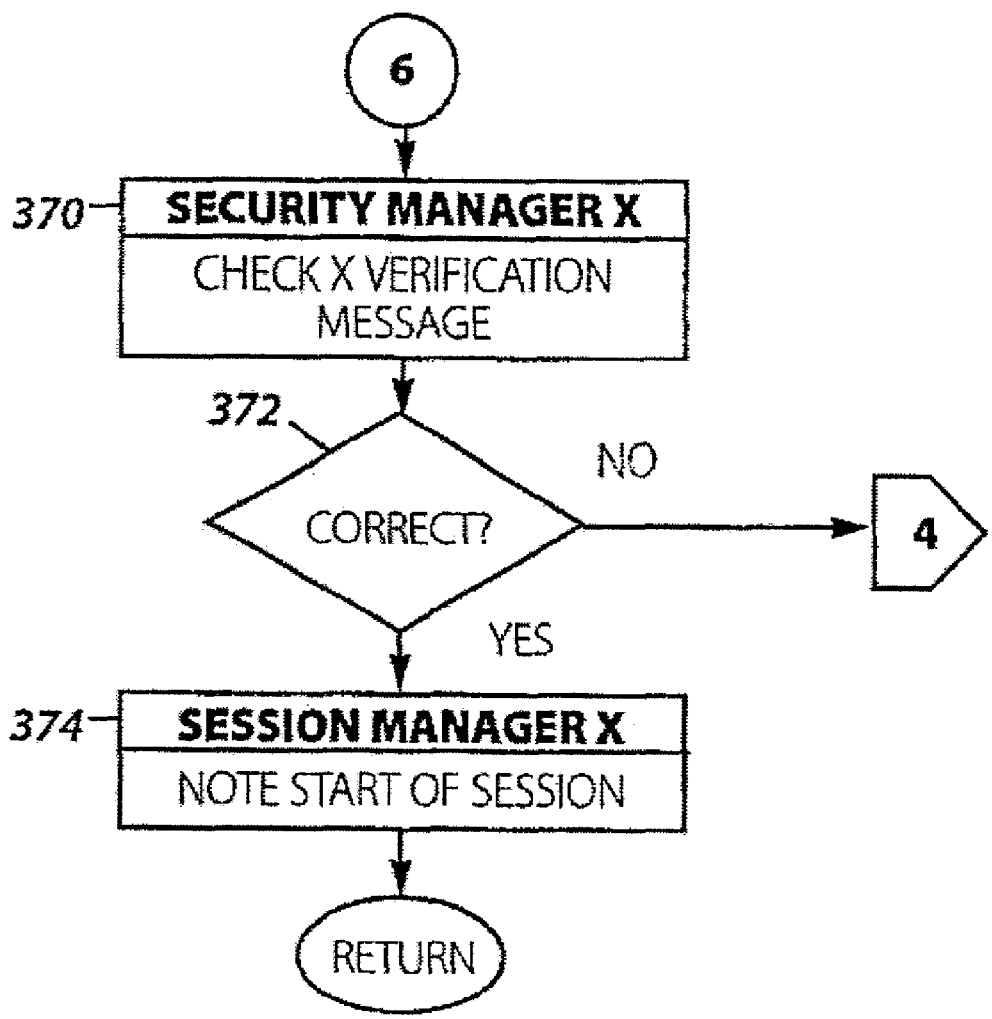

FIG. 59 shows the flow chart for recertifying a trusted agent. When the owner of trusted agent A decides to recertify his agent, typically after or near the expiration date of his current cert(TA), a host transaction application from the host processor embedded in his transaction device connects to a trusted server B (steps 240-242).

An Establish Session subroutine is called (step 244) for setting up a cryptographically secure communication channel between trusted agent A and trusted server B. Referring to FIG. 60, the Session Manager of trusted agent A requests and then receives A's certificate (i.e., cert(TA)) from the Security Manager (steps 296-298). Session Manager A then sends cert(TA) to trusted server B's Session Manager which, in turn, passes it along to its Security Manager (steps 300-304).

Trusted server B's Public Key function verifies the cert (TA) by using the validation protocols described in the previous discussion on system security (steps 306-308). However, there is the caveat that when Establish Session is called during a revalidation procedure, the previously described certificate validation protocol does not terminate if it determines that the certificate has expired—that is the reason the trusted agent is recertifying.

If cert(TA) is not valid, then Session Manager B notes that the session is terminated and informs Session Manager A that the transaction is denied. Session Manager A also notes that the session is terminated. (Steps 310-312). If cert(TA) is valid, then Security Manager B checks if trusted agent A is on the untrusted list (steps 314-316). If trusted agent A is untrusted, then the session is terminated (steps 310-312).

If A is not on the untrusted list, then Random Number Generator B creates a random number R(B) and also a B verification message (step 318). The random number R(B) will eventually be used to form a session key. The B verification message is a random number used by B to protect against message replay. Next, Security Manager B assembles R(B), the B verification message, and cert(TS) into a message for trusted agent A (step 320). Public Key B encrypts the message using trusted agent A's public key (TA(PK)) which trusted server B received with A's cert(TA) (step 322). Session Manager B sends the encrypted message to A's Session Manager (steps 324-326).

Public Key A decrypts the message using its private key (corresponding to its public key) and verifies the validity of cert(TS) (steps 328-330). If cert(TS) is invalid, then Session Manager A notes the session as terminated and sends a transaction denial message to B whose Session Manager also notes the session as terminated (steps 332-334). If cert(TS) is valid, then Security Manager A checks if trusted server B is on the untrusted list (steps 336-338). If trusted server B is on the list, the session is terminated (steps 332-334).

If B is not on the untrusted list, then Random Number Generator A creates a random number R(A) and an A verification message (e.g., another random number) (step 340). The Date/Time function passes the current date and time to the Security Manager (step 342). Dates and times are exchanged by A and B for eventual recording in their trans logs during commits. Security Manager A then forms and stores session key (TA/TA) by exclusive ORing random numbers R(A) and R(B) (step 344). Session key (TA/TA) is used to encrypt communications between two trusted agents 120 or between a trusted agent 120 and a trusted server 200 (as in the present case where Establish Session is called during recertification). Session Manager A assembles a message containing the A and B verification messages, the date/time information, and R(A) (step 344). Public Key A encrypts the message with trusted server B's public key (received by A in cert(TS)) and sends the encrypted message to trusted server B's Session Manager (steps 346-350).

Public Key B decrypts the received message using its secret key (corresponding to its public key) (step 352). Security Manager B checks if the B verification message received from A is the same B verification message it previously sent to A (steps 354-356). If it is not the same, then the session is terminated (steps 310-312). If it is the same, then Session Manager B notes the start of the session (step 358).

Security Manager B forms session key (TA/TA) by R(A) XOR R(B) and then stores the session key (step 360). At this point, both A and B have created and stored the same session key (i.e., session key (TA/TA)) to be used for their current interaction in recertifying A's certificate. Next, Date/Time B sends its current date and time information to Security Manager B (step 362). Security Manager B assembles a message having an acknowledgement to A, the A verification message, and B's date/time information (step 364). The Send Message subroutine is then called (step 366) for sending the message from B to A.

Figure 61:
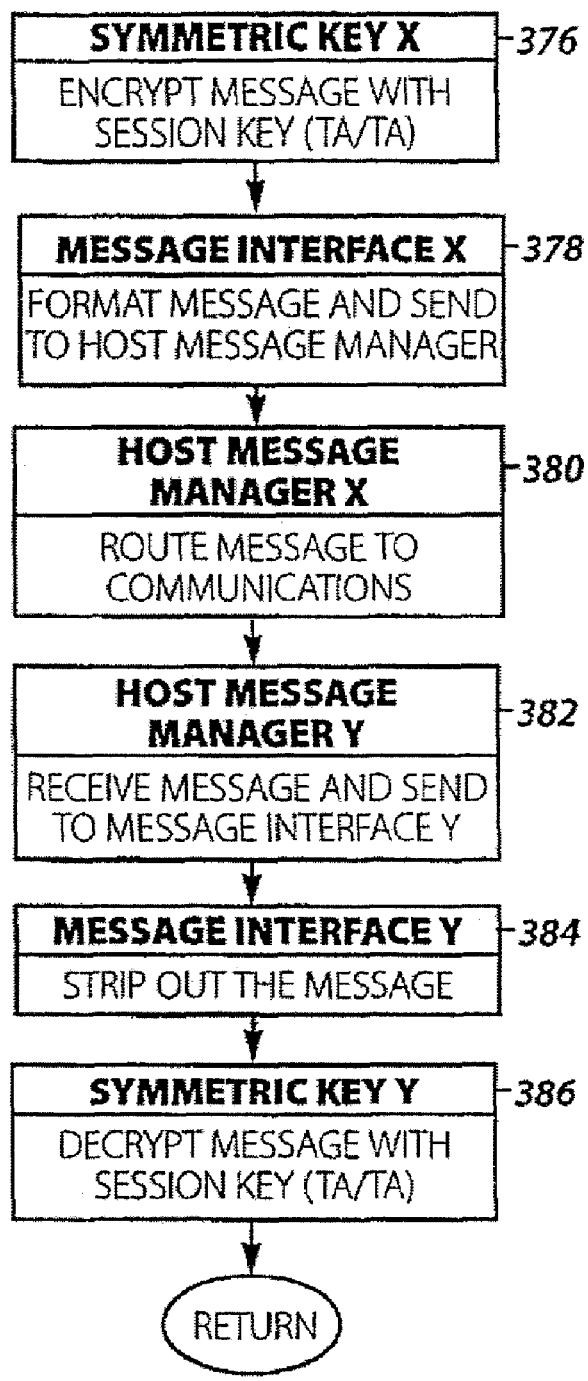
FIG. 61 illustrates a Send Message protocol.

Referring to FIG. 61, trusted server B's Symmetric Key function encrypts the message using session key (TA/TA) (step 376). Message Interface B then formats the message and sends it to the host processor's Message Manager (step 378). Host Message Manager B then routes the message via Communications to Host Message Manager A in trusted agent A's host processor (step 380). Host Message Manager A then sends the message to trusted agent A's Message Interface which strips out the message (steps 382-384). Symmetric Key A decrypts the message with session key (TA/TA) thus completing the secure communication of a message between trusted server and trusted agent using session key (TA/TA) (step 386).

Referring again to FIG. 60, Security Manager A receives the acknowledgement, A verification message and B's date/time information (step 368). Security Manager A checks if the A verification message is the same A verification message which A previously sent to B (steps 370-372). If it is not the same, then Session Manager A terminates the session (steps 332-334). If it is the same, then Session Manager A notes the start of the session (step 374).

Referring back to FIG. 59, the recertification process continues. Security Manager A requests Public Key A to generate a new public and private key pair and, further, to digitally sign the new public key with the old private key (corresponding to the old TA(PK)) (steps 246-248). As has been described, a trusted agent's public and private key pair are used in establishing a session between trusted agents 120 or between a trusted agent 120 and a trusted server 200.

Security Manager A assembles a message containing the new signed public key and the current version number of the untrusted list (step 250). Each change to the untrusted list will have a new version number, so the trusted server need only send changes to the list. The message is then sent to trusted server B using the Send Message subroutine (step 252). Trusted server B receives the message and checks if the digital signature on the new public key is valid (by using trusted agent A's old public key) (steps 254-258). If the signature is not valid, then the Abort Transaction subroutine (step 260) is called.

Figure 62:
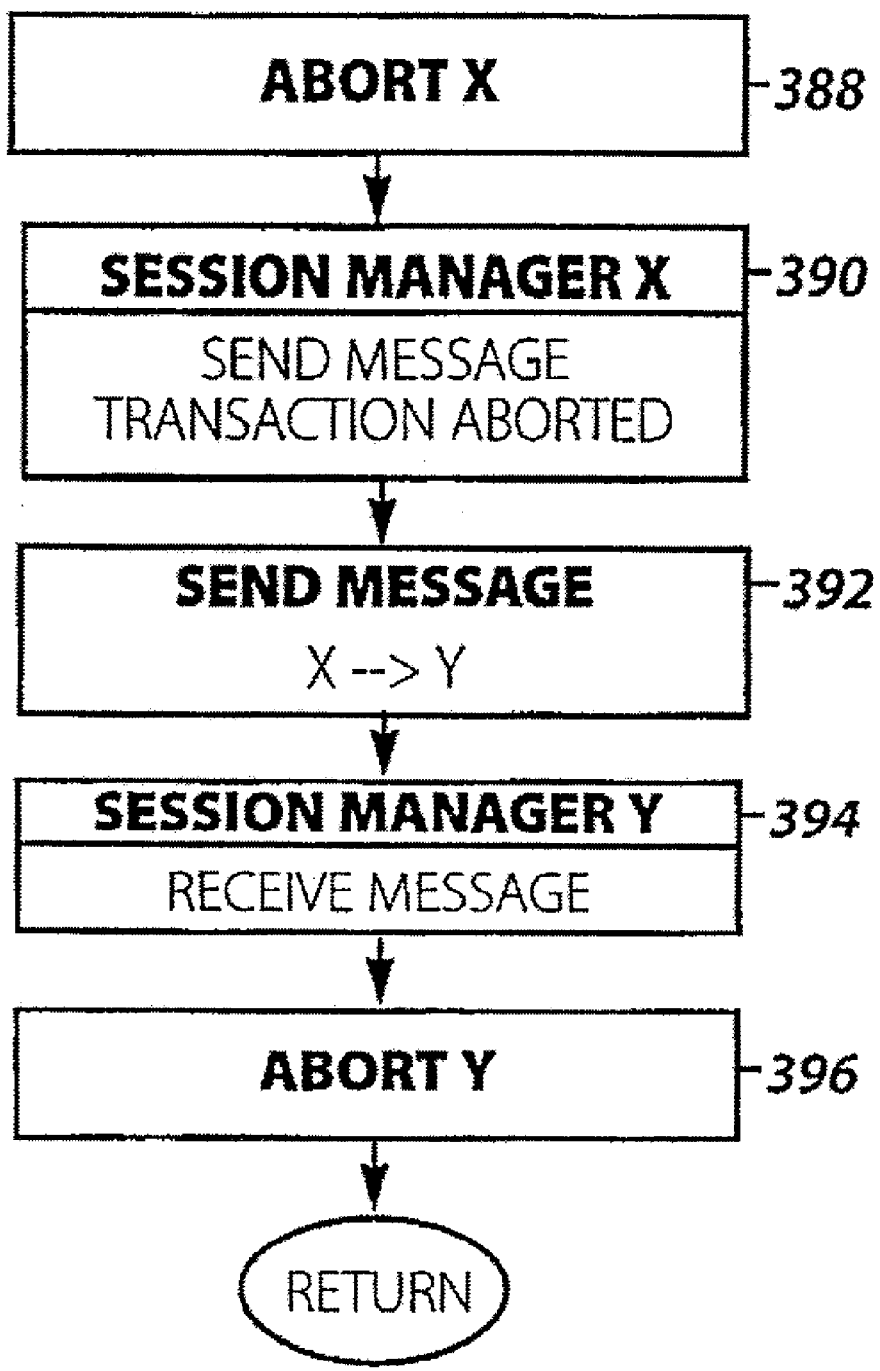
FIG. 62 illustrates an Abort Transaction protocol.

Referring to FIG. 62, trusted server B aborts (step 388) and its Session Manager sends a message to trusted agent A's Session Manager informing A that B has aborted (steps 390-394). Trusted agent A then aborts (step 396).

Referring back to FIG. 59, if the signature on the new public key is valid, then trusted server B creates a new certificate (cert(TA)) containing the new public key and a new expiration date. The new certificate is then sent back to A along with an untrusted list update and a PTS(PK) list update (steps 262-264). Security Manager A receives this message and has Public Key A check if the new certificate is valid (steps 268-270).

If not a valid certificate then, Security Manager A checks if trusted server B has attempted to create a new certificate fewer than three times (step 274). If this is the case, then Security Manager A sends a message to trusted server B to retry creating the certificate (steps 280-284). If the trusted server is unable to create a valid cert(TA) then Tran Log A records the failed attempt and aborts the transaction (steps 276-278).

If the trusted server sends a valid new cert(TA), then Security Manager A updates the cert(TA), the untrusted list, and the PTS(PK) list (step 286). Trusted agent A then commits (step 288). Security Manager A sends a message to the trusted server that the trusted agent has updated its certificate. Trusted server B then notes that A has been recertified. (Steps 290-294).

Purchase of Electronic Merchandise

Figure 63A:
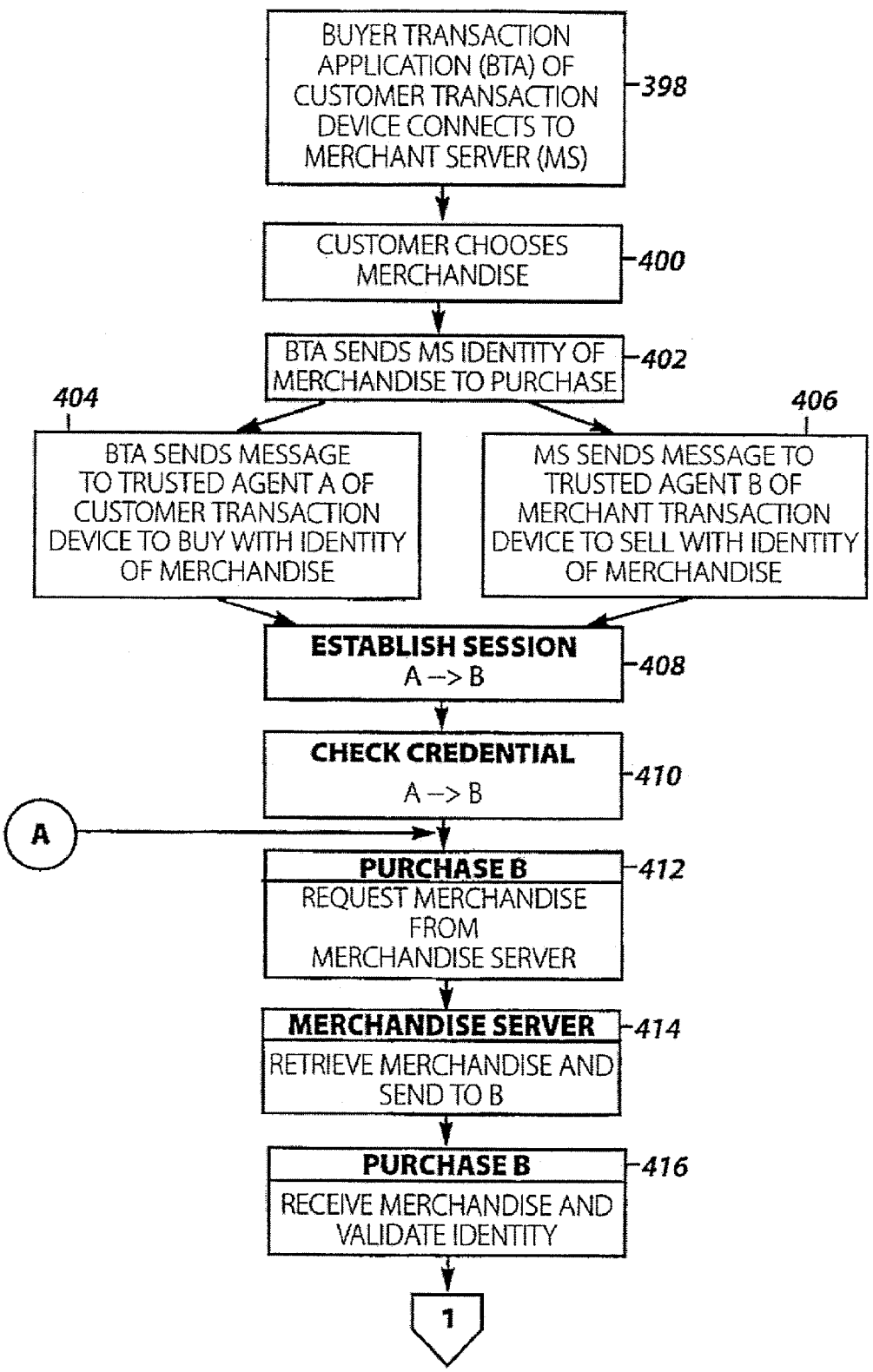
FIGS. 63A-63B illustrates a Purchase of Electronic Merchandise protocol.
Figure 63B:
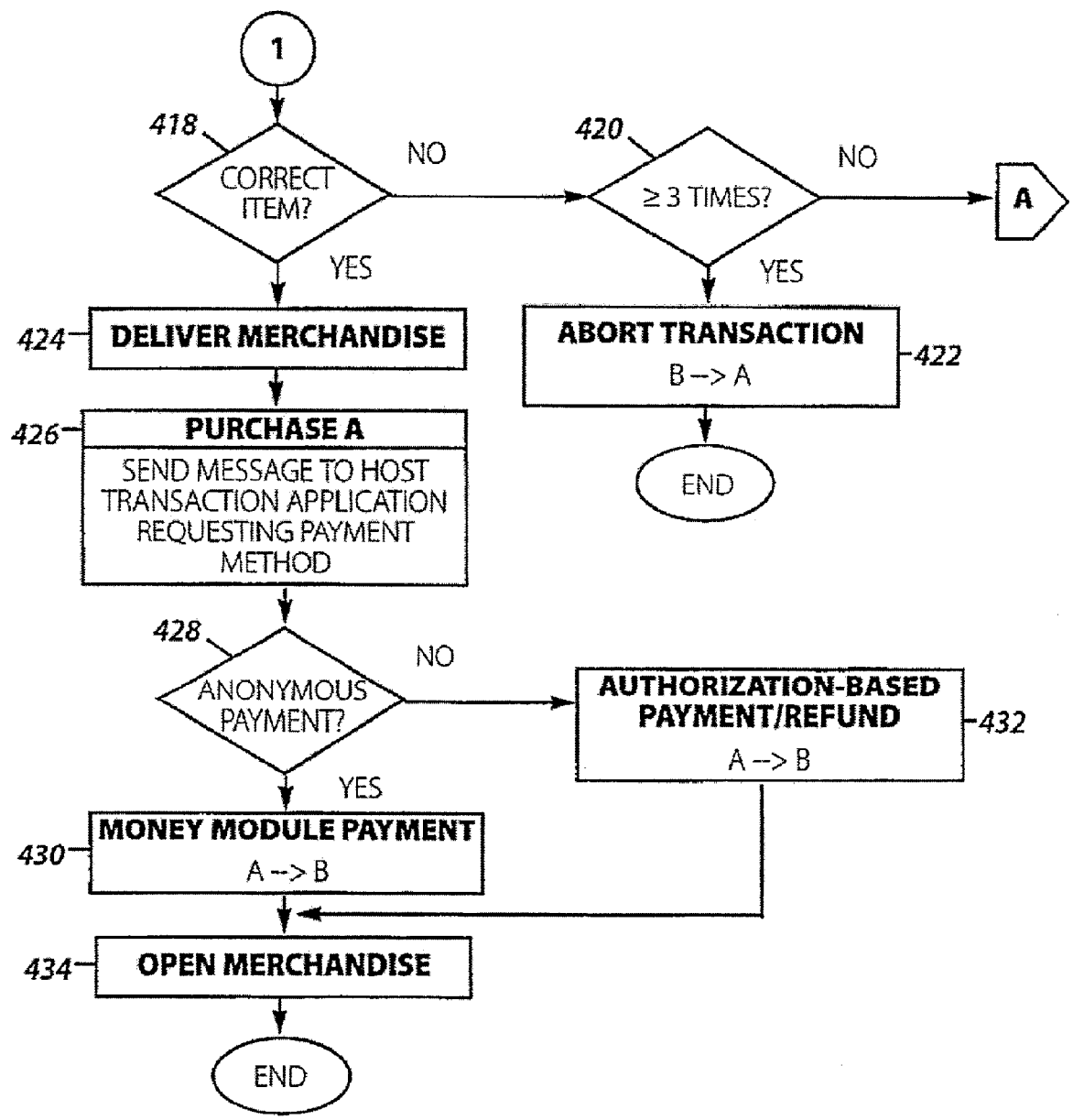
Figure 77:
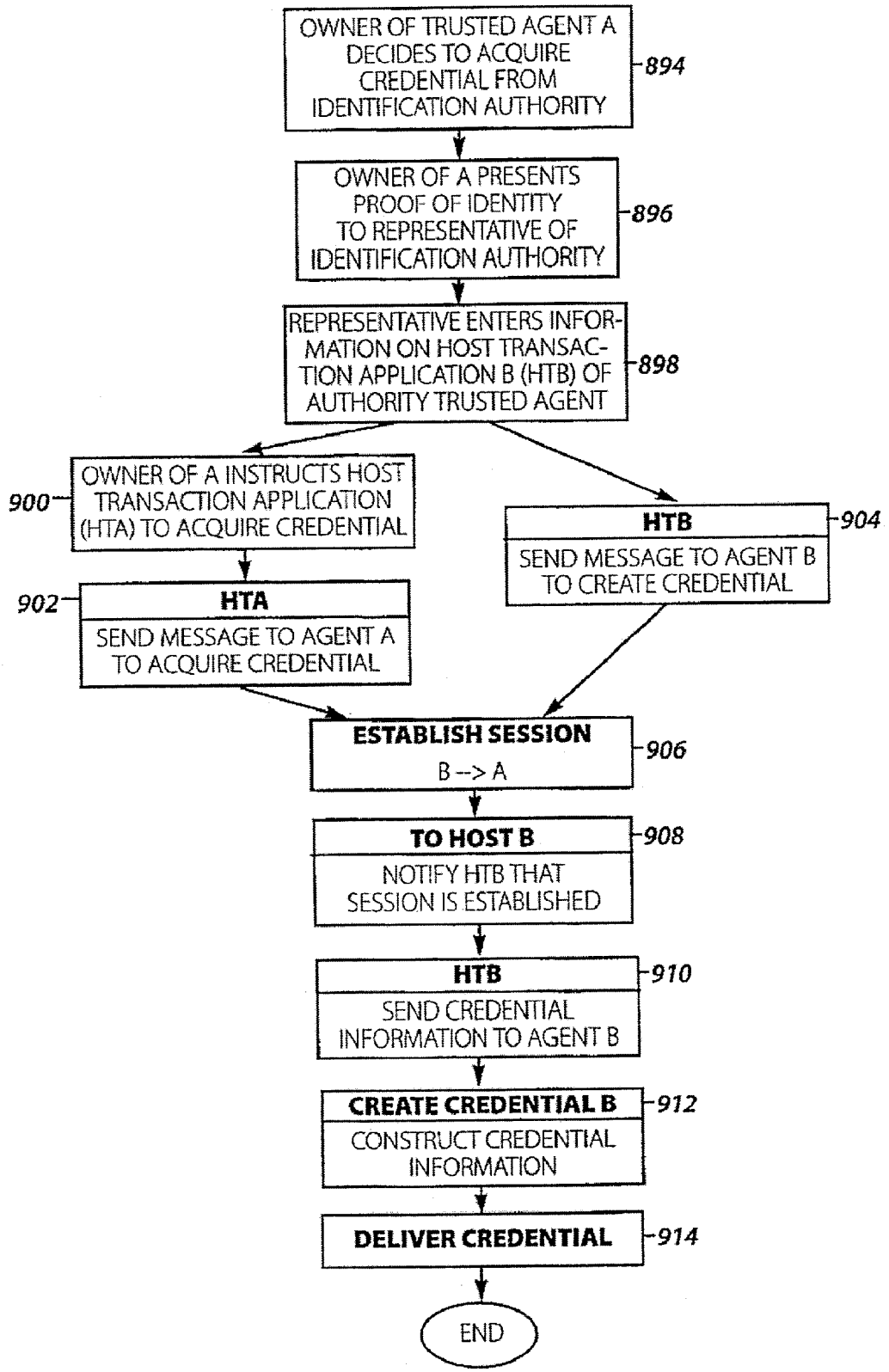
FIG. 77 illustrates an Acquire Credential protocol.

The purchase of electronic merchandise is described with reference to FIG. 63. Items purchased in accordance with the flow diagram of FIG. 63 include electronic objects and their associated decryption tickets, transportation tickets, event tickets and communications tickets. Credentials, on the other hand, are obtained using the Acquire Credential flow diagram (FIG. 77). A buyer transaction application (BTA) in the host processor 124 of a CTD 188 connects to the merchant server 194 of a merchant network 192. The BTA allows the buyer to browse the seller's merchandise and make a selection (steps 398-400). The BTA sends the identity of the selected merchandise to the merchant server 194 (step 402). The BTA then sends a message to trusted agent A (within the same CTD) instructing trusted agent A to buy and identifying the selected merchandise. Also, the merchant server sends a message to trusted agent B of the MTD 198 instructing trusted agent B to sell and identifying the selected merchandise (steps 404-406).

Figure 64:
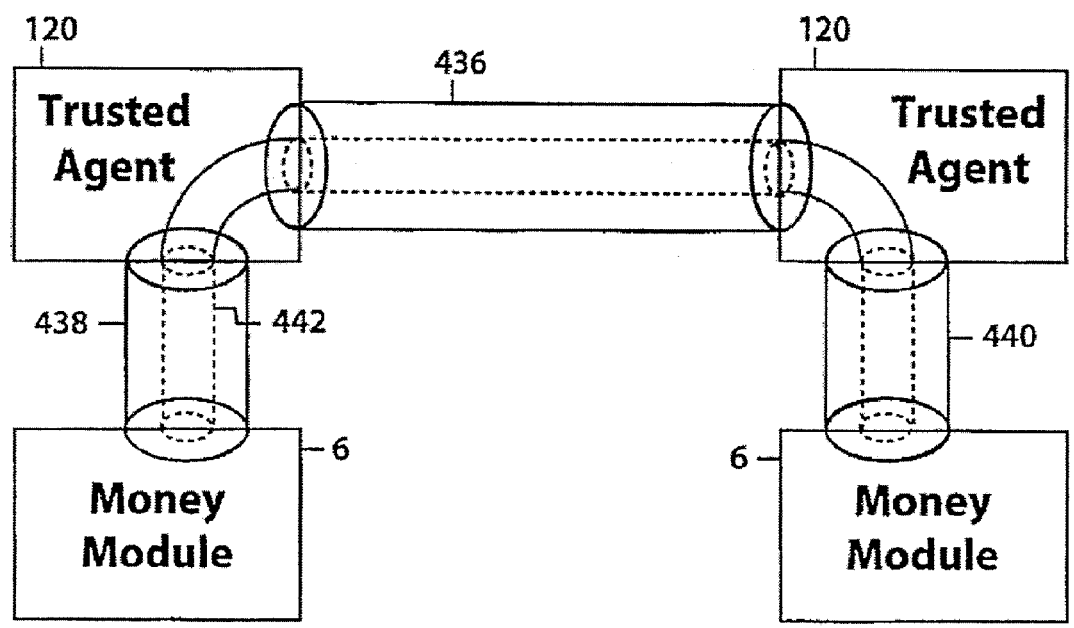
FIG. 64 shows the various message encryption layers established among trusted agents and money modules.

A session is then established between trusted agent A and trusted agent B where both A and B may now communicate using the newly created session key (TA/TA) (step 408). Referring to FIG. 64, there is shown four encryption channels established during a purchase transaction. Encryption channel 436 between the two trusted agents 120 carries messages encrypted by session key (TA/TA). Channels 438 and 440 between a trusted agent 120 and its money module 6 share session key (TA/MM). Channel 442 between money modules 6 in different transaction devices 122 use session key (MM/MM).

Figure 65:
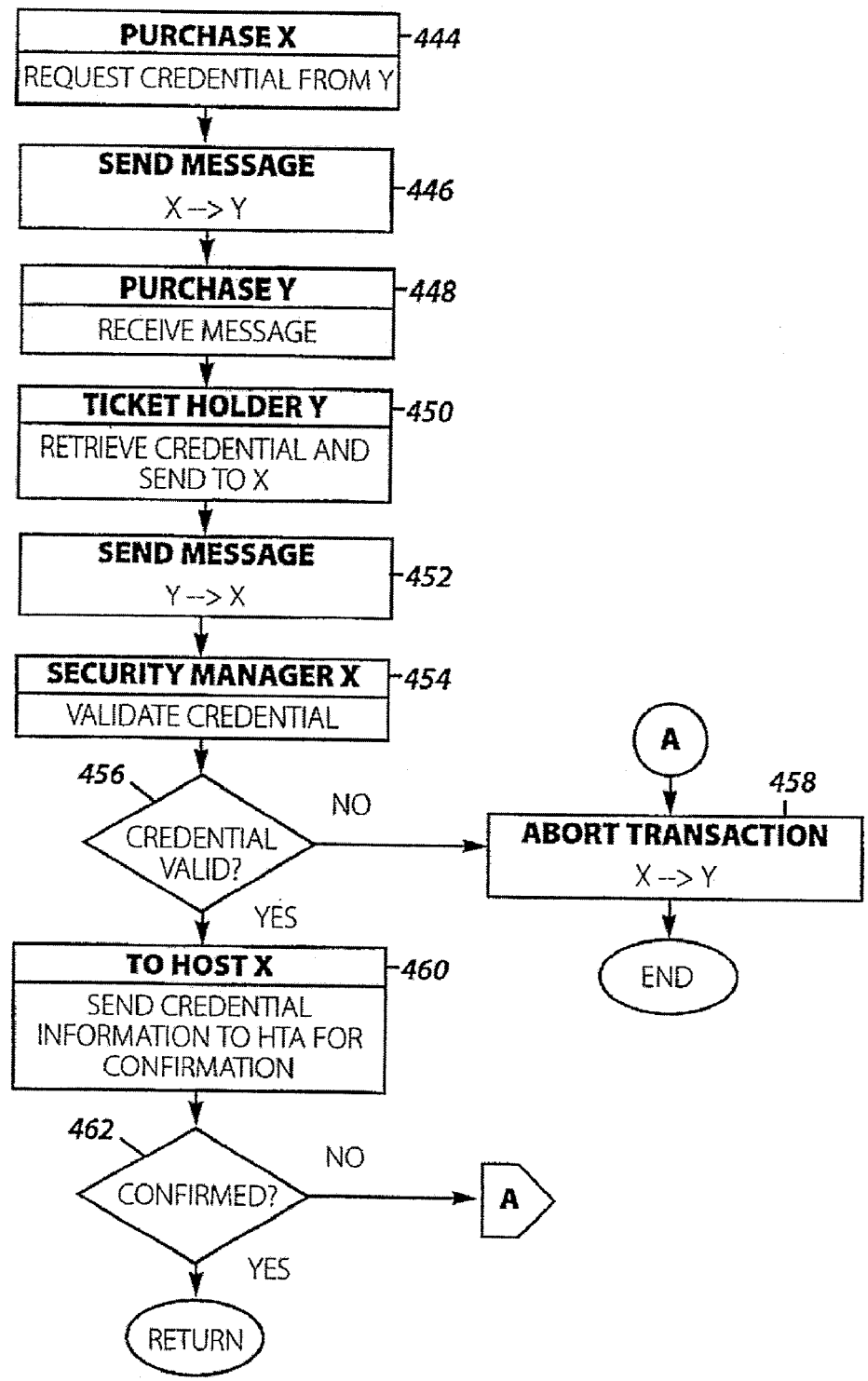
FIG. 65 illustrates a Check Credential protocol.

Referring again to FIG. 63, the Check Credential subroutine is called (step 410). All MTDs 198 contain a credential identifying the owner/merchant (e.g., NYNEX, Ticketron, etc.). Such merchant credentials may, for example, be issued by a merchant identification authority controlled by the Trusted Agency. On the other hand, customer credentials held by CTDs 188 may include driver's licenses or credit cards issued by various identification authorities. Referring to FIG. 65, Purchase A sends a message to Purchase B of trusted agent B requesting its merchant credential (steps 444-448). Ticket Holder B retrieves its merchant credential and sends the credential to A for validation (steps 450-456).

Credentials or any other type of ticket 8 are validated as follows:

1) Validate issuer certificate and check issuer signature.
2) Verify each transfer—match receiver and sender identifiers (i.e., $S_o$=Issuer, $R_o$=1st receiver, then $R_i=S_{i+1}$, $i \geq o$).
3) Validate each sender certificate and check each sender signature.
4) Verify that the last receiver identifier matches the identifier (TA(id)) of the certificate (cert(TA)) of the trusted agent in the current session.

If the merchant's credential is not valid, then the transaction is aborted (step 458). If the merchant's credential is valid, then To Host A sends the credential information to a host transfer application for confirmation (e.g., visual confirmation of merchant name by CTD holder) (steps 460-462).

Referring again to FIG. 63, Purchase B requests the selected merchandise from the merchandise server, which retrieves the merchandise and sends it to Purchase B for identity validation (steps 412-418). If the item is incorrect, then merchandise retrieval is attempted twice more before the transaction is aborted (steps 420-422). If the correct merchandise is received by trusted agent B, then the Deliver Merchandise subroutine is initiated (step 424).

Figure 66A:
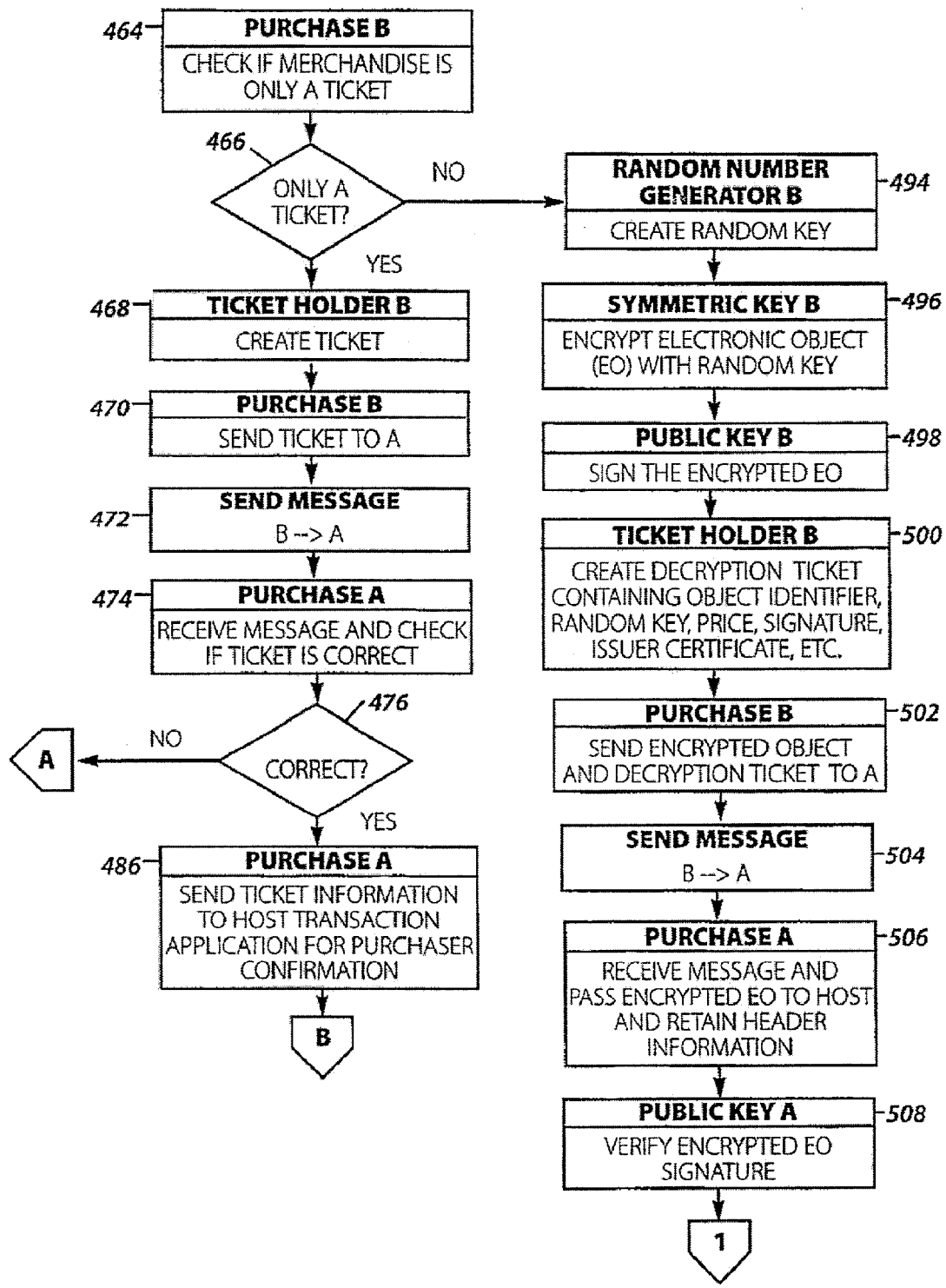
FIGS. 66A-66B illustrate a Deliver Merchandise protocol.
Figure 66B:
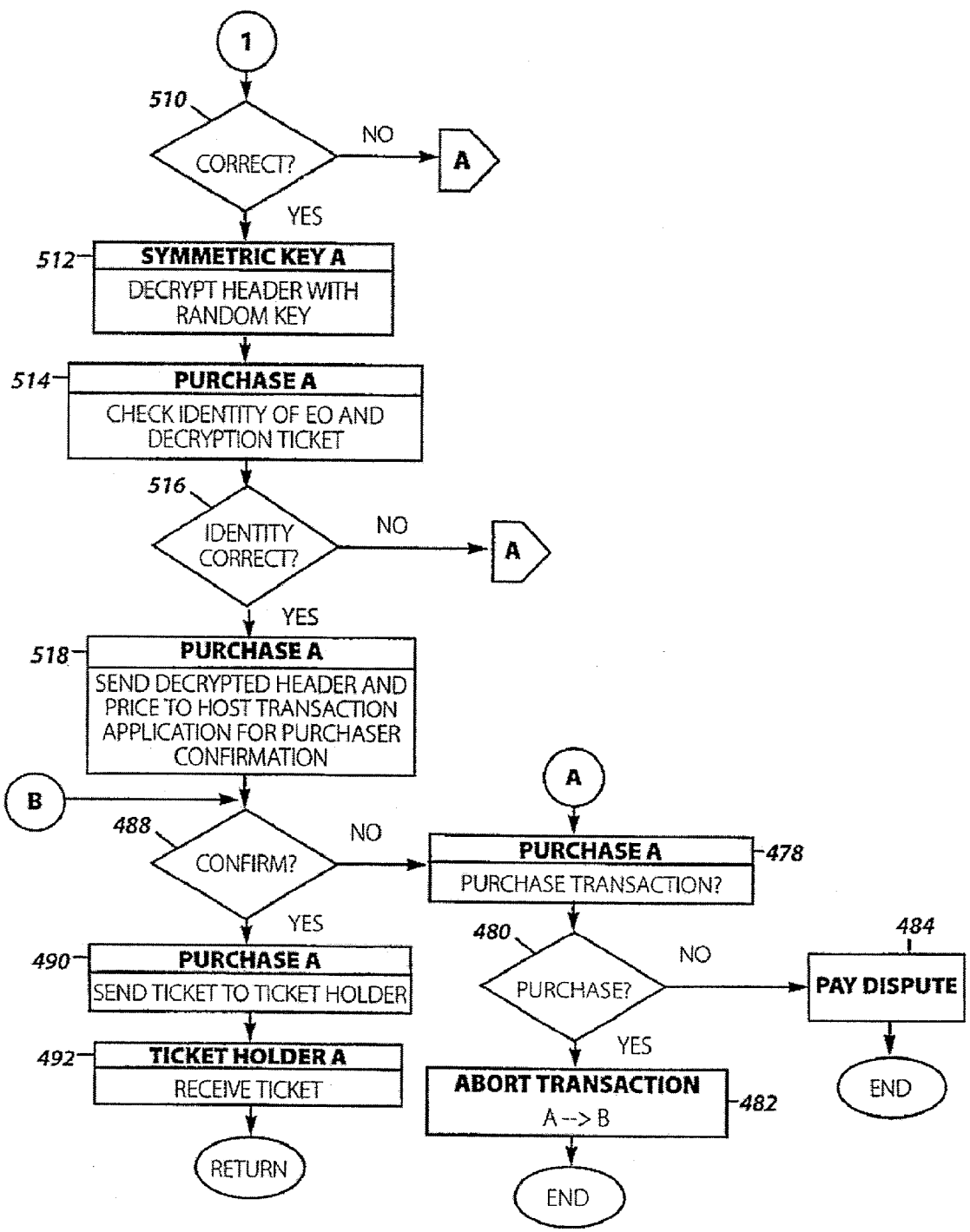
Figure 67A:
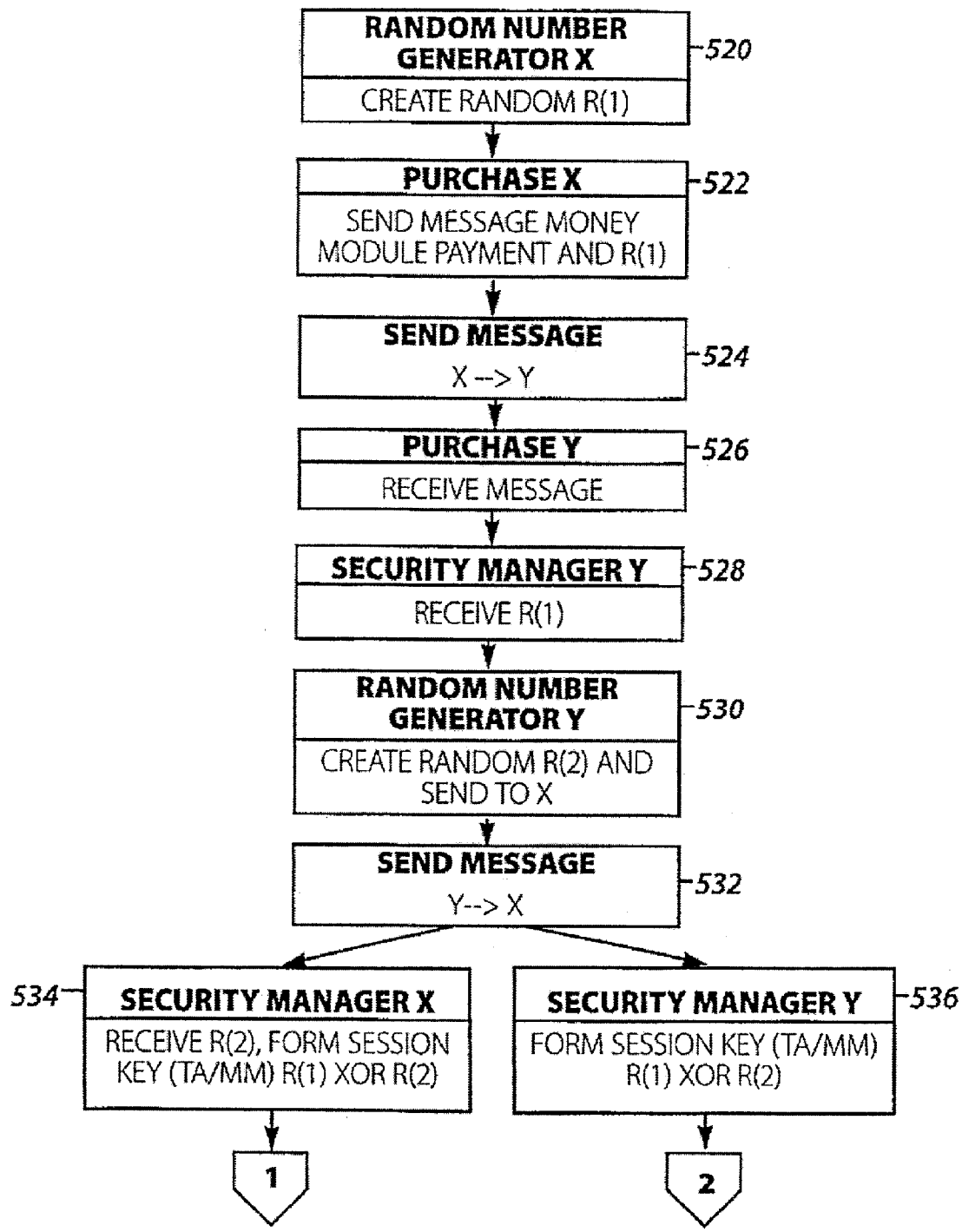
FIGS. 67A-67E illustrate a Money Module Payment protocol.
Figure 67B:
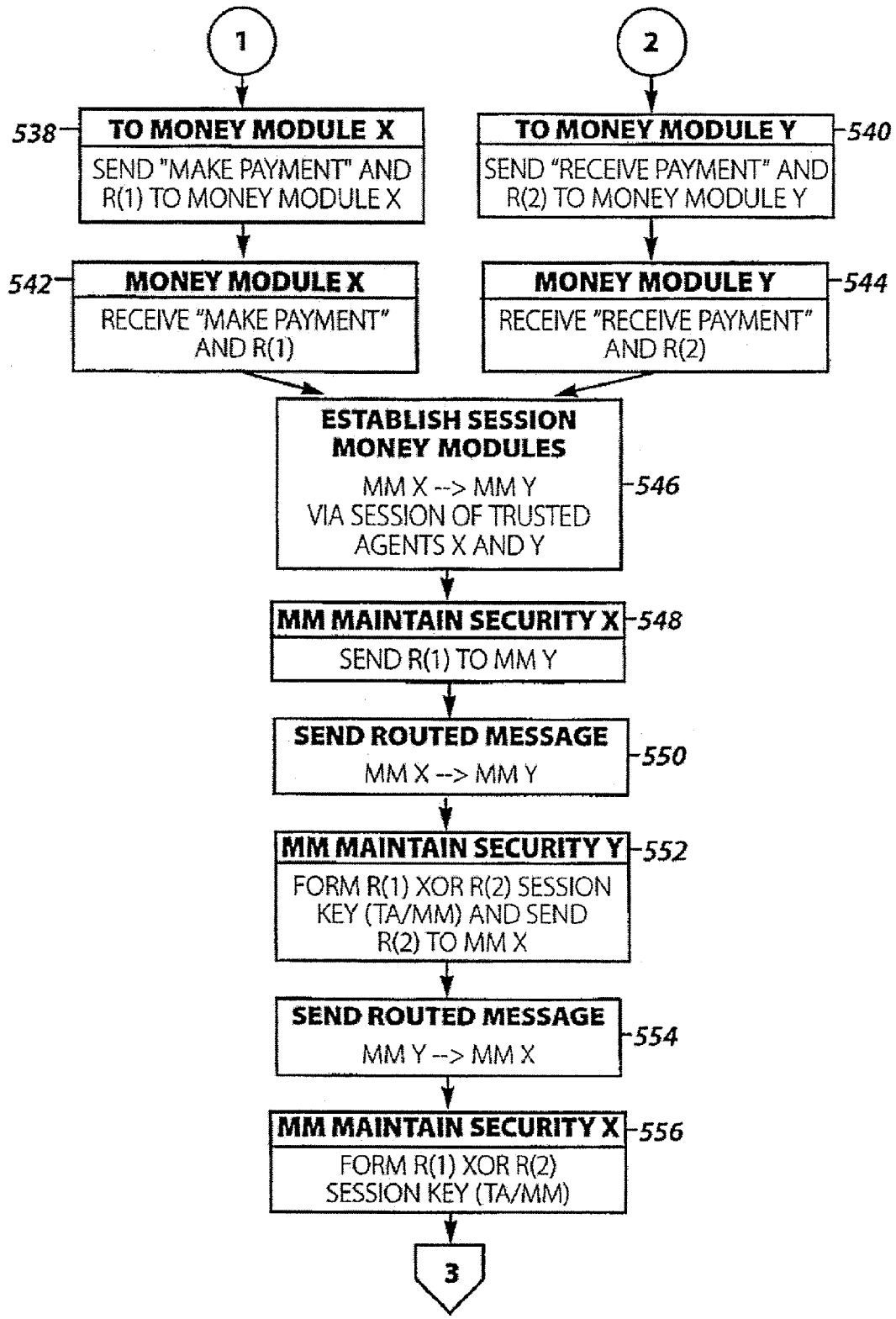
Figure 67C:
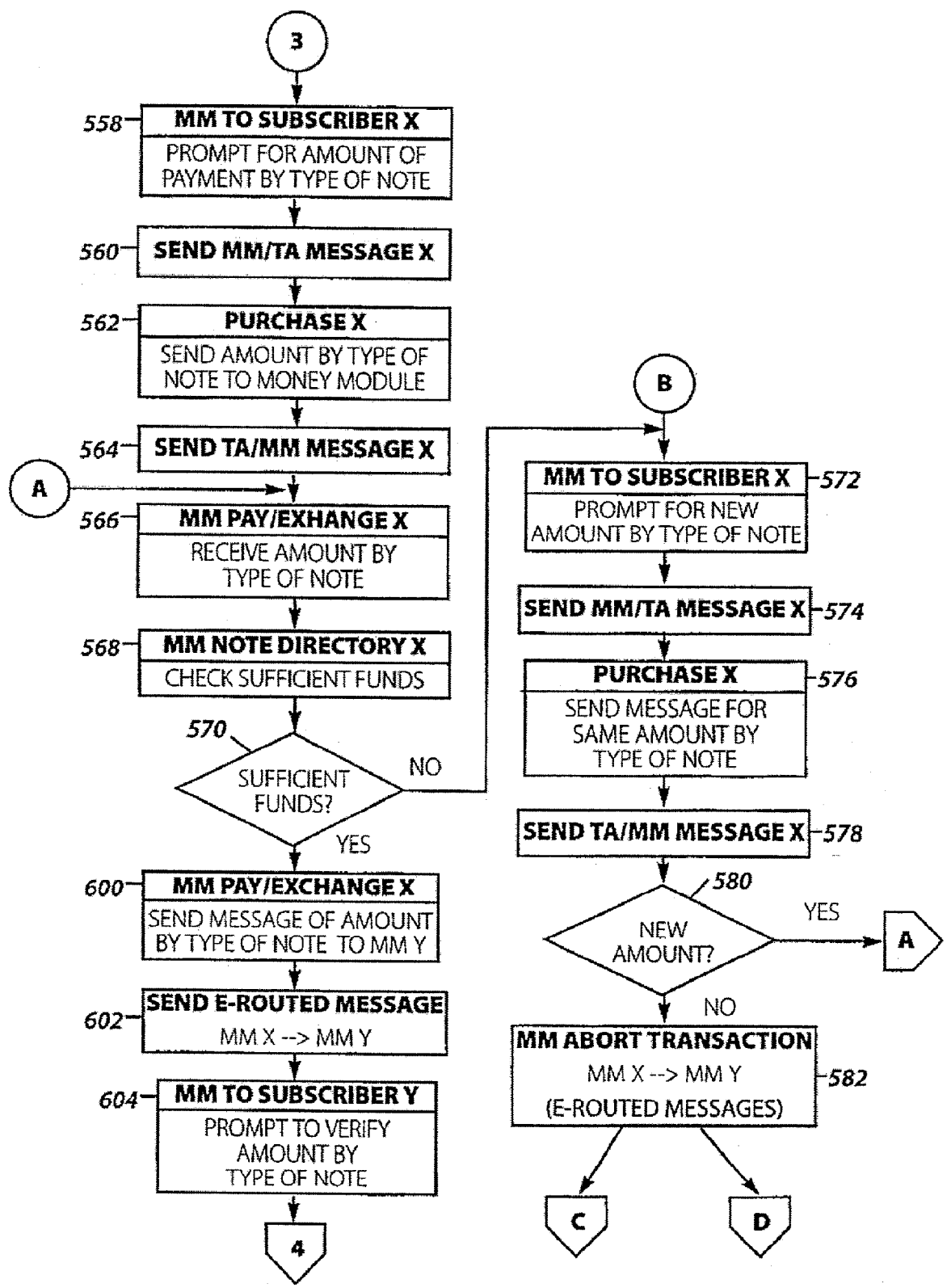
Figure 67D:
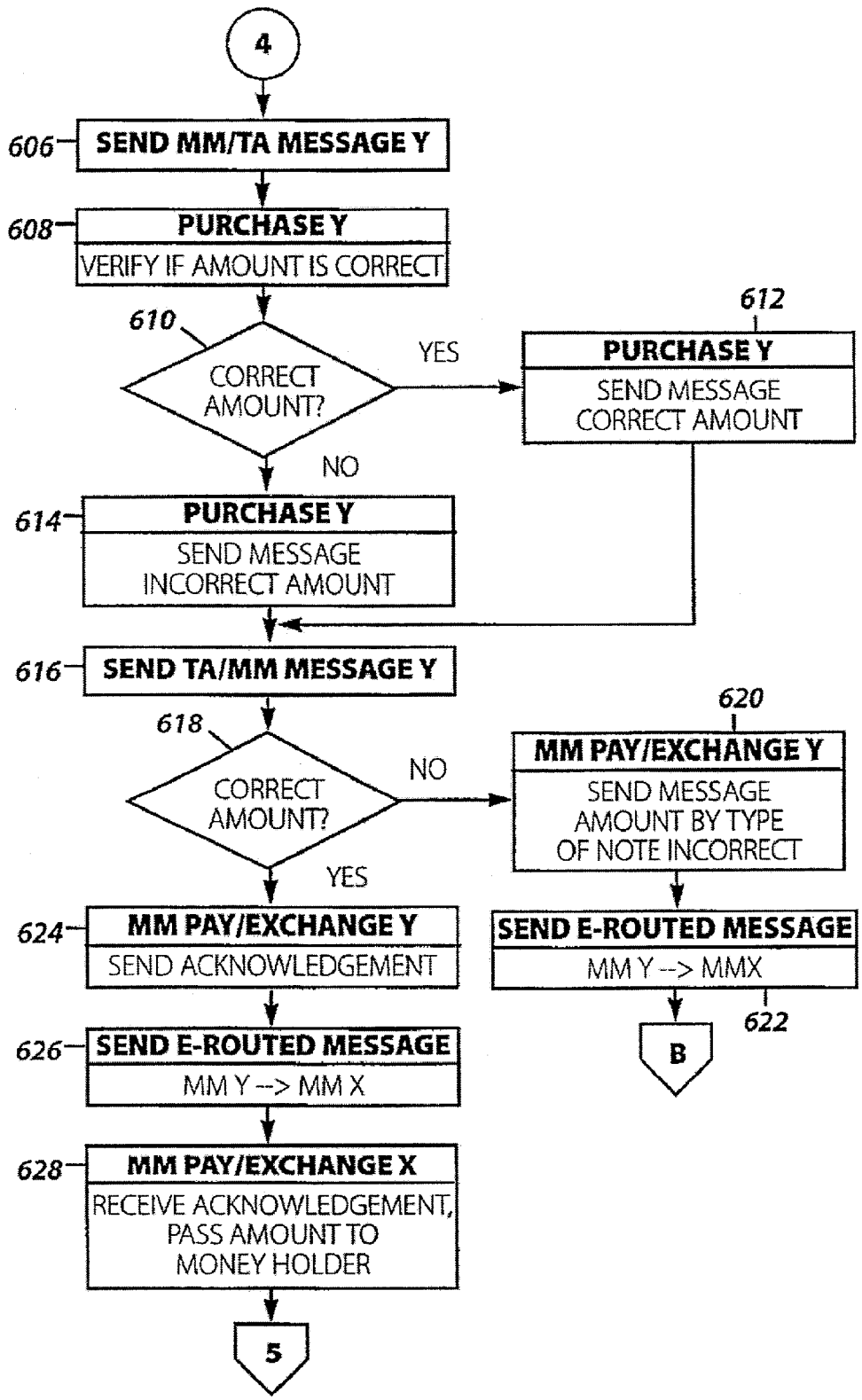
Figure 67E:
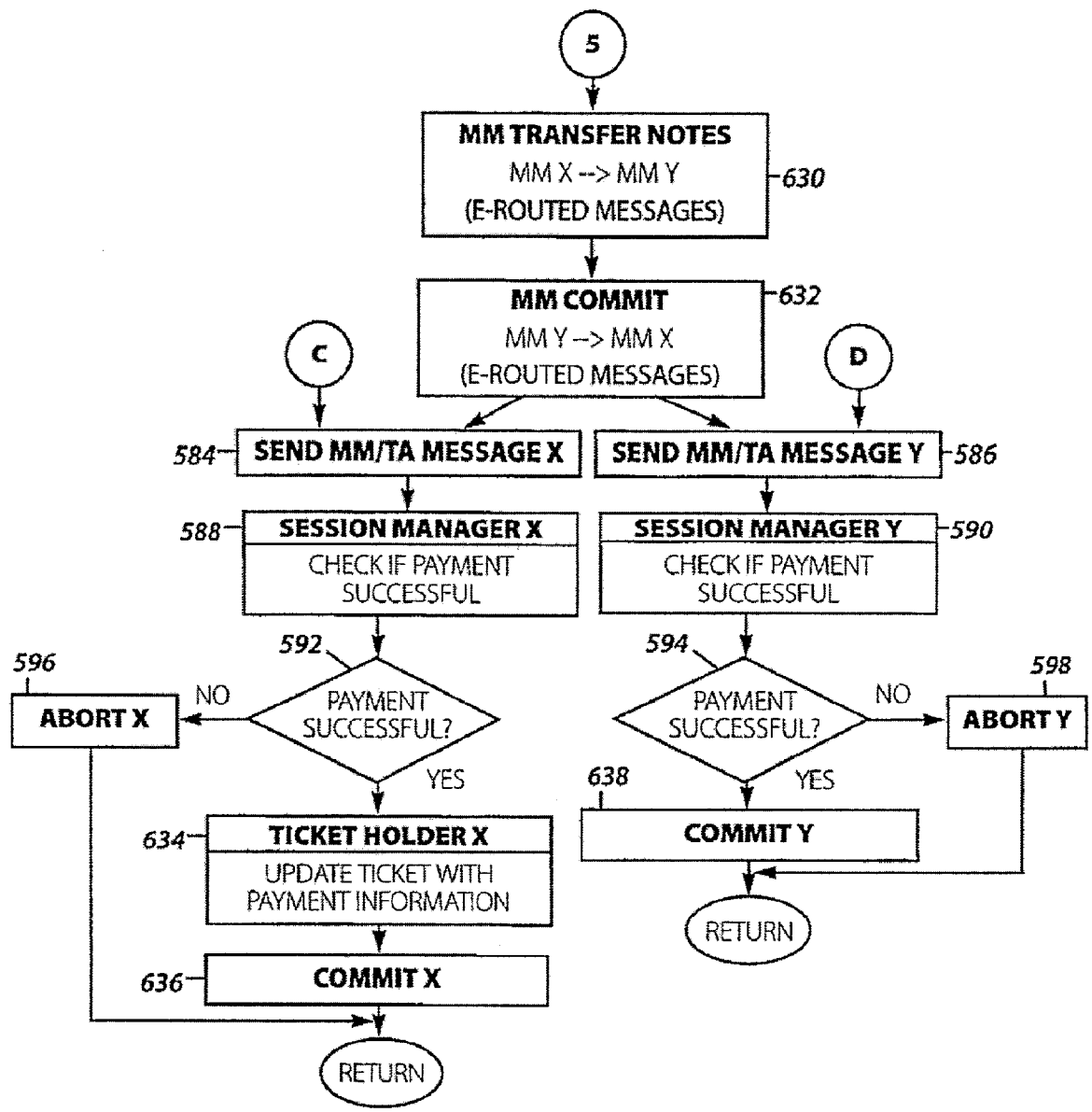

Referring to FIG. 66, Purchase B checks if the merchandise will be embodied as only a ticket (as opposed to a decryption ticket and electronic object) (steps 464-466). If only a ticket, then Ticket Holder B creates the ticket (step 468). Purchase B then sends the ticket to trusted agent A (steps 470-472). Purchase A receives the ticket and checks if it is correct by comparing the expected merchandise identity (previously received from the BTA) with information in the ticket (steps 474-476). If not correct, then Purchase A identifies the transaction as a purchase and hence aborts the transaction (steps 478-482). If trusted agent A approves the ticket as correct, it then sends information from the ticket to a host transaction application for purchaser confirmation (steps 486-488). Such information allows the CTD holder to verify that he is getting the merchandise and price that he previously selected. If the is correct, then Purchase A sends the ticket to Ticket Holder A for storage (steps 490-492). Trusted agent A now provisionally holds the ticket 8. If trusted agent A subsequently aborts, then the ticket 8 is deleted. If trusted agent A subsequently commits, then the owner/holder of A will be able to present the ticket 8.

On the other hand, if the merchandise to be purchased consists of both an electronic object and its associated decryption ticket, then Random Number Generator B in merchant trusted agent B creates a random key (step 494). Symmetric Key B then encrypts the electronic object with the random key and Public Key B digitally signs the encrypted electronic object with the MTA's private key (steps 496-498). Ticket Holder B then creates a decryption ticket containing the random key, price, and other information (step 500). The owner of trusted agent A may now receive the encrypted electronic object from the merchant, but he will be unable to use it unless he has access to the random key contained within the associated decryption ticket.

Purchase B sends the encrypted electronic object and the decryption ticket to trusted agent A (steps 502-504). Purchase A receives the message and passes the encrypted electronic object to the host and retains a copy of the encrypted header information (step 506). Concurrently, Public Key A verifies the encrypted electronic object's signature using B's public key (steps 508-510). If the signature is incorrect, then the transaction is aborted (steps 478-482). If the electronic object's integrity is verified, then Symmetric Key A decrypts the header with the random key from the decryption ticket (step 512). Purchase A checks the identity of the electronic object and the decryption ticket (steps 514-516). Such checking may be performed by comparing the expected merchandise identity with the electronic object's identifier and with information in the decryption ticket. Thus, it is assured that the selected merchandise, electronic object, and decryption ticket are all related. If the identity check fails, then the transaction is aborted (steps 478-482).

If the electronic object and decryption ticket are correct, then Purchase A sends the decrypted header and price information to a host transaction application for purchaser confirmation (steps 518, 488). If the purchaser does not accept the merchandise, then the transaction is aborted (steps 478-482). If the purchaser accepts the merchandise, then Purchase A sends the decryption ticket to Ticket Holder A for storage (steps 490-492).

Referring again to FIG. 63, now that the delivery of merchandise from merchant to customer is complete (and the merchandise is inaccessible to the customer due to its encryption and/or its storage within his trusted agent 2) Purchase A sends a message to a host transaction application requesting the customer's desired payment method (steps 426-428). Payment may be made in one of two alternative forms: by anonymous payment using a money module 6 or by authorization-based payment (requiring identification of the customer) using a credit card or debit card credential.

If an anonymous payment is desired, then the Money Module Payment subroutine is called (step 430). Referring to FIG. 67, Random Number Generator A creates random number R(1) (step 520). Purchase A then sends a message to trusted agent B indicating that a "money module payment" will be made and also containing R(1) (step 522-524). Purchase B receives the message and sends R(1) to Security Manager B (steps 526-528). Random Number Generator B creates random number R(2) and sends it to trusted agent A (steps 530-532). Security Managers A and B both form session key (TA/MM) by exclusive ORing R(1) and R(2) (Steps 534-536).

Referring to FIG. 64, session key (TA/MM) is used for encrypting messages sent between a trusted agent 120 and its associated money module 6 via encryption channels 438 and 440. At the present point in the flow diagram, only the two trusted agents 120 have session keys (TA/MM). Both money modules 6 will later in the flow diagram form copies of session key (TA/MM) so as to enable encrypted communication between the trusted agents 120 and their money modules 6.

It may be noted that instead of the trusted agent 120 and money module 6 being embodied as discrete tamper-proof components, they may be fabricated as one tamper-proof module. In this case, it would not be necessary to establish a secure session for communication between trusted agent 120 and money module 6 in the same transaction device 122. However, discrete money modules 6 and trusted agents 120 are preferable in that such a configuration allows for greater application flexibility.

Referring back to FIG. 67, To Money Module A sends a "Make Payment" message and R(1) to its associated money module A. Also, To Money Module B sends a "Receive Payment" message and R(2) to its associated money module B (steps 538-544).

At this stage, money module A (within the CTA 2) and money module B (within the MTA 4) establish a session between them so that each money module 6 winds up holding new session key (MM/MM) (step 546). In establishing this money module to money module session, the money modules exchange messages via the pre-existing trusted agent's session. Referring to FIG. 64, the session key for encryption channel 442 is formed by exchanging messages encrypted by channel 436. After the money module session is established, messages sent between money modules will be encrypted twice, by both session key (MM/MM) and session key (TA/TA), along the portion of the communication path between trusted agents 120.

In the preferred embodiment, the money module session is established in a manner similar to the establishment of a trusted agent session. The money modules 6 would therefore hold their own certificates containing their public keys. The swapping of certificates and random numbers (for XORing) enables the secure creation of session keys (MM/MM). The Establish Session protocol used by money modules is shown in FIG. 89 and described subsequently. The overall system security pertaining to the money modules may be integrated with that for the trusted agents 120, but is preferably separate to provide for enhanced system security and system flexibility.

Referring back to FIG. 67, money module A sends R(1) to money module B. This function may be initiated by a MM Maintain Security A application residing in money module A (step 548). This application and other money module applications are prefaced by the designations "MM" and are described in U.S. Pat. No. 5,453,601 together with any modifications and/or additions herein.

Figure 68:
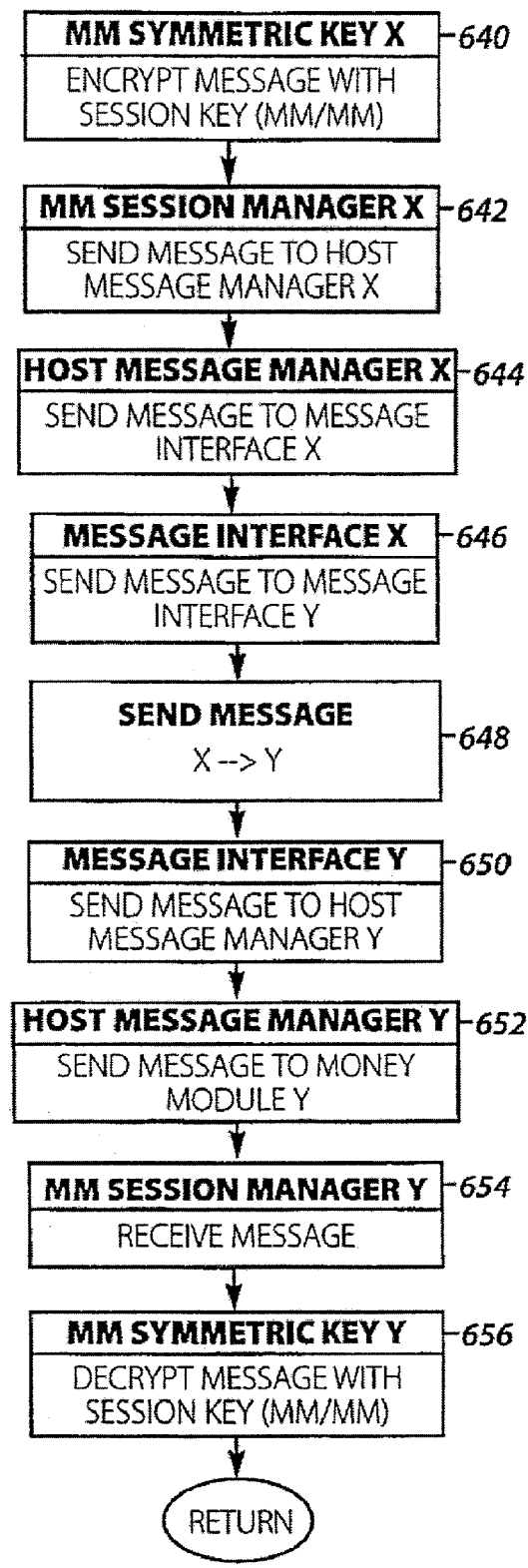
FIG. 68 illustrates a Send Routed Message protocol.

Random number R(1) is sent from money module A to money module B by the subroutine Send Routed Message (step 550). Referring to FIG. 68, MM Symmetric Key A encrypts the message (including R(1)) with session key (MM/MM) (step 640). MM Session Manager A sends the message to Host Message Manager A which, in turn, sends the message to Message Interface A of trusted agent A (steps 642-646). Trusted agent A then sends the message to Message Interface B of trusted agent B using the Send Message subroutine (step 648) which encrypts and decrypts the message with session key (TA/TA) in between the trusted agents. Message Interface B then sends the message to MM Session Manager B in money module B via Host Message Manager B (steps 650-654). Finally, MM Symmetric Key B decrypts the message with session key (MM/MM) (step 656).

Referring again to FIG. 67, MM Maintain Security B (in money module B) forms session key (TA/MM) by exclusive ORing R(1) and R(2). Money module B then sends R(2) to money module A which also forms session key (TA/MM) by exclusive ORing R(1) and R(2) (Steps 552-556). Referring to FIG. 64, at this stage, three session keys exist: (MM/MM), (MM/TA), and (TA/TA). Thus, the four encryption channels shown are in place.

Referring to FIG. 67, MM To Subscriber A prompts trusted agent A for the amount of payment by type of note (e.g., dollars, yen, pounds, etc.) (step 558). A money module as described in U.S. Pat. No. 5,453,601, incorporated by reference herein, would generally use the To Subscriber application for communication with the owner/holder of the money module. However, as used in the present instance, the To Subscriber application communicates with the trusted agent 120 for getting various instructions. Here, the trusted agent 120 delivers amount of payment and type of note information (trusted agent A has previously communicated with the owner/holder of the customer transaction device (CTD) 2 to confirm the price of the selected merchandise).

Figure 69:
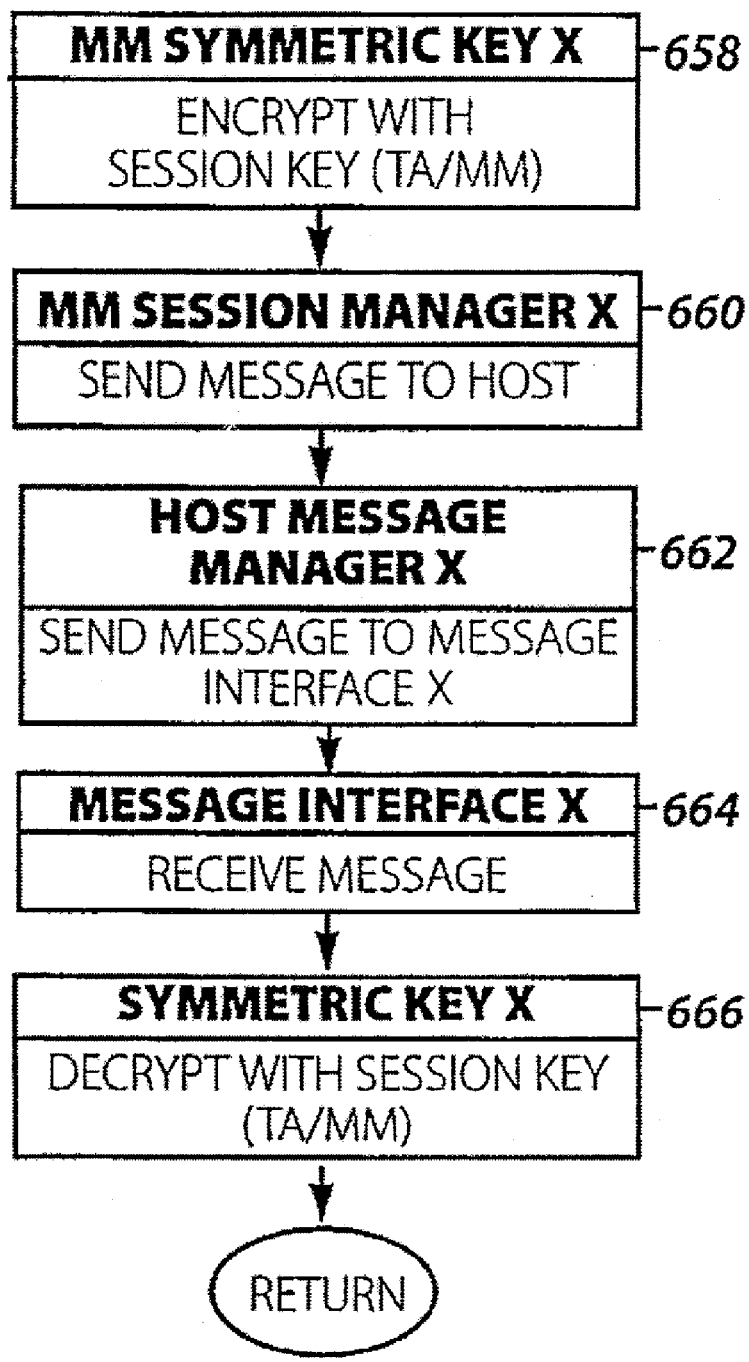
FIG. 69 illustrates a Send MM/TA Message protocol.
Figure 70:
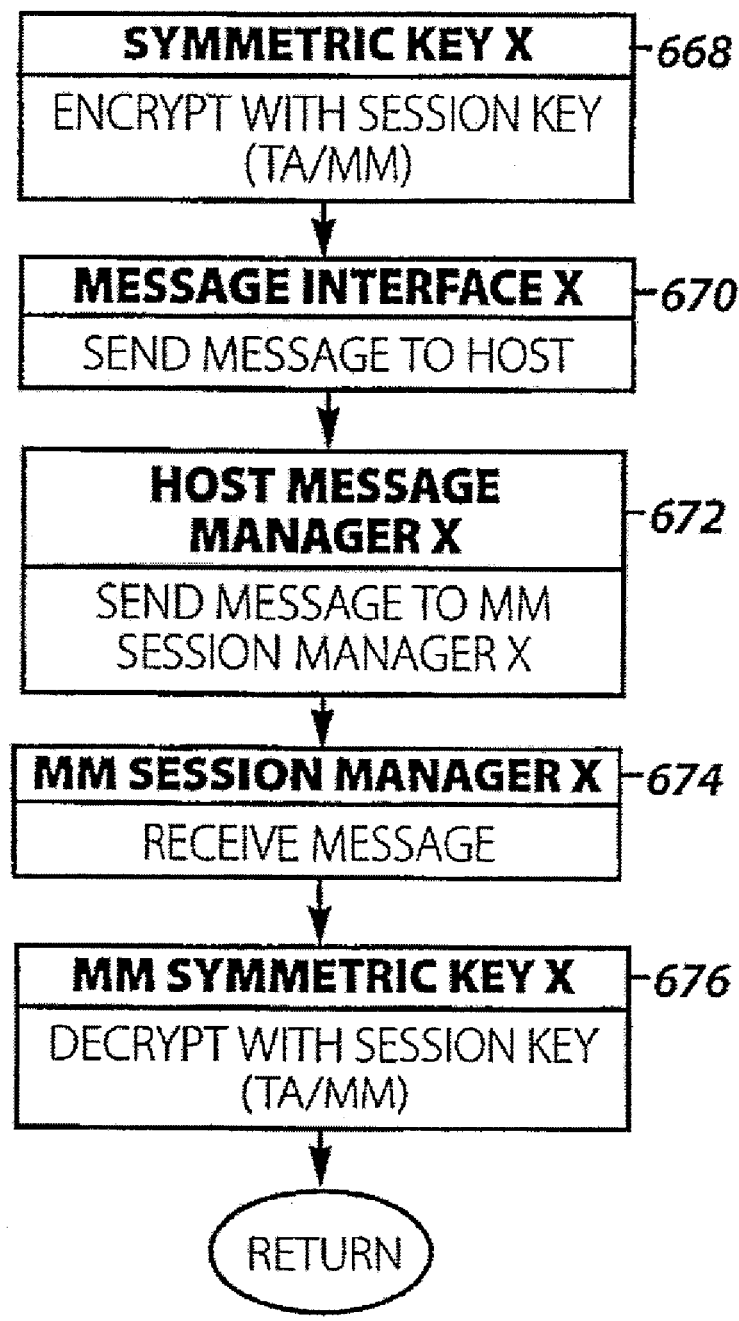
FIG. 70 illustrates a Send TA/MM Message protocol.

The prompt from the money module 6 to the trusted agent 120 is sent via the Send MM/TA Message subroutine (step 560). Referring to FIG. 69, MM Symmetric Key A encrypts the message with session key (TA/MM) (step 658). MM Session Manager A sends the message to trusted agent A's Message Interface via Host Message Manager A (steps 660-664). Symmetric Key A decrypts the message with session key (TA/MM) (step 666). Referring back to FIG. 67, Purchase A of trusted agent A sends the amount (price of selected merchandise) by type of note to MM Pay/Exchange A of money module A (steps 562-566). This message is sent via the Send TA/MM Message subroutine (step 564). Referring to FIG. 60, Symmetric Key A encrypts the message with session key (TA/MM) (step 668). Message Interface A sends the message to money module A's MM Session Manager via Host Message Manager A (steps 670-674). Finally, MM Symmetric Key A decrypts the message with session key (TA/MM) (step 676).

Referring to FIG. 67, MM Note Directory A checks if the money module 6 has sufficient funds to cover the payment (steps 568-570). If insufficient, then money modules A and B abort the transaction (steps 572-582).

Figure 71:
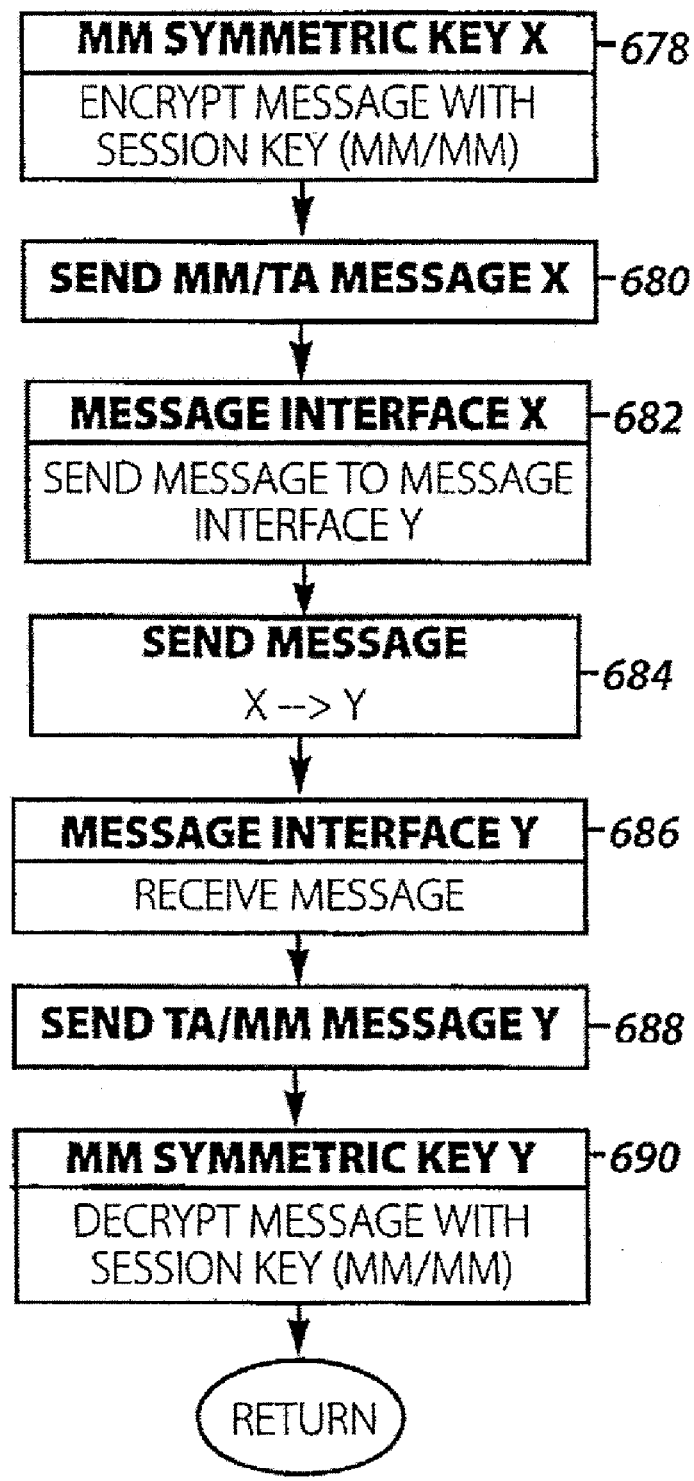
FIG. 71 illustrates a Send E-Routed Message protocol.

The MM Abort transaction protocol (step 582) of the preferred electronic monetary system is described subsequently and shown in FIG. 93. The messages between money module A and money module B are sent via a Send E-Routed Message subroutine which utilizes all three session keys (MM/MM), (TA/MM), and (TA/TA). Referring to FIG. 71, MM Symmetric Key A encrypts a message with session key (MM/MM) (step 678). The message is then double encrypted by session key (MM/TA) before it is sent to trusted agent A. Once received by trusted agent A, the message is decrypted by session key (MM/TA). (Step 680). Message Interface A then sends the message to Message Interface B (steps 682-684). In between trusted agents 120, the message is double encrypted by session key (TA/TA). In like manner, Message Interface B sends the message to MM Symmetric Key B for final decrypting (steps 686-690). FIG. 64 illustrates the various encryption layers.

Referring again to FIG. 67, during the abort routines of money modules A and B (step 582), they generate messages sent to their trusted agents A and B, respectively (steps 584-586) informing them that they have aborted the transaction and hence that payment was unsuccessful. Session Managers A and B note that the payment was unsuccessful and consequently trusted agents A and B abort (steps 588-598).

If, on the other hand, the customer's money module 2 has sufficient funds then MM Pay/Exchange A sends a message to the merchant's money module containing the amount of money to be transferred in payment and the type of notes (step 600). This message is sent by the Send E-Routed Message subroutine (step 602).

Money module B receives the message containing the payment amount according to money module A. MM To Subscriber B then sends a prompt to trusted agent B to verify this amount is correct (steps 608-610). If correct, then trusted agent B sends a "Correct Amount" message to money module B. If incorrect, then an "Incorrect Amount" message is sent. (Steps 612-616). In the event of an "Incorrect Amount" message, money module B informs money module A which, in turn, requests its trusted agent to resend a new amount or else abort (steps 618-622,572-582). In money module payments made during an electronic merchandise purchase, the trusted agent will not send a new amount and hence both money modules 6 and both trusted agents 120 will abort.

If, on the other hand, money module B receives a "Correct Amount" message from its trusted agent, then money module B sends an Acknowledgement message back to the customer's money module (steps 624-626). When MM Pay/Exchange A receives the Acknowledgement message, it then passes the amount to Money Holder A (the application which contains and manages the electronic representations of money) (step 628).

Note that the payor initiated protocol just described may instead be implemented as a payee initiated payment as in the POS Payment protocol shown in FIG. 94 and described subsequently. In such a protocol, the merchant's trusted agent instructs its money module as to the payment amount it expects to receive, this payment information is sent to the customer's money module which prompts its trusted agent for verification, and if the amount is correct, then the customer's trusted agent informs its money module.

Figure 90A:
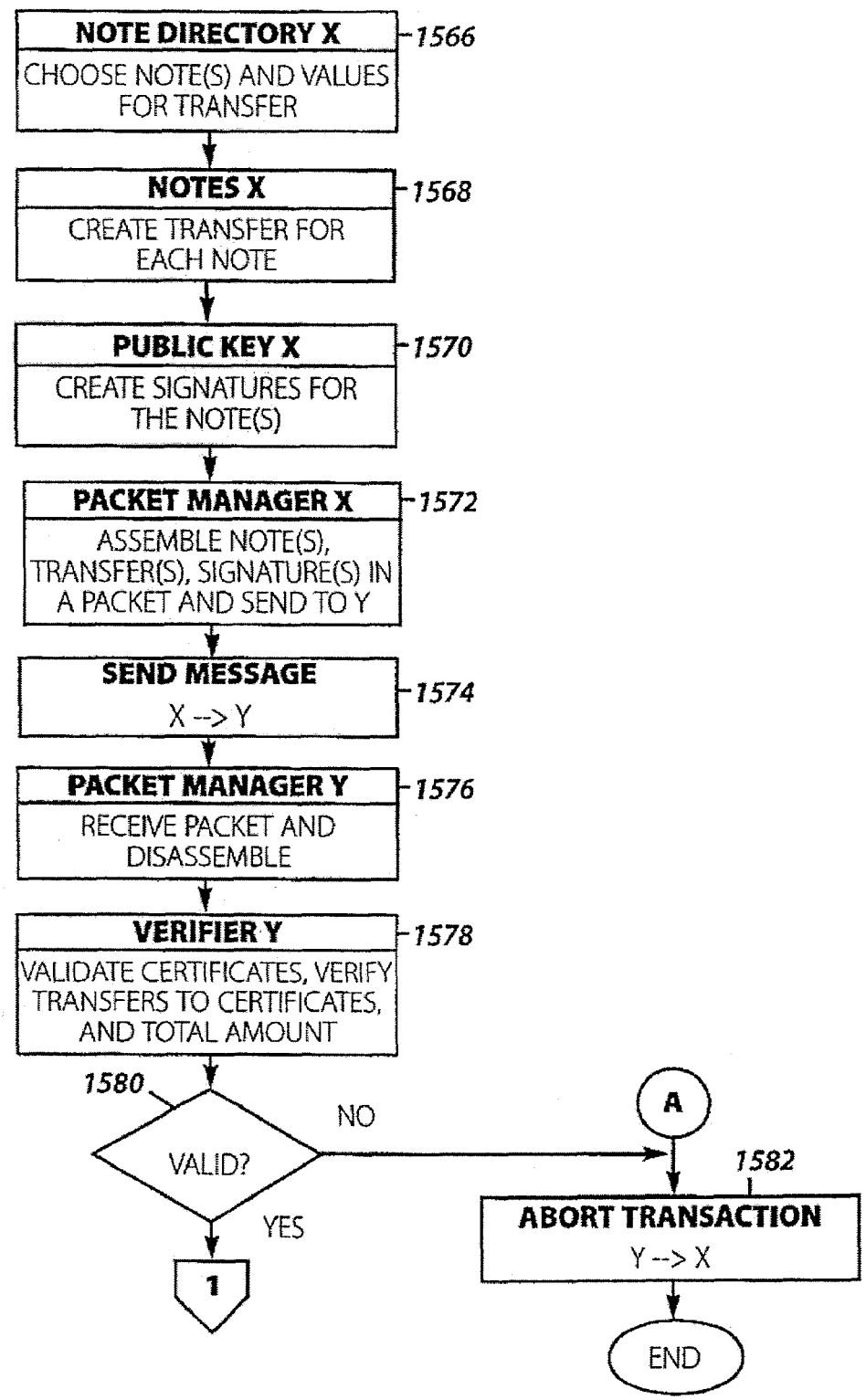
FIGS. 90A-90B illustrate a Transfer Notes protocol.
Figure 90B:
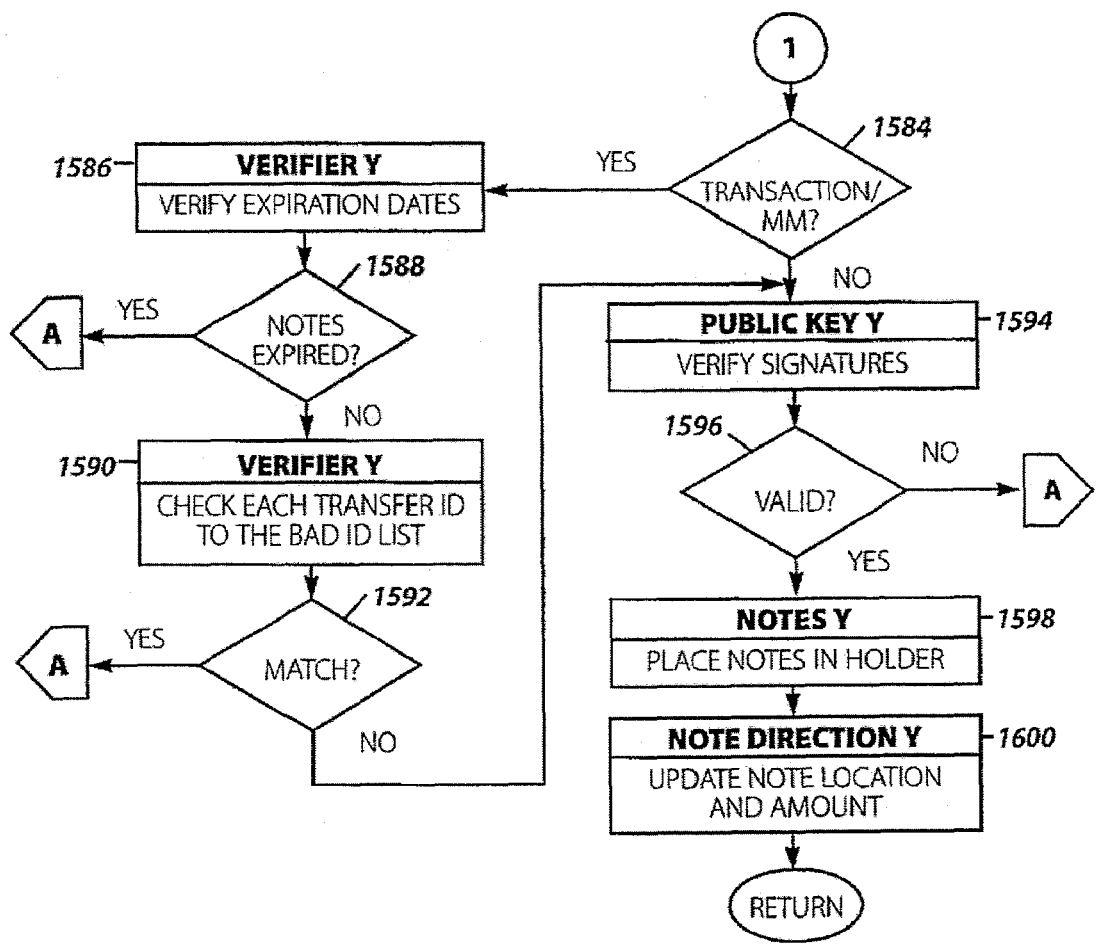
Figure 91A:
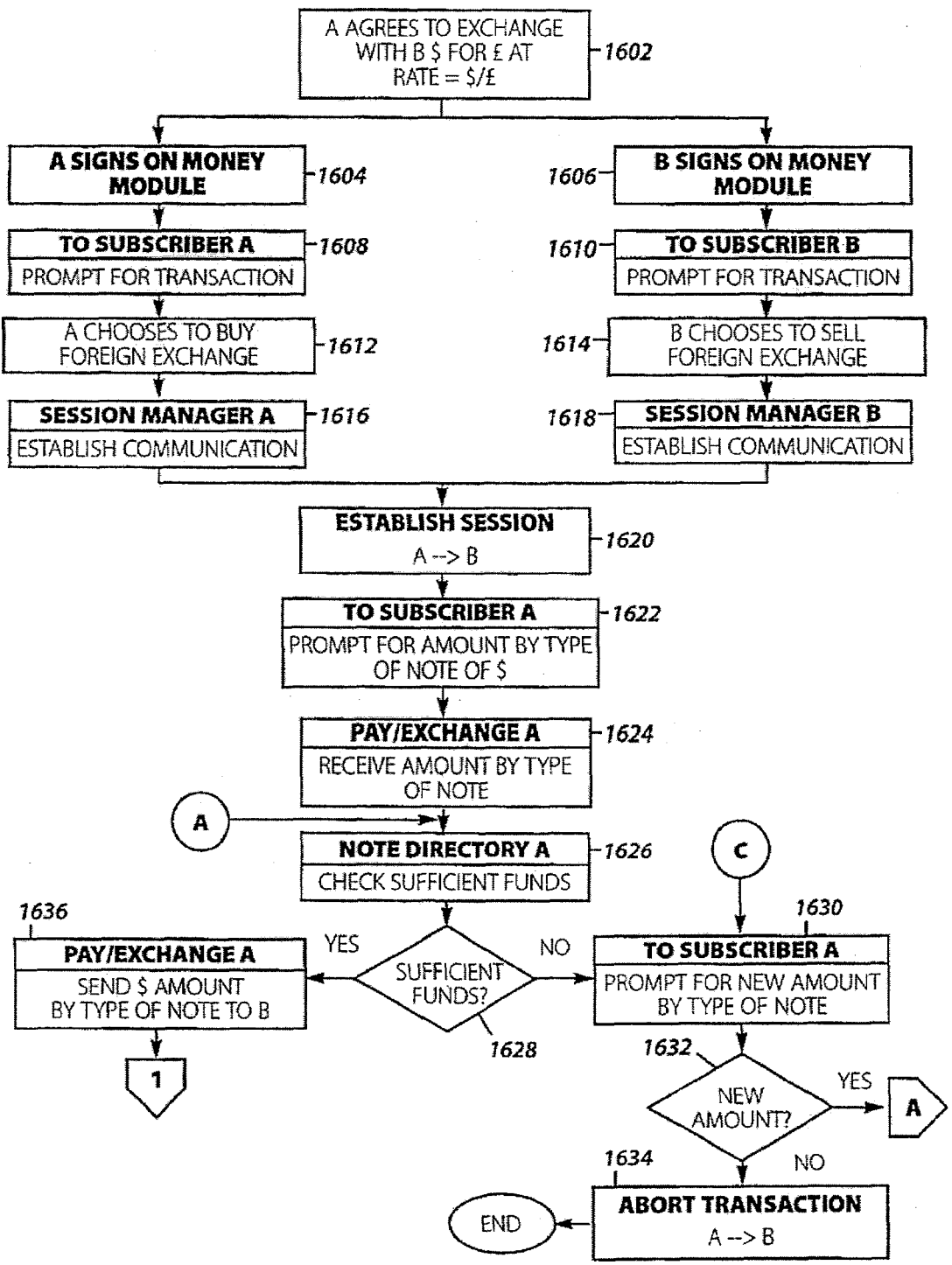
FIGS. 91A-91D illustrate a Foreign Exchange protocol.
Figure 91B:
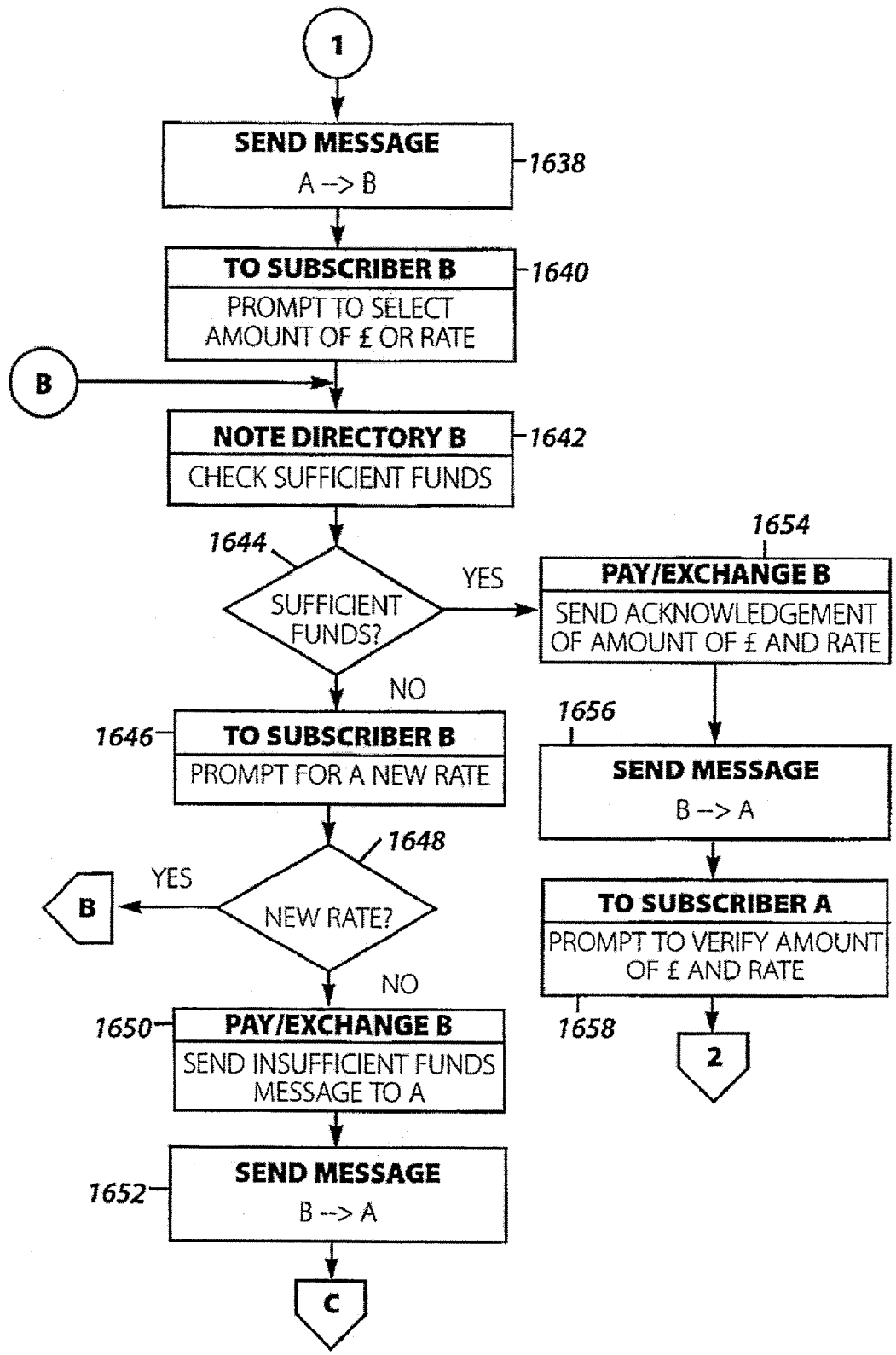
Figure 91C:
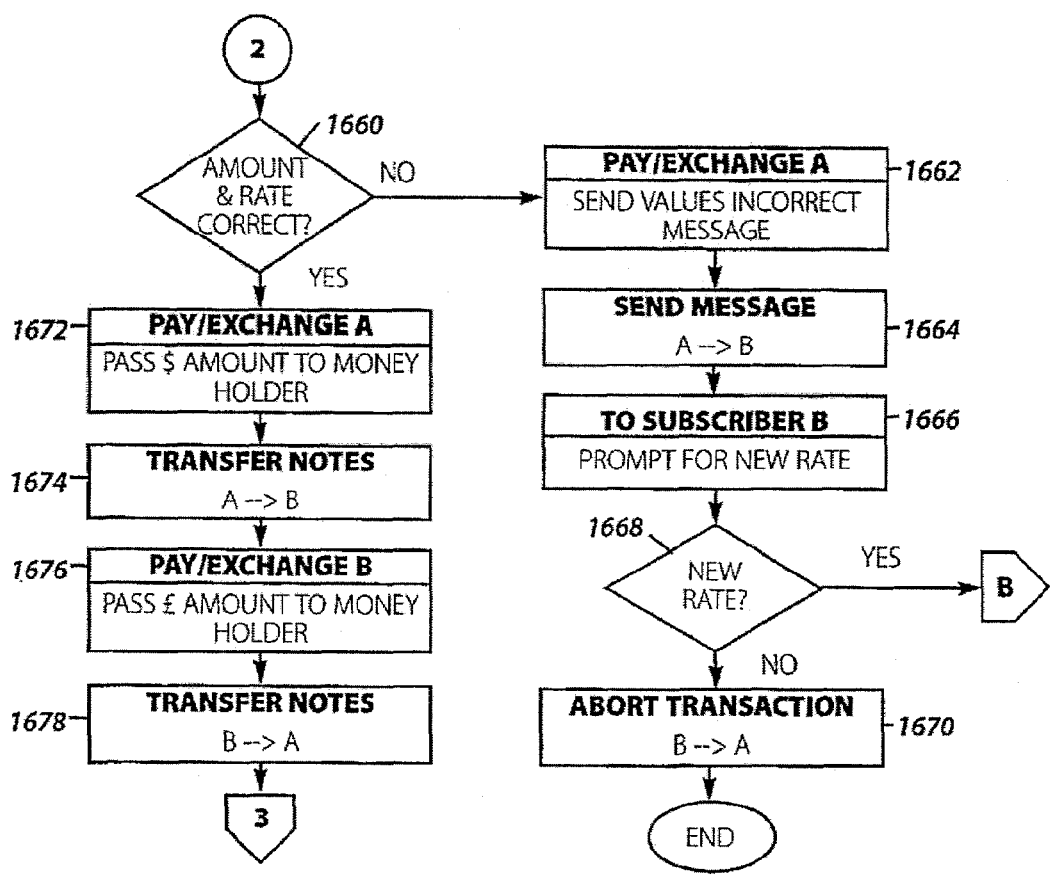
Figure 91D:
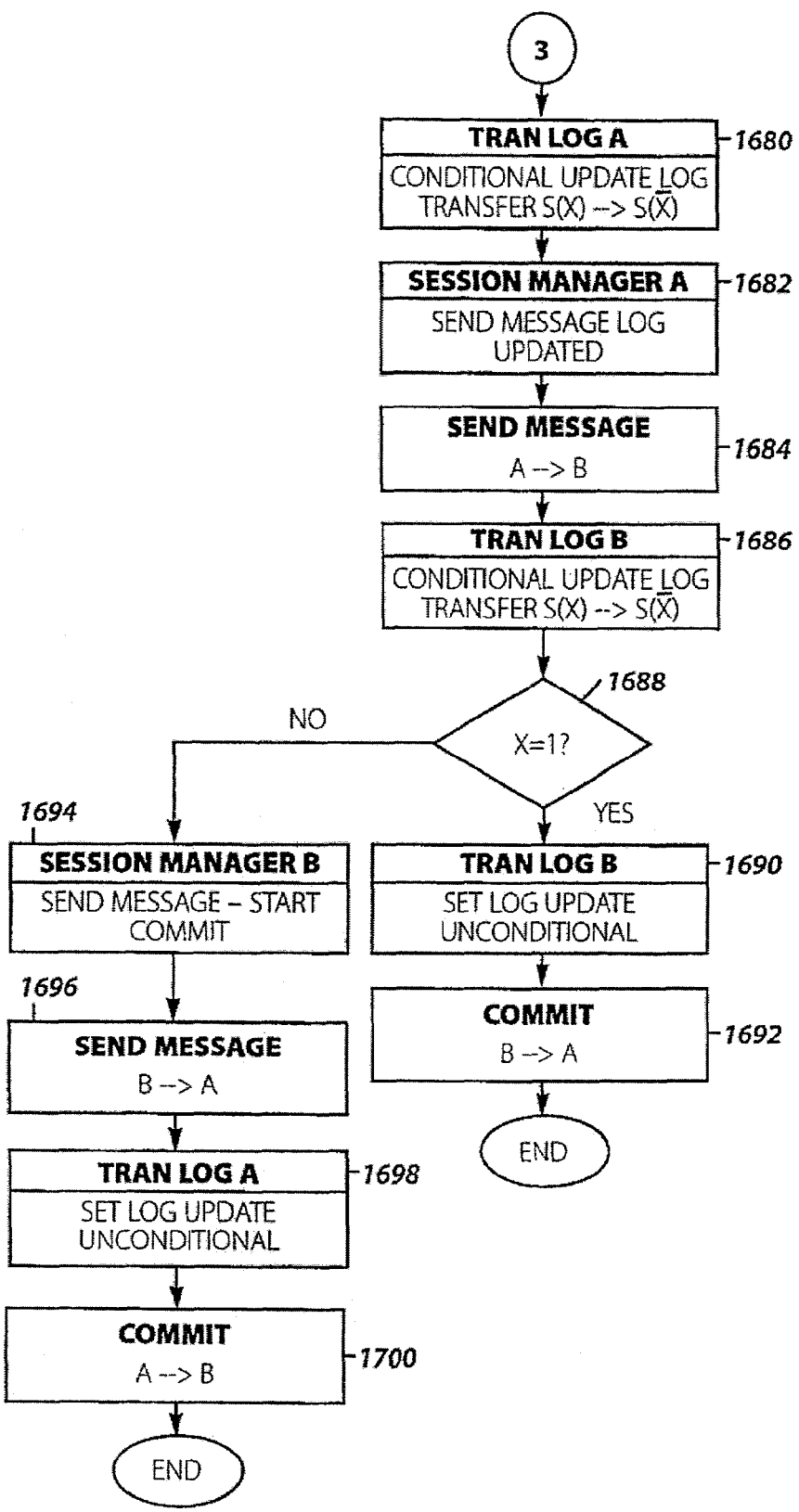

Referring again to FIG. 67, the customer's money module A then transfers electronic notes in the amount specified to the merchant's money module 4 via the E-Routed message path (step 630). At this stage in the transaction, A provisionally retains a correct ticket 8 (and perhaps an encrypted electronic object) and B provisionally retains electronic notes in the correct amount. FIG. 90 shows a Transfer Notes protocol described subsequently.

Figure 92:
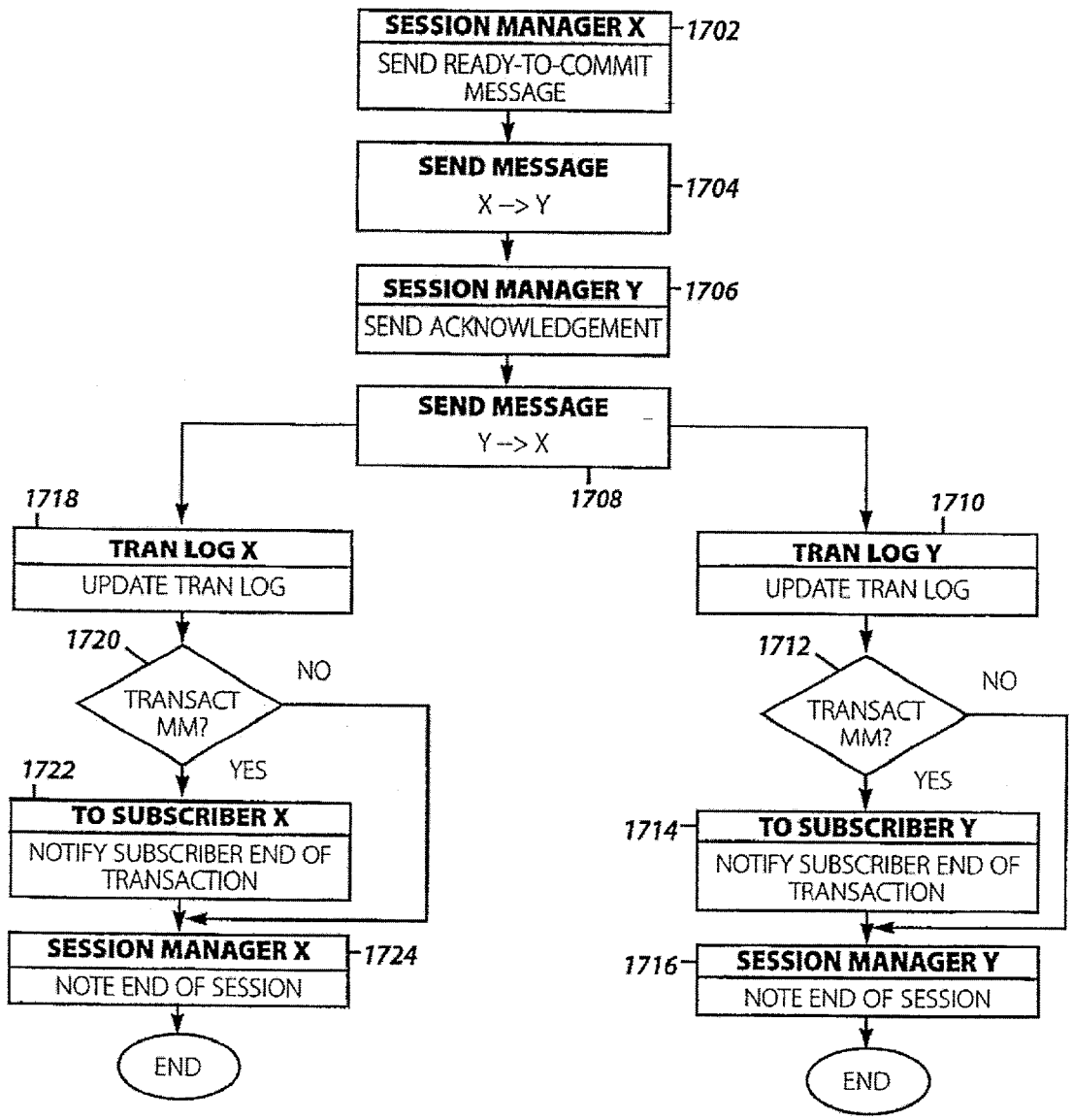
FIG. 92 illustrates a Commit protocol for modules in the EMS.

Next, a MM Commit subroutine is called (step 632). FIG. 92 shows the CDmmit protocol used in the preferred electronic monetary system. This flow diagram is still followed when money modules 6 are interacting with trusted agents 120 with the understanding that Send Message=Send E-Routed Message and that To Subscriber messages are actually sent encrypted to the trusted agent 120. With the foregoing in mind, money module B's MM Session Manager sends a "Ready-To-Commit" message to money module A's MM Session Manager via the send E-Routed Message subroutine (steps 1702-1704). MM Session Manager A then sends an "Acknowledgement" message to money module B and money module A commits (steps 1706-1716). When money module B receives the "Acknowledgement" message it too commits (steps 1718-1724).

During the commit routines of money modules A and B, they generate messages sent to their trusted agents A and B, respectively (steps 1714, 1722) informing them that they have committed to the transaction and hence that the payment was successful.

Referring again to FIG. 67, the money modules then both send the aforementioned "Payment Successful" messages to their trusted agents (steps 584-586). These messages are encrypted by session key (TA/MM). Session Manager A detects that a successful payment has been made and Ticket Holder A updates the ticket with payment information such as the date of purchase (steps 588, 592, (634). Trusted agent A then commits (step 636) so that its retention of the ticket is no longer "provisional". Similarly, Session Manager B detects a successful payment (steps 590, 594) and trusted agent B commits (step 638). The transaction is now complete.

In summary, a secure purchase transaction in accordance with the preferred embodiment of the present invention occurs as follows:

(1) a secure transaction session is established between the buyer's and seller's money modules, between the buyer's and seller's trusted agents, and between the money module and trusted agent of each transaction device;

(2) selected electronic merchandise is transferred from the seller's trusted agent to the buyer's trusted agent (where it is retained provisionally)—in the event that the electronic merchandise includes an electronic object, the electronic object is encrypted so that it may be stored outside of the trusted agent;

(3) after verifying the correctness of the transferred electronic merchandise, the buyer's trusted agent instructs its money module to pay a certain amount of electronic money to the seller's money module;

(4) the buyer's money module informs the seller's money module of the amount of electronic money to be paid to it and the seller's money module checks with its trusted agent to verify that this is the correct price of the merchandise;

(5) if the amount is correct, the seller's money module sends an acknowledgement to the buyer's money module;

(6) the buyer's money module transfers the electronic money to the seller's money module (the seller's MM provisionally retains the note(s) and the buyer's MM provisionally decrements the value of the note(s) in the transferred amount);

(7) both the buyer's and seller's money modules commit (the seller MM's retention of the note(s) is no longer provisional and the buyer's MM retains the new value(s) of the note(s)) and, in so doing, send "payment successful" messages to their respective trusted agents;

(8) finally, both the buyer's and seller's trusted agents commit (the seller's trusted agent records the sale and the customer trusted agent's retention of the merchandise is no longer provisional), so that the buyer can now use his/her electronic merchandise and the seller has his/her electronic money.

It may be noted that in an alternative embodiment, the order of exchanging electronic merchandise and money may be reversed. In such a case, the electronic money may be transferred (provisionally) first followed by the (provisional) transfer of the electronic merchandise. The customer's trusted agent would then instruct its money module to commit, and the transaction would proceed as previously described. Such an alternative embodiment would require modifying the money module payment protocols accordingly.

We have shown how to secure simultaneous payment to delivery of electronic merchandise over a communication network where the seller does not know the identity of the buyer. This is a direct analogy to a buyer purchasing merchandise in a store with cash. The store clerk does not know the identity of the customer, but will sell to him for cash. The customer trusts he will get the merchandise since he is in physical proximity to the clerk across the "counter". We have produced with the above protocol an electronic "counter" across which the customer's trusted agent 2 and merchant's trusted agent 4 can transact as securely as in the physical analogue.

In addition to anonymous money module payments, the trusted agent 120 also provides a secure platform for providing identity-based transactions, i.e., transactions requiring disclosure of the customer's identity. Examples of such transactions are credit or debit card payments, opening a checking account, purchase of an item which requires buyer registration such as a car or truck or paying a bill or invoice. Today it is risky for a merchant to remotely accept a credit or debit card number for payment and deliver the merchandise to other than the customer address. If the transaction is fraudulent, the merchant is responsible. However, the merchant could take the card number as part of a trusted agent's credential, which would be secure enough for the card issuer to take the risk of fraud.

Figure 72A:
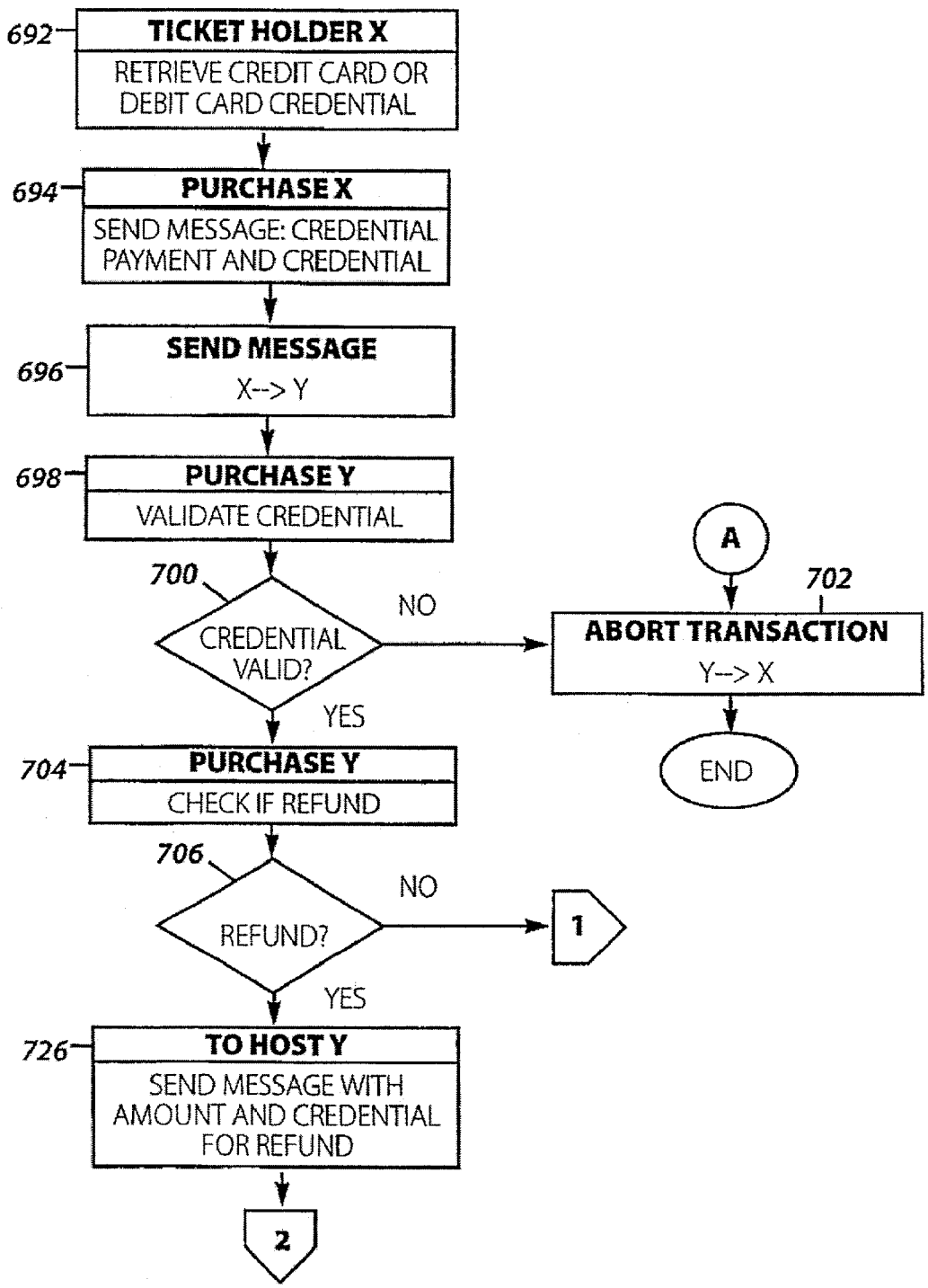
FIGS. 72A-72B illustrate an Authorization-Based Payment/Refund protocol.
Figure 72B:
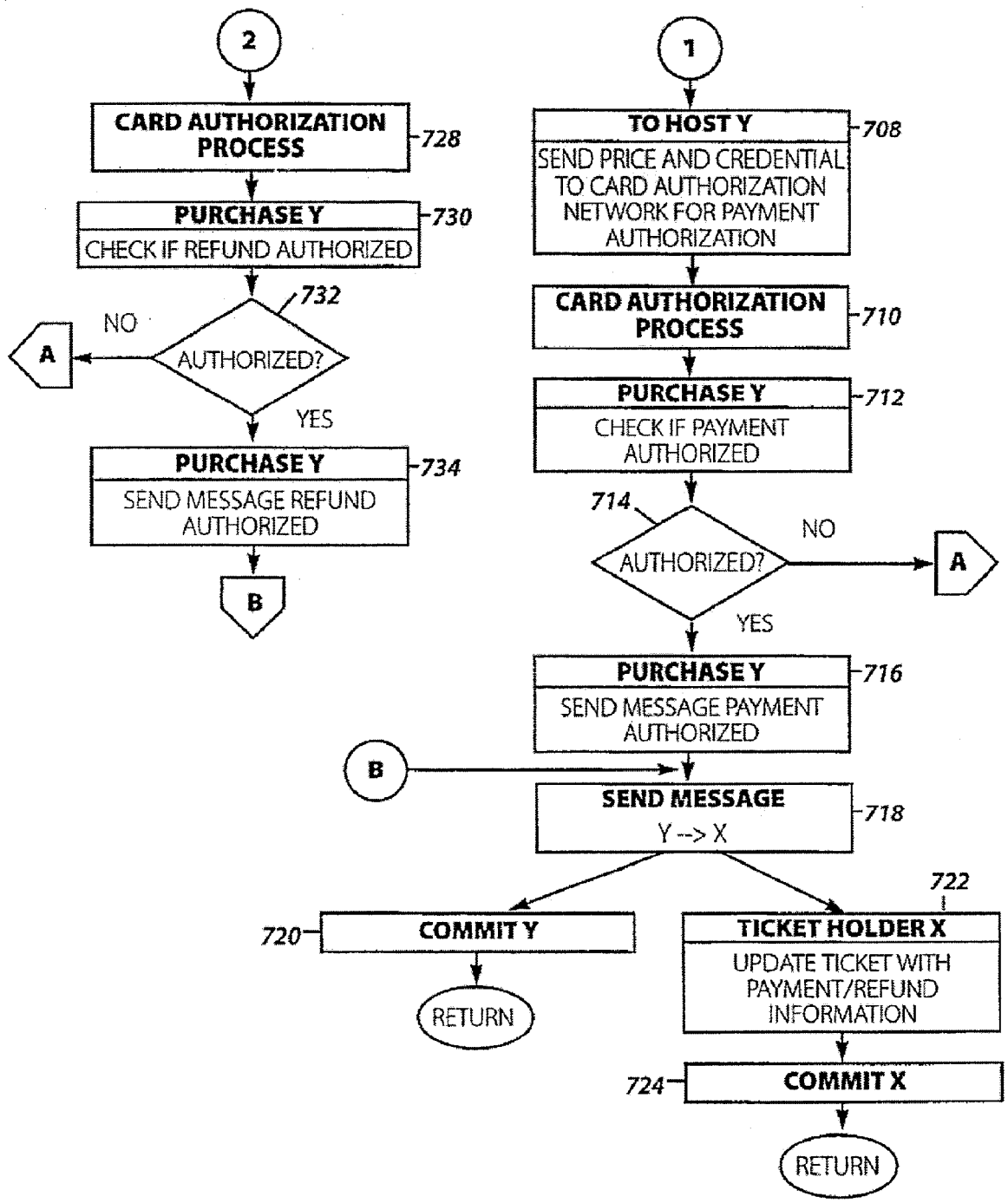

Referring back to FIG. 63, if instead of an anonymous money module payment, the customer decides to pay via a credit or debit card credential, then the Authorization-Based Payment/Refund subroutine is called (step 432). Referring to FIG. 72, Ticket Holder A retrieves a credit card or debit card credential (step 692). Purchase A sends a message indicating that payment is a "Credential Payment" and containing the credential to Purchase B for validation (steps 694-700). If invalid, the transaction is aborted (step 702). If valid, then Purchase B checks to see whether the customer is requesting a refund (steps 704-706). Assuming it is not a refund transaction, To Host B sends the price and credential to a card authorization network for payment authorization (step 708). The MTD initiates a card authorization process (step 710). Card authorization is well known in the art and typically involves the card issuer or its agent authorizing a particular payment when sufficient funds are present or the amount is within the card holder's credit limit. Upon completion of the card authorization process, Purchase B checks if a payment was authorized (steps 712-714).

If payment is not authorized, then the transaction is aborted (step 702). If payment is authorized, then Purchase B sends message "Payment Authorized" to Ticket Holder A and trusted agent B commits (steps 716-720). When Ticket Holder A receives the "Payment Authorized" message, it updates the ticket with payment information (e.g., date of purchase) (step 722). Trusted agent A then commits (step 724), completing the authorization-based payment.

Figure 73:
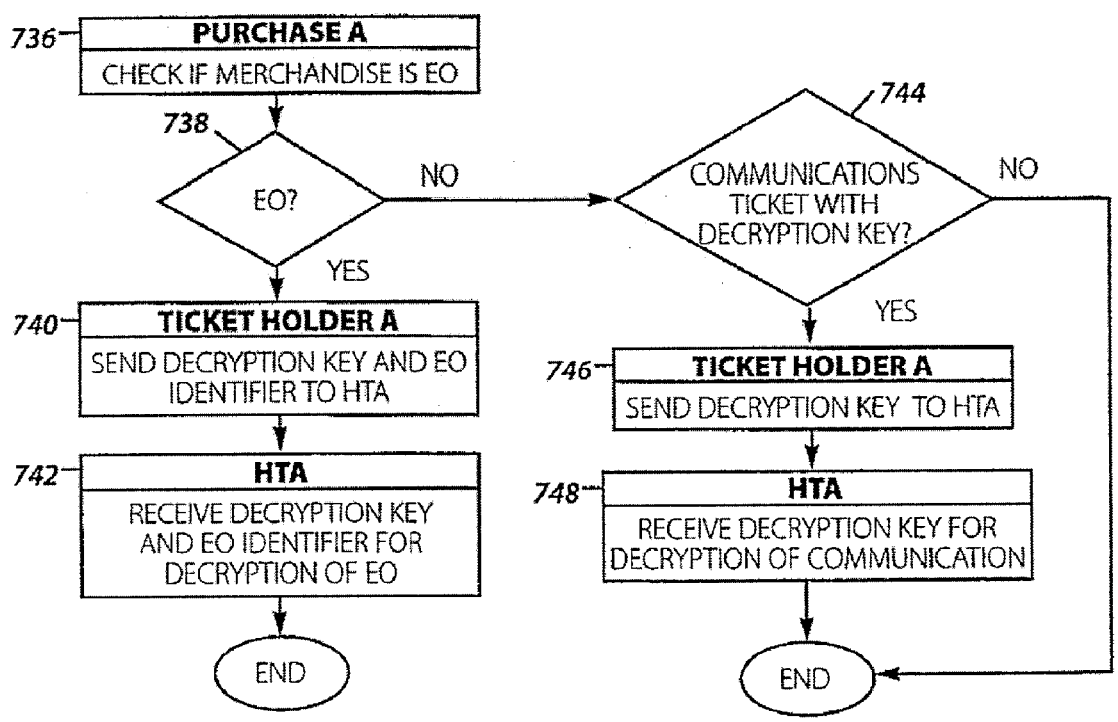
FIG. 73 illustrates an Open Merchandise protocol.
Figure 74A:
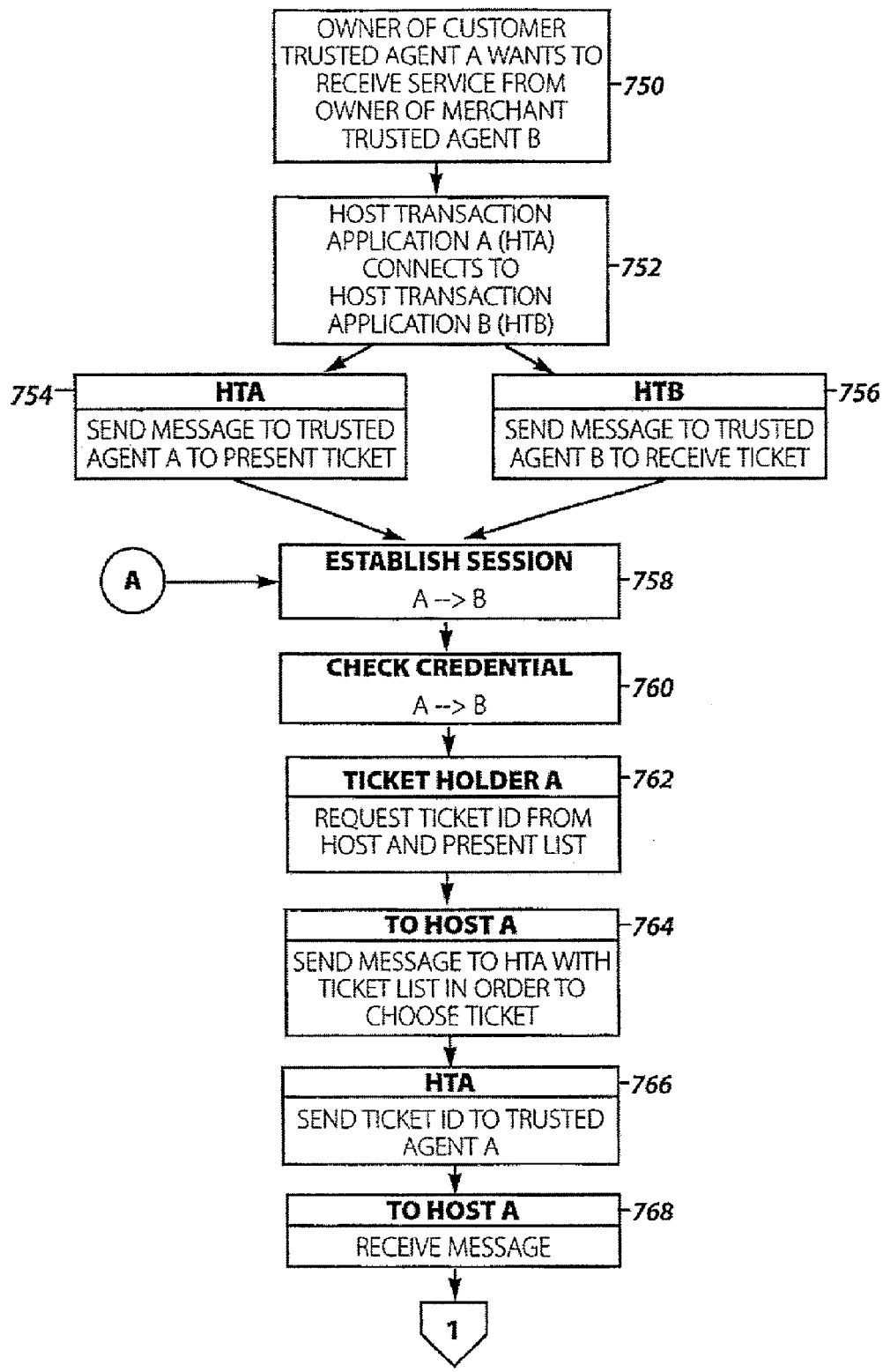
FIGS. 74A-74D illustrate a Present Electronic Ticket for Services protocol.
Figure 74B:
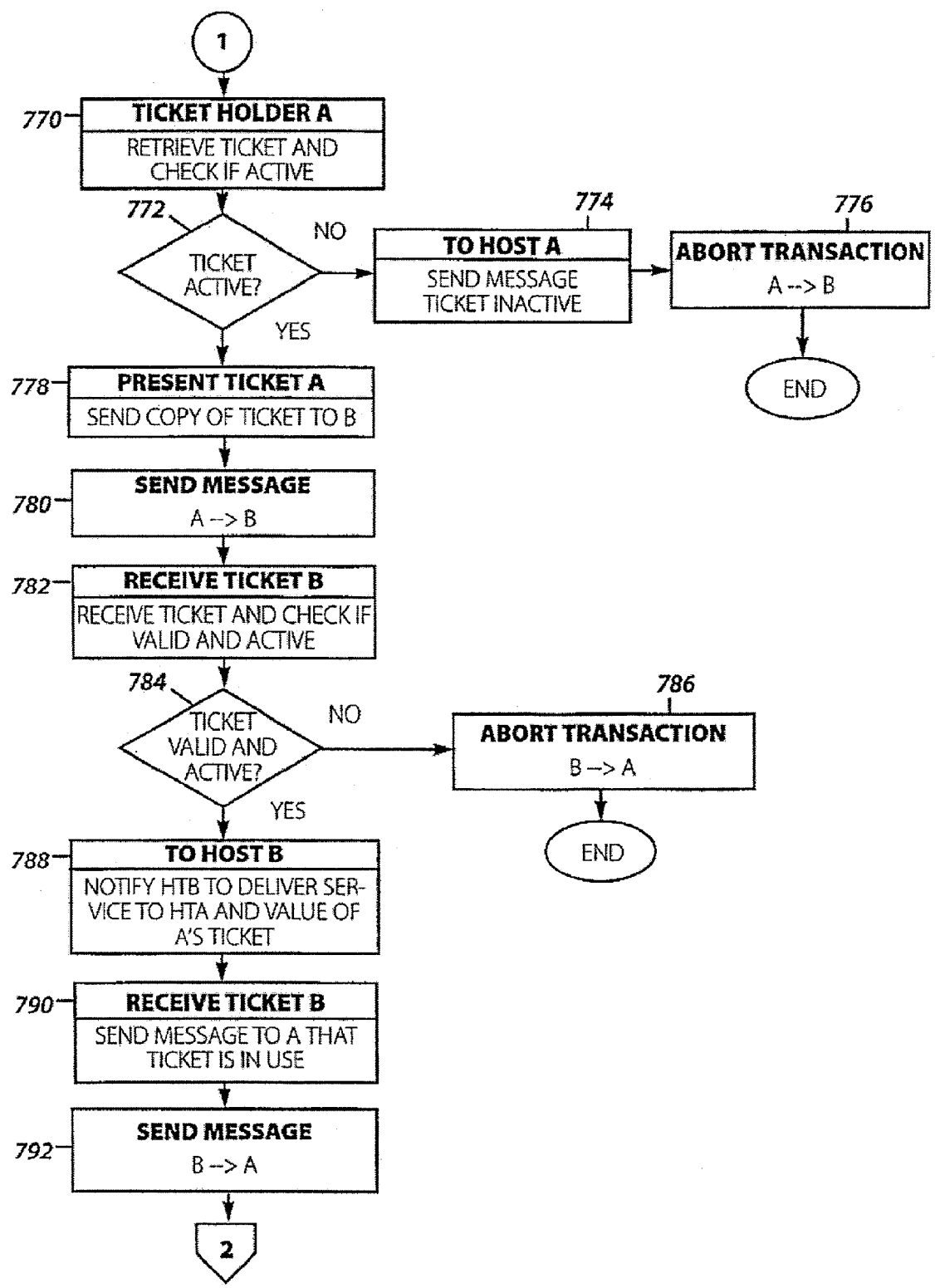
Figure 74C:
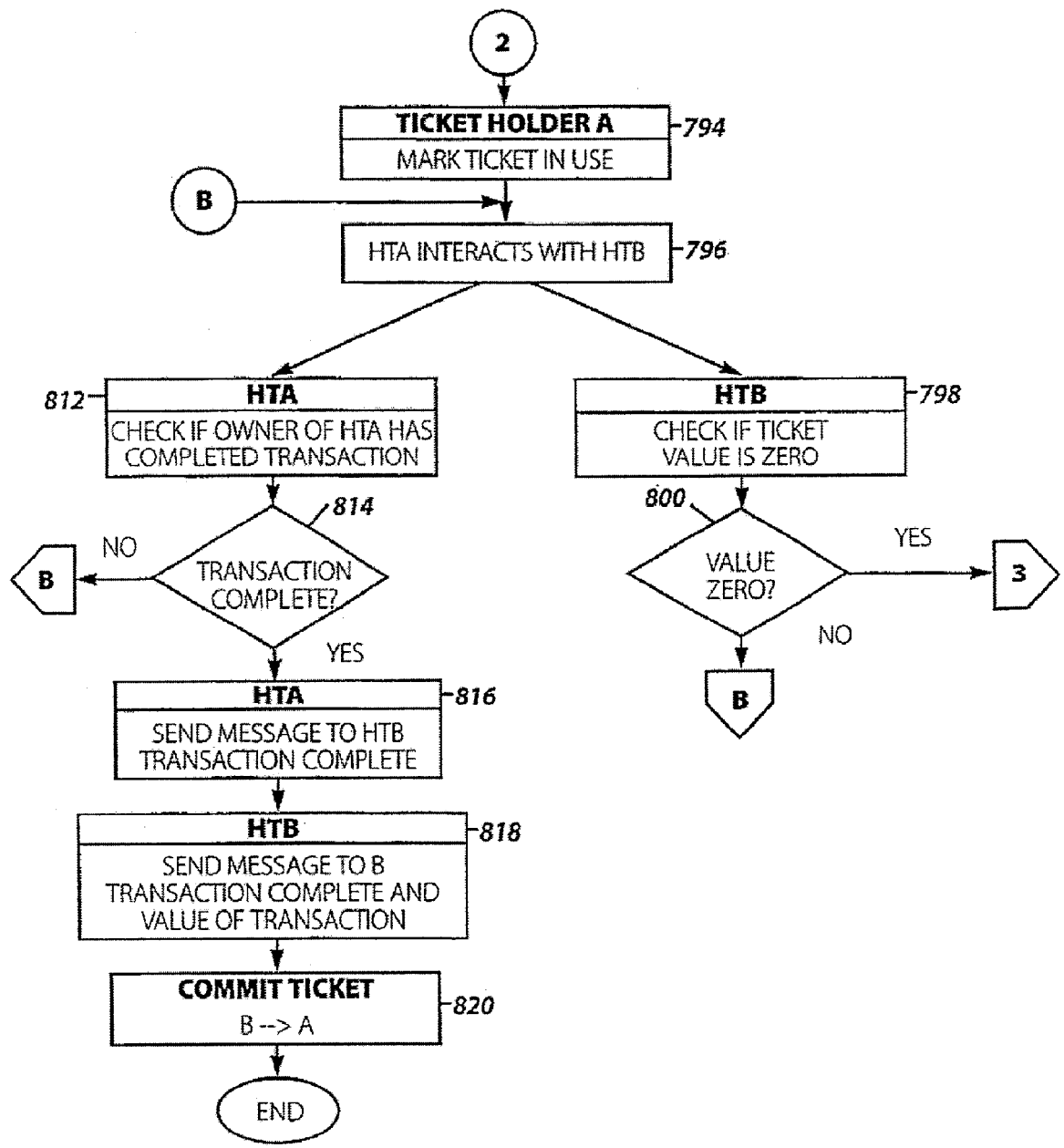
Figure 74D:
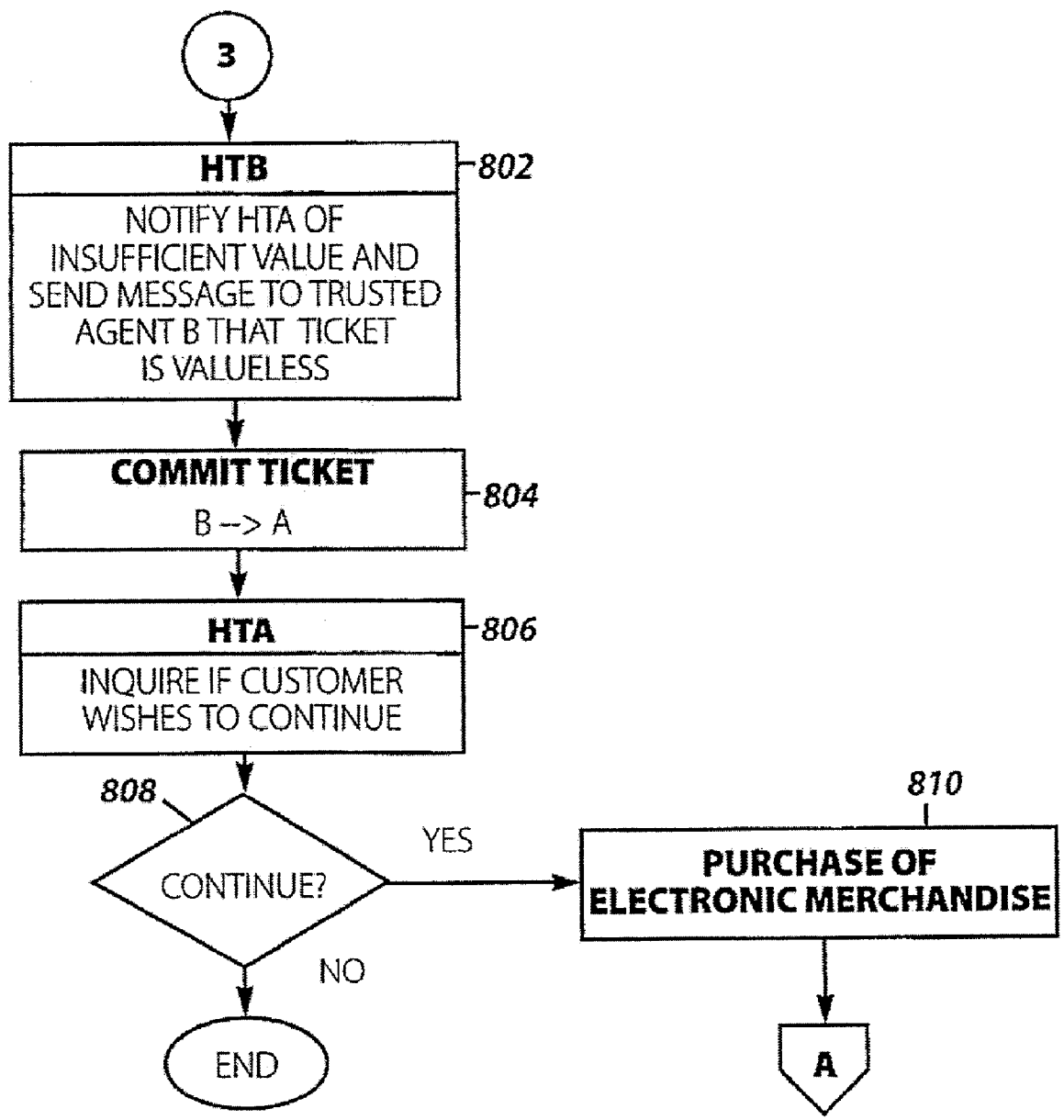

Referring back to FIG. 63, after payment the Open Merchandise subroutine is called (step 434). Referring to FIG. 73, Purchase A checks if merchandise is an electronic object (steps 736-738). If so, Ticket Holder A sends the decryption key and the electronic object identifier from the decryption ticket to a host transaction application for its use in decryption of the electronic object (steps 740-742). If, however, the merchandise is a communications ticket with a decryption key, then Ticket Holder A sends the decryption key to the HTA (step 746). The HTA uses the key for decrypting communications (step 748). If the merchandise is neither an electronic object nor a communications ticket with decryption key, then the process simply ends. The other forms of ticket 8 must be presented in order to obtain services.

Present Ticket

Referring to FIG. 74, when the owner of a customer trusted agent A wants to use a ticket for receiving services from the owner of a merchant trusted agent B, a host transaction application A (HTA) connects to a host transaction application B (HTB) (steps 750-752). HTA sends a message to its trusted agent to "Present Ticket" and HTB sends a message to its trusted agent to "Receive Ticket" (steps 754-756).

The trusted agents establish a session (step 758) and A checks B's merchant credential (step 760). Ticket Holder A requests the ticket ID from the host and presents a list of tickets which it holds (step 762). To Host A sends this message to HTA so that the customer can choose which ticket to present (step 764). After the customer chooses the appropriate ticket, HTA sends the ticket's ID to trusted agent A (steps 766-768). Ticket Holder A retrieves the selected ticket and checks if it is active (steps 770-772). A ticket 8 is "active" if it still has value. For example, in the case of an event ticket the status field 100 indicates whether the ticket 8 has already been presented and is thus valueless. In the case of a communications ticket the Time Available field 116 indicates the remaining value in the ticket 8. If the ticket 8 is not active, then To Host A sends a message to HTA that the ticket is inactive and the transaction is aborted (steps 774-776).

If the ticket 8 is active, then Present Ticket A sends a copy of the ticket to B (steps 778-780). Receive Ticket B receives the ticket and checks if it is both valid and active (steps 782-784). If not active and valid, the transaction is aborted (step 786). If valid and active, then To Host B notifies HTB to deliver services to HTA (step 788). The remaining value of A's ticket is also passed since the ticket may be a type having value that is used up incrementally as services are rendered (e.g., similar to a prepaid phone card). Receive Ticket B then sends a message to A that the ticket 8 is now in use (steps 790-792). Ticket Holder A marks the ticket 8 as "In Use" (step 794).

HTA interacts with HTB in the appropriate fashion depending on the type of ticket and services being rendered (step 796). HTB continually monitors the remaining ticket value until the value is reduced to zero (steps 798-800). At this point, HTB notifies HTA of the insufficient value and sends a message to B that the ticket is valueless (steps 802). The Commit Ticket subroutine is then called (step 804).

Figure 75:
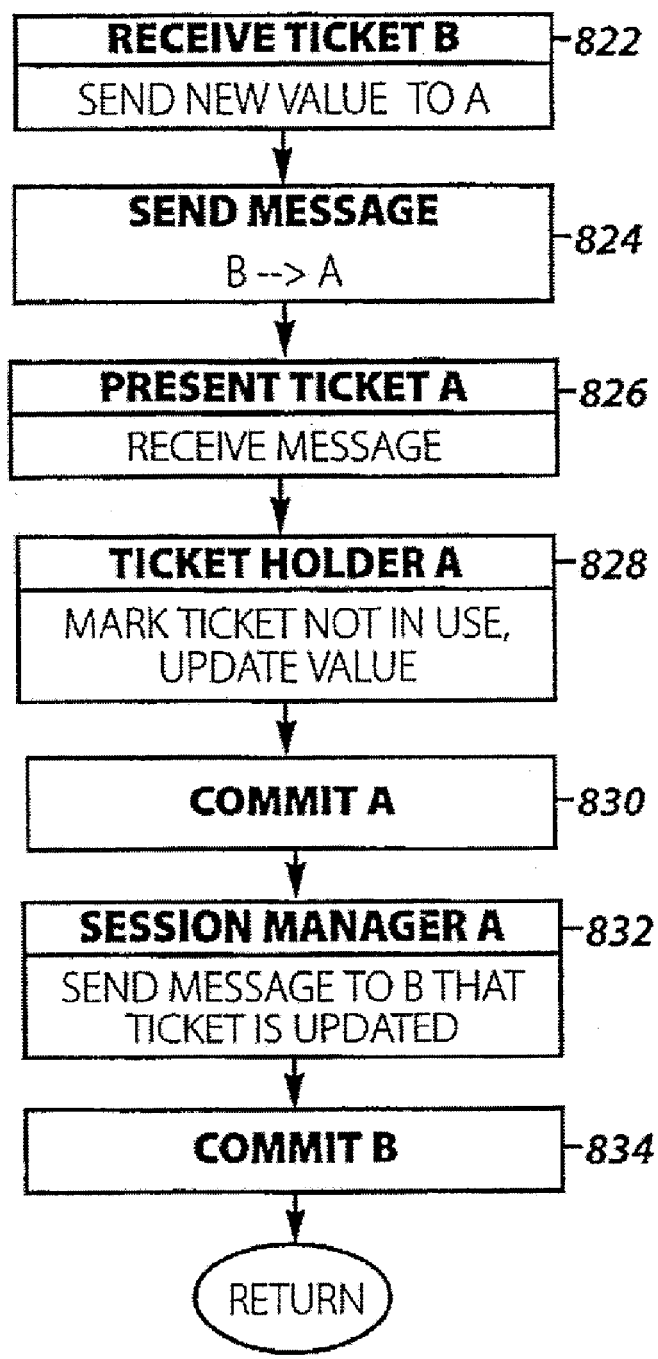
FIG. 75 illustrates a Commit Ticket protocol.

Referring to FIG. 75, Receive Ticket B sends the new remaining ticket value, in this case zero, to Present Ticket A (steps 822-826). Ticket Holder A then marks the ticket 8 as "Not In Use" and updates the ticket value (step 828). Finally, trusted agent A commits, Session Manager A informs B that the ticket 8 is updated, and trusted agent B commits (steps 830-834). Referring back to FIG. 74, HTA then inquires whether the customer wishes to continue (steps 806-808). If so, then trusted agent A undertakes to purchase more ticket value (step 810).

During HTA to HTB interaction (step 796), HTA checks if the owner of HTA has completed the transaction (steps 812-814). If the transaction is completed, then HTA informs HTB which, in turn, informs its trusted agent (steps 816-818). HTB also sends its trusted agent the remaining ticket value. Finally, the Commit Ticket subroutine is called (step 820).

Ticket Transfer

Tickets 8 may be transferred between trusted agents 120 (aside from the initial issuing of the ticket). There are several reasons an owner may wish to do this. For example, if a ticket 8 was purchased via a desktop transaction device 122 (e.g., a CTD 188 embedded in a personal computer), then the owner may wish to transfer it to a portable device (e.g., an electronic wallet). Or, if the owner buys a ticket 8 for a friend or relative, then the owner can transfer the ticket to the other party for their use. Another situation is when the owner purchases a new transaction device 122 and wishes to transfer his credentials to the new device.

Figure 76A:
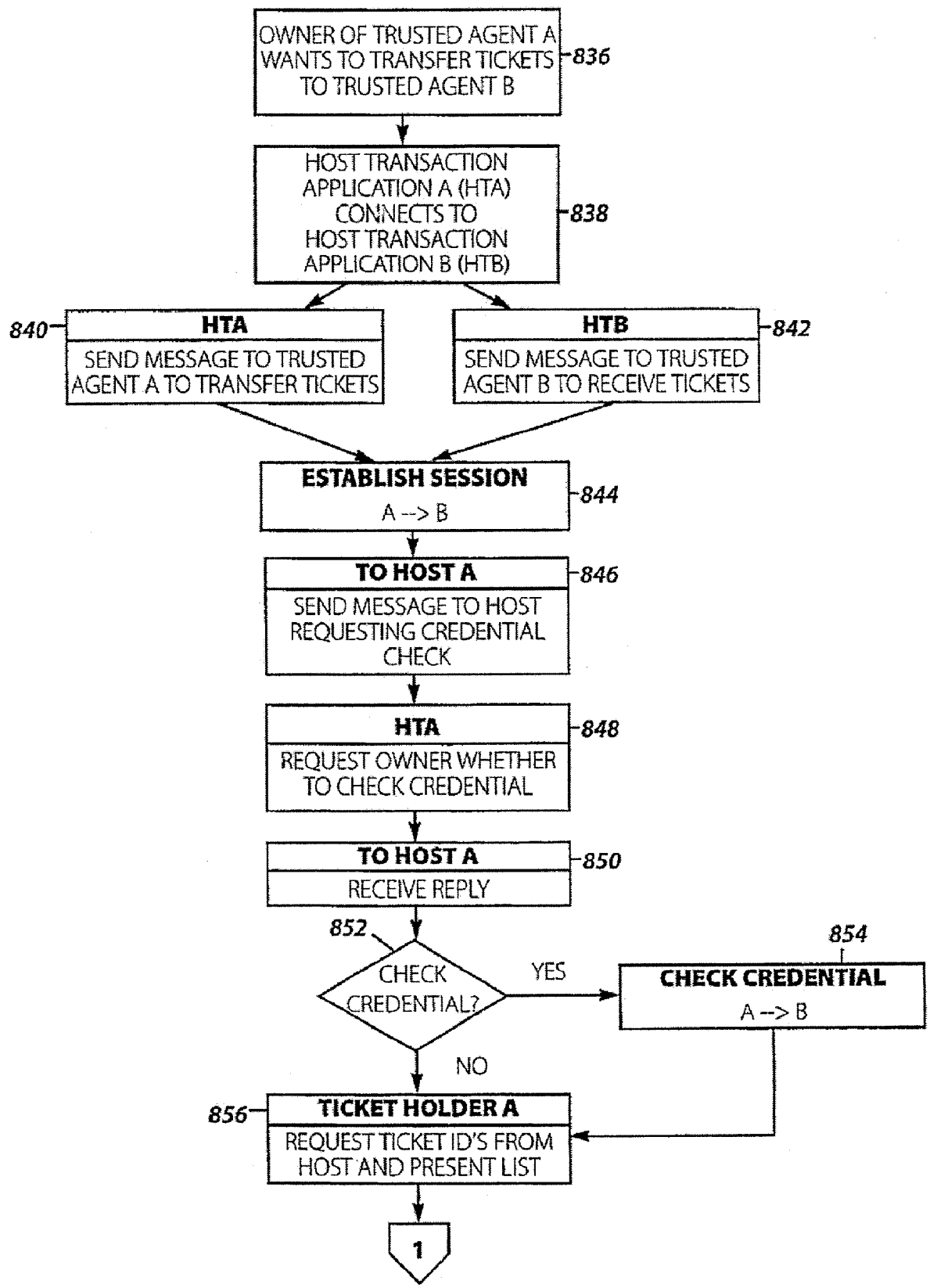
FIGS. 76A-76C illustrate a Transfer Tickets protocol.
Figure 76B:
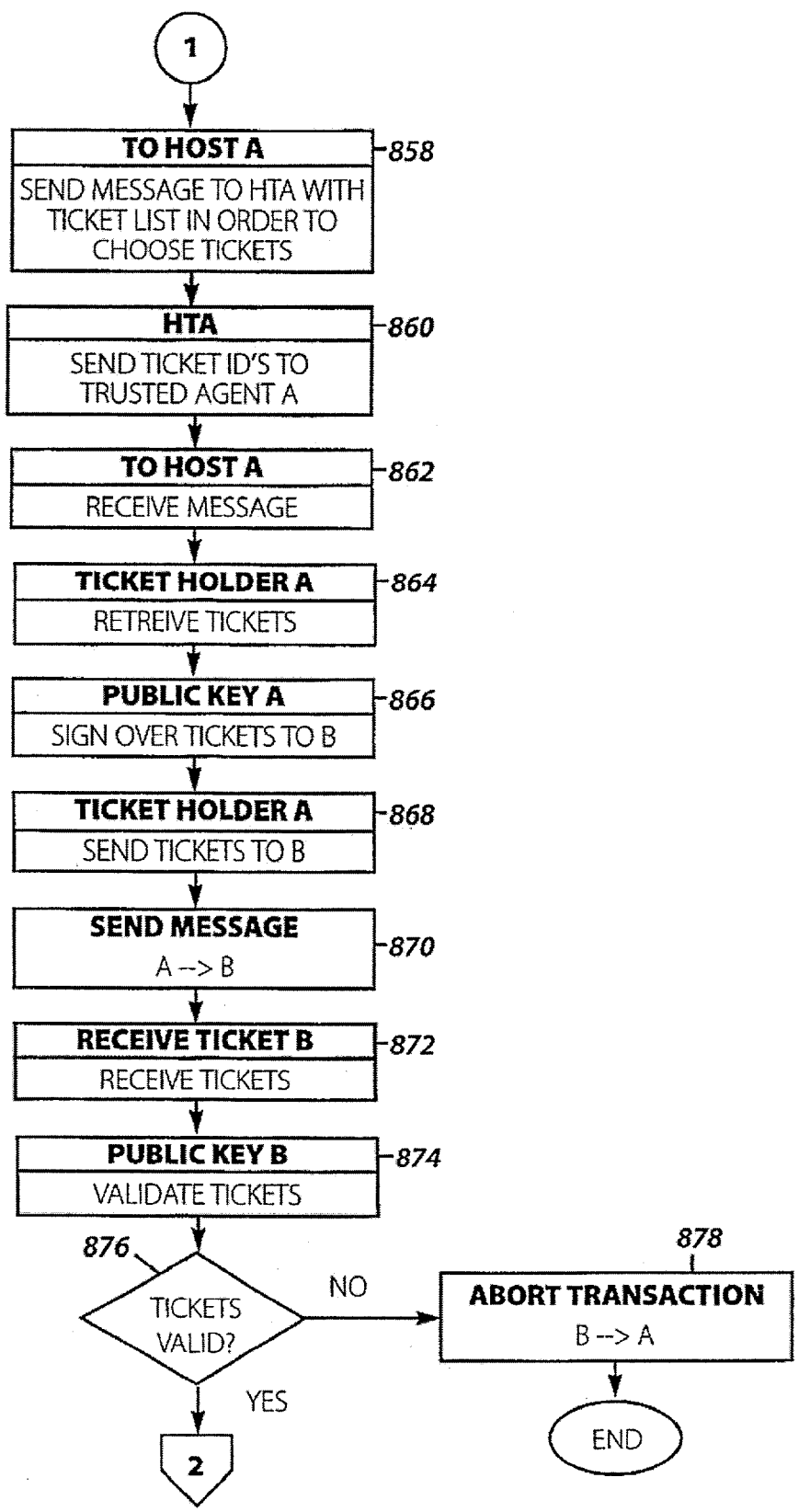
Figure 76C:
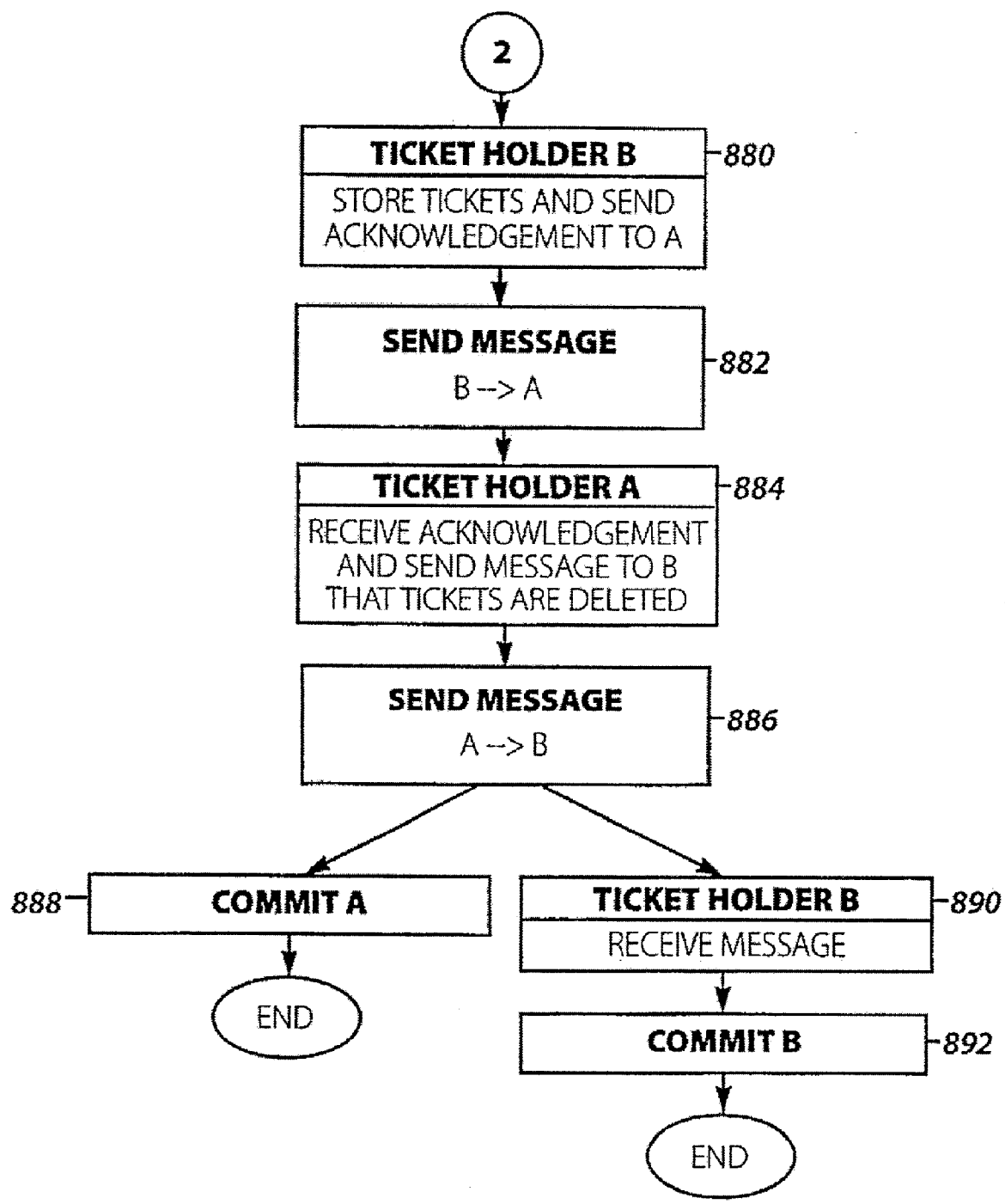

Referring to FIG. 76, there is shown the procedure followed when the owner of trusted agent A wants to transfer one or more tickets 8 to trusted agent B (step 836). Initially, HTA connects to HTB (step 838). HTA then instructs its trusted agent to "Transfer Ticket(s)" and HTB instructs its trusted agent to "Receive Ticket(s)" (steps 840-842). Next, the trusted agents establish a secure session (step 844). To Host A then sends an inquiry to the transaction device owner via HTA whether to check the identifying credential of the party to receive the ticket(s) (steps 846-848). If there is no credential check or a credential check is performed successfully (steps 850-854), then Ticket Holder A requests the ID's of the tickets to be transferred (step 856). Tickets are selected from a list of tickets held by trusted agent A. To Host A sends the message to HTA with the ticket list, the owner chooses, and To Host A receives the response identifying the selected ticket(s) (steps 858-862).

Ticket Holder A retrieves the selected ticket(s) (step 864). Public Key A then signs over the ticket(s) to B by adding the appropriate transfer information to the Transfer History section and appending the digital signature to the Sender Signatures section (step 866). Ticket Holder A then sends the ticket(s) to Receive Ticket B for validation by Public Key B (steps 868-876). If the ticket(s) are not valid, then the transaction is aborted (step 878). If the ticket(s) are valid, then Ticket Holder B stores the ticket(s) and sends an acknowledgement to A (steps 880-882). Ticket Holder A receives the acknowledgement and deletes the ticket(s) (step 884). Trusted agent A informs Ticket Holder B that the tickets are deleted (steps 884-886) and commits (step 888). Ticket Holder B receives the message (step 890) and then trusted agent B commits (step 892).

Credentials

A customer can acquire credentials in person from an Identification Authority. The credentials could be a driver's license from a motor vehicle administration, a passport from the State Department or a Foreign Office, a credit or debit card from a bank, or a corporate seal (identifier) for a bureau of commerce. The credentials can be revalidated remotely or even acquired remotely in the first place if the trusted agent 120 already contains credentials for proof of identity. With credentials it would be possible to open a checking account remotely even if the customer is unknown to the bank.

Referring to FIG. 77, there is shown the flow diagram followed when the owner of trusted agent A decides to acquire a credential from an identification authority in person (step 894). First, the owner of A presents proof of his/her identity to a representative of the identification authority. The representative then enters various information (e.g., name, address, etc.) via HTB of authority trusted agent B. (Steps 896-898). Next, the owner of A instructs his HTA to acquire a credential. In response, HTA sends the message "Acquire Credential" to trusted agent A. (Steps 900-902). Meanwhile, HTB sends the message "Create Credential" to trusted agent B (step 904). Trusted agent B then establishes a session with trusted agent A (step 906). To Host B notifies HTB that a session has been established. HTB sends the various credential information to trusted agent B (steps 908-910). Create Credential then constructs credential information (i.e., the Identifier and Components sections 10, 12 of a credential ticket) (step 912).

Figure 78A:
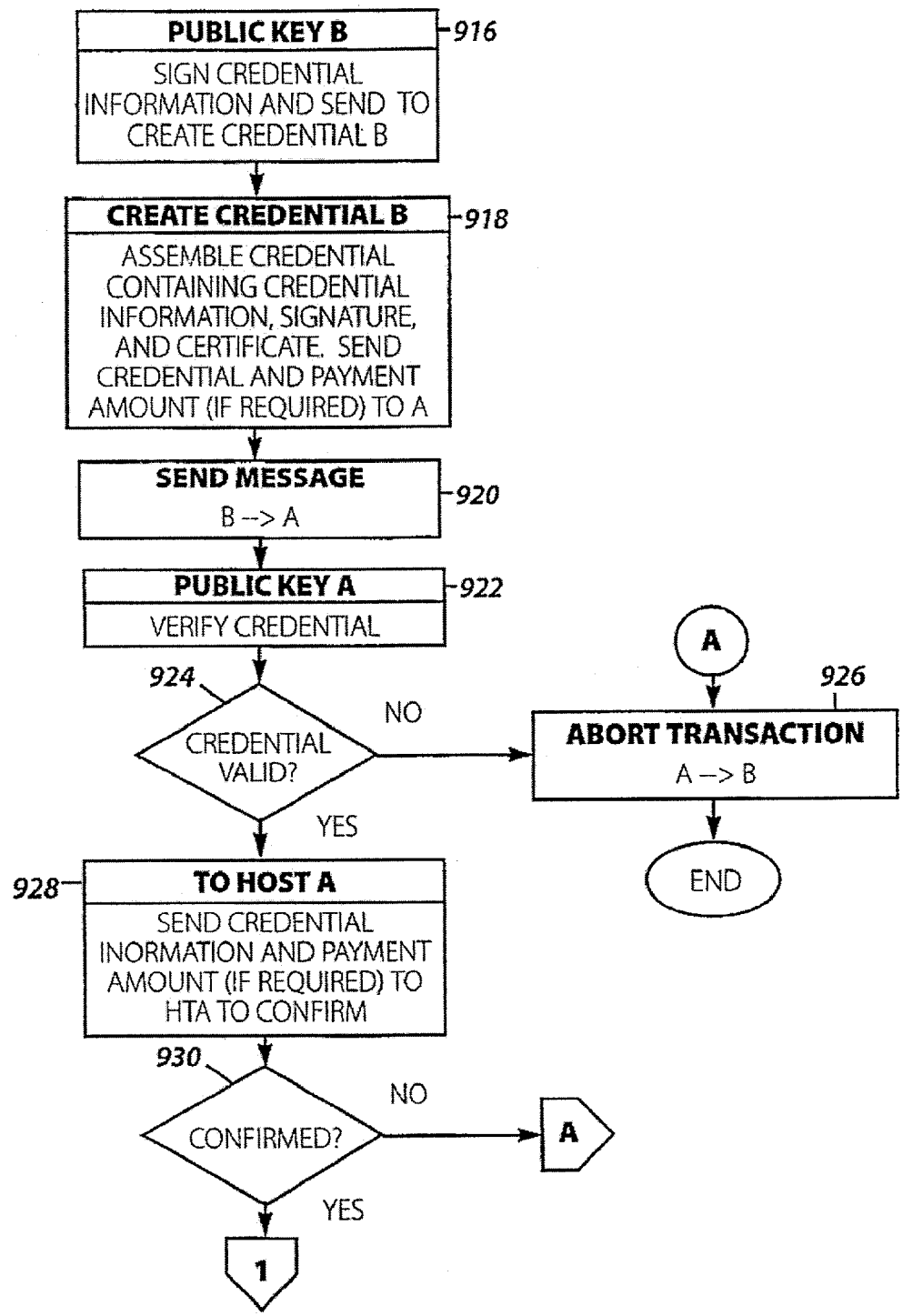
FIGS. 78A-78B illustrate a Deliver Credential protocol.
Figure 78B:
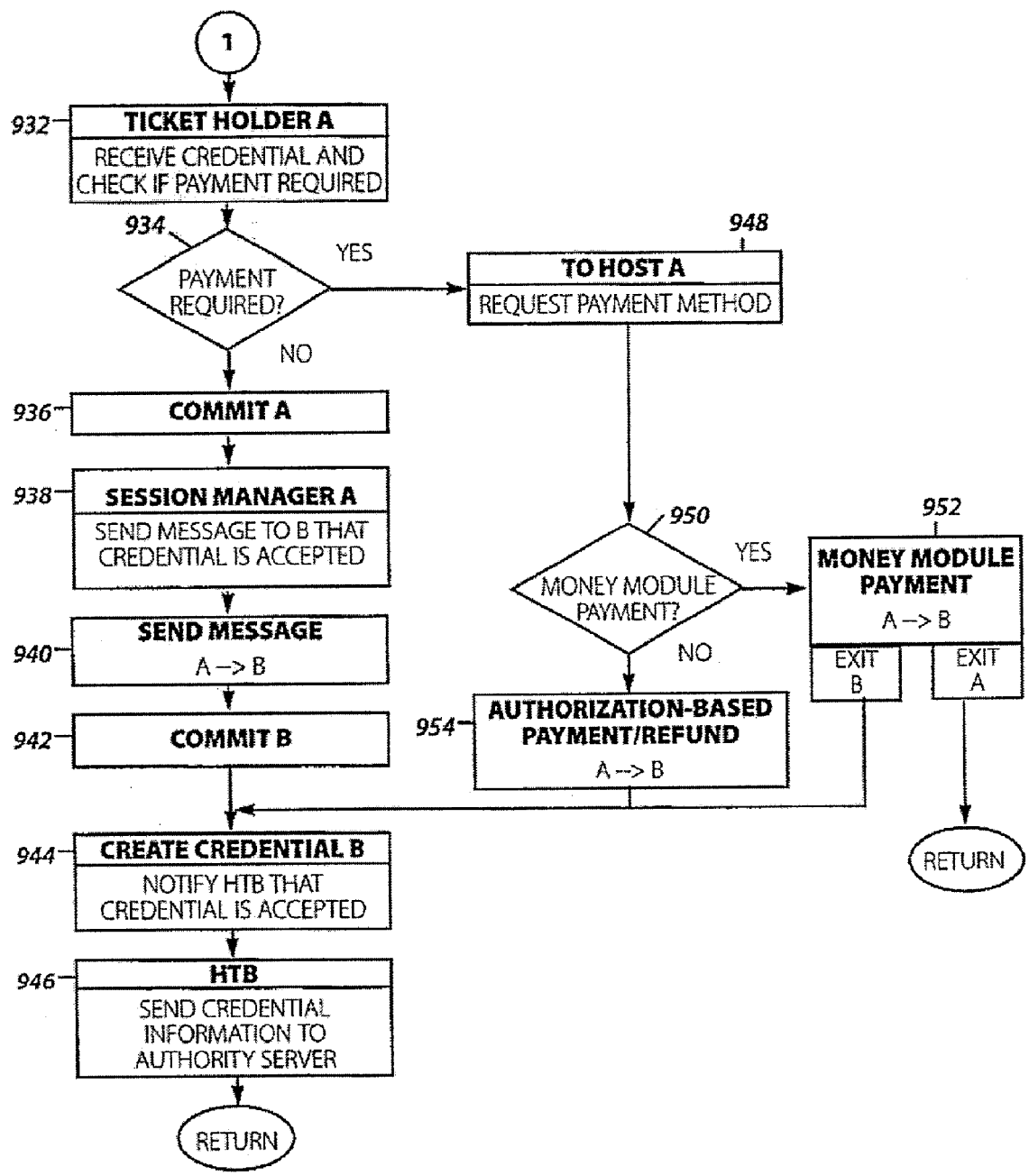

The Deliver Credential subroutine is then called for passing the newly created credential to trusted agent A (step 914). Referring to FIG. 78, Public Key B signs the credential information (with the ATA's private key) and sends it to Create Credential B (step 916). Create Credential B assembles a credential containing the credential information, signature, and certificate (the ATA's cert(TA)) (step 918). Create Credential B then sends the newly created credential to trusted agent A (step 920). If required, Create Credential also sends the price of the credential to A.

Public Key A verifies the credential (steps 922-924). If invalid, the transaction is aborted (step 926). If valid, then To Host A sends the credential information and payment amount (if required) to HTA for confirmation (steps 928-930). If not confirmed by the owner of trusted agent A, then the transaction is aborted (step 926).

If the credential is confirmed, then Ticket Holder A receives the credential and checks if payment is required (steps 932-934). If no payment is required, then trusted agent A commits (step 936) and sends a message to trusted agent B that the credential has been accepted (steps 938-940). Trusted agent B commits upon receiving the message (step 942). Create Credential B then notifies HTB that the credential is accepted and HTB sends the credential information to the credential database maintained by the authority server (steps 944-946).

If, on the other hand, payment for the credential is required, then To Host A requests the owner of trusted agent A to choose a payment method (steps 948-950). If a money module payment is selected, then the Money Module Payment subroutine is called (step 952). At the point where B exits the subroutine, Create Credential B notifies HTB that the credential is accepted and HTB sends the credential information to the authority server (steps 944-946). If, instead, the owner of trusted agent A decides to pay with a credit or debit card, then the Authorization-Based Payment/Refund subroutine is called (step 954).

Figure 79A:
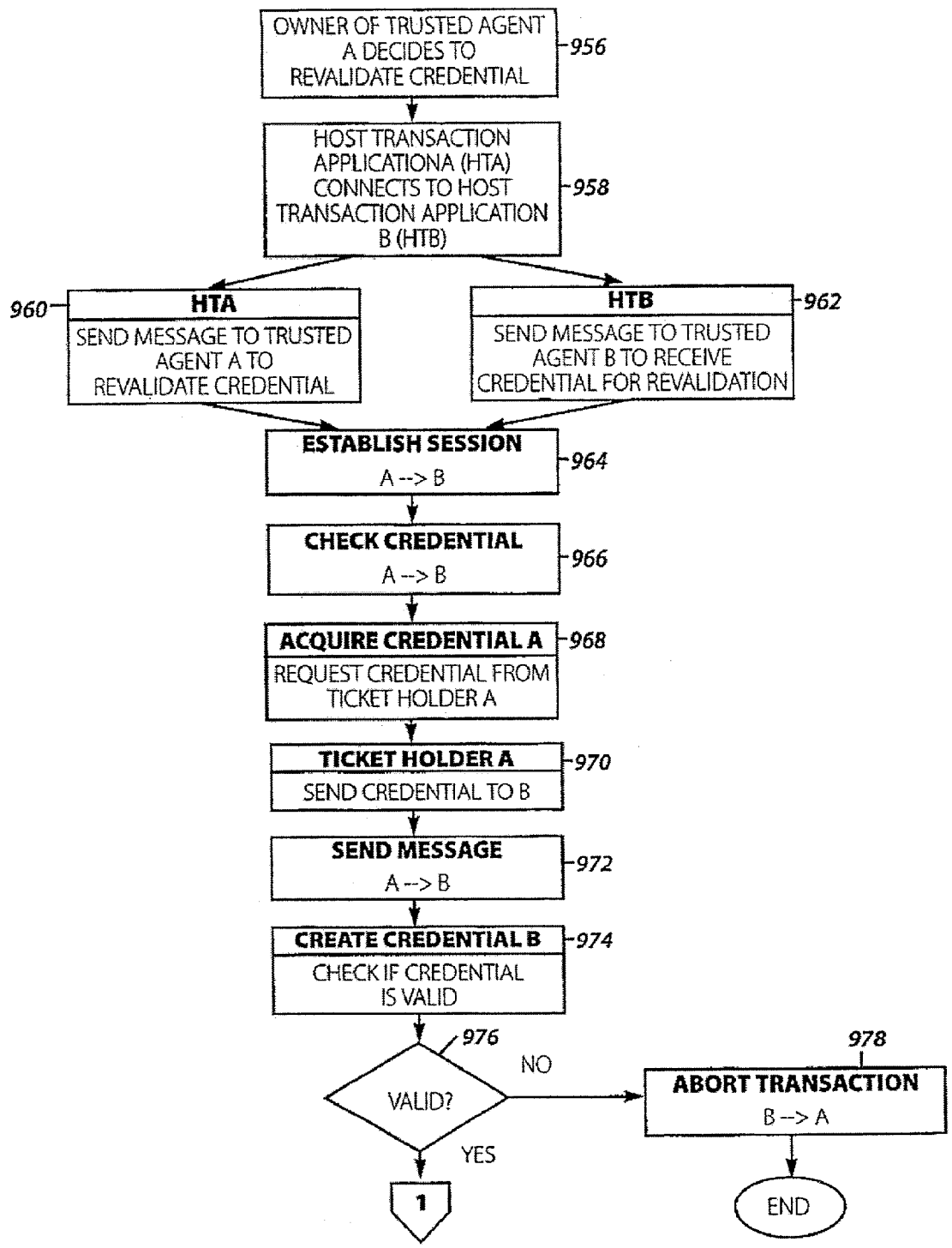
FIGS. 79A-79B illustrate a Revalidate Credential Remotely protocol.
Figure 79B:
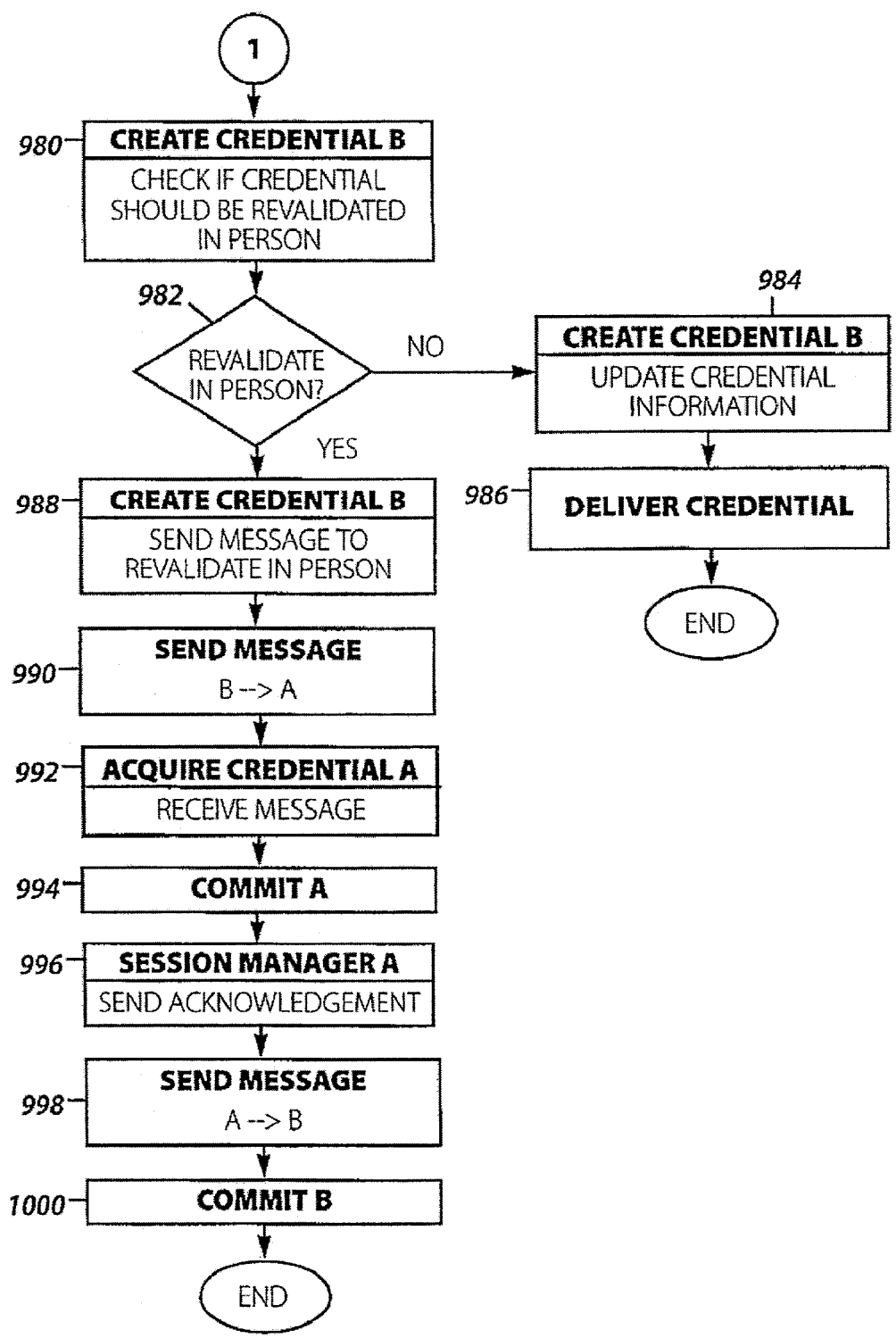

It may be desirable for identification authorities to update their credential information on a periodic basis. Revalidation is thus required by giving credentials expiration dates. FIG. 79 shows how the owner of trusted agent A can revalidate a credential remotely (step 956). Initially, HTA connects to HTB (step 958). HTA sends the message "Revalidate Credential" to trusted agent A (step 960). HTB sends the message "Receive Credential For Revalidation" to trusted agent B (step 962). Trusted agent A then establishes a secure session with trusted agent B (step 964).

Trusted agent A first checks the authority's credential (step 966). Authority credentials may be issued under the supervision of the Trusted Agency. Acquire Credential A requests the credential specified for revalidation from Ticket Holder A which sends the credential to authority trusted agent B (steps 968-972). Create Credential B checks if the credential is valid (steps 974-976). If not valid, the transaction is aborted (step 978). If valid, then Create Credential B checks if the credential should be revalidated in person (steps 980-982). If the credential may be revalidated remotely, then Create Credential B updates the credential information including a new expiration date (step 984). The Deliver Credential subroutine is then called (step 986).

If the credential must be revalidated in person, then Create Credential B sends the message "Revalidate In Person" to trusted agent A (steps 988-990). Acquire Credential A receives the message (step 992). Trusted agent A then commits (step 994) and Session Manager A sends an acknowledgement to trusted agent B (steps 996-998). Trusted agent B then commits (step 1000).

Identity-Based Money Module Payment

Figure 80A:
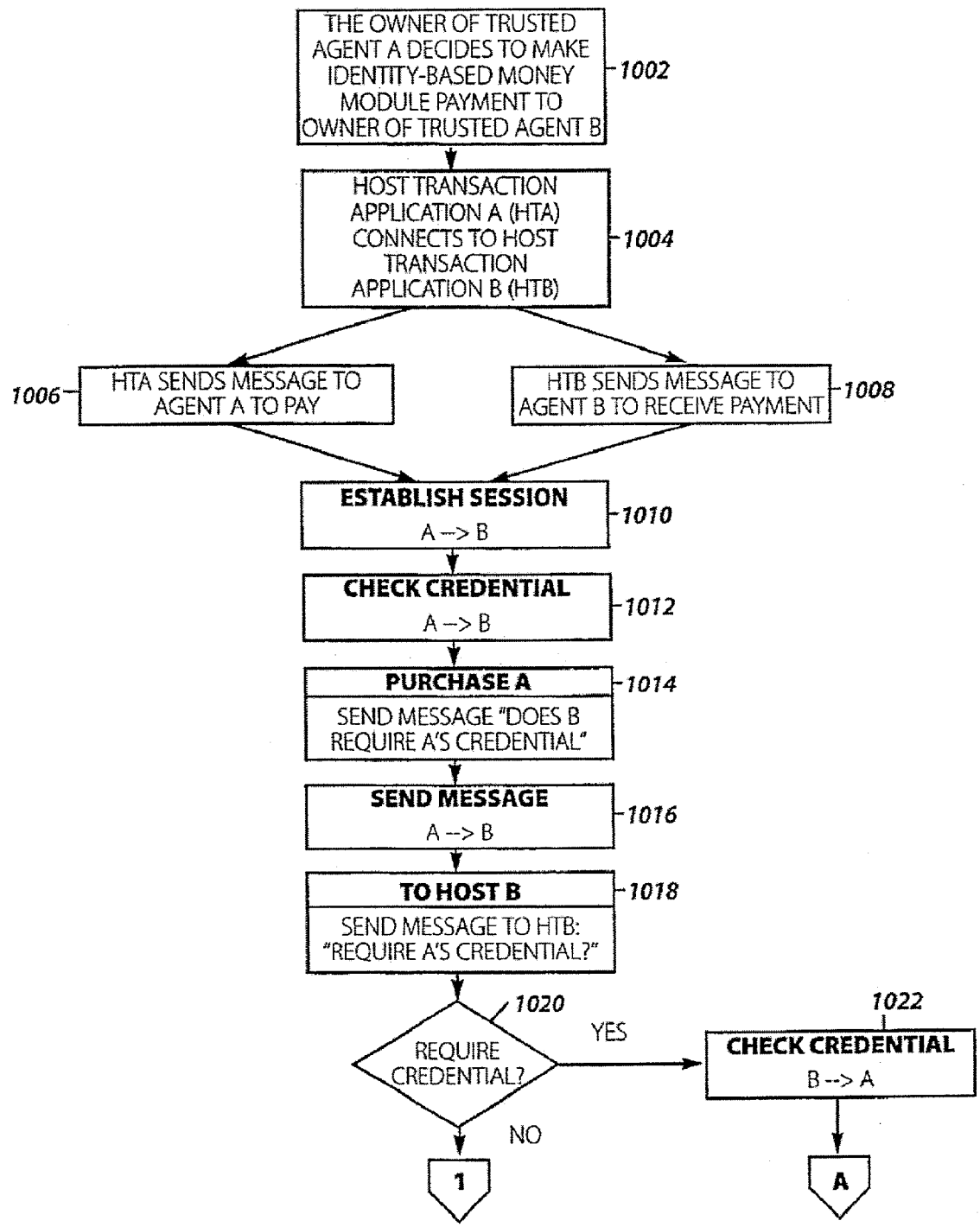
FIGS. 80A-80B illustrate an Identity-Based Money Module Payment protocol.
Figure 80B:
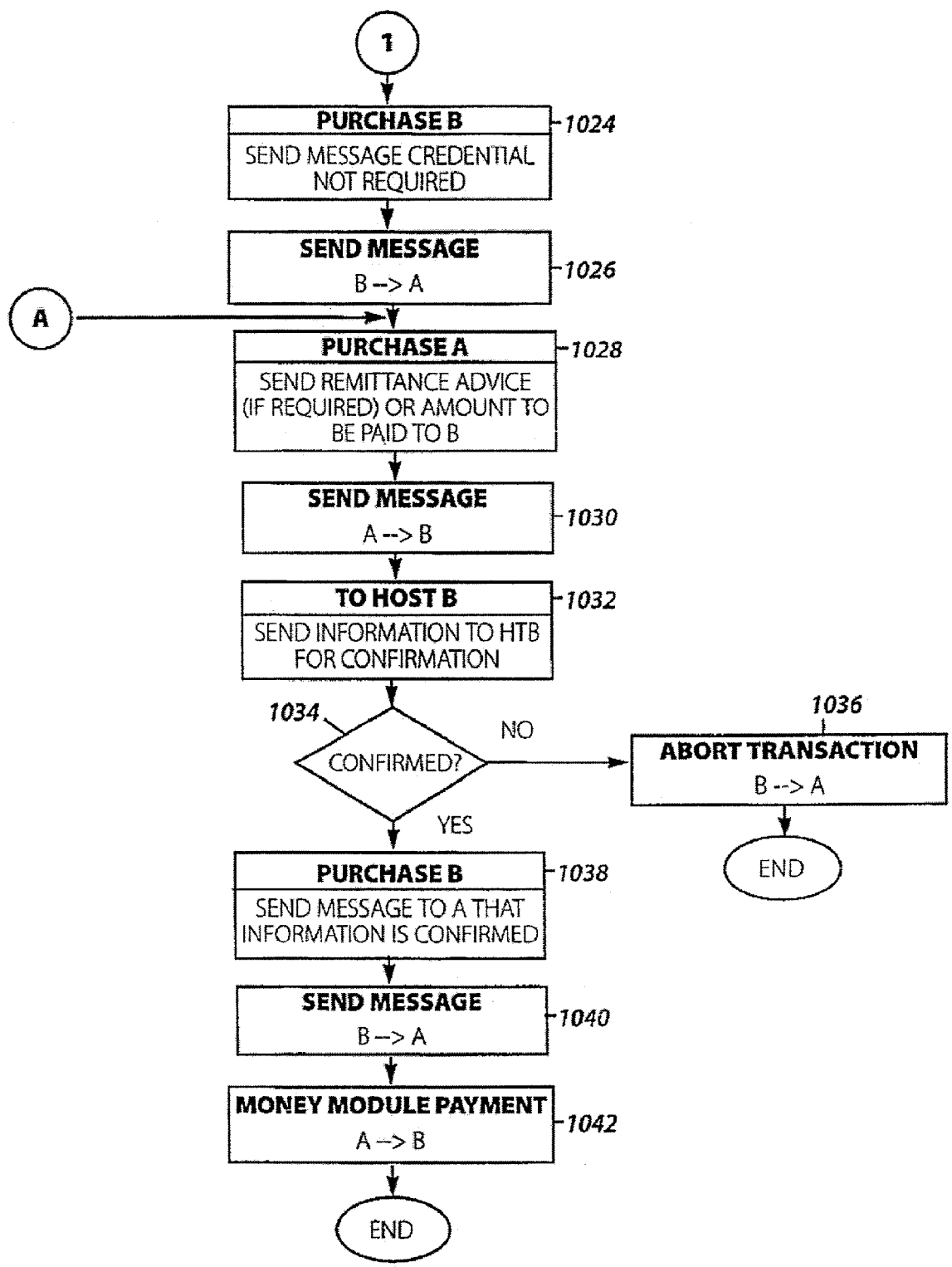
Figure 81A:
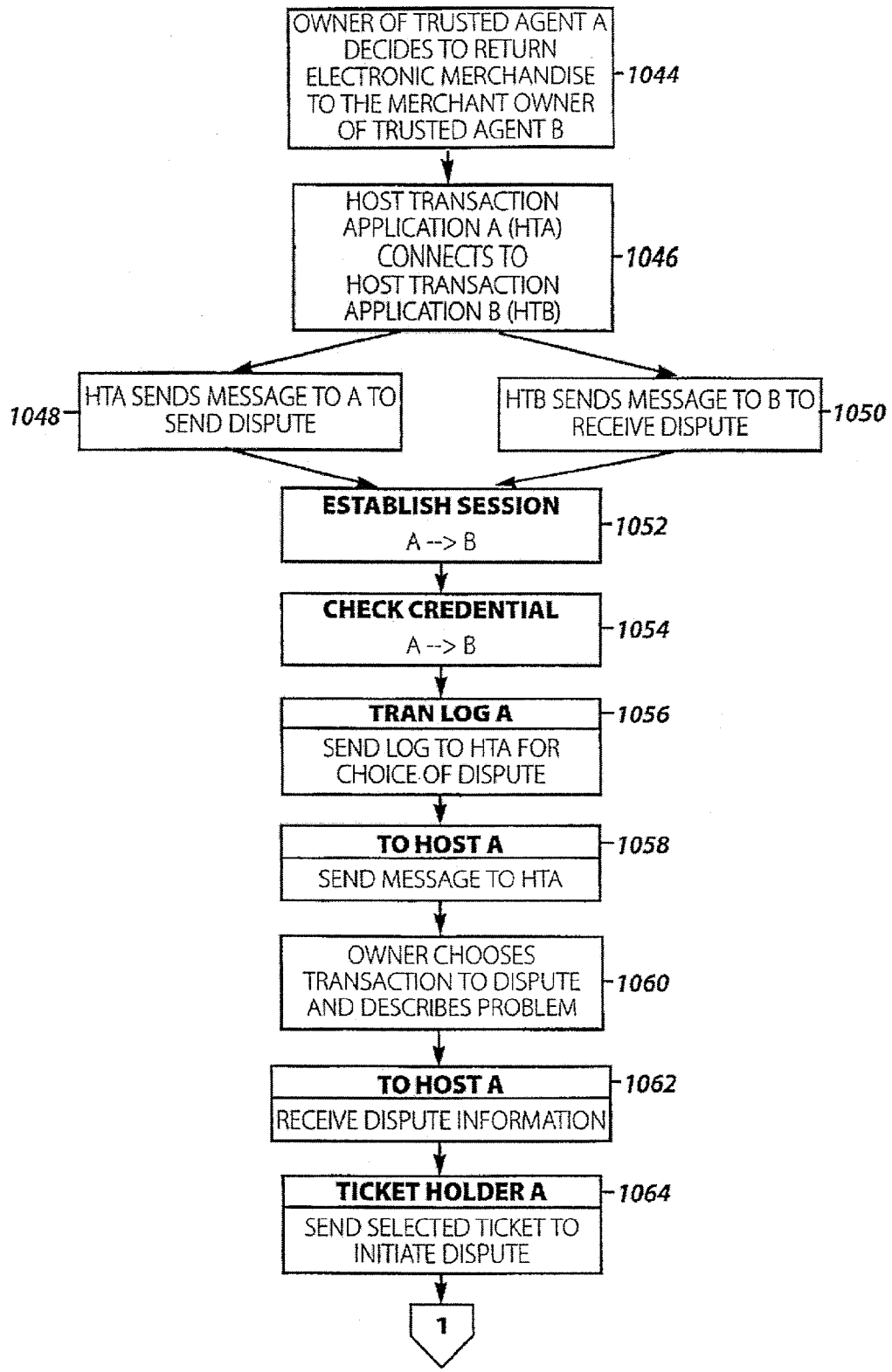
FIGS. 81A-81E illustrate a Dispute Over Electronic Merchandise protocol.
Figure 81B:
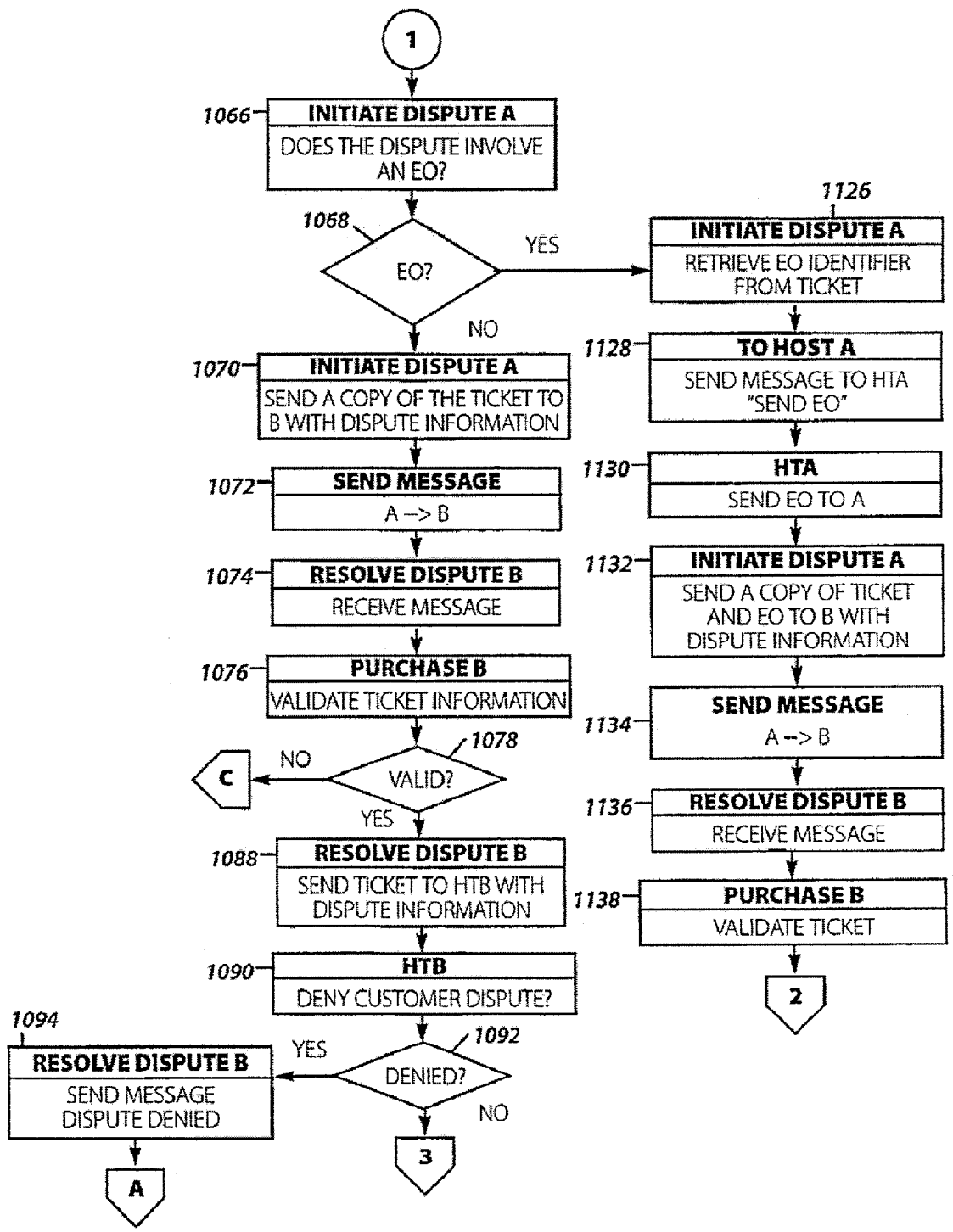
Figure 81C:
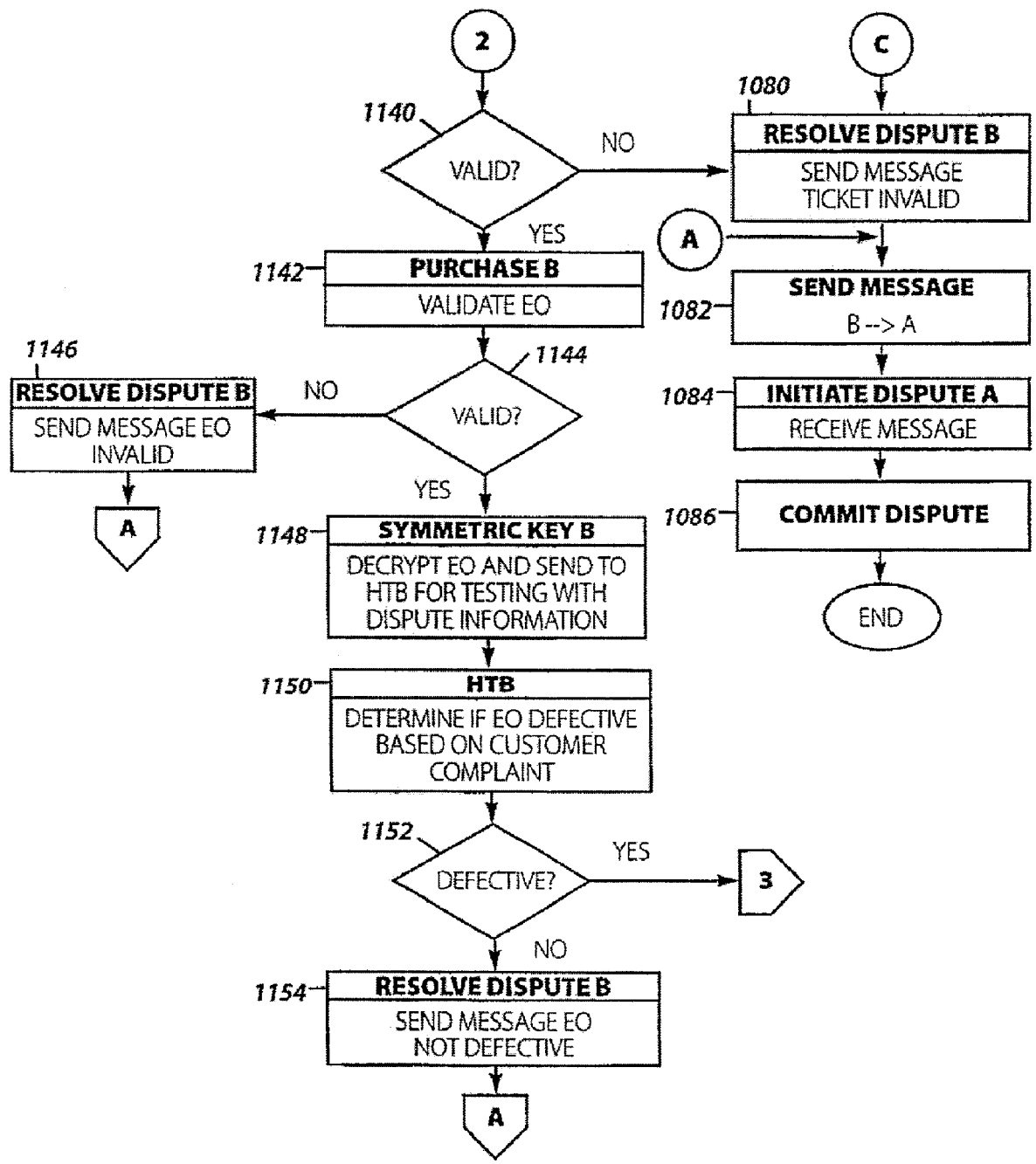
Figure 81D:
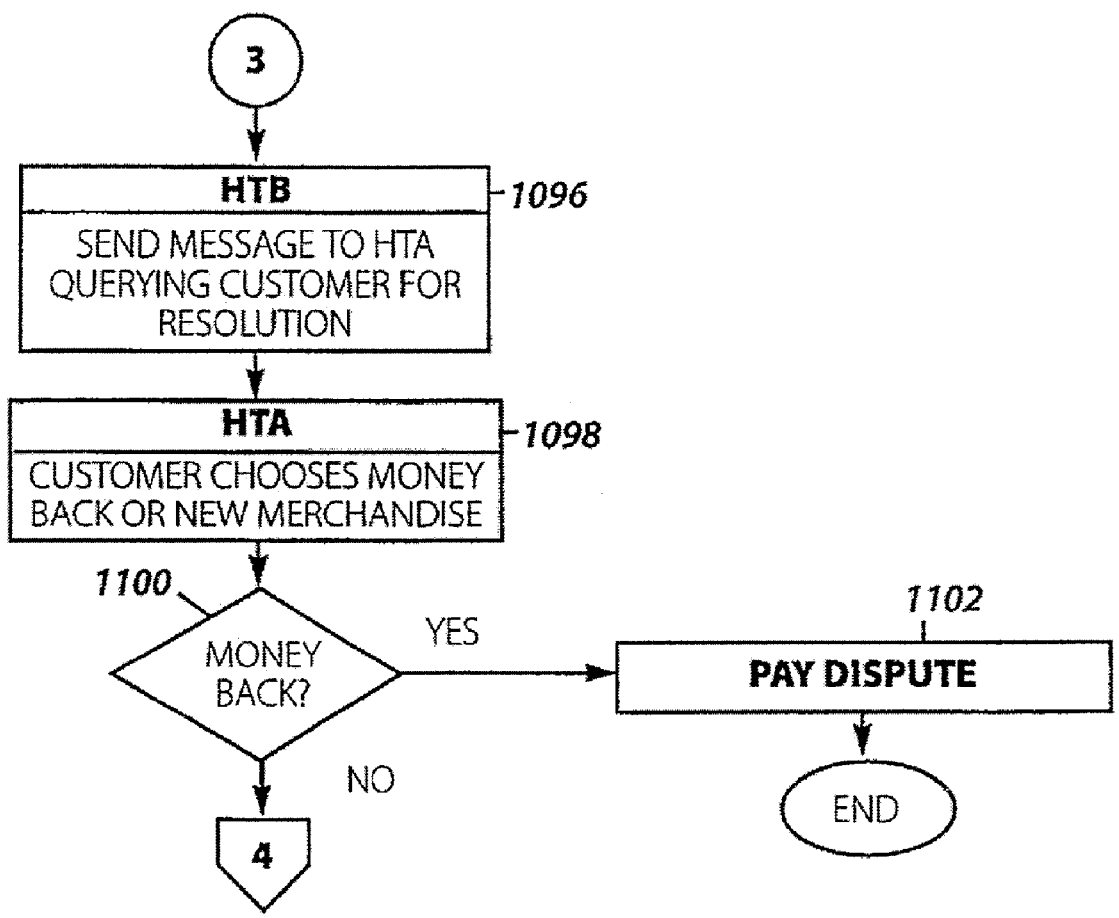
Figure 81E:
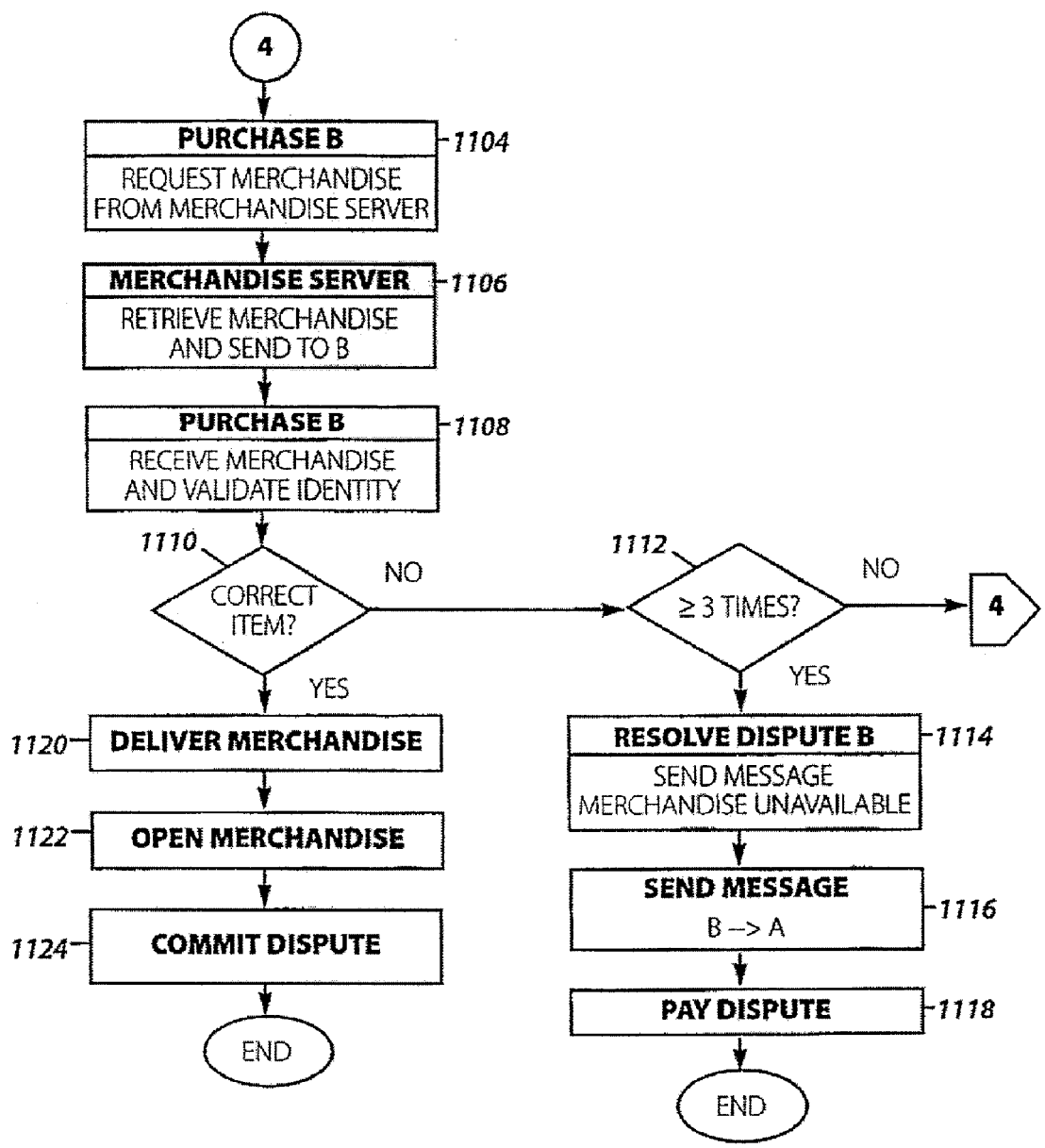

Electronic cash payments not involving the simultaneous purchase of electronic merchandise may be made using the flow diagram shown in FIG. 80. The owner of trusted agent A decides to make a money module payment to the owner of trusted agent B, where the owner of A wants to verify B's identity because they are transacting remotely (step 1002). HTA connects to HTB (step 1004). HTA sends the message "Pay" to its trusted agent (step 1006). HTB sends the message "Receive Payment" to its trusted agent (step 1008). A then establishes a secure session with B (step 1010).

Trusted agent A checks B's credential (step 1012). This credential may be a driver's license, credit card, or other acceptable credential. If the credential is valid and acceptable to A then Purchase A sends the message "Does B require A's credential" to trusted agent B (steps 1014-1016). To Host B then sends the message "Require A's Credential? " to HTB for checking if B requires A's credential (steps 1018-1020). If required, then B checks A's credential (step 1022). Again, various types of credentials may be used. If B does not require A's credential then Purchase B informs trusted agent A (steps 1024-1026).

Purchase A then sends a remittance advice specifying the amount to be paid (if a bill payment) or sends just the amount to be paid to trusted agent B (steps 1028-1030). To Host B sends the information to HTB for confirmation (steps 1032-1034). If not confirmed, the transaction is aborted (step 1036). If confirmed, then Purchase B informs A (steps 1038-1040). A money module payment is then initiated (step 1042).

Disputes

In case a customer is dissatisfied with a purchase, the trusted agents 120 can act as surrogates for the customer and merchant for remote resolution of the dispute. For example, if an electronic object is perceived to be defective, the customer could connect to the merchant and enter into a dispute dialogue. The merchant cannot repudiate the electronic merchandise if it is validated by his trusted agent 4 [since this will be recorded in the transaction log of the customer's trusted agent 2].

If the customer is not satisfied with the result of the dispute interaction with the merchant, he can take his complaint to the Trusted Agency. The customer's transaction log shows that the dispute was denied by the merchant first. The dispute and accompanying documentation can be presented to a trusted server 200 on the Trusted Agency Network 208. The interaction is then similar to the interaction with the merchant's trusted agent 4. Most merchants will want to resolve the dispute directly with the customer, and not have the customer resort to the Trusted Agency resolution process. Too many disputes could jeopardize the merchant's status with the Trusted Agency.

The dispute process enables the customer to produce electronic merchandise and prove that the merchandise was the merchandise purchased from the merchant. The dispute process also protects the merchant against fraudulent claims. The merchant can believe the customer's trusted agent 2 by verifying that the customer's trusted agent 2 received the merchandise. The customer's complaint can then be resolved by examining the merchandise for defects.

FIG. 81 shows the procedure followed when the owner of trusted agent A decides to return electronic merchandise to the owner of merchant trusted agent B (step 1044). Initially, HTA connects with HTB. HTA sends the message "Send Dispute" to its trusted agent. HTB sends the message "Receive Dispute" to its trusted agent. Trusted agent A then establishes a secure session with trusted agent B. (Steps 1046-1052).

Trusted agent A checks B's merchant credential (step 1054). Tran Log A sends its log via To Host A to HTA so that the owner can choose which transaction to dispute and describe the problem (steps 1056-1060). To Host A receives the dispute information from HTA (step 1062). Ticket Holder A then sends the selected ticket to Initiate Dispute A (step 1064).

Initiate Dispute A checks if the dispute involves an electronic object (steps 1066-1068). If there is no EO (only a ticket is involved), then Initiate Dispute A sends a copy of the ticket along with the dispute information to trusted agent B (steps 1070-1072). Resolve Dispute B receives the message and Purchase B validates the ticket (steps 1074-1078). If the ticket is invalid, then Resolve Dispute B sends the message "Ticket Invalid" to Initiate Dispute A (steps 1080-1084). The Commit Dispute subroutine is called (step 1086).

Figure 82:
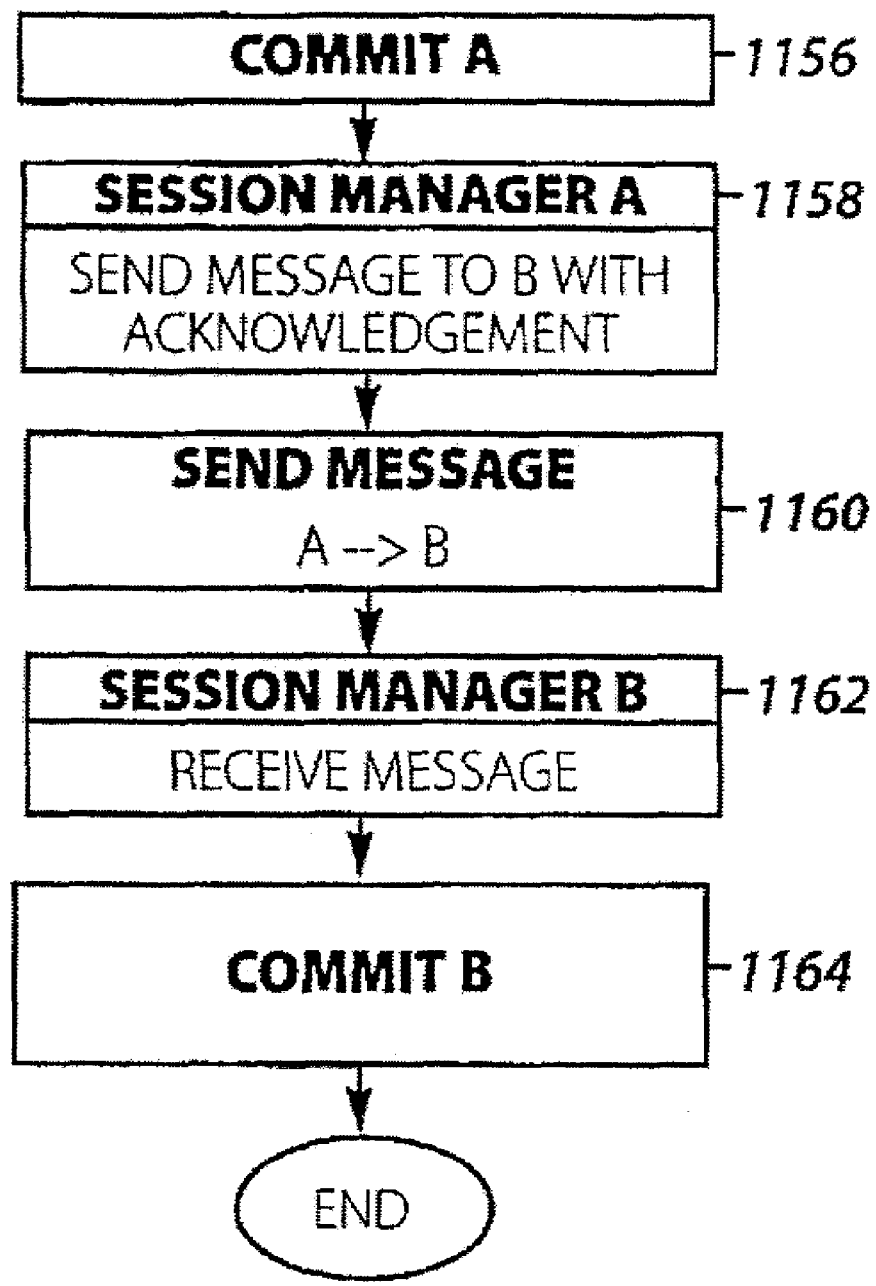
FIG. 82 illustrates a Commit Dispute protocol.

Referring to FIG. 82, trusted agent A commits (step 1156). Session Manager A sends an acknowledgement to Session Manager B (steps 1158-1162). Trusted agent B then commits (step 1164).

Referring back to FIG. 81, if, however, the ticket was valid (step 1078), then Resolve Dispute B sends the ticket and dispute information to HTB. The merchant then reviews the dispute and decides whether or not to deny the customer dispute (steps 1088-1092). If denied, Resolve Dispute B sends the message "Dispute Denied" to trusted agent A which initiates the Commit Dispute subroutine (steps 1094, 1082-1086).

If the merchant does not deny the dispute, then HTB sends a message to HTA querying the customer for resolution (step 1096). The customer then chooses if he wants a refund or new merchandise (assuming the merchant allows these options) (steps 1098-1100).

Figure 83:
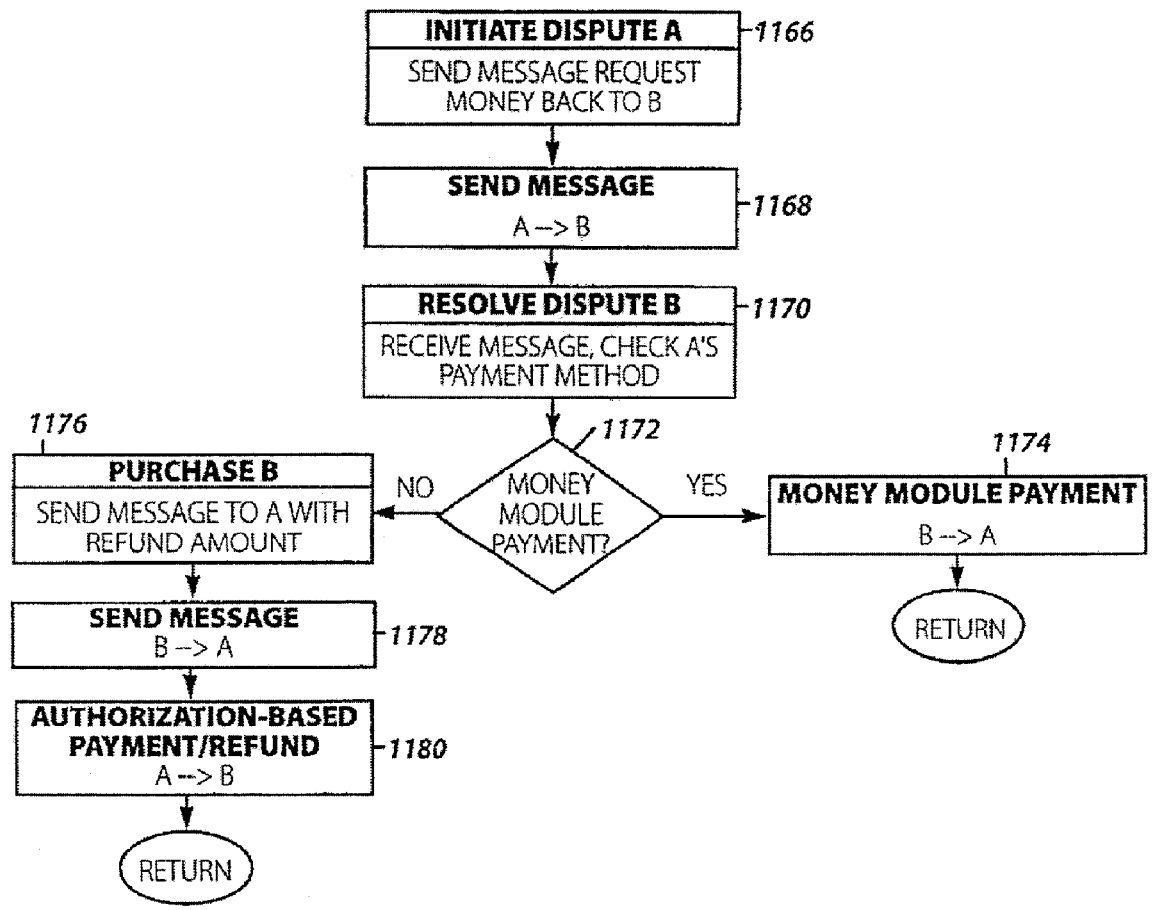
FIG. 83 illustrates a Pay Dispute protocol.

If the customer wants a refund, then the Pay Dispute subroutine is called (step 1102). Referring to FIG. 83, Initiate Dispute A sends the message "Request Money Back" to trusted agent B (steps 1168-1170). Resolve Dispute B receives the message and checks A's payment method (step 1172). If a money module payment is desired, then the Money Module Payment subroutine is called (step 1174).

If a credit or debit card refund is desired, then Purchase B sends a message to A with the refund amount (steps 1176-1178). The Authorization=Based Payment/Refund subroutine is then called (step 1180). Referring to FIG. 72, there is shown the flow diagram followed in the event of a refund. If a refund transaction is being performed (steps 704-706) then To Host B sends a message to HTA containing the credit or debit card credential and the amount to be refunded (step 726). The card authorization process is performed (step 728). Purchase B then checks if the refund was authorized (steps 730-732). If not authorized, then the transaction is aborted (step 702). If authorized, then Purchase B sends the message "Refund Authorized" to trusted agent A (steps 734,718). Trusted agent B then commits (step 720). Upon receiving B's message, Ticket Holder A updates the ticket with the refund information (step 722). Trusted agent A then commits (step 724).

Referring back to FIG. 81, if instead of a refund the owner of trusted agent A chooses to receive new merchandise, then Purchase B requests merchandise from the merchandise server (step 1104). The merchandise server retrieves the merchandise and sends it to trusted agent B. Purchase B receives the merchandise and validates its identity (steps 1106-1110). If the item is correct, then the subroutines Deliver Merchandise, Open Merchandise, and Commit Dispute are called (steps 1120-1124). If the item is not correct, and unobtainable from the merchandise server, then Resolve Dispute B sends the message "Merchandise Unavailable" to trusted agent A (steps 1114-1116). In this event, a refund is initiated (step 1118).

If the merchandise dispute involves an electronic object (steps 1066-1068), then Initiate Dispute A retrieves the electronic object identifier from its associated decryption ticket. To Host A, then instructs HTA to send the electronic object to trusted agent A (steps 1126-1130). Initiate Dispute A then sends a copy of the ticket and the EO to B along with the dispute information (steps 1132-1134). Resolve Dispute B receives the message (step 1136). Purchase B then validates the ticket (steps 1138-1140). If the ticket is invalid, then trusted agent A is so informed and the dispute is completed (steps 1080-1086). If the ticket is valid, then Purchase B validates the electronic object (steps 1142-1144). If not valid, then Resolve Dispute B informs trusted agent A (step 1146) and the dispute is completed (steps 1082-1086). If the electronic object is valid, then Symmetric Key B decrypts the EO and sends it to HTB for testing. The dispute information is also sent to HTB. (Steps 1148-1152).

HTB determines if the electronic object is defective based on the customer complaint. If the merchant determines that the merchandise is not defective, then Resolve Dispute B informs trusted agent A (step 154) and the dispute is completed (steps 1082-1086). If, however, the merchant determines that the merchandise is defective, then the customer may choose either a refund or new merchandise (steps 1096-1098).

Electronic Monetary System

An electronic monetary system (EMS) which may be used in conjunction with the described system for open electronic commerce is found in U.S. Pat. No. 5,453,601. Described below are various improvements and supplements to that EMS.

Overview

The term "money module" as used in PCT patent application WO 93/10503 generically refers to transaction money modules, teller money modules, and money generator modules. The money modules 6 previously discussed which cooperate with trusted agents 120 generally correspond, in the preferred embodiment, to transaction money modules. In the following discussion of the EMS, the term "money module" is again used in its generic sense to refer to transaction money modules, teller money modules, and money generator modules.

Effective security for a monetary system has three characteristics: inhibit counterfeiters, detect counterfeiters, and contain counterfeiters. The described EMS is designed to have components which exhibit all three characteristics.

In order to inhibit counterfeiters, the money modules communicate using symmetric and asymmetric key cryptography. None of the messages are in the clear. The module's protocols are also physically protected by tamper-proof hardware.

Counterfeiting is detected by note reconciliation processes. System-wide time protocols (e.g., note expiration) force electronic notes to be reconciled regularly. Electronic notes are also refreshed (i.e., replaced with a new note with a new expiration date) when banking transactions are performed.

Money modules are blocked (e.g., placed on the bad ID list) if duplicated or counterfeit notes are tied back to them Also, notes which have passed through these modules will not be allowed to transfer. The transfer of duplicated or counterfeit notes will be contained since notes expire or eventually are deposited to a bank. Moreover, in case of a serious system security problem, the EMS may call for a global recertification, thereby requiring all modules to recertify, including transaction money modules the next time they sign on the EMS Network.

Security Hierarchy

Figure 84A:
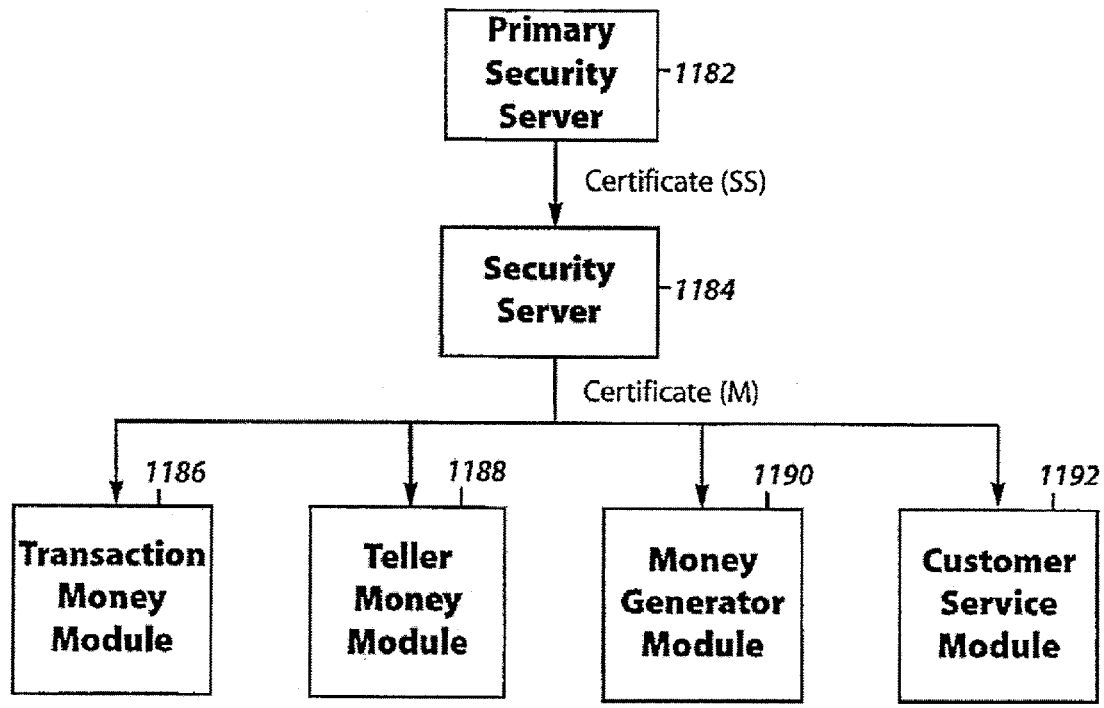
FIG. 84A is a diagram showing the EMS Security Hierarchy.

Ref erring to FIG. 84A, EMS will have two types of security servers, primary 1182 and ordinary 1184. The primary security servers 1182 certify the (ordinary) security servers 1184. The security servers 1184 certify all other modules (transaction MMs 1186, Teller MMs 1188, money generator modules 1190, and customer service modules 1192) in the system.

Figure 85:
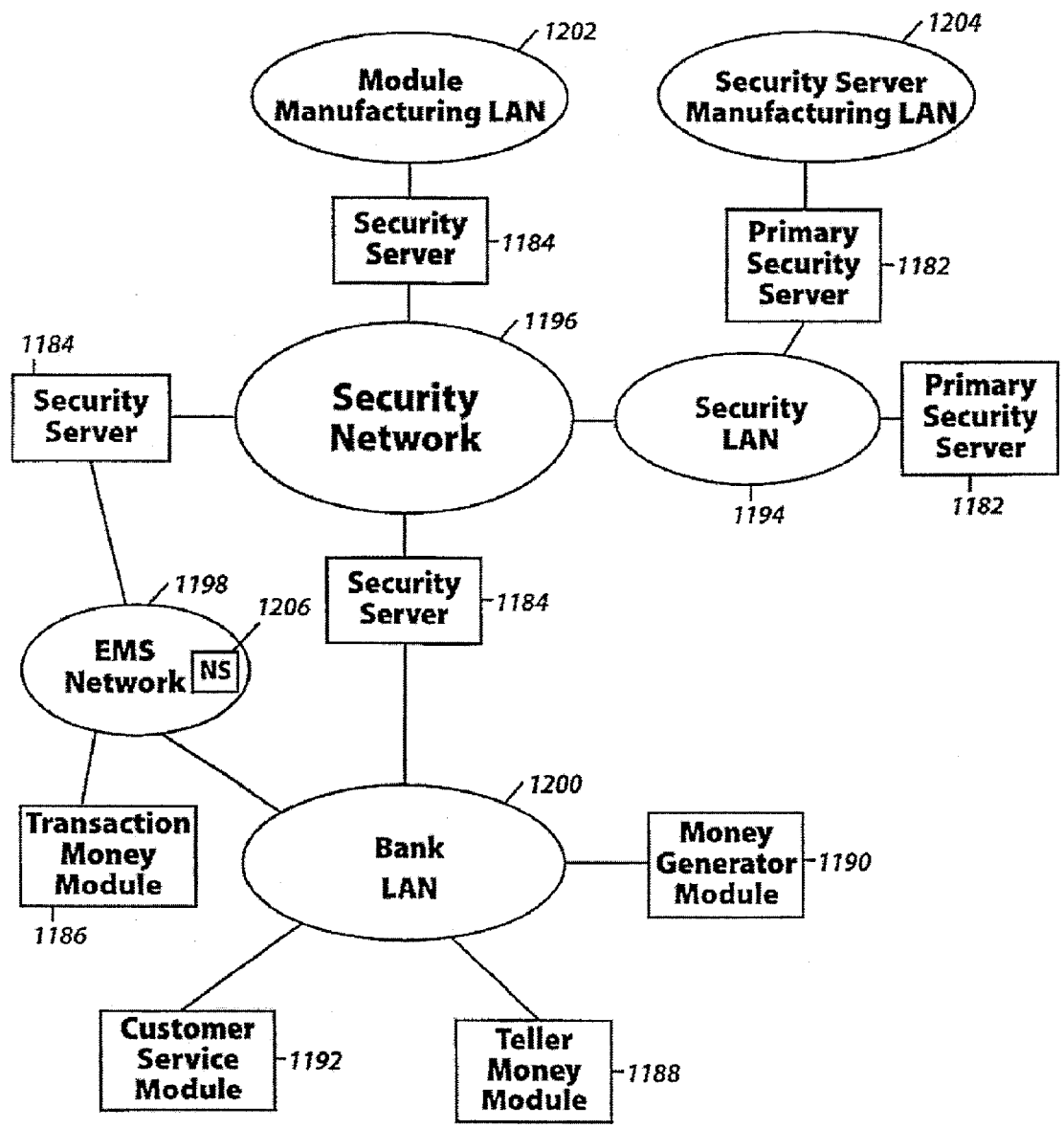
FIG. 85 is a diagram showing the security network structure for the EMS.

The primary servers 1182 only interact with other primary servers 1182 or the security servers 1184. Referring to FIG. 85, the primary security servers 1182 are housed in a secure facility connected to each other by a Security LAN 1194. The LAN 1194 is connected through a secure gateway to the Security Network 1196. Only the security servers communicate over this network. All security servers are physically protected devices.

Security servers 1184 are also attached to the EMS Network 1198 and bank local networks 1200. Security servers are treated as if they could be compromised and are validated upon all interactions with other modules.

Only the security servers 1184 and modules have certificates. The primary security server's public keys are carried by these devices. There are two types of certificate: security server and module.

Certificate Structure and Validation

The structure of a certificate is as follows:

$$Cert(SS) = \underbrace{E_{PSS}[SS(id) \| SS(PK) \| expire\ data \| \sigma_{PSS}(X)] \| [PSS(id) XOR\ C]}_{x}$$

$$Cert(M) = \underbrace{E_{SS}[M(id) \| M(PK) \| expire\ data \| \sigma_{SS}(Y)] \| Cert(SS)}_{y}$$

The certificate validation protocols are:

1) Validate Cert(SS)
   a) PSS(id)=[PSS(id) XOR C] XOR C
   b) $D_{PSS}(E_{PSS}(X \| \sigma_{PSS}(X))) = X \| \sigma_{PSS}(X)$ c) Check if SS(id) is authentic (see module numbering scheme)
d) Check if date is valid
e) Check if $D_{PSS}(\sigma_{PSS}(X))=h(X)$ 2) Validate Cert(M)
a) Validate Cert(SS)
b) $D_{SS}(E_{SS}(Y\|\sigma_{SS}(Y)))=Y\|\sigma_{SS}(Y)$
c) Check if M(id) is authentic (see module numbering scheme)
d) Check if date is valid
e) Check if $D_{SS}(\sigma_{SS}(Y)=h(Y)$ Where PSS=Primary Security Server
SS=Security Server
M=Module
∥=Concatenate
id=identification
h=Hash function
C=Constant random number shared by all modules
PK=Public Key (includes length of key)
σ=Digital Signature=Eoh
Cert=Certificate
E=Algorithm with key used for encrypting and for creating digital signature
D=Algorithm with public key used for decryption and for checking digital signature Note E and D may also be used for decrypting and encrypting, respectively when applied in other applications.

Module Numbering Scheme

The primary security servers 1182, security servers 1184, teller money modules 1188, money generator modules 1190, customer service modules 1192, and transaction money modules 1186 are assigned identification numbers (id's) so that the numbers can be checked for authenticity. A 48-bit prime number "p" is generated and a primitive root "a" modulo p (where $a^n \neq 1(p)$ for all $1 \leq n < p-1$) is found via a secure process. Both a and p are loaded to all modules in the system securely by the primary security servers when they are manufactured.

The scheme works as follows:

If $a^n = m(p)$ and (1) $1 \leq m \leq 99,999$ then n is assigned as the id of a primary security server, (2) $100,000 \leq m \leq 99,999$ then n is assigned as the id of a security server, (3) $1,000,000 \leq m \leq 6,999,999$ then n is assigned as the id of a teller money module, (4) $7,000,000 \leq m \leq 9,999,999$ then n is assigned as the id of a money generator module, (5) $10,000,000 \leq m \leq 11,999,999$ then n is assigned as the id of a customer service module, (6) $m \geq 12,000,000$ then n is assigned as the id of a transaction money module.

If a module or server is validating a certificate, it checks the authenticity of the identification number (e.g., M(id), SS(id), or PSS(id)) n by computing $a^n = m(p)$ and then checks if m is in the correct range.

Security Network

As shown in FIG. 85, the Security Network 1196 and the Security LAN 1194 connect the security servers 1184 to the primary security servers 1182. Security servers 1184 initially certify the money modules and customer service modules 1192 at manufacturing. Such security servers may be connected by a Module Manufacturing LAN 1202. They pass security information such as the bad id list and the list of primary security servers and their public keys to the modules. The bad id list contains the identities of the money modules, customer service modules, and security servers which are blocked from transacting. Recertification of these modules is described subsequently in the network sign-on flow diagram.

Figure 84B:
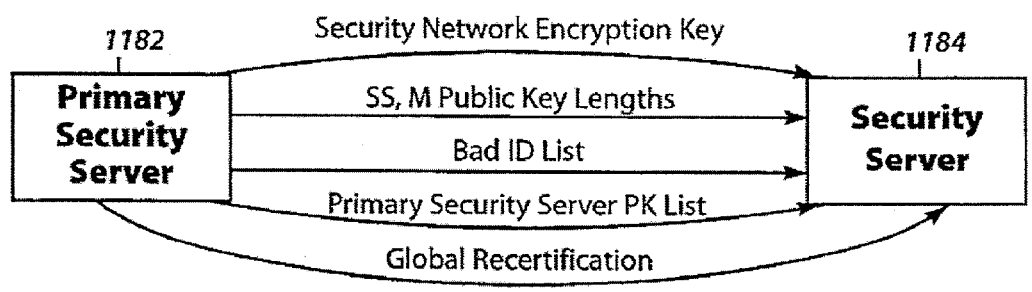
FIG. 84B is a diagram showing the security network messaging between a primary security server and an ordinary security server.

The security servers 1184 are initially certified by the primary security servers 1182 at manufacturing. Such primary security servers may be connected by a Security Server Manufacturing LAN 1204. Referring to FIG. 84B, the security servers 1184 receive various security information which they pass to the other modules. The security servers provide security services for the EMS Network 1198 and the bank LANs 1200, such as network sign-on where they pass updated security information. The security servers 1184 receive this information from the primary security servers 1182 over the Security Network 1196. Transaction money modules 1186 communicate with the EMS Network 1198 via network servers 1206 (NS). Participating banks have teller money module(s) 1188 and perhaps money generator(s) 1190 connected to their LANs 1200.

The Security Network 1196 is link encrypted. In addition, the primary security servers and security servers share a common symmetric key (a Security Network encryption key). This key is changed periodically by a designated primary server 1182 by public key, key exchange. The primary server 1182 encrypts the symmetric key with its private key, signing the key and broadcasting the change to the other primary servers 1182 over the Security LAN 1194, and to the security servers 1184 over the Security Network 1196.

The list of bad id's is maintained by a designated primary server 1182. The list is accumulated from interactions with participating banks, law enforcement authorities, and subscribers to the system.

Periodically the length of the public keys for the security servers and the modules will be changed. The key length will be normally lengthened to maintain a high security level. The new designated key lengths will be communicated to the primary security servers by a designated primary server. The new lengths will be communicated to the security servers by the primary servers when new bad id lists are sent or upon recertification. In case of a dangerous breach of security, a primary security server can call for global recertification.

The length of the public key for each primary server will not change. A timetable will be created which will schedule the implementation and decommission of primary security servers. The new servers will most likely have longer keys unless they are implemented because of increased transaction volume. The list of active PSS public keys is created by a primary security server and encrypted by the server with its private key. The list is then broadcast to other security servers.

Figure 86A:
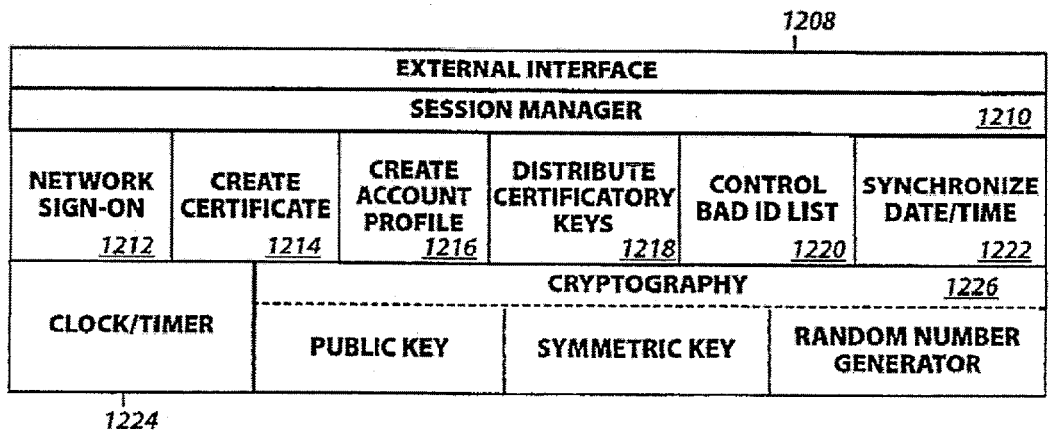
FIG. 86A illustrates the functional components of a security server.

FIG. 86A shows the functional components of a security server 1184. An External Interface function 1208 provides a communications layer for network interfacing. A Session Manager function 1210 controls the security aspects of a transaction session. A Network Sign-On function 1212 manages the security functions for network sign-on. A Create Certificate function 1214 certifies a certificate for any of the money modules (in a primary security server, this function certifies security servers). A Create Account Profile function 1216 certifies and signs a bank account profile that allows a money module to access the subscriber's different bank accounts. A Distribute Certificatory Keys function 1218 distributes the Certification Agency's list of valid primary security server public keys to the money modules (primary security server also distributes global certification message). A Control Bad ID List function 1220 controls and distributes the list of bad identifiers. A Synchronize Date/Time function 1222 keeps money module Clock/Timer services synchronized to a system time. Clock/Timer 1224 and Cryptography functions 1226 are identical to those functions in the money modules.

Figure 86B:
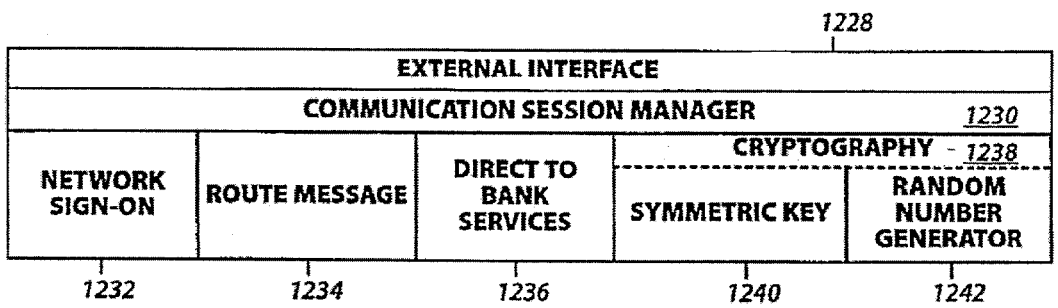
FIG. 86B illustrates the functional components of a network server.

FIG. 86B shows the functional components of a network server 1206. An External Interface function 1228 provides a communications layer for network interfacing. A Communication Session manager function 1230 manages a communication session between money modules, and between a money module and a security server. A Network Sign-On function 1232 controls the money module network sign-on process. A Route Message function 1234 provides directory services for routing messages, controlling message routing during sign-on and during a money module session. A Direct to Bank Services function 1236 provides information on services provided by participating banks. A Cryptography function 1238 provides a Symmetric Key function 1240 and a Random Number Generator function 1242. The Symmetric Key function 1240 encrypts messages between the network server 1206 and the modules accessing the network and between the network server 1206 and the security servers 1184. The Random Number Generator function 1242 generates random numbers for encryption keys and verification messages.

Network Sign-On

Figure 87:
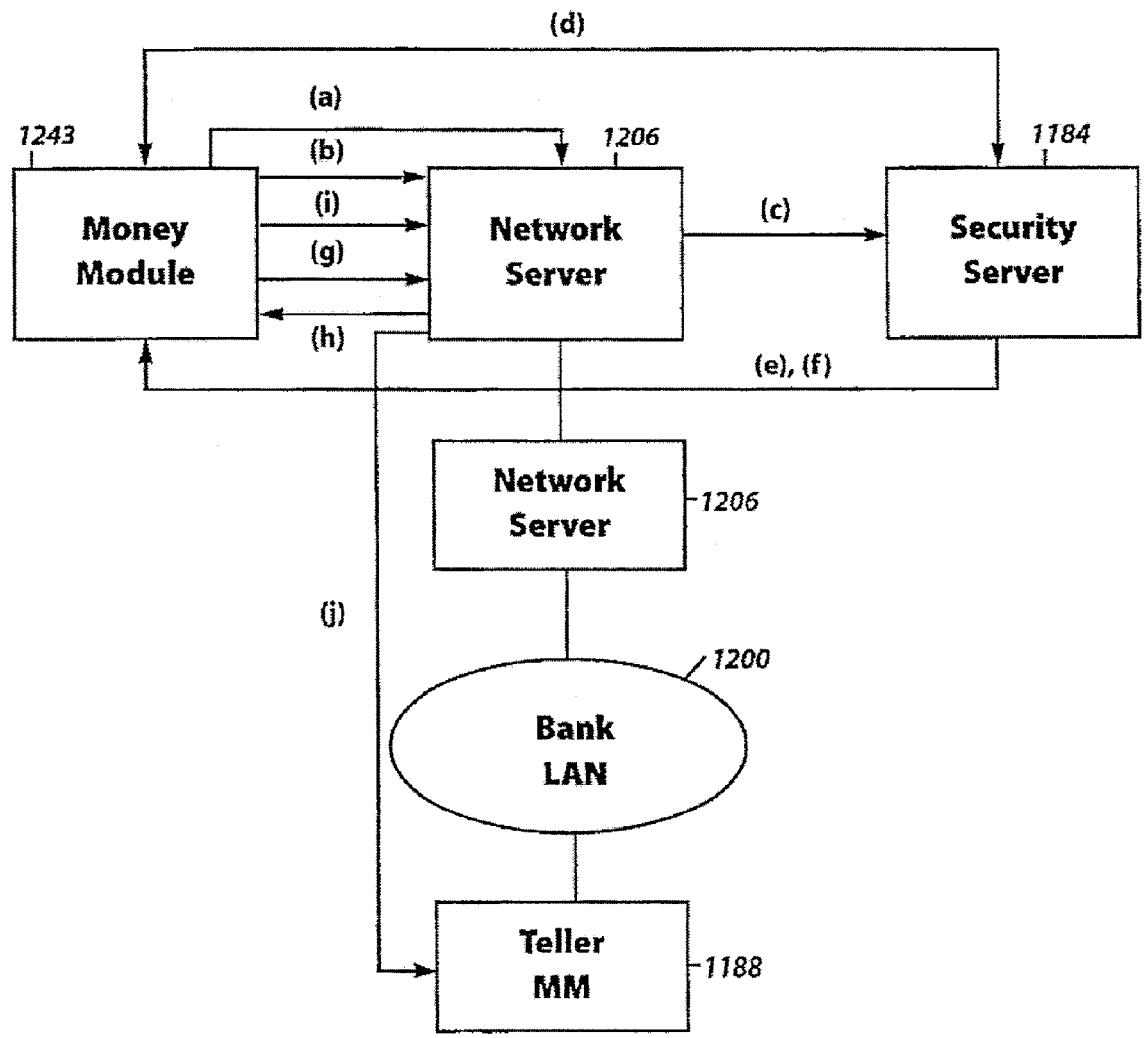
FIG. 87 shows an overview of the network sign-on procedure.
Figure 88A:
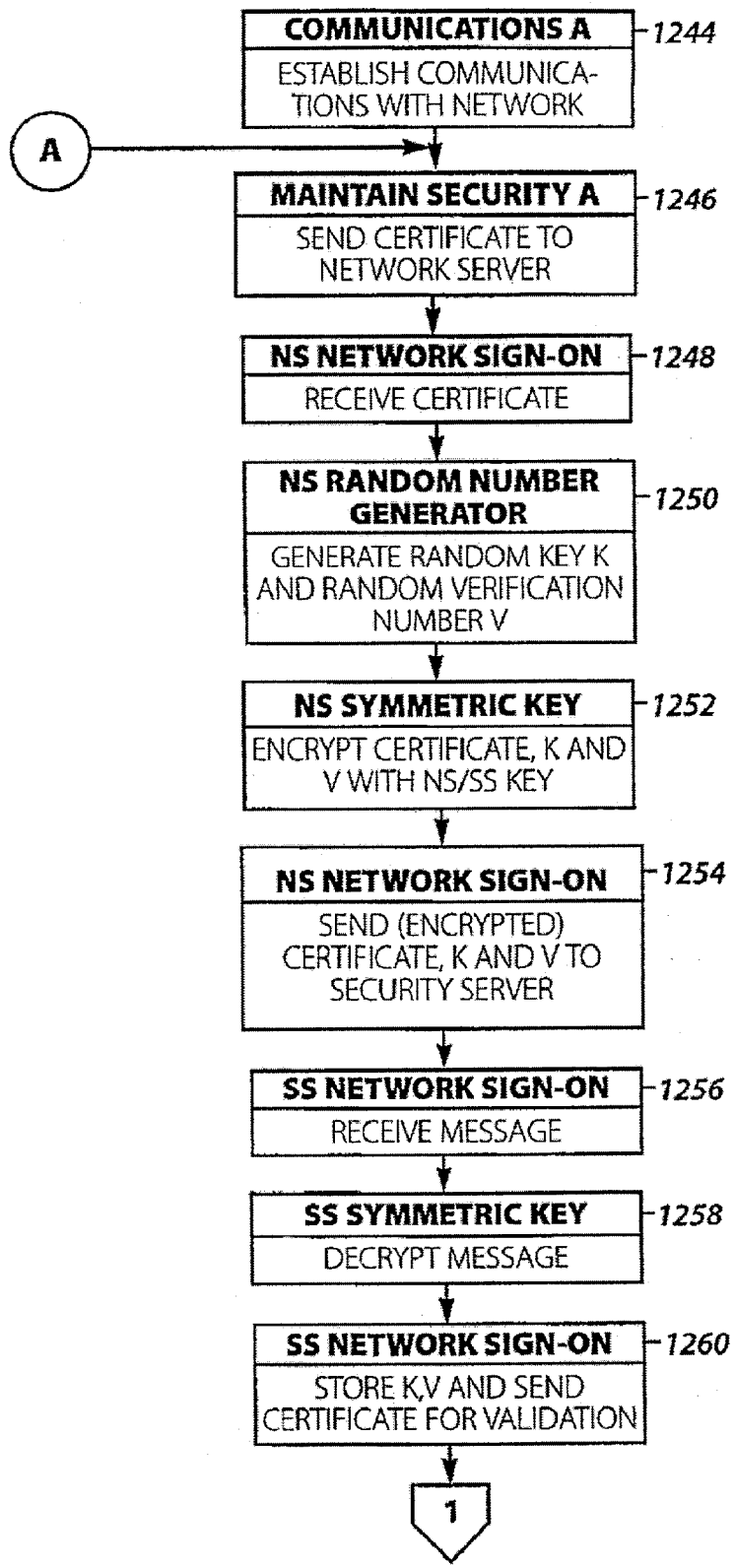
FIGS. 88A-88K illustrate a Network Sign-On protocol.
Figure 88B:
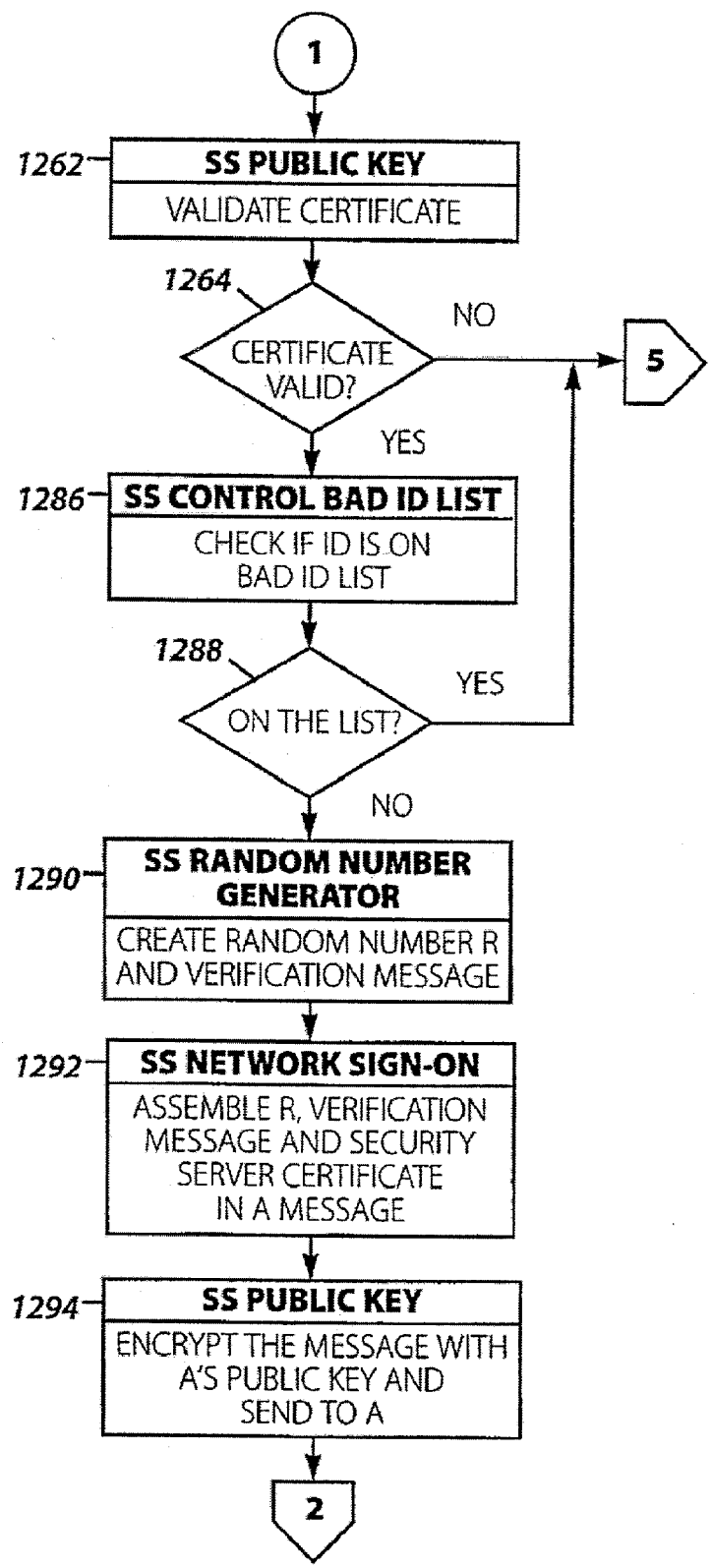
Figure 88C:
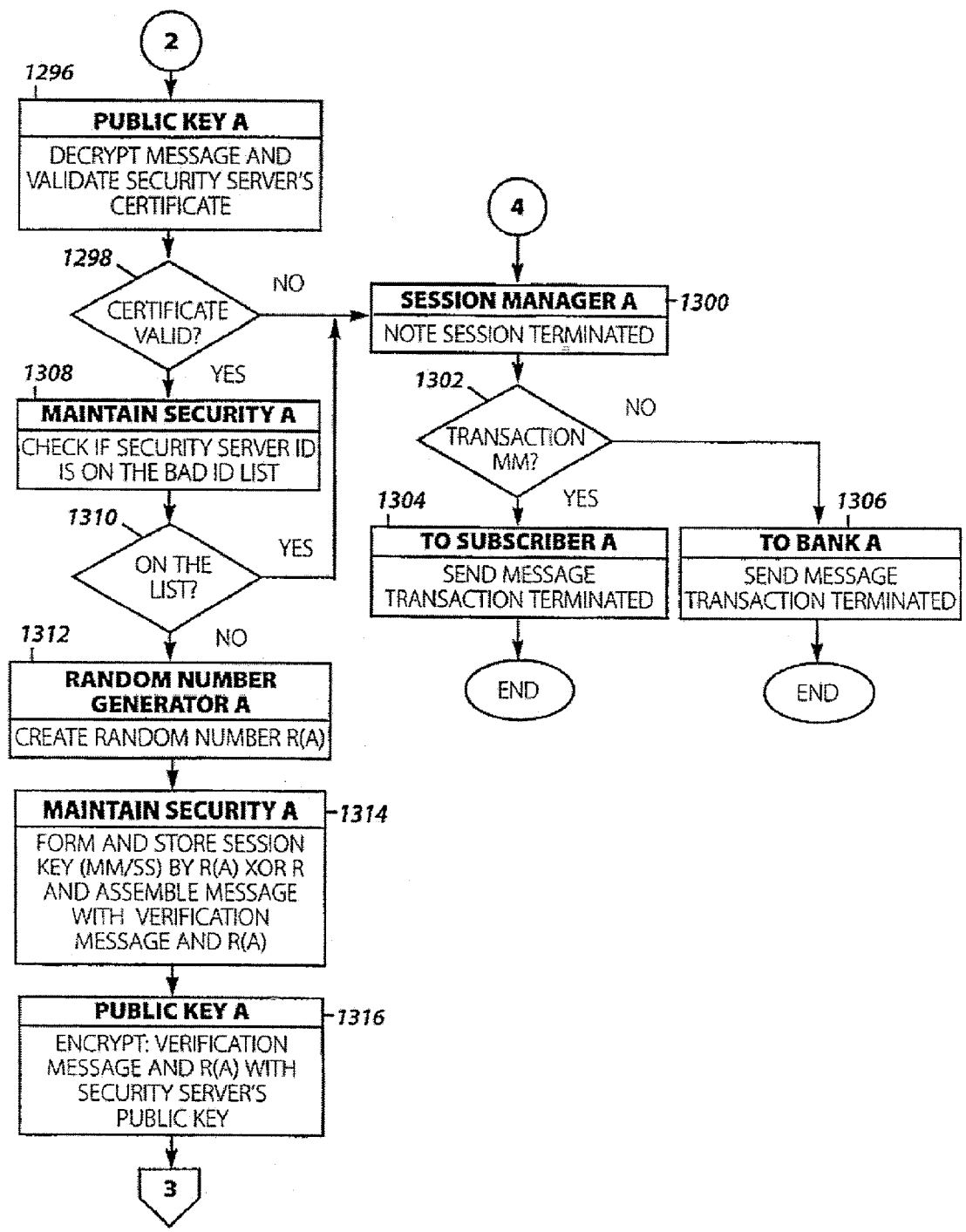
Figure 88D:
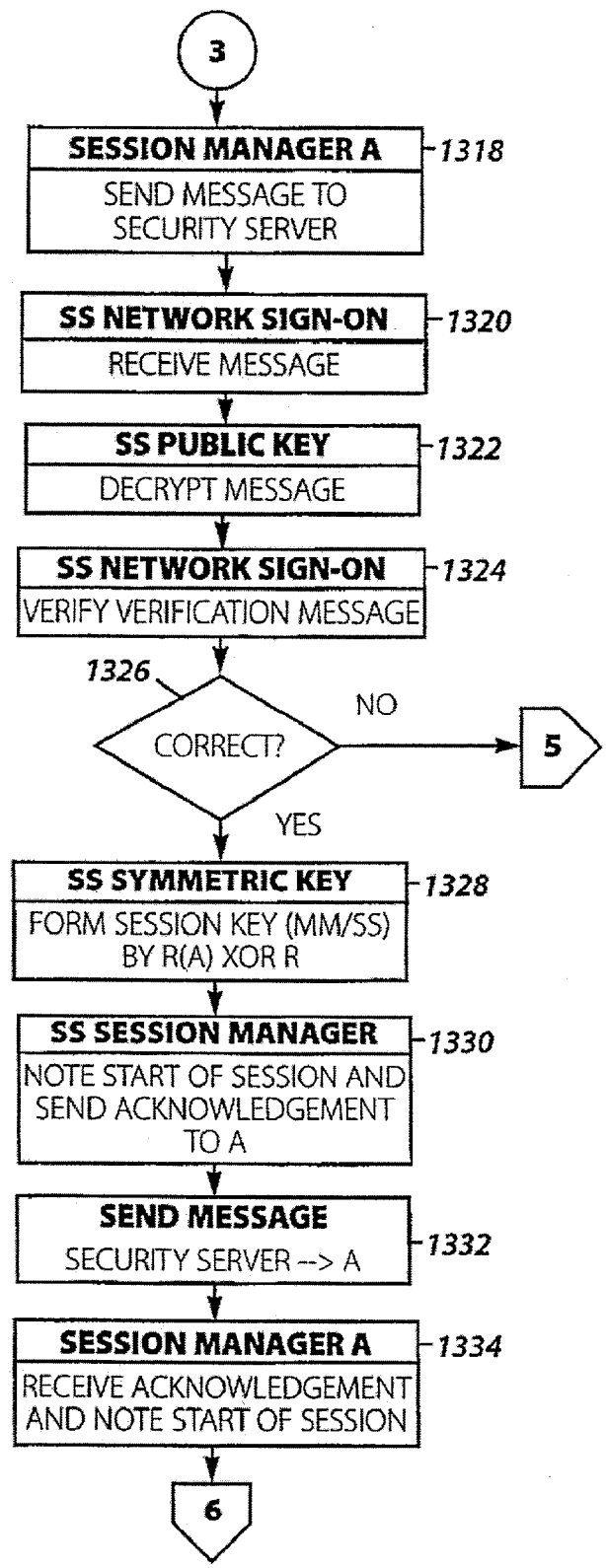
Figure 88E:
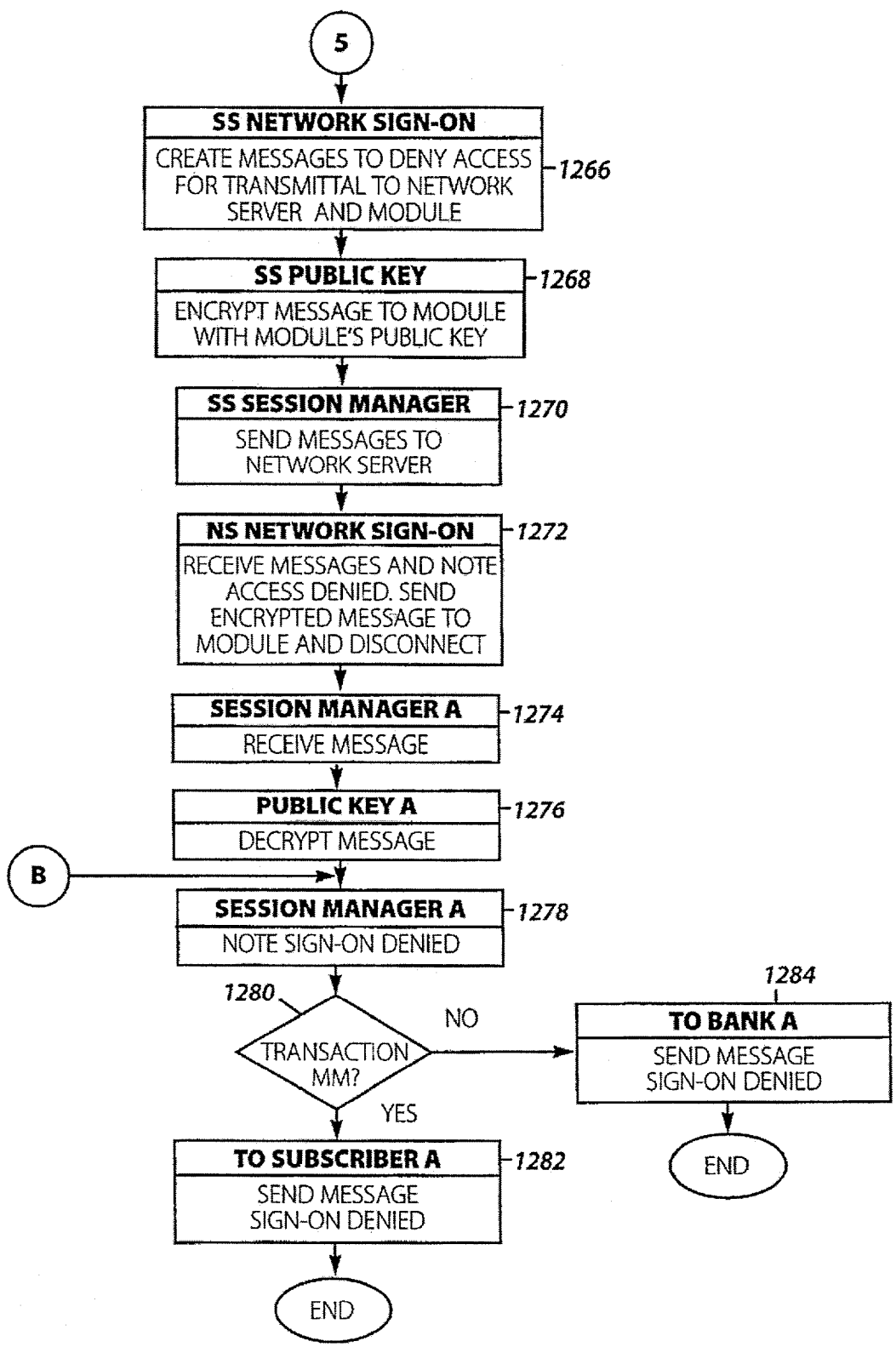
Figure 88F:
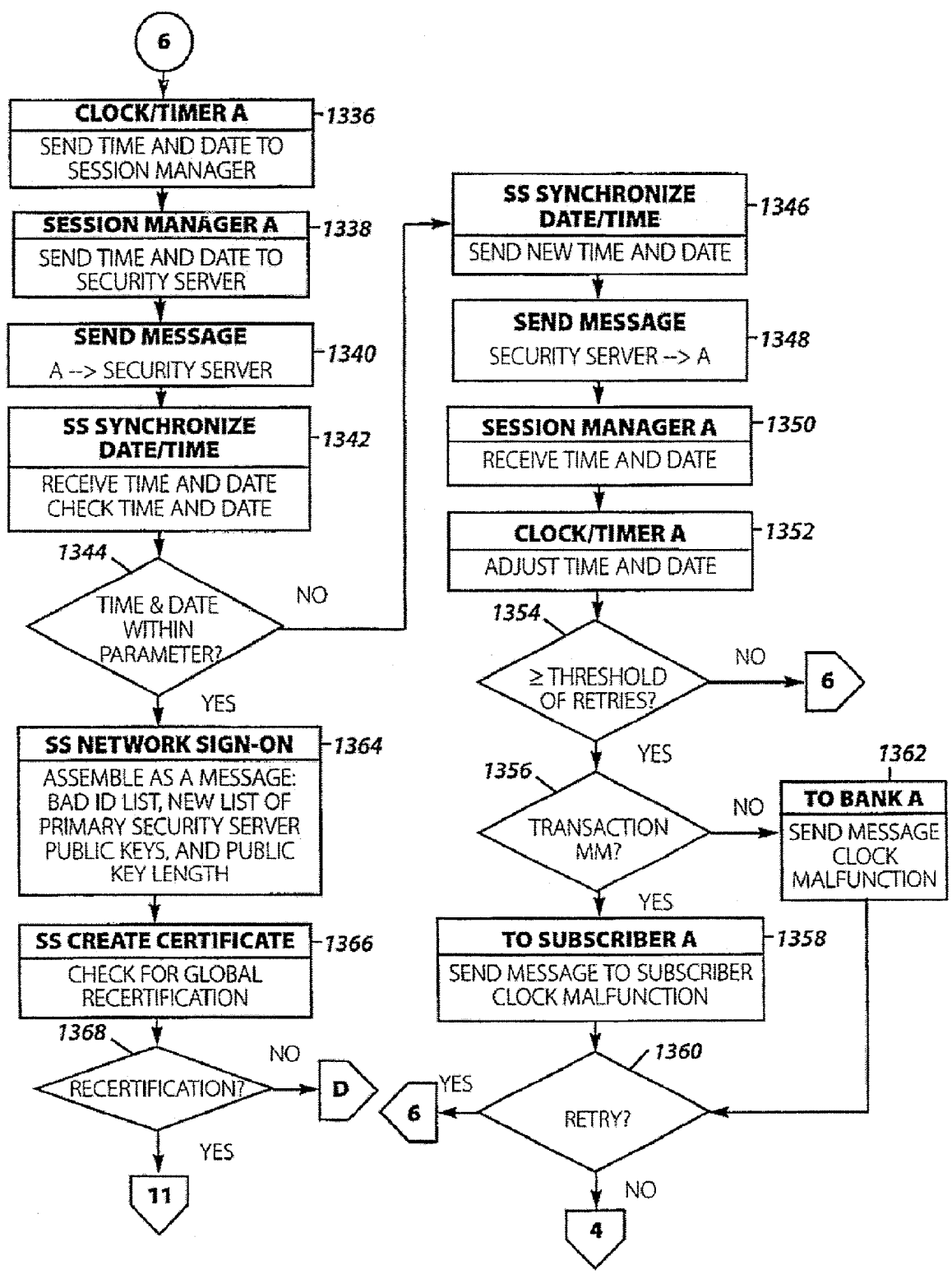
Figure 88G:
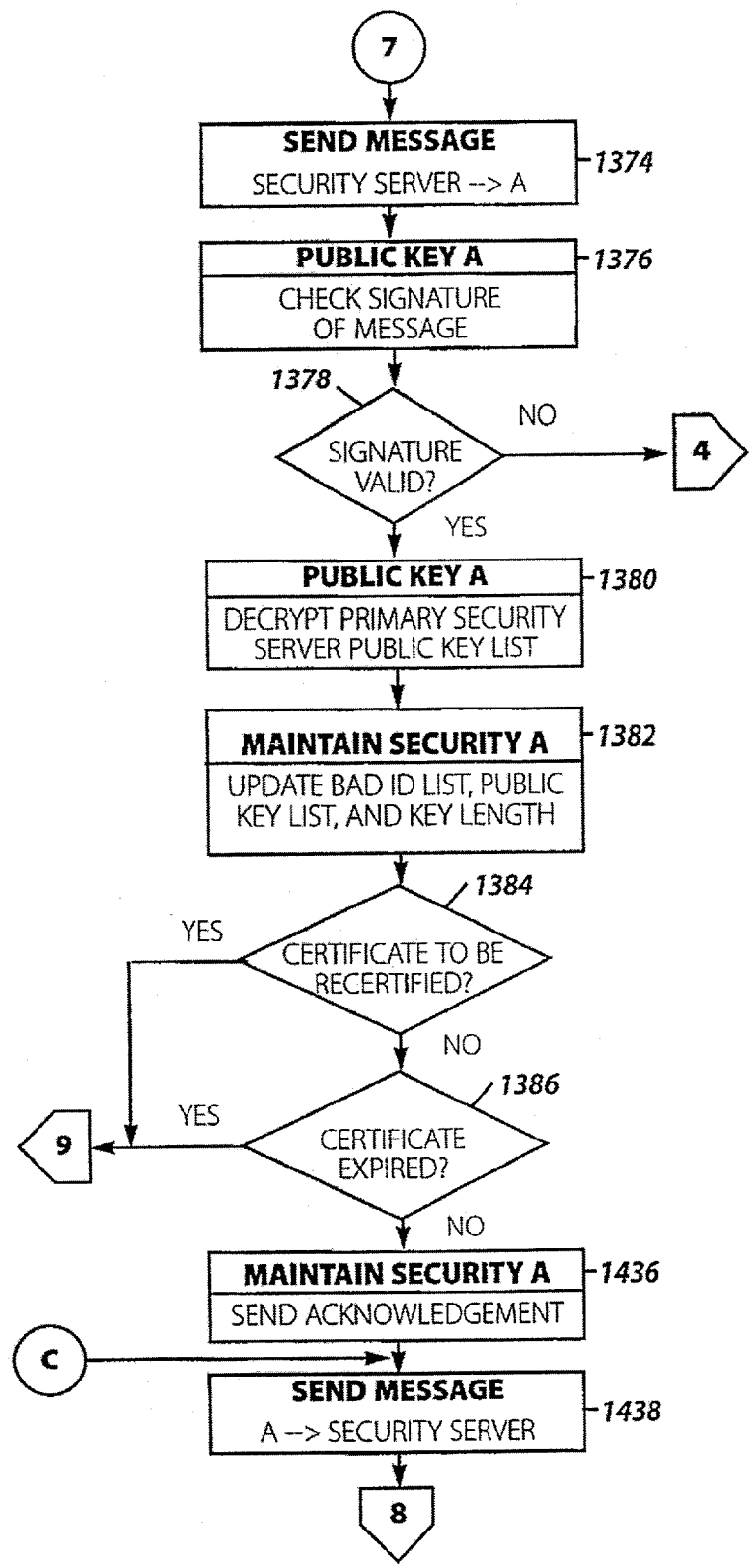
Figure 88H:
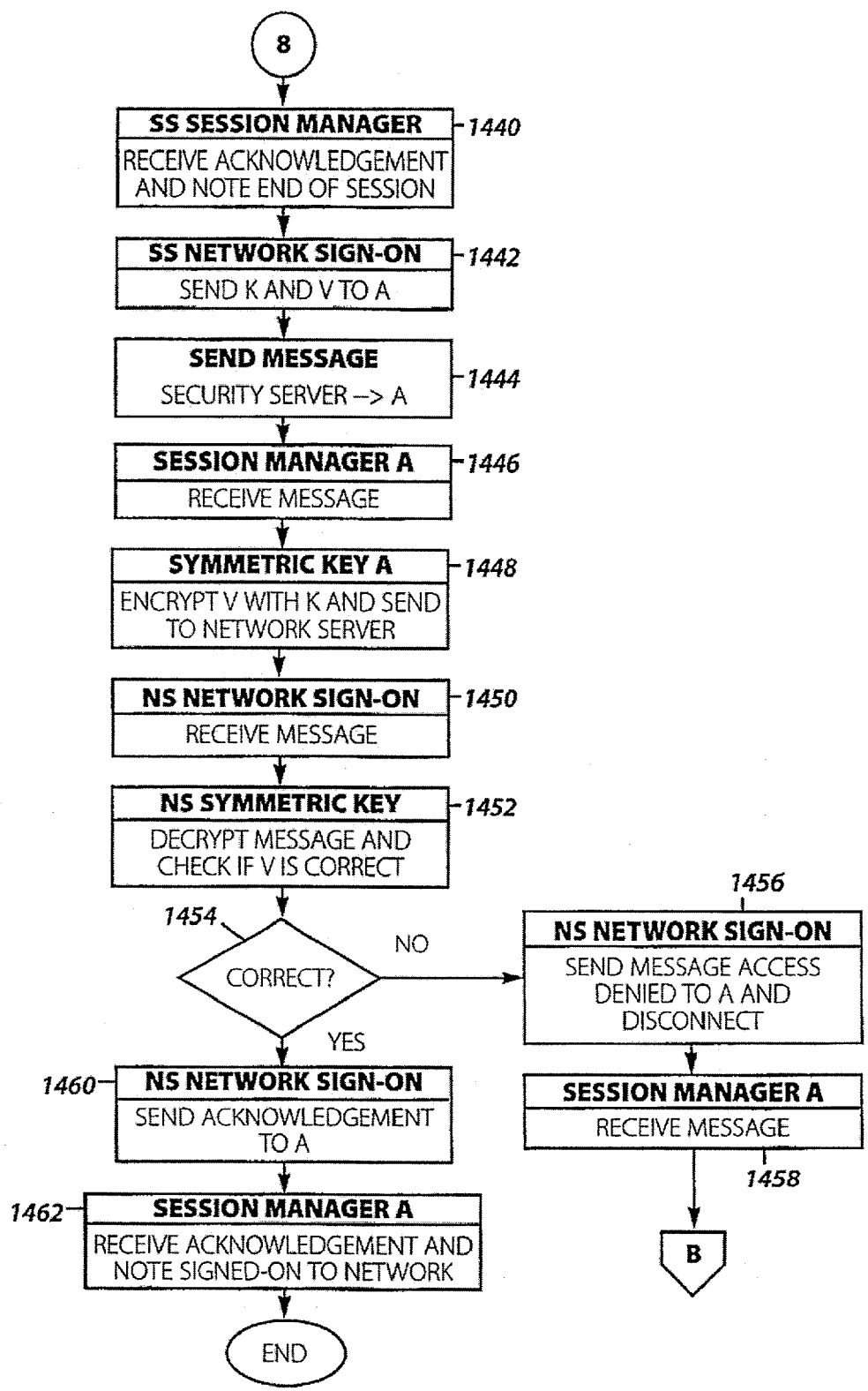
Figure 88I:
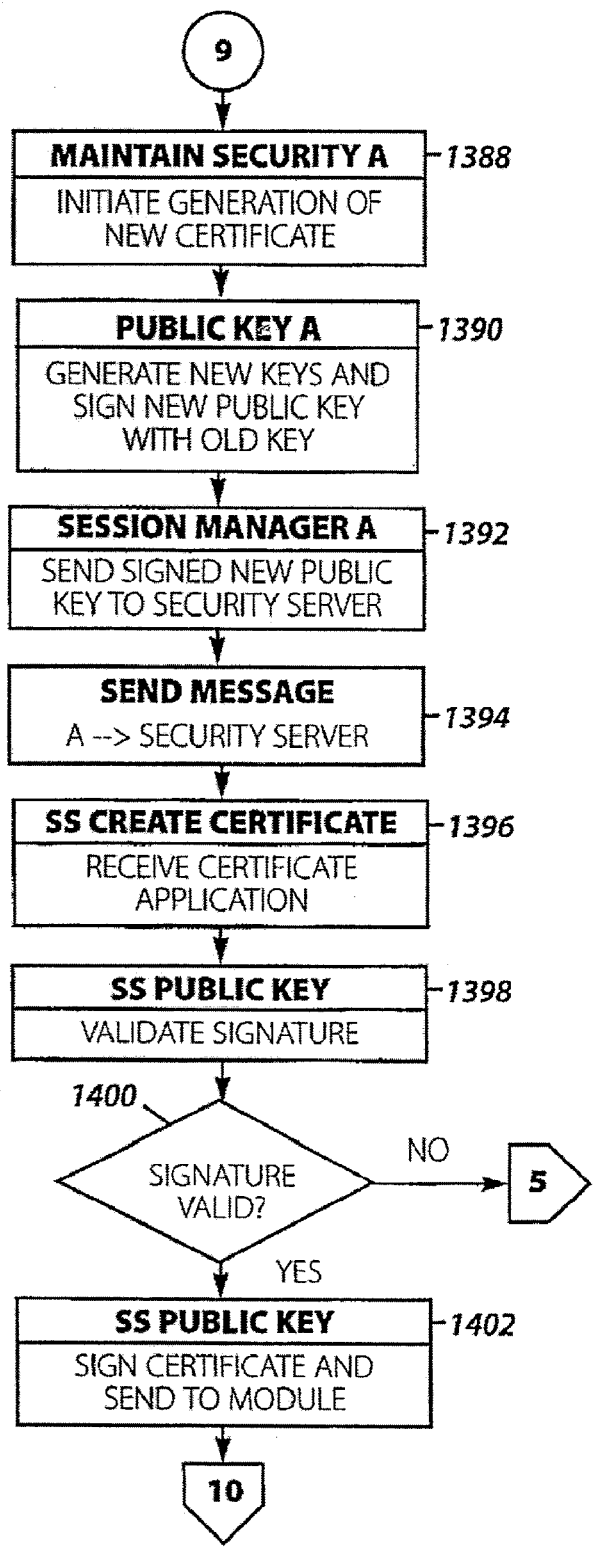
Figure 88J:
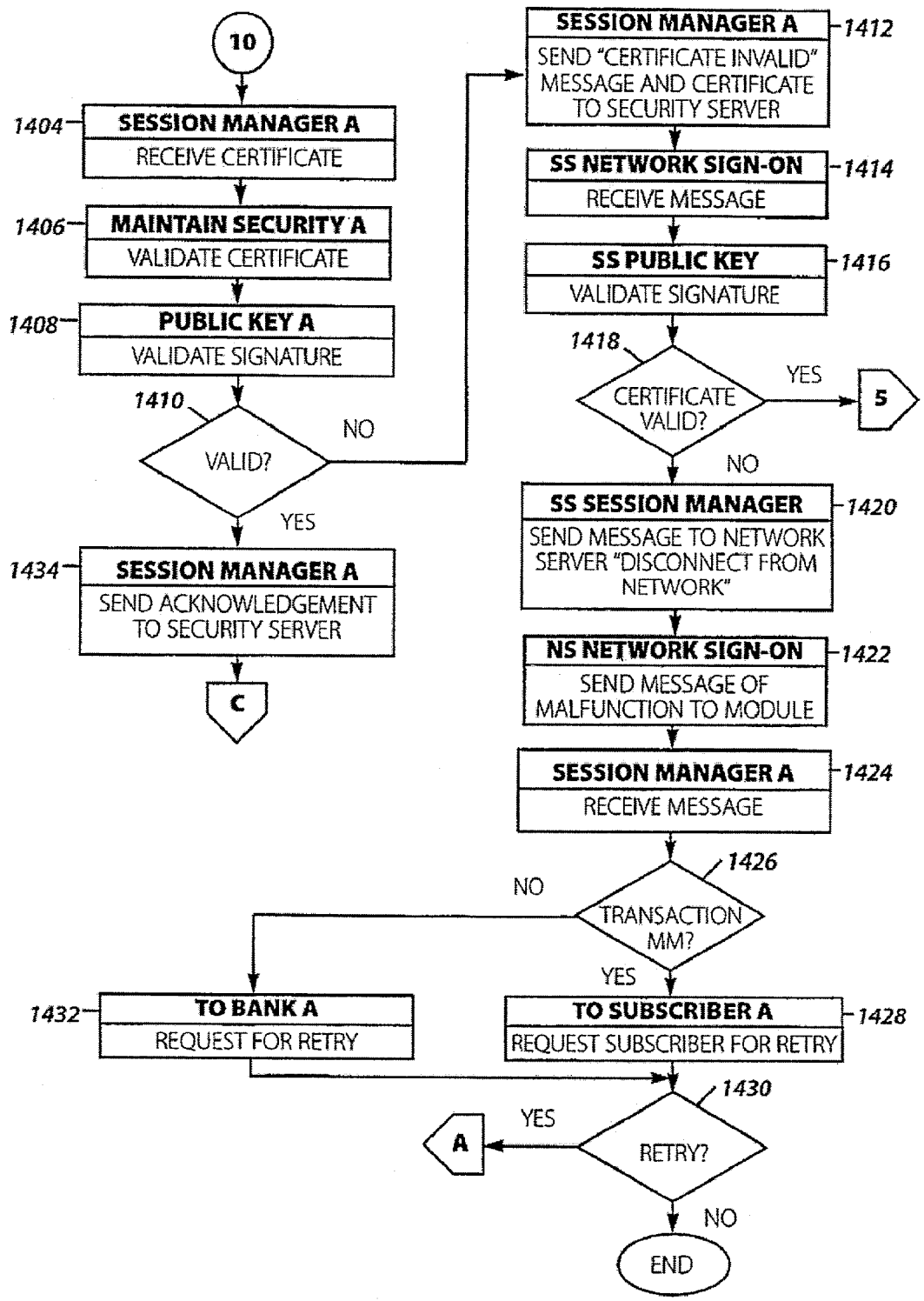
Figure 88K:
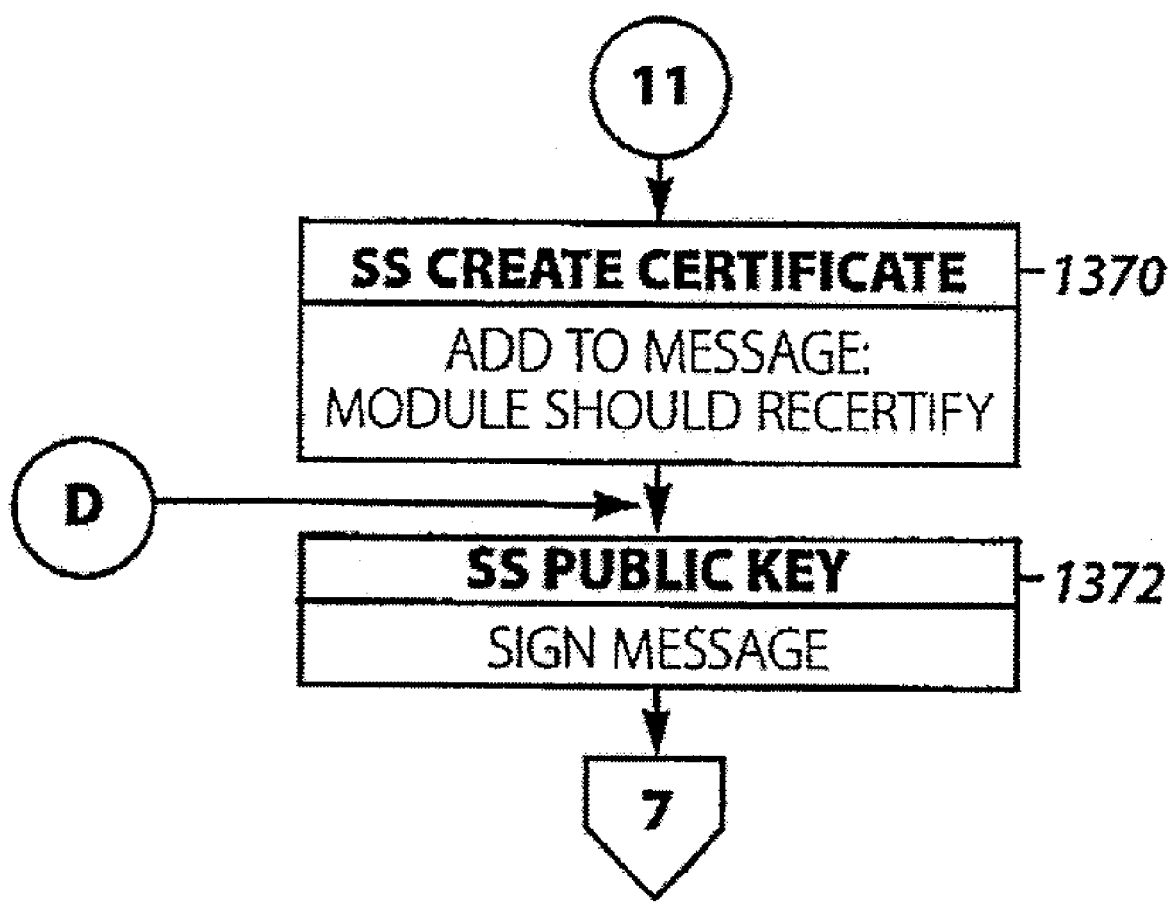
Figure 89A:
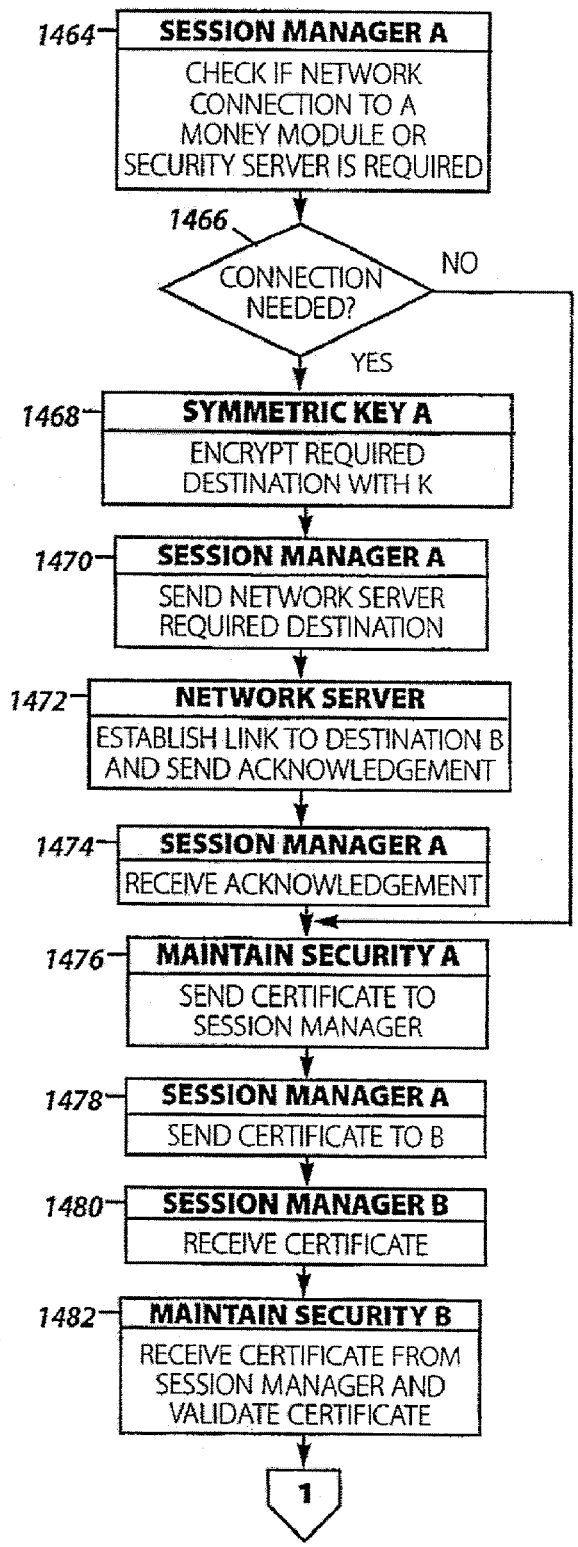
FIGS. 89A-89E illustrate an Establish Session protocol in the EMS.
Figure 89B:
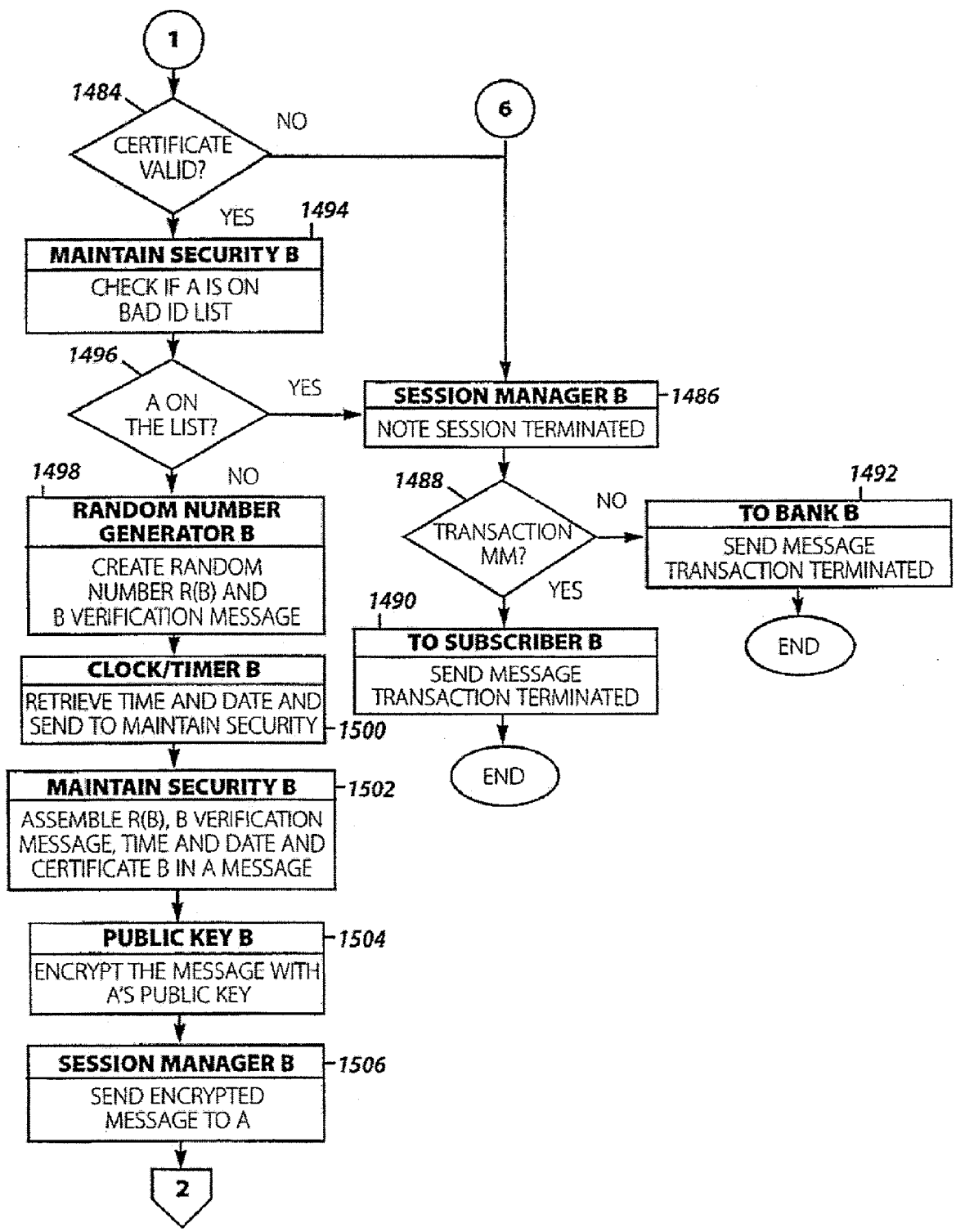
Figure 89C:
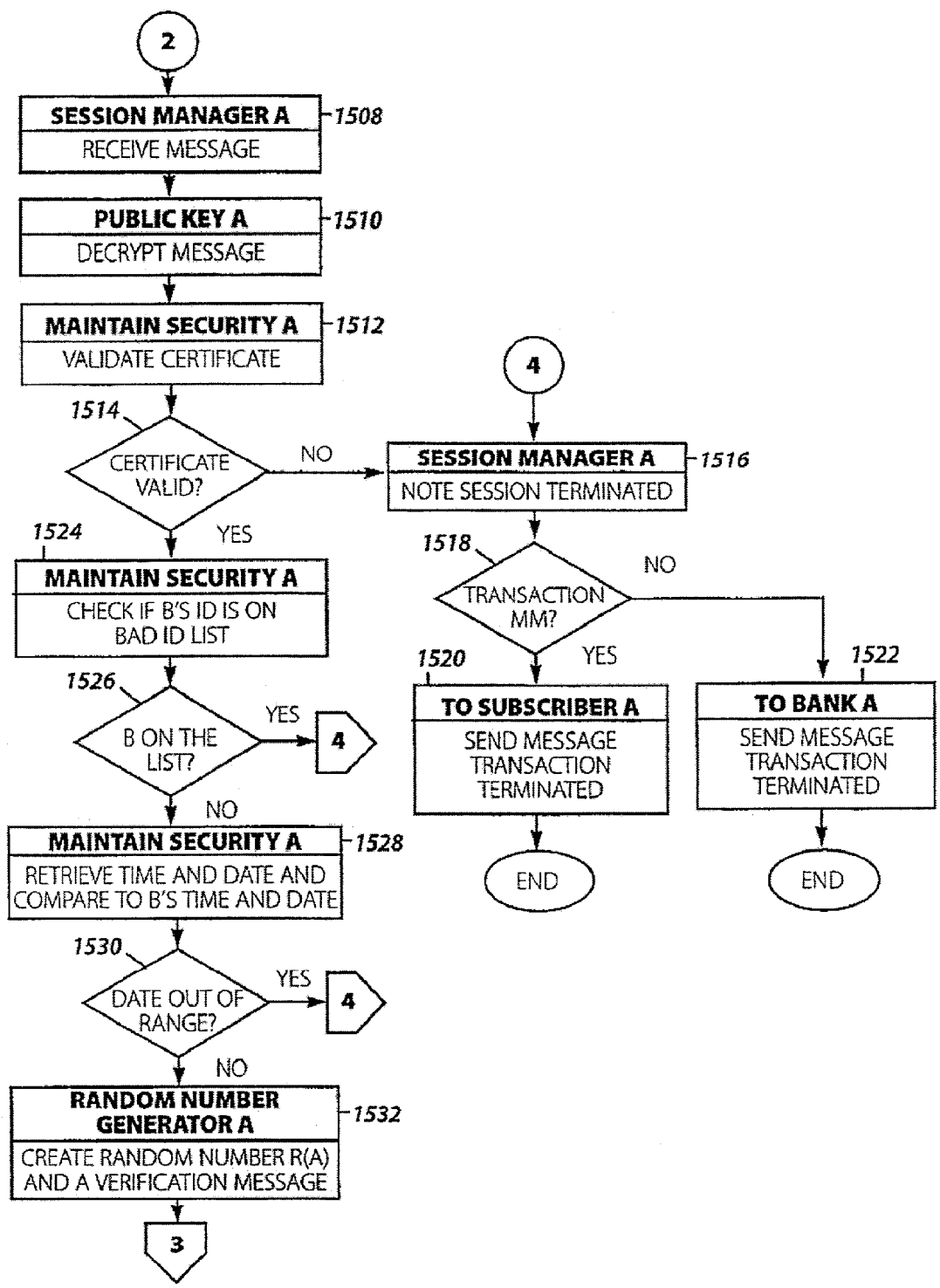
Figure 89D:
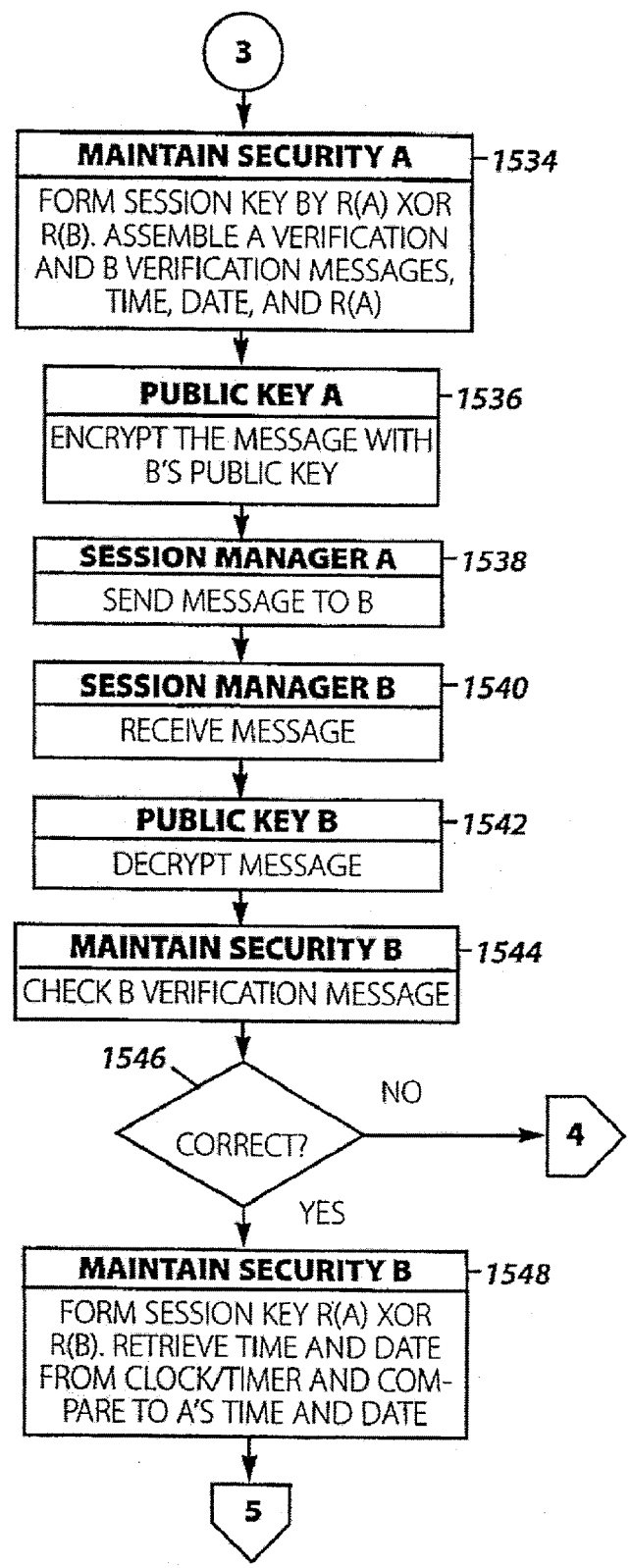
Figure 89E:
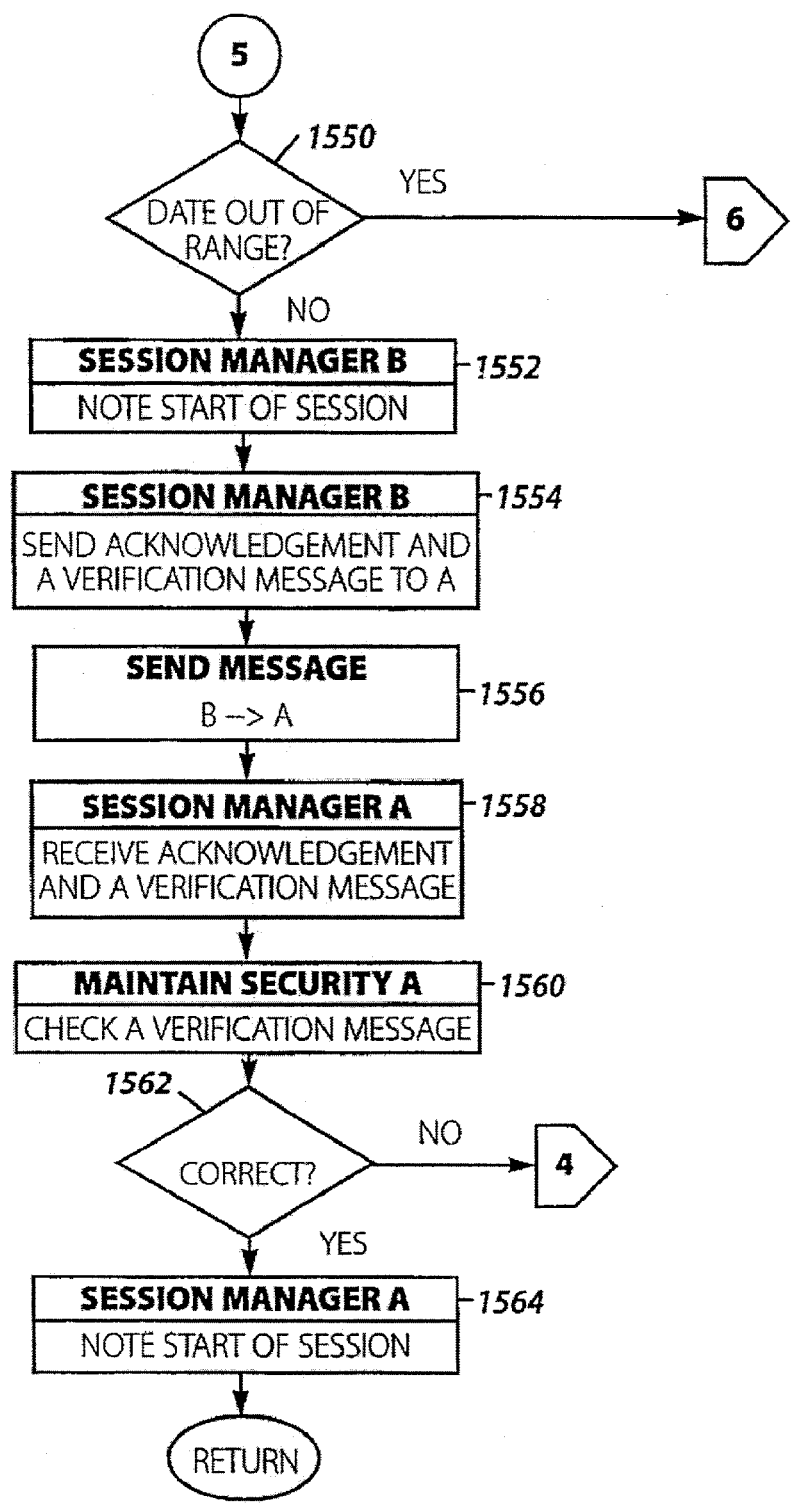

An overview of the network sign-on procedure is provided with reference to FIG. 87. The Sign-On protocol describes the situation where a module 1243 desires access to the EMS Network 1198 for recertification, deposit, withdrawal or other reason. The module 1243 may be a transaction money module 1186, teller money module 1138, money generator module 11188, or customer service module 1192. (a) Establish a communication between module 1243 and network server 1206. (b) Pass the module's certificate to the network server 1206. (c) The network server 1206 generates a random verification number V and a random key K; the network server then passes the module's certificate, V, and K to a security server 1184 (encrypted by a NS/SS key). (d) The module 1243 and the security server 1184 establish a secure communication session (via session key (MM/SS)). (e) The security server 1184 passes the time/date, update bad ID list, update list of primary security server public keys, public key length, global recertification (if necessary), and recertified module certificate (if necessary). (f) End session with module 1243 and send V and K to the module 1243. (g) Encrypt V with K and send to the network server 1206. (h) The network server 1206 acknowledges network sign-on to the module 1243. (i) The module 1243 then informs the network server 1206 of the destination (if any) to which it wishes to be connected. (j) The network server 1206 establishes a connection to the destination.

The network sign-on is designed so that no one can spoof the module 1243 or intercept any of its information in the clear. FIG. 88 describes the detailed flow of the network sign-on procedure.

Communications A establishes communications with the EMS Network 1198 (step 1244). Maintain Security A sends its certificate to the network server 1206 (step 1246). NS Network Sign-On receives the certificate (step 1248). NS Random Number Generator generates random key K and random verification number V (step 1250). NS Symmetric Key encrypts the module's certificate, K and V with a NS/SS key (step 1252). NS/SS keys are local symmetric keys installed in network servers 1206 and security servers 1184 which communicate for network sign-on. NS Network Sign-On sends the certificate, K and V to the security server 1184, where SS Network Sign-On receives the message and SS Symmetric Key decrypts the message (steps 1254-1258). SS Network Sign-On stores K and V and then sends the module certificate to SS Public Key for validation (steps 1260-1264).

If the module certificate is not valid, then SS Network Sign-On creates messages to deny access for transmittal to the network server 1206 and module 1243 (step 1266). SS Public Key encrypts the message to the module 1243 with the module's public key and SS Session Manager sends the messages to the network server (step 1268-1270). NS Network Sign-On receives the messages and notes access denied. The encrypted message is then sent to the module, and the network server disconnects. (Step 1272). Session Manager A receives the message, Public Key A decrypts the message, and Session Manager A notes that sign-on was denied (steps 1274-1278). If the device requesting sign-on was a transaction money module, then To Subscriber A informs the subscriber (steps 1280-1282). Otherwise, To Bank A informs the bank (step 1284).

If, on the other hand, the module's certificate is valid, then SS Control Bad ID List checks if the module's id is on the bad id list (steps 1286-1288). If the id is on the list, then network access is denied. Otherwise, SS Random Number Generator creates random number R and a verification message (step 1290). SS Network Sign-On assembles R, the verification message, and the security server's certificate in a message which is encrypted by SS Public Key using A's public key (steps 1292-1294). The message is sent to A where Public Key A decrypts the message and validates the security server's certificate (step 1298).

If the certificate is invalid, then A notes session termination and informs either the subscriber or the bank (steps 1304-1306). If the certificate is valid, then Maintain Security A checks if the security server's id is on the bad id list (steps 1308-1310). If on the list, then the session is terminated (steps 1300-1306). If not on the list, then Random Number Generator A creates random number R(A) (step 1312). Maintain Security A forms session key (MM/SS) by the operation R(A) XOR R and then stores the session key (step 1314).

A message containing the verification message and R(A) is assembled and encrypted with the security server's public key (step 1316). Session Manager A sends the message To SS Network Sign-On and SS Public Key decrypts the message (steps 1318-1322).

SS Network Sign-On verifies that the verification message is the one which it created (steps 1324-1326). If it is not, then the security server denies network access. If the verification message is correct, then SS Symmetric Key forms session key (MM/SS) by R(A) XOR R (step 1328). SS Session Manager notes the start of session and sends an acknowledgement to A by the Send Message subroutine (steps 1330-1332). Session Manager A receives the acknowledgement and notes the start of the session (step 1334).

Clock/Timer A sends the time and date to the Session Manager which sends it to the security server (steps 1336-1340). SS Synchronize Date/Time receives the time and date and checks if it is within parameter (steps 1342-1344). If not within parameter, then SS Synchronize Date/Time sends a new time and date to Session Manager A (steps 1346-1350). Clock/Timer A then adjusts the time and date (step 1352). A then resends its date and time to the security server for rechecking. If clock synchronization is attempted more than a set number of times, then a clock malfunction is reported to the subscriber or bank, which may then retry if desired (steps 1354-1362).

If, however, the time and date are within parameter, then SS Network Sign-On assembles a message containing the bad id list, the new list of primary security server public keys (which comes from the Distribute Certificatory Key function), and the public key length (the size of the public keys are varied periodically) (step 1364). SS Create Certificate checks if a global recertification has been called for, and ensures that the time period for the global recertification has not expired (steps 1366-1368). Such time period should be long enough so that everyone's certificate has been recertified or expired. The function should also check when the module last recertified because if it was certified during the period of the global recertification, then there would be no need to recertify.

If recertification is required, then SS Create Certificate adds to the previous message: module should recertify (step 1370). Then, whether or not a recertification is called for, SS Public Key signs the message (step 1372). The message is sent to A where Public Key A checks the digital signature on the message (steps 1374-1378). If the signature is invalid, then the session is terminated. If the signature is valid, then Public Key A decrypts the primary security server public key list using an existing PSS public key (step 1380). The updated list of primary security server public keys was previously encrypted by the private key of the originating primary security server. Maintain Security A then updates its bad id list, public key list, and key length (step 1382).

Module A then checks if its certificate needs to be recertified (either because of a global recertification order or because of an expired certificate) (steps 1384-1386). If a new certificate is required, then Maintain Security A initiates the generation of a new certificate (step 1388). Public Key A generates new keys and signs the new public key with its old public key (step 1390). Session Manager A sends the signed new public key to the security server's SS Create Certificate (steps 1392-1396). SS Public Key then validates the signature on the new public key (steps 1398-1400). If not a valid signature, then the security server denies network access. If the signature is valid, then SS Public Key signs the module's new certificate and sends it to the module (step 1402). Session Manager A receives the certificate, Maintain Security A undertakes to validate the certificate, and Public Key A validates the signature (steps 1404-1410).

If the certificate is not valid, then Session Manager A sends a "Certificate Invalid" message and the certificate to the security server (step 1412). SS Network Sign-On receives the message and SS Public Key validates the signature (steps 1414 1418). If the security server determines that the certificate is actually valid, then it denies the module access to the network. If, however, the certificate is invalid, then SS Session Manager informs the network server that it will disconnect from the network (step 1420). NS Network Sign-On informs the module of the malfunction (step 1422). The module then queries the subscriber or the bank for a retry (steps 1424-1432).

If, on the other hand, the module determines that its new certificate is valid, then Session Manager A sends an acknowledgement to the security server (step 1434). Similarly, if no new certificate was required then Maintain Security A sends an acknowledgement message to the security server (steps 1436-1438). In either case, SS Session Manager receives the acknowledgement and notes the end of its session with the module (step 1440). SS Network Sign-On then sends K and V to A (steps 1442-1444). Session Manager A receives the message and Symmetric Key A encrypts V with K and sends the message to the network server (steps 1446-1448). NS Network Sign-On receives the message and NS Symmetric Key decrypts the message and checks if V is the same V it previously generated (steps 1450-1454).

If V is incorrect, then NS Network Sign-On sends an access denied message to A and then disconnects (steps 1456-1458). If V is correct, then NS Network Sign-On sends an acknowledgement to A (step 1460). Finally, Session Manager A receives the acknowledgment and notes that A has signed-on to the EMS Network 1198 (step 1462).

Establish Session

FIG. 89 shows the Establish Session protocol. Session Manager A checks if a network connection to a money module or security server is required (steps 1464-1466). If a connection is needed, then Symmetric Key A encrypts the required destination with key K (step 1468). Session Manager A sends the required destination to the network server (step 1470). The network server then establishes a link to destination B and sends an acknowledgement, which is received by Session Manager A (steps 1472-1474).

Maintain Security A sends its certificate to Session Manager A which sends it to B (steps 1476-1478). Session Manager B receives the certificate and Maintain Security B (if B is a security server, then this function is performed by the Session Manager) validates the certificate (steps 1480-1484). If the certificate is not valid, then Session Manager B notes the session is terminated and informs either the subscriber or the bank (steps 1486-1492) (if B is a security server, then B merely notes the transaction is terminated).

If the certificate is valid, then Maintain Security B checks if A is on the bad id list (steps 1494-1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message, time and date, and B's certificate in a message (step 1502). Public Key B encrypts the message with A's public key and Session Manager B sends the message to A (steps 1504-1506).

Session Manager A receives the message, Public Key A decrypts the message, and Maintain Security A validates B's certificate (steps 1508-1514). If the certificate is not valid, then Session Manager A notes the termination of the session and informs either the subscriber or the bank (steps 1516-1522). If the certificate is valid, then Maintain Security A checks if B is on the bad id list (steps 1524-1526). If B is on the list, then the session is terminated. If B is not on the list, then Maintain Security A retrieves the date and time and compares it to B's date and time (steps 1528-1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540-1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554-1556). Session Manager A receives the message and Maintain Security A checks the A verification message (steps 1558-1562). If the verification message is not correct, the session is terminated. If the verification message is correct, then Session Manager A notes the start of the session (step 1564).

Transfer Notes

FIG. 90 shows the transfer notes protocol. Note Directory X chooses the note(s) and values for transfer (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days=residual value of note to be transferred times the number of days left until the note expires, summed for all the notes in the packet.

Notes X creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572-1574). Packet Manager Y receives the packet and disassembles it (step 1576).

Verify Y validates all certificates in the note(s) (e.g., money generator certificate and all transfer certificates). Then all transfers to certificates are verified by ensuring that the transferors and transferees match up throughout the history of the electronic note. Also, the total amount transferred is checked to ensure it is the amount expected. (Steps 1578-1580). If not valid, then the transaction is aborted (step 1582).

If valid and Y is a transaction money module, then Verifier Y verifies the expiration dates of the note(s) (steps 1584-1588). If the note(s) are expired, then the transaction is aborted. If not expired, then Verifier Y checks each id from the note transfers against the bad id list (steps 1590-1592). If any of the transfer id's are on the bad id list, then the transaction is aborted.

If the transfer id's are not on the bad id list (or Y is not a transaction money module), then Public Key Y verifies the validity of the note(s) signatures (steps 1594-1596). If the signatures are not valid, then the transaction is aborted. If the signatures are valid, then Notes Y places the note(s) in the money holder (step 1598). Finally, Note Directory Y updates the note(s) location(s) and amount(s) (step 1600).

Foreign Exchange

FIG. 91 shows the protocol for a foreign exchange transaction using dollars and pounds as exemplary monetary units. Initially, A agrees to exchange with B dollars ($) for pounds (£) at an exchange rate of $/£ (step 1602). A and B then sign on their money modules and prompt their subscribers for the type of transaction (steps 1604-1610). A chooses to buy foreign exchange and B chooses to sell foreign exchange (steps 1612-1614). A and B establish a secure transaction session (steps 1616-1620).

To Subscriber A prompts the owner/holder of A for the amount by type of note of dollars he wishes to exchange (step 1622). Pay/Exchange A receives the amount and Note Directory A checks if A has sufficient funds (steps 1624-1628). If the funds are not sufficient, then To Subscriber A prompts for a new amount which again is checked against existing funds (steps 1630-1632). If no new amount is entered, then the transaction is aborted (step 1634).

If funds are sufficient, then Pay/Exchange A sends the dollar amount to B (steps 1636-1638). To Subscriber B then prompts the owner/holder of B to select either the amount of pounds he wishes to exchange for the dollars or, alternatively, simply the exchange rate for the dollars (step 1640). Note Directory B checks for sufficient funds (steps 1642-1644). If funds are insufficient, then To Subscriber B prompts for a new rate and again existing funds are checked for sufficiency (steps 1646-1648). If, however, no new rate is selected, then Pay/Exchange B informs A of its insufficient funds (steps 1650-1652). A may then select a new amount for exchange or abort the transaction (steps 1630-1634).

If B has sufficient funds for the transaction, then Pay/Exchange B sends A an acknowledgment and the amount of pounds to be exchanged (the equivalent rate is also sent) (steps 1654-1656). To Subscriber A prompts to verify the amount of pounds and the rate (steps 1658-1660). If the amount and rate are incorrect, then Pay/Exchange A informs B that the amount and rate are incorrect (steps 1662-1664). To Subscriber B then prompts for a new rate (steps 1666-1668). If no new rate is chosen, then the transaction is aborted (step 1670).

If, however, A verifies the correct amount and rate of the transaction, then Pay/Exchange A passes the dollar amount to the money holder (step 1672). The dollar notes are then transferred from A to B (step 1674). Pay/Exchange B passes the pound amount to its money holder (step 1676). The pound notes are then transferred from B to A (step 1678).

At this point in the transaction, both A and B provisionally hold foreign exchange notes in the correct amounts. A and B have each participated in two transfers: A transfers: (1) A transferred dollars to B; (2) A received pounds from B. B transfers: (1) B transferred pounds to A; (2) B received dollars from A. To complete the foreign exchange transaction, A must now commit (i.e., finalize and permanently record in its transaction log) both of its two transfers. Similarly, B must commit both of its two transfers. Note that A may commit to the foreign exchange transfer A→B (dollars from A to B) and B→A (pounds from B to A) separately. Likewise B may commit to the foreign exchange transfers A→B and B→A separately.

The next portion of the foreign exchange protocol is designed so that neither party knows the order in which the transacting money modules will commit. Such uncertainty will discourage parties from intentionally trying to tamper with a transaction. As background, a function S(X) is defined so that S(O)=A and S(1)=B, where A and B refer to money modules A and B. Thus, if X is randomly chosen as 0 or 1, then money module A or B is randomly indicated.

The following routine is used to allow A and B to commonly establish a random X. R(A) and R(B) are the random numbers generated by A and B, respectively, during the Establish Session subroutine. The parity of R(A) XOR R(B) is determined (by exclusive-ORing each bit of R(A) XOR R(B). This parity is the random number X. $\overline{X}$ is the complement of X ($\overline{X}$=X XOR 1).

Referring again to FIG. 91, Tran Log A conditionally updates its transaction log to record the transfer S(X) to S($\overline{X}$) (step 1680). IF X is calculated to be 0, then the transfer A to B (i.e., the dollar transfer) is conditionally recorded. If X is calculated to be 1, then the transfer B to A (i.e., the pound transfer) is conditionally recorded. Because the log is conditionally recorded, it may be rolled-back in the event money module A aborts the transaction. The update log becomes permanent once the log update has been set to unconditional (either as shown explicitly in the flow diagram or implicitly during a commit). Session Manager A then sends a "Log Updated" message to B (steps 1682-1684). In response, Tran Log B also conditionally updates its log to record the transfer S(X) to S($\overline{X}$) (step 1686).

If X=1, then Tran Log B sets the log update to unconditional (steps 1688-1690). Thus, at this point, B has committed to its transfer of pounds to A. Next, B follows the Commit protocol (step 1692) described subsequently with reference to FIG. 92. In this situation, A will commit to both its transfers (i.e., transferring dollars and receiving pounds) and B will commit to its one outstanding (uncommitted) transfer, namely receiving dollars.

If, however, X=0 (step 1688), then Session Manager B sends a "Start Commit" message to A (steps 1694-1696). Tran Log A then sets its log update to unconditional (step 1698), thus committing to its transfer of dollars. The Commit protocol of FIG. 92 is then called (step 1700). During this protocol (described subsequently) B commits to both its transfers (i.e., transferring pounds and receiving dollars) and A commits to its one outstanding transfer, receiving pounds.

The foreign exchange protocol thus ensures that neither party know whose transfer (A's of dollars or B's of pounds) will be committed first. This reduces the incentive of a party to tamper with the transaction.

Commit (Module)

FIG. 92 shows the Commit protocol for modules. Session Manager X sends a "Ready-to-Commit" message to Y (steps 1702-1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706-1708) and commits to any outstanding transactions by updating its transaction log (step 1710). Also, if Y is a transaction money module, then To subscriber Y notifies the subscriber of the successful transaction (steps 1712-1714). Session Manager Y notes the end of the session (step 1716).

Tran Log X receives the acknowledgement from Y and updates its transaction log, thus committing to any outstanding transfers. X completes its commit in the same manner as Y (steps 1718-1724).

Abort Transaction (Module)

Figure 93A:
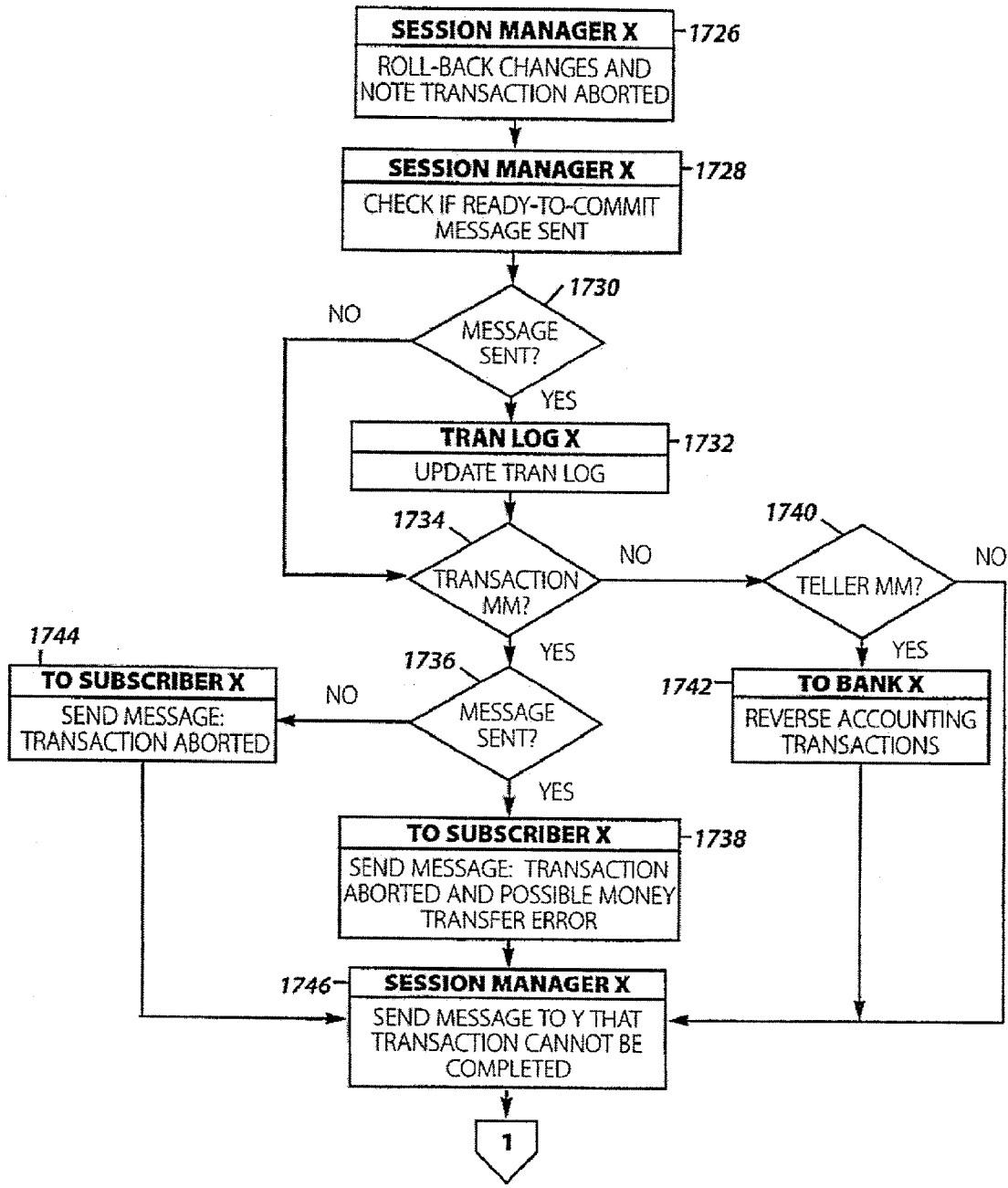
FIGS. 93A-93B illustrate an Abort Transaction protocol for modules in the EMS.
Figure 93B:
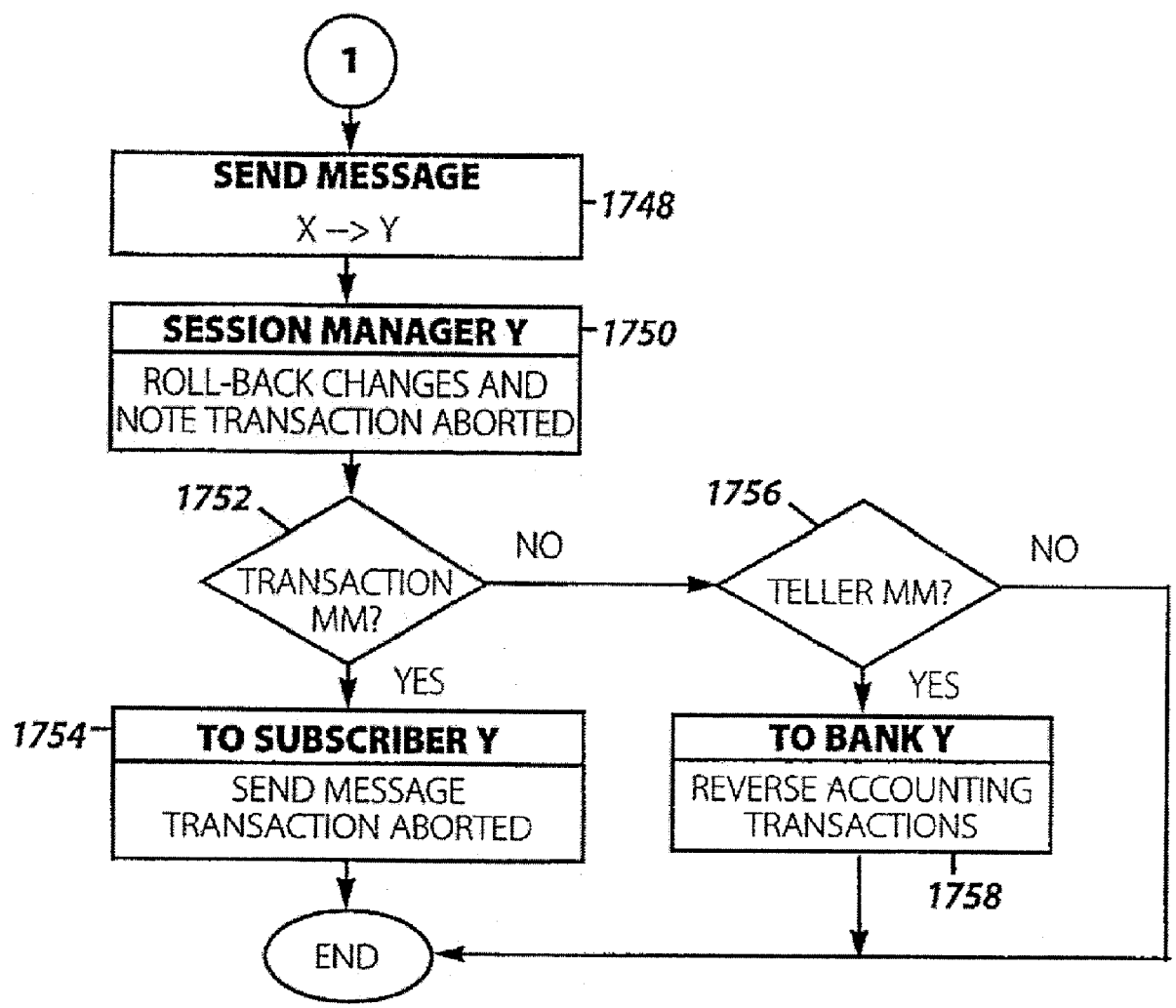

FIG. 93 shows the Abort transaction protocol for modules. Session Manager X rolls-back changes and notes that the transaction is aborted (step 1726). Session Manager X then checks if the "Ready-to-Commit" message has been sent (steps 1728-1730). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734-1738).

If X is a teller money module 1188, then To Bank X informs the bank that it should reverse its accounting transactions (by appropriate debits and credits) (steps 1740-1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746-1748). Session Manager Y rolls-back its changes and notes the transaction as aborted (step 1750). Y then informs its subscriber that the transaction is aborted (steps 1752-1754) or informs the bank to reverse its accounting transaction (steps 1756-1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

POS Payment

Figure 94A:
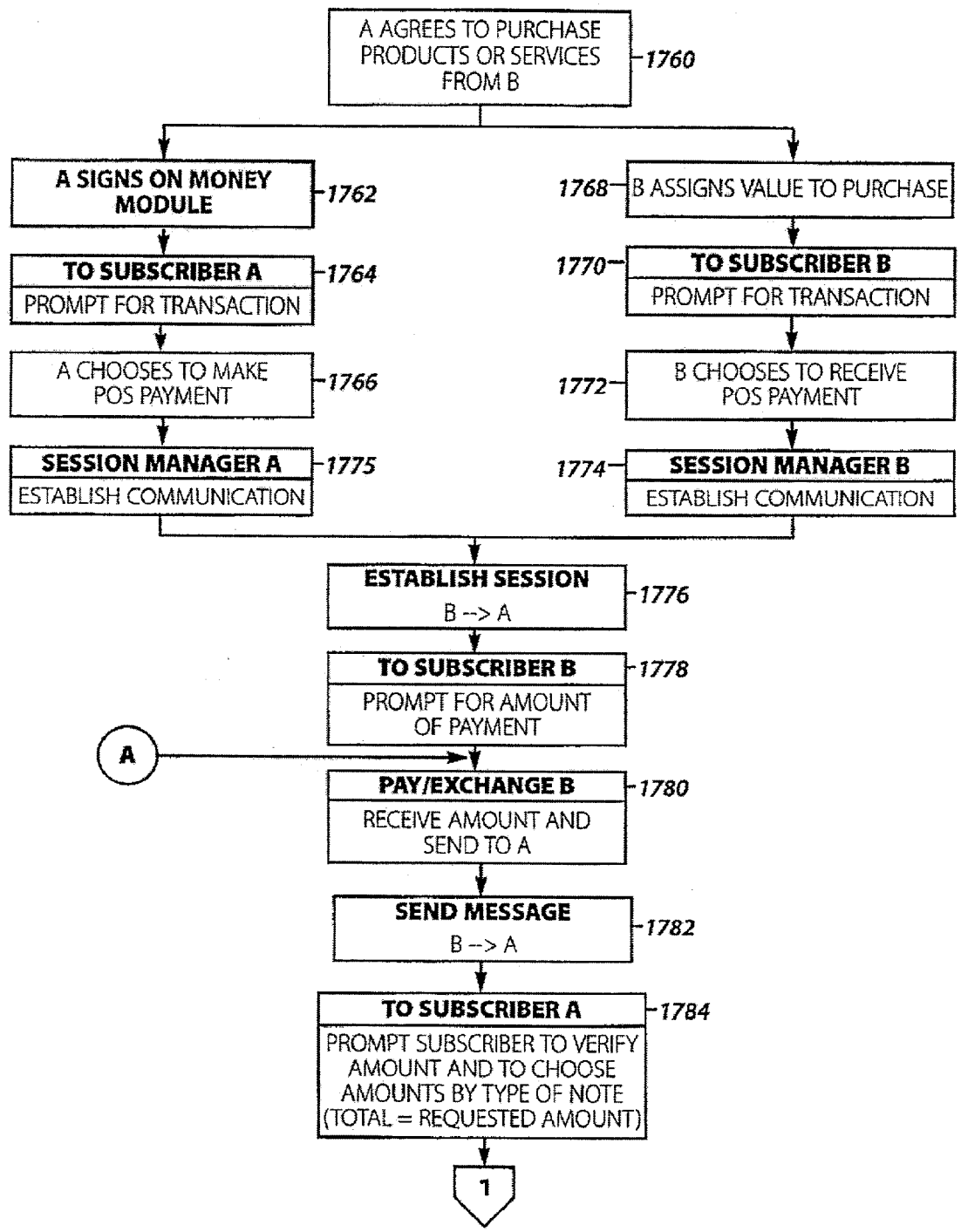
FIGS. 94A-94C illustrates a Point of Sale (POS) Payment protocol.
Figure 94B:
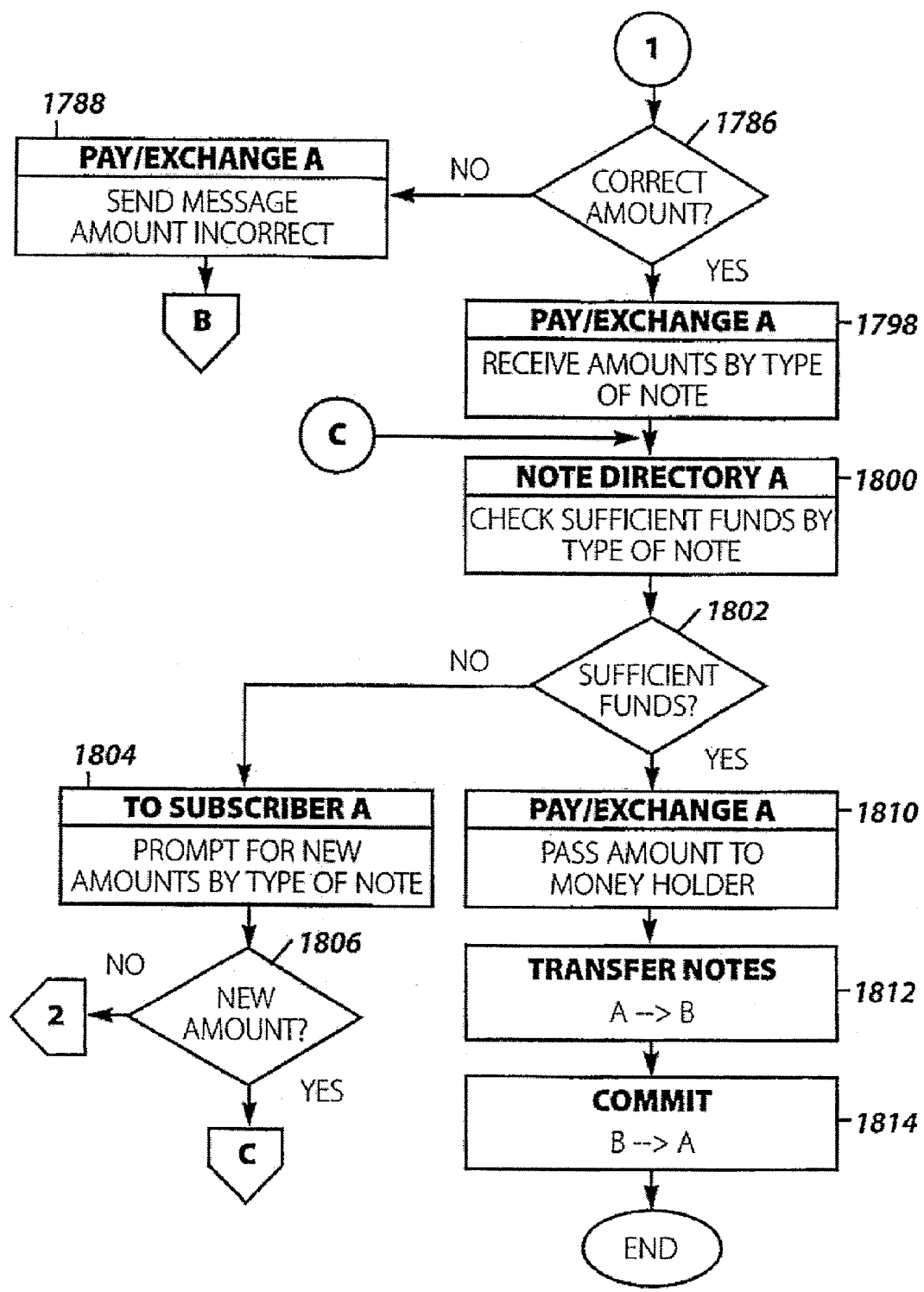
Figure 94C:
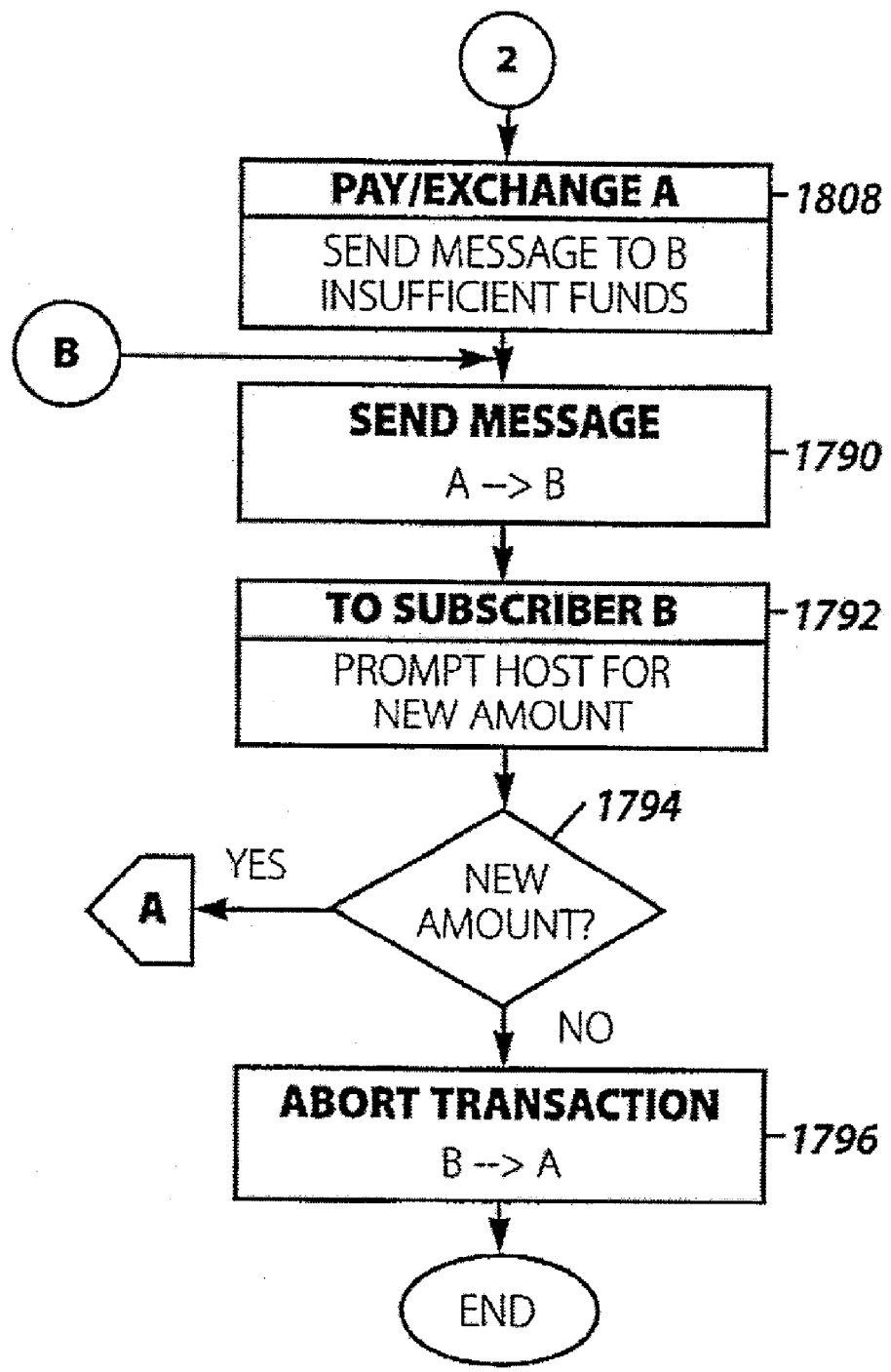

FIG. 94 shows a Point of Sale (POS) payment protocol. The POS Payment protocol is intended to simplify payments made between a buyer's transaction money module 1186 and a merchant's transaction money module 1186. The merchant's transaction money module 1186 may, for example, be located in a cash register at a supermarket.

Initially, A agrees to purchase products or services from B (step 1760). The owner/holder of transaction money module A signs onto his money module (step 1762). To Subscriber A prompts the owner/holder for a transaction and A chooses to make a POS payment (steps 1764-1766). Meanwhile, the merchant determines the total purchase price (step 1768). To Subscriber B prompts for a transaction and B chooses to receive a POS payment (steps 1770-1772). A and B then establish a secure session (steps 1774-1776).

To Subscriber B prompts for amount of payment and Pay/Exchange B receives the amount and sends it to A (steps 1778-1782). To Subscriber A then prompts its subscriber to verify the requested amount (steps 1784-1786). Moreover, the subscriber is requested to choose the notes in which it will pay (e.g., currency or credit) and the amounts so that the total equals the requested amount. If the requested amount is not correct, then Pay/Exchange A sends B a message indicating that the requested amount is incorrect (steps 1788-1790). To Subscriber B then prompts its host for a new amount (steps 1792-1794). If a new amount is not chosen then the transaction is aborted (step 1796).

If the requested amount is correct, then Pay/Exchange A receives amounts by type of note (step 1798). Note Directory A then checks for sufficient funds (steps 1800-1802). If funds are insufficient, then To Subscriber A prompts for new amounts by type of note (steps 1804-1806). If no new amount is entered, then Pay/Exchange A sends B a message that it has insufficient finds (steps 1808, 1790). To Subscriber B prompts host for new amount (steps 1792-1794). If no new amount is selected, then the transaction is aborted (step 1796). If a new amount is selected, then the payment transaction begins again.

If funds are sufficient, then Pay/Exchange A passes the amount to the money holder (step 1810). The notes are then transferred from A to B (step 1812). Finally, the transaction money modules commit (step 1814).

Figure 95A:
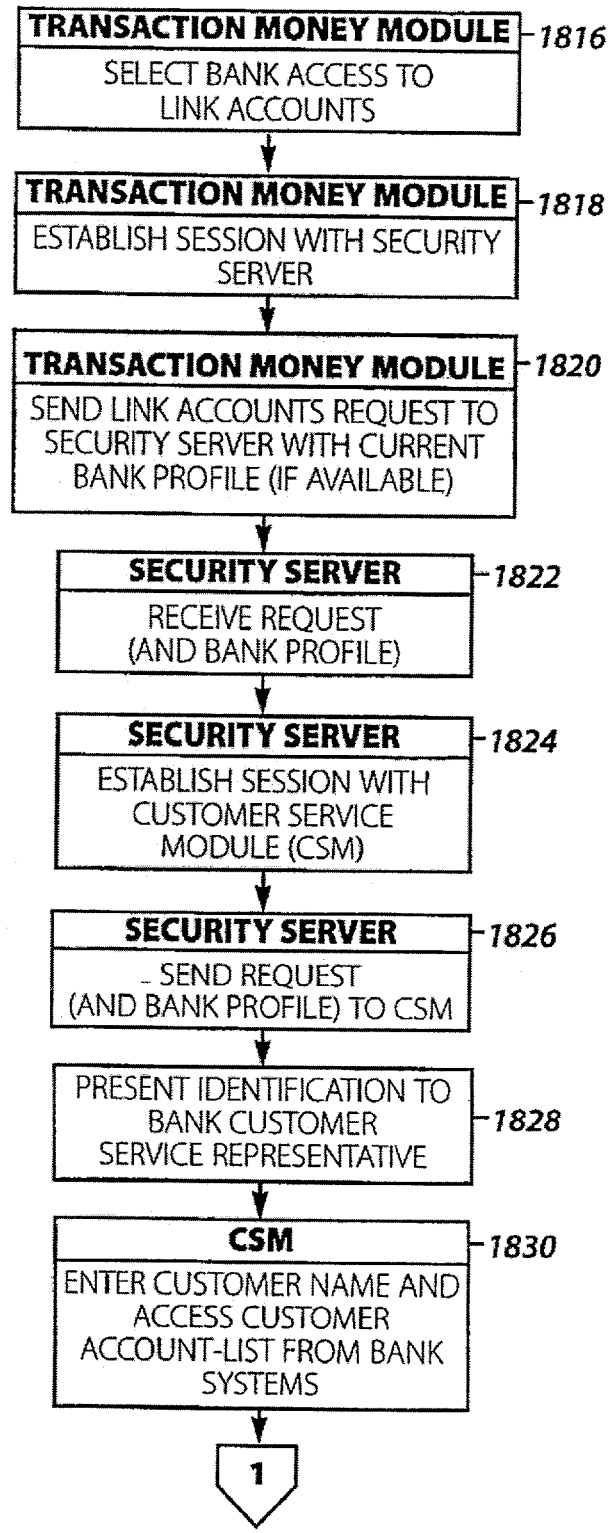
FIGS. 95A-95B illustrate a Link Accounts protocol.
Figure 95B:
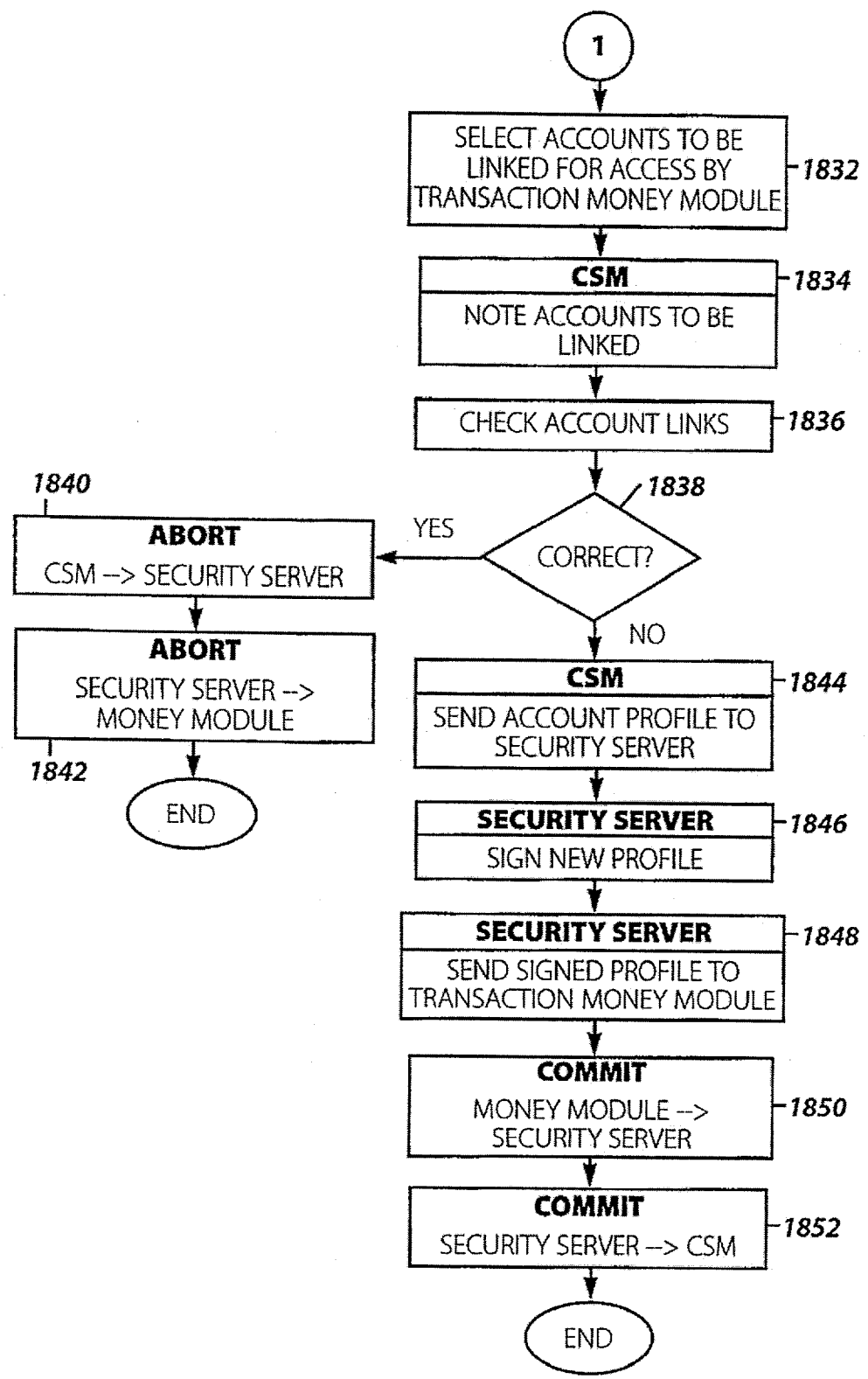

As can be seen, the POS payment is simplified for the buyer because it is a payee initiated payment. Link Accounts FIG. 95 shows the protocol for linking accounts by creating or updating account profiles. A customer will be able to link his/her transaction money module to his/her accounts at a bank by using the link accounts protocol (a teller money module 1188 at a correspondent bank may also be linked to its bank's accounts at an issuing bank). A profile of accounts is carried by the transaction money module 1186 (or teller money module 1188) for access to each of the linked accounts. This profile will be signed by a bank's security server 1184. The bank need not keep an access list for each customer since it can check its digital signature when the account profile is presented by the customer's money module. This should provide increased security over today's method of access using an ATM or credit card.

Customer Service Modules 1192 (CSM) are tamper-proof devices used for creating and updating account profiles. CSMs 1192 contain a unique certificate like those found in money modules and security servers. CSMs can establish secure sessions with other modules (e.g., security servers). To link accounts, the owner of a transaction money module 1186 goes to his bank in person and connects his money module to the bank's network 1200. Referring to FIG. 95, the money module selects bank access to link accounts (step 1816). The money module 1186 then establishes a secure session with a security server 1184 (step 1818). The money module then sends a link accounts request to the security server along with its current bank profile (if one exists) (step 1820). The security server receives the link request (and bank profile) (step 1822). The security server establishes a session with a customer service module 1192 (step 1824). The security server then sends a link request (and bank profile) to the CSM (step 1826).

The owner of the transaction money module then presents his identification to a bank customer service representative (step 1828). The customer service representative enters the customer's name and the CSM accesses the customer's account-list from the bank systems (step 1830). The owner of the money module then selects the accounts to be linked for access by the money module (step 1832). The CSM notes the accounts to be linked (step 1834). The money module owner and customer service representative then check the account links (steps 1836-1838). If the account links are incorrect, then the CSM to security server session and the security server to money module session are aborted (steps 1840-1842).

If the account links are correct, then the CSM 1192 sends the account profile to the security server 1184 (step 1844). The security server 1184 digitally signs the new (or updated) profile (step 1846). The security server 1184 then sends the signed profile to the money module 1186 (step 1848). Finally, the money module to security server transaction commits (step 1850) and the security server to CSM transaction commits (step 1852).

In this disclosure, there is shown and described the preferred embodiments of the invention, it being understood that the invention is capable of use in various other combinations and environments and is capable of changes or modifications within the scope of the inventive concepts as expressed herein.

Moreover, although the invention has been described in detail with particular reference to a preferred embodiment thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A device having an input and an output, said device comprising: a memory; a certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by a tampering phenomenon, and whereupon said verification being successful said certifying authority is able to certify that said device is in an untampered state, wherein said device key pair generator regenerates a new key pair in response to a predetermined event; and a certificate which certifies an authenticity of said new key pair, wherein the secure device is issued a first certificate that has a finite life, and said recertification is performed at predetermined intervals prior to an end of said finite life.

2. A device as recited in claim 1, wherein said device uses said device private key to sign said certificate which asserts a change from said public key to a new public key.

3. A device as recited in claim 2, wherein said certificate is shown to be rooted in said first certificate so as to maintain said untampered state.

4. A device as recited in claim 3, further comprising a recertifier for enabling said certifying authority to recertify said device.

5. A method for a certifying authority to certify an untampered state of a device, said method comprising: a certifying authority having an authority public key known to said device; generating a device key pair for said device, said device key pair including a device private key and a device public key which are stored in said memory; exporting said device public key to said certifying authority; enabling said certifying authority to perform a verification that said device public key emerged from said device, and that said device was not attacked by a tampering phenomenon, and whereupon said verification being successful said certifying authority certifying that said device is in an untampered state; regenerating a new key pair in response to a predetermined event; generating a certificate certifying authenticity of said new key pair; ensuring that said certificate is available to a user to whom the device wishes to be authenticated by the certifying authority sending said certificate to the device; and said device authenticating that said certificate came from said certifying authority, wherein authenticating is implemented using a secret key authenticating technique.

6. A device having an input and an output, said device comprising: a memory; a tamper circuit coupled to said memory and being responsive to a tampering phenomenon, such that a certifying authority can determine an occurrence of said phenomenon, said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; wherein said device digitally signs a public key of the new key pair using the device private key of the device key pair, and wherein the secure device is issued a first certificate that has a finite life, and said recertification is performed at predetermined intervals prior to an end of said finite life.

7. A device as recited in claim 6, wherein said device uses said device private key to sign said certificate which asserts a change from said public key to a new public key.

8. A device as recited in claim 7, wherein said certificate is shown to be rooted in said first certificate so as to maintain said untampered state.

9. A method for a certifying authority to certify an untampered state of a device, said method comprising: providing a tamper circuit being responsive to a tampering phenomenon; a certifying authority determining an occurrence of said phenomenon, said certifying authority having an authority public key known to said device; generating a device key pair for said device, said device key pair including a device private key and a device public key which are stored in said memory; exporting said device public key to said certifying authority; enabling said certifying authority to perform a verification that said device public key emerged from said device, and that said device was not attacked by said tampering phenomenon, and whereupon said verification being successful said certifying authority certifying that said device is in an untampered state; regenerating a new key pair in response to a predetermined event; digitally signing a public key of the new key pair using the device private key of the device key pair; ensuring that said device certificate is available to a user to whom the device wishes to be authenticated; and said device authenticating that said certificate came from said certifying authority, wherein said step of authenticating is implemented using a secret key authenticating technique.

10. A device having an input and an output, said device comprising: a memory; said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, wherein said device key pair generator regenerates a new key pair in response to a predetermined event; wherein said device digitally signs a public key of the new key pair using the device private key of the device key pair, wherein the secure device is issued a first certificate that has a finite life, and said recertification is performed at predetermined intervals prior to an end of said finite life.

11. A device as recited in claim 10, wherein said device uses said device private key to sign said certificate which asserts a change from said public key to a new public key.

12. A device as recited in claim 11, wherein said certificates are shown to be rooted in said first certificate so as to maintain said untampered state.

13. A device having an input and an output, said device comprising: a memory; said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, wherein said device key pair generator regenerates a new key pair in response to a predetermined event; wherein said device digitally signs a public key of the new key pair using the device private key of the device key pair, and a recertifier for enabling said certifying authority to recertify said device.

14. A method for a certifying authority to certify an untampered state of a device, said method comprising: a certifying authority having an authority public key known to said device; generating a device key pair for said device, said device key pair including a device private key and a device public key which are stored in said memory; exporting said device public key to said certifying authority; enabling said certifying authority to perform a verification that said device public key emerged from said device, regenerating a new key pair in response to a predetermined event; digitally signing a public key of the new key pair using the device private key of the device key pair; ensuring that said device certificate is available to a user to whom the device wishes to be authenticated by the certifying authority sending said certificate to the device; and said device authenticating that said certificate came from said certifying authority by using a secret key authenticating technique.

15. A device having an input and an output, said device comprising: a memory; a tamper circuit coupled to said memory and being responsive to a tampering phenomenon, such that a certifying authority can determine an occurrence of said phenomenon, said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; a certificate which certifies an authenticity of said new key pair; and a zeroizing circuit capable of erasing a portion of said memory upon said tamper circuit detecting an occurrence of said tampering phenomenon.

16. A device as recited in claim 15, wherein said memory includes all non-volatile memory in said device.

17. A device having an input and an output, said device comprising: a memory; a tamper circuit coupled to said memory and being responsive to a tampering phenomenon, such that a certifying authority can determine an occurrence of said phenomenon, said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; a certificate which certifies an authenticity of said new key pair; and a recertifier for enabling said certifying authority to authenticate said untampered state, provide a recertification of said untampered state, and attest to said public key.

18. A device as recited in claim 17, wherein said first certificate has a finite life, and said recertification is performed at predetermined intervals prior to an end of said finite life.

19. A device having an input and an output, said device comprising: a memory; a tamper circuit coupled to said memory and being responsive to a tampering phenomenon, such that a certifying authority can determine an occurrence of said phenomenon, said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; and a certificate which certifies an authenticity of said new key pair, wherein said device uses said device private key to sign said certificate which asserts a change from said public key to a new public key.

20. A apparatus as recited in claim 19, wherein said certificates are shown to be rooted in said first certificate so as to maintain said untampered state.

21. A device as recited in claim 20, further comprising a recertifier for enabling said certifying authority to recertify said device.

22. A device as recited in claim 21, wherein said recertifier authenticates said untampered state, provides a recertification of said untampered state, and attests to said public key.

23. A device having an input and an output, said device comprising: a memory; a tamper circuit coupled to said memory and being responsive to a tampering phenomenon, such that a certifying authority can determine an occurrence of said phenomenon, said certifying authority having an authority public key known to said device; a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; and a certificate which certifies an authenticity of said new key pair, wherein said tampering phenomenon is such as to cause the device to undergo an action that triggers tamper-response zeroization.

24. A device having a memory which includes data required to be erased upon a tampering attempt, said device comprising: a tamper responsive circuit having an enabling capability; a certifying authority; an initialization circuit wherein said certifying authority enables said tamper responsive circuit using said enabling capability; a first key pair generator for generating a public key made available to a plurality of third party users, and for generating a private key retained in said memory; a certification circuit for exporting said public key to said certifying authority to enable said certifying authority to verify said public key, to certify that said public key emerged from said device, and to certify that said device is untampered; a key pair regenerator for forming a new key pair, upon an occurrence of a predetermined event, where said key pair includes a new public key and a new private key; and a recertifier for exporting said new public key to said certifying authority such as to enable said certifying authority to verify said new public key and certify that said new public key emerged from said device and that said device is untampered.

25. A device having a memory which includes data required to be erased upon a tampering attempt said device comprising: a tamper responsive circuit having an enabling capability; a certifying authority; an initialization circuit wherein said certifying authority enables said tamper responsive circuit using said enabling capability; a first key pair generator for generating a public key made available to a plurality of third party users, and for generating a private key retained in said memory; a certification circuit for exporting said public key to said certifying authority to enable said certifying authority to verify said public key, to certify that said public key emerged from said device, and to certify that said device is untampered; and a key pair regenerator for forming a new key pair, upon an occurrence of a predetermined event, where said key pair includes a new public key and a new private key, wherein at least a portion of said memory is zeroized upon said tamper responsive circuit detecting a tampering event.

26. A device as in claim 25, wherein said device further comprises a memory disaster protection circuit for stopping an attacker from impersonating said device.

27. A device as in claim 25, further comprising a re-initialization circuit for reinitializing said device to an operative state following said device being zeroized in response to said tampering event.

28. A device as in claim 25, wherein said reinitialization circuit employs symmetric keys.

29. A method for a certifying authority to certify an untampered state of a device, said method comprising: providing a tamper circuit being responsive to a tampering phenomenon; a certifying authority determining an occurrence of said phenomenon, said certifying authority having an authority public key known to said device; generating a device key pair for said device, said device key pair including a device private key and a device public key which are stored in said memory; exporting said device public key to said certifying authority; enabling said certifying authority to perform a verification that said device public key emerged from said device, and that said device was not attacked by said tampering phenomenon, and whereupon said verification being successful said certifying authority certifying that said device is in an untampered state; regenerating a new key pair in response to a predetermined event; generating a certificate certifying authenticity of said new key pair; ensuring that said device certificate is available to a user to whom the device wishes to be authenticated by the certifying authority sending said certificate to the device; and said device authenticating that said certificate came from said certifying authority using a secret key authenticating technique.

30. A method for certifying a device, comprising: generating a first key pair for said device, said first key pair including a first private key and a first public key; exporting said first public key to a certifying authority; said certifying authority certifying said device; generating a second key pair in response to a predetermined event, the second key pair including a second private key and a second public key; and digitally signing data comprising the second public key with the first private key, wherein the device is issued a first certificate that has a finite life, and recertification is performed at predetermined intervals prior to an end of said finite life.

31. The method as recited in claim 30, wherein said device uses said second private key to sign a certificate which asserts a change from said first public key to said second public key.

32. A method for certifying a device, comprising: generating a first key pair for said device, said first key pair including a first private key and a first public key; exporting said first public key to a certifying authority; said certifying authority certifying said device; generating a second key pair in response to a predetermined event, the second key pair including a second private key and a second public key; digitally signing data comprising the second public key with the first private key; and enabling, with a recertifier, said certifying authority to recertify said device.

* * * * *